(12) United States Patent
Stearns et al.

(10) Patent No.: US 9,134,044 B2
(45) Date of Patent: *Sep. 15, 2015

(54) ROOF MOUNT ASSEMBLY

(71) Applicant: Vermont Slate & Copper Services, Inc., Morrisville, VT (US)

(72) Inventors: Brian C. Stearns, Stowe, VT (US); Alexander Grant Bornemann, Wolcott, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,521

(22) Filed: Apr. 21, 2014

(65) Prior Publication Data

US 2014/0305046 A1    Oct. 16, 2014

Related U.S. Application Data

(63) Continuation-in-part of application No. 13/271,650, filed on Oct. 12, 2011, now Pat. No. 8,701,354, which (Continued)

(51) Int. Cl.
*E04B 1/68* (2006.01)
*F24J 2/52* (2006.01)
(Continued)

(52) U.S. Cl.
CPC .................. *F24J 2/5245* (2013.01); *E04D 3/36* (2013.01); *E04D 3/38* (2013.01); *E04D 13/10* (2013.01);
(Continued)

(58) Field of Classification Search
CPC ............. E04D 3/36; E04D 3/38; E04D 13/10; E04D 1/34

USPC .................. 52/58, 60, 27, 173.3, 62, 698; 248/205.1, 237; 136/244
See application file for complete search history.

(56) References Cited

U.S. PATENT DOCUMENTS 473,512 A     4/1892   Laird
756,884 A     4/1904   Parry
(Continued)

FOREIGN PATENT DOCUMENTS

CH    204783    5/1939
CH    671063    7/1989
(Continued)

OTHER PUBLICATIONS

"AET T6 Pitched Roof PV Rail System" Brochure, Applied Energy Technologies (Available at least as early as Oct. 20, 2011).

(Continued)

*Primary Examiner* — Beth Stephan
(74) *Attorney, Agent, or Firm* — Michael Best & Friedrich LLP

(57) ABSTRACT

A mount assembly is provided for mounting a structure to a roof having a top surface. The mount includes a flashing including an aperture; a bracket including a first portion and a second portion, the first portion having an opening and a countersink extending around the opening, the second portion extending at an angle away from the flashing, the second portion including a slot configured to be coupled to the structure; a fastener extending through the aperture and through the opening of the bracket; and a seal extending around the aperture and positioned between the flashing and the first portion of the bracket, the seal engaging the countersink of the bracket and being compressed against the flashing.

30 Claims, 101 Drawing Sheets

Related U.S. Application Data is a continuation of application No. 13/166,542, filed on Jun. 22, 2011, now Pat. No. 8,146,299, which is a continuation of application No. 12/914,209, filed on Oct. 28, 2010, now Pat. No. 8,209,914, which is a continuation-in-part of application No. 12/727,726, filed on Mar. 19, 2010, now Pat. No. 8,153,700, application No. 14/257,521, which is a continuation-in-part of application No. 13/271,650, which is a continuation of application No. 12/914,209, which is a continuation-in-part of application No. 12/727,726, application No. 14/257,521, which is a continuation-in-part of application No. 13/271,650, which is a continuation-in-part of application No. 13/166,378, filed on Jun. 22, 2011, now Pat. No. 8,151,522, which is a continuation of application No. 12/727,726, application No. 14/257,521, which is a continuation-in-part of application No. 13/271,650, which is a continuation-in-part of application No. 12/727,726, application No. 14/257,521, which is a continuation-in-part of application No. 13/272,005, filed on Oct. 12, 2011, now Pat. No. 8,826,618, application No. 14/257,521, which is a continuation-in-part of application No. 13/623,348, filed on Sep. 20, 2012, now Pat. No. 8,782,983.

(60) Provisional application No. 61/161,668, filed on Mar. 19, 2009, provisional application No. 61/298,101, filed on Jan. 25, 2010, provisional application No. 61/345,885, filed on May 18, 2010, provisional application No. 61/452,983, filed on Mar. 15, 2011, provisional application No. 61/485,693, filed on Mar. 15, 2011, provisional application No. 61/538,262, filed on Sep. 23, 2011, provisional application No. 61/914,936, filed on Dec. 11, 2013.

(51) Int. Cl.

| | | |
|---|---|---|
| *E04D 3/36* | (2006.01) | |
| *E04D 3/38* | (2006.01) | |
| *E04D 13/10* | (2006.01) | |
| *E04D 13/14* | (2006.01) | |
| *F16B 43/00* | (2006.01) | |
| *F16B 5/02* | (2006.01) | |
| *E04B 1/38* | (2006.01) | |

(52) U.S. Cl.
CPC ............ *E04D 13/14* (2013.01); *E04D 13/1407* (2013.01); *F16B 43/001* (2013.01); *E04B 2001/405* (2013.01); *F16B 5/0258* (2013.01); *F24J 2002/5294* (2013.01); *Y02B 10/20* (2013.01); *Y02E 10/47* (2013.01)

(56) References Cited

U.S. PATENT DOCUMENTS

| | | |
|---|---|---|
| 1,646,923 A | 10/1927 | Martens |
| 1,925,263 A | 9/1933 | Levow |
| 2,079,768 A | 5/1937 | Levow |
| 2,349,467 A | 5/1944 | Scott |
| D139,568 S | 11/1944 | Hinchman |
| 2,890,664 A | 6/1959 | Rachlin |
| 2,925,976 A | 2/1960 | Martin |
| D188,221 S | 6/1960 | Maro |
| 3,141,532 A | 7/1964 | Runyan |
| 3,182,762 A | 5/1965 | Syak et al. |
| 3,633,862 A | 1/1972 | Breen |
| 3,880,405 A | 4/1975 | Brueske |
| 3,937,121 A | 2/1976 | Schubert |
| 3,998,019 A | 12/1976 | Reinwall, Jr. |
| 4,226,058 A | 10/1980 | Riley |
| 4,269,012 A | 5/1981 | Mattingly et al. |
| 4,321,745 A | 3/1982 | Ford |
| 4,325,178 A | 4/1982 | Pruehs |
| 4,348,846 A | 9/1982 | Bellem |
| 4,367,864 A | 1/1983 | Eldeen |
| 4,404,962 A | 9/1983 | Zinn et al. |
| 4,554,773 A | 11/1985 | Conley |
| D293,203 S | 12/1987 | Hertensteiner |
| D294,904 S | 3/1988 | Bleskachek |
| 4,744,187 A | 5/1988 | Tripp |
| 4,763,456 A | 8/1988 | Giannuzzi |
| 4,778,702 A | 10/1988 | Hutter, III |
| 4,796,403 A | 1/1989 | Fulton et al. |
| 4,892,429 A | 1/1990 | Giannuzzi |
| 4,903,997 A | 2/1990 | Kifer |
| 4,927,305 A | 5/1990 | Peterson, Jr. |
| 4,977,720 A | 12/1990 | Kuipers |
| 5,082,412 A | 1/1992 | Thomas |
| 5,127,205 A | 7/1992 | Eidson |
| 5,207,043 A | 5/1993 | McGee et al. |
| 5,217,191 A | 6/1993 | Smith |
| 5,228,248 A | 7/1993 | Haddock |
| 5,353,473 A | 10/1994 | Sherick |
| 5,431,372 A | 7/1995 | Kostelecky |
| 5,483,772 A | 1/1996 | Haddock |
| 5,491,931 A | 2/1996 | Haddock |
| D368,648 S | 4/1996 | Losier |
| 5,528,872 A | 6/1996 | Rotter |
| 5,547,226 A | 8/1996 | Wentworth |
| 5,557,903 A | 9/1996 | Haddock |
| 5,609,326 A | 3/1997 | Stearns et al. |
| 5,613,328 A | 3/1997 | Alley |
| 5,685,508 A | 11/1997 | Smith |
| 5,687,936 A | 11/1997 | Wilson |
| D388,136 S | 12/1997 | Lecocq et al. |
| 5,692,352 A | 12/1997 | Simpson |
| 5,694,721 A | 12/1997 | Haddock |
| 5,715,640 A | 2/1998 | Haddock |
| 5,797,232 A | 8/1998 | Larson |
| 5,813,649 A | 9/1998 | Peterson et al. |
| 5,873,201 A | 2/1999 | Fey |
| 5,882,043 A | 3/1999 | Murphy et al. |
| D409,078 S | 5/1999 | Bolt |
| 5,983,588 A | 11/1999 | Haddock |
| D426,453 S | 6/2000 | Stearns et al. |
| D428,799 S | 8/2000 | Stearns et al. |
| D430,005 S | 8/2000 | Stearns et al. |
| 6,164,033 A | 12/2000 | Haddock |
| 6,193,455 B1 | 2/2001 | Levey |
| 6,354,046 B1 | 3/2002 | Swearingen |
| 6,360,491 B1 | 3/2002 | Ullman |
| 6,414,237 B1 | 7/2002 | Boer |
| 6,453,623 B1 | 9/2002 | Nelson et al. |
| 6,470,629 B1 | 10/2002 | Haddock |
| 6,514,005 B2 | 2/2003 | Shiokawa et al. |
| 6,526,701 B2 | 3/2003 | Stearns et al. |
| 6,536,729 B1 | 3/2003 | Haddock |
| 6,640,511 B1 | 11/2003 | Link |
| 6,718,718 B2 | 4/2004 | Haddock |
| 6,868,647 B2 | 3/2005 | Poldmaa |
| 6,918,724 B2 | 7/2005 | Eriksson |
| 7,013,612 B2 | 3/2006 | Haddock |
| 7,069,698 B2 | 7/2006 | Nee |
| 7,100,338 B2 | 9/2006 | Haddock |
| 7,174,677 B1 | 2/2007 | Dressler |
| 7,260,918 B2 | 8/2007 | Liebendorfer |
| 7,434,362 B2 | 10/2008 | Liebendorfer |
| 7,592,537 B1 | 9/2009 | West |
| 7,600,349 B2 | 10/2009 | Liebendorfer |
| 7,686,268 B2 | 3/2010 | Terunuma et al. |
| 7,703,256 B2 | 4/2010 | Haddock |
| D617,174 S | 6/2010 | Schaefer et al. |
| 7,730,901 B2 | 6/2010 | Ball |
| 7,758,011 B2 | 7/2010 | Haddock |
| 7,762,027 B1 | 7/2010 | Wentworth et al. |
| 7,789,365 B2 | 9/2010 | Durig et al. |
| 7,857,269 B2 | 12/2010 | Plaisted et al. |
| 7,861,485 B1 | 1/2011 | Wentworth et al. |

(56) References Cited

U.S. PATENT DOCUMENTS

| | | |
|---|---|---|
| 7,866,099 B2 | 1/2011 | Komamine et al. |
| 7,895,808 B1 | 3/2011 | Wentworth et al. |
| 7,900,413 B2 | 3/2011 | Stanley |
| 7,905,064 B1 | 3/2011 | Wentworth et al. |
| 7,935,202 B2 | 5/2011 | Stanley |
| 7,946,082 B2 | 5/2011 | Ohkoshi et al. |
| 7,956,280 B2 | 6/2011 | Kobayashi |
| 7,987,641 B2 | 8/2011 | Cinnamon |
| 8,109,048 B2 | 2/2012 | West et al. |
| 8,122,648 B1 | 2/2012 | Liu |
| 8,136,311 B2 | 3/2012 | Liu |
| 8,166,720 B2 | 5/2012 | Garrigus et al. |
| 8,375,654 B1 | 2/2013 | West et al. |
| 8,448,405 B2 | 5/2013 | Schaefer et al. |
| 8,549,793 B1 | 10/2013 | Gens et al. |
| 8,557,070 B2 | 10/2013 | Stanley |
| 8,756,881 B2 | 6/2014 | West et al. |
| 8,875,455 B1 | 11/2014 | Yang et al. |
| 8,946,540 B1 | 2/2015 | West et al. |
| 8,984,819 B1 | 3/2015 | Yang et al. |
| 8,991,114 B2 | 3/2015 | West |
| 9,003,729 B2 | 4/2015 | West et al. |
| 9,062,897 B2 | 6/2015 | West et al. |
| 2002/0035811 A1 | 3/2002 | Heuel |
| 2002/0046506 A1 | 4/2002 | Ullman |
| 2002/0066235 A1 | 6/2002 | Stearns et al. |
| 2002/0088196 A1 | 7/2002 | Haddock |
| 2002/0131842 A1 | 9/2002 | Eriksson |
| 2003/0101662 A1 | 6/2003 | Ullman |
| 2003/0177706 A1 | 9/2003 | Ullman |
| 2004/0173373 A1 | 9/2004 | Wentworth et al. |
| 2006/0010786 A1 | 1/2006 | Rogers |
| 2006/0260670 A1 | 11/2006 | Terunuma et al. |
| 2007/0175170 A1 | 8/2007 | Shah |
| 2007/0245636 A1 | 10/2007 | Ayer et al. |
| 2007/0266672 A1 | 11/2007 | Bateman et al. |
| 2007/0289233 A1 | 12/2007 | Haddock |
| 2008/0000173 A1 | 1/2008 | Lenox et al. |
| 2008/0053008 A1 | 3/2008 | Ohkoshi et al. |
| 2008/0087275 A1 | 4/2008 | Sade et al. |
| 2008/0190047 A1 | 8/2008 | Allen |
| 2008/0245404 A1 | 10/2008 | DeLiddo |
| 2008/0313976 A1 | 12/2008 | Allen |
| 2009/0309388 A1 | 12/2009 | Ellison |
| 2010/0192505 A1 | 8/2010 | Schaefer et al. |
| 2010/0236155 A1 | 9/2010 | Lanza |
| 2010/0307074 A1 | 12/2010 | Stearns et al. |
| 2011/0000519 A1 | 1/2011 | West |
| 2011/0000520 A1 | 1/2011 | West |
| 2011/0000526 A1 | 1/2011 | West |
| 2011/0000544 A1 | 1/2011 | West |
| 2011/0120047 A1 | 5/2011 | Stearns et al. |
| 2011/0135882 A1 | 6/2011 | Stanley |
| 2011/0138602 A1 | 6/2011 | Stanley |
| 2011/0162779 A1 | 7/2011 | Stanley |
| 2011/0204195 A1 | 8/2011 | Stanley |
| 2011/0240207 A1 | 10/2011 | Stanley |
| 2011/0247279 A1 | 10/2011 | Stearns et al. |
| 2011/0247295 A1 | 10/2011 | Stearns et al. |
| 2012/0017529 A1 | 1/2012 | Shadwell et al. |
| 2012/0125410 A1 | 5/2012 | West et al. |
| 2012/0152326 A1 | 6/2012 | West et al. |
| 2012/0233958 A1 | 9/2012 | Stearns |
| 2012/0234378 A1 | 9/2012 | West et al. |
| 2012/0255598 A1 | 10/2012 | West |
| 2012/0260972 A1 | 10/2012 | West et al. |
| 2012/0266946 A1 | 10/2012 | West et al. |
| 2012/0279558 A1 | 11/2012 | West et al. |
| 2012/0298186 A1 | 11/2012 | West |
| 2012/0298188 A1 | 11/2012 | West et al. |
| 2012/0298817 A1 | 11/2012 | West et al. |
| 2012/0301661 A1 | 11/2012 | West et al. |
| 2013/0048816 A1 | 2/2013 | Wentworth et al. |
| 2013/0140416 A1 | 6/2013 | West et al. |
| 2013/0180572 A1 | 7/2013 | West |
| 2013/0180573 A1 | 7/2013 | West |
| 2013/0180574 A1 | 7/2013 | West et al. |
| 2013/0183084 A1 | 7/2013 | West et al. |
| 2013/0298494 A1 | 11/2013 | Corsi |
| 2014/0026946 A1 | 1/2014 | West et al. |
| 2014/0053891 A1 | 2/2014 | West et al. |
| 2014/0102997 A1 | 4/2014 | West et al. |
| 2014/0130847 A1 | 5/2014 | West et al. |
| 2014/0158184 A1 | 6/2014 | West et al. |
| 2014/0174511 A1 | 6/2014 | West et al. |
| 2014/0175244 A1 | 6/2014 | West et al. |
| 2014/0182662 A1 | 7/2014 | West et al. |
| 2014/0223838 A1 | 8/2014 | West et al. |
| 2014/0246549 A1 | 9/2014 | West et al. |
| 2014/0251431 A1 | 9/2014 | West et al. |
| 2014/0299179 A1 | 10/2014 | West et al. |
| 2014/0326838 A1 | 11/2014 | West et al. |
| 2014/0339179 A1 | 11/2014 | West et al. |
| 2014/0360558 A1 | 12/2014 | West et al. |
| 2015/0013756 A1 | 1/2015 | West et al. |
| 2015/0033658 A1 | 2/2015 | West et al. |
| 2015/0040965 A1 | 2/2015 | West et al. |
| 2015/0040967 A1 | 2/2015 | West et al. |
| 2015/0041251 A1 | 2/2015 | Hudson et al. |
| 2015/0068590 A1 | 3/2015 | West et al. |
| 2015/0069198 A1 | 3/2015 | West et al. |
| 2015/0075100 A1 | 3/2015 | West et al. |
| 2015/0075589 A1 | 3/2015 | West et al. |
| 2015/0075590 A1 | 3/2015 | West |
| 2015/0155820 A1 | 6/2015 | West |
| 2015/0155821 A1 | 6/2015 | West |
| 2015/0155823 A1 | 6/2015 | West et al. |
| 2015/0180405 A1 | 6/2015 | West et al. |

FOREIGN PATENT DOCUMENTS

| | | |
|---|---|---|
| DE | 3716491 A1 | 12/1988 |
| DE | 3723020 A1 | 1/1989 |
| GB | 666147 | 2/1952 |
| JP | 5346055 | 12/1993 |
| JP | 8193392 | 7/1996 |
| JP | 2004300668 | 10/2004 |
| JP | 2004324181 | 11/2004 |
| JP | 2008274591 | 11/2008 |
| JP | 2011047154 | 3/2011 |
| WO | 2008044425 | 4/2008 |
| WO | 2011032134 A2 | 3/2011 |
| WO | 2015020817 | 2/2015 |
| WO | 2015023526 | 2/2015 |
| WO | 2015039007 | 3/2015 |
| WO | 2015042260 | 3/2015 |

OTHER PUBLICATIONS

Affordable Solar, UniRac PRO-PAK Standard Rail 204, available at least as early as Jan. 9, 2009.

Affordable Solar, Solar Panel Mounts & Solar Trackers for Solar Power Systems, available at least as early as Jan. 9, 2009.

"E-Ton Solar" Brochure, E-Ton Solar Tech. Co., Ltd. (Available at least as early as Oct. 20, 2011).

"Fall Protection in Contruction", OSHA Laws 3146; 1995.

"Genmounts Solar Racking Systems" Brochure (Available at least as early as Oct. 20, 2011).

MacDonald, "Inspecting the Scaffold" and Protective Roofing Products Ltd. Advertisement, Roofing Contractor 6.00, (available at least as early as Oct. 20, 2011).

"Mage Powertec Kits" Brochure, Mage Solar Projects, Inc. (Available at least as early as Oct. 20, 2011).

Non-Final Office Action, U.S. Appl. No. 12/727,726, mailed Sep. 16, 2011.

Non-Final Office Action, U.S. Appl. No. 13/166,378, mailed Sep. 19, 2011.

Non-Final Office Action, U.S. Appl. No. 12/914,209, mailed Sep. 20, 2011.

Non-Final Office Action, U.S. Appl. No. 13/166,542, mailed Sep. 16, 2011.

Omco Solar Brochure (Available at least as early as Oct. 20, 2011).

(56) References Cited

OTHER PUBLICATIONS

"Orion Solar Racking Jupiter Series Ground Mount System" Brochure, Orion Solar Racking (Available at least as early as Oct. 20, 2011).
"Phono Solar Tigo Energy Smart Module" Brochure, Phono Solar Technology Co., Ltd. (Available at least as early as Oct. 20, 2011).
"Polar Racking PolaRail Flush Mount Racking System" Brochure, Polar Racking Inc. Brochure, Schletter Inc. (Available at least as early as Oct. 20, 2011).
"PowAR Grip Product Sheet", A Raymond Tinnerman Industrial, Inc. (Available at least as early as Oct. 20, 2011).
Product Advertisement, "Alpine Snowguards/Setting the Industry Standard/Snow Guards for Every Roof Type" Mar. 27, 2000.
Product Advertisement, "Speedstand", Contractors Guide, Jun. 2000.
Product Advertisement—Sarna, Sarnafil Division, (available at least as early as Oct. 20, 2011).
Product Description—"An Innovative Approach to Zero Roof Penetrations", Portable, Pipe Hangers, Inc., printed Jul. 2000.
Product Description—"Flat Roof Safety System", POHL Roof and Safety Systems,Securant, (available at least as early as Oct. 20, 2011).
Product Description—"Gecko—An Introduction", Gecko Safety Systems, Fall Arrest Protection, printed Jul. 2000.
Product Description—"Instruction and Specification Manual, Super Anchor: Fall Arrest Anchor. ARS-2.times.8 and ARS-2.times.12", 1993.
Product Description—"Super Anchor: Instruction/Specification Manual: Stainless Steel Fall Arrest Anchors ARS 2.times.8, ARS 2.times.12, I-Joist, Moveable ARS, Vertical Wall Anchor, and Custom Anchor", Mar. 2000.
Product Description—Anchor Guardrails, printed Aug. 2000.
Product Description—FLUX-Boy (available at least as early as Oct. 20, 2011).
Product Description—Gecko—An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
Professional Solar Products Inc., Fast Jack, available at least as early as Jan. 9, 2009.
Professional Solar Products Inc., FastJack Commercial Fast Jack, Commercial Leveling Kit, Comparison Chart for the Fast Jack, available at least as early as Jan. 9, 2009.
Professional Solar Products Inc., FastJack Installation Manual, modified Sep. 10, 2007.
Professional Solar Products Inc., FastJack Leveling Kits, available at least as early as Jan. 9, 2009.
"Prysmian Cables & Systems Photovoltaic (PV) System Products" Product Sample and Brochure, Prysmian Power Cables and Systems USA, LLC (Available at least as early as Oct. 20, 2011).
"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
"S-5! CorruBracket" Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).

"Solar Power International 11 SPI Daily News—Thursday, Oct. 20, 2011" Solar Power International 2011 (Oct. 20, 2011).
"Solar Security Fasteners" Brochure, Duncan Solar (Available at least as early as Oct. 20, 2011).
"Sunmodo Ez Roof Mount Installation Guide" (Available at least as early as Oct. 20, 2011).
"Sunmodo Ez Roof Mount L Foot for Shingle Roofs" Brochure (Available at least as early as Oct. 20, 2011).
"Sunmodo Ez Mount Standoff for Metal Roofs" Brochure (Available at least as early as Oct. 20, 2011).
"Sunmodo Ez Roof Mount Standoff for Shingle Roofs" Brochure (Available at least as early as Oct. 20, 2011).
Office Action from the United States Patent and Trademark Office for U.S. Appl. No. 13/271,650 dated Apr. 23, 2012 (13 pages).
Office Action from the United States Patent and Trademark Office for U.S. Appl. No. 13/271,650 dated Jul. 25, 2012 (12 pages).
Quick Rack Installation Manual, "Rail-Free Mounting System for Composition/Asphalt Shingle Roofs," May 2014 (28 pages).
Office Action from the United States Patent and Trademark Office for U.S. Appl. No. 13/271,650 dated Aug. 2, 2013 (10 pages).
International Preliminary Report on Patentability for Application No. PCT/US2012/033764 dated Jan. 23, 2014 (7 pages).
International Report on Patentability for International Application No. PCT/US2012/056248 dated Mar. 25, 2014 (9 pages).
"Sunmodo Solar Mounting System" Brochure (Available at least as early as Oct. 20, 2011).
"Tecsun (UL) PV-Wire" Brochure, Prysmian Cables and Systems USA, LLC Brochure, Schletter Inc. (Available at least as early as Oct. 20, 2011).
TileTrac Product Photograph (Available at least as early as Jun. 8, 2011).
"TileTrac Tile Roof Structural Attachment" Brochure, Professional Solar Products, Inc., Copyright Mar. 2011.
UFD (Universal Fastening Disc) Installation Instructions and Design Drawings (Available at least as early as Jul. 14, 2011).
"Zilla Racking & Mounting Components" Zilla Corporation, Jun. 8, 2009.
"Zilla the King of Racking Racking Systems" Brochure, Zilla Corporation (Available at least as early as Oct. 20, 2011).
"Zilla Zip Flashing Assembly Instructions" Zilla Corporation, Copyright 2011.
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
Office Action from United States Patent and Trademark Office for U.S. Appl. No. 13/271,633 dated Dec. 5, 2011, 7 pages.
Office Action from United States Patent and Trademark Office for U.S. Appl. No. 13/270,419 dated Dec. 22, 2011, 7 pages.
Office Action from United States Patent and Trademark Office for U.S. Appl. No. 13/272,938 dated Dec. 22, 2011, 9 pages.
Office Action from United States Patent and Trademark Office for U.S. Appl. No. 13/270,385 dated Dec. 23, 2011, 7 pages.
Office Action from United States Patent and Trademark Office for U.S. Appl. No. 12/727,726 dated Jan. 4, 2012, 5 pages.
Office Action from United States Patent and Trademark Office for U.S. Appl. No. 12/914,209 dated Jan. 27, 2012, 5 pages.
Office Action from the United States Patent and Trademark Office for U.S. Appl. No. 13/270,385 dated Mar. 26, 2012 (7 pages).
Office Action from the United States Patent and Trademark Office for U.S. Appl. No. 13/272,938 dated Apr. 23, 2012 (11 pages).
Office Action from the United States Patent and Trademark Office for U.S. Appl. No. 13/270,792 dated Apr. 16, 2012 (10 pages).
Office Action from the United States Patent and Trademark Office for U.S. Appl. No. 13/270,798 dated Mar. 26, 2012 (8 pages).
"Advanced Roof Protection" PANELCLAW, (available at least as early as Feb. 16, 2012), 2 pages.
"CENIQ, Mounting instructions," Instruction Manual, CENTROSOLAR AG, (Oct. 2011), 28 pages.
"Dura-BiokTM, A Complete Rooftop Support Solution" brochure, Cooper Industries, PLC, (2010), 16 pages.

(56) References Cited

OTHER PUBLICATIONS

"Lightning Rod at Deck Level With SecurTape" drawing sheet, Thermoplastic Universal, (2011), 1 page.
"Lightning Rod at Deck Level" drawing sheet, Thermoplastic Universal, (2012), 1 page.
"Lightning Rod at Parapet (Vertical Attachment)" drawing sheet, Thermoplastic Universal, (2012), 1 page.
"Lightning Rod Detail" drawing sheet, Duro-Last, (1998), 1 page.
"Lightning Rod" drawing sheet, Sika Corporation, (Apr. 2010), 1 page.
"Nobody Covers You Better" drawing sheets, Firestone Building Products, (Jan. 1, 2006), 6 pages.
"Rooftop Mount" Daetwyler Clean Energy Eco-Top™, (2011-2012), 3 pages.
"Scirocco—an innovative solution for low impact and low ballast flat-roof PV installation" brochure, Solar Canada Inc. (2010-2011), 2 pages.
"Solar" brochure, Lauren Manufacturing, (available at least as early as Feb. 16, 2012), 2 pages.
"Sunrail Flat Roof Mounting System" brochure, Opsun Technologies, Inc. (2011), 2 pages.
Office Action from the United States Trademark and Patent Office for U.S. Appl. No. 13/272,938 dated Jul. 26, 2012 (8 pages).
Office Action from the United States Patent and Trademark Office for U.S. Appl. No. 13/272,005 dated Nov. 14, 2012 (24 pages).
International Search Report and Written Opinion for Application No. PCT/US2012/027798 dated Sep. 27, 2012 (8 pages).
International Search Report and Written Opinion for Application No. PCT/US2012/033764 dated Oct. 10, 2012 (8 pages).
International Preliminary Report on Patentability for Application No. PCT/US2012/027798 dated Sep. 26, 2013 (7 pages).

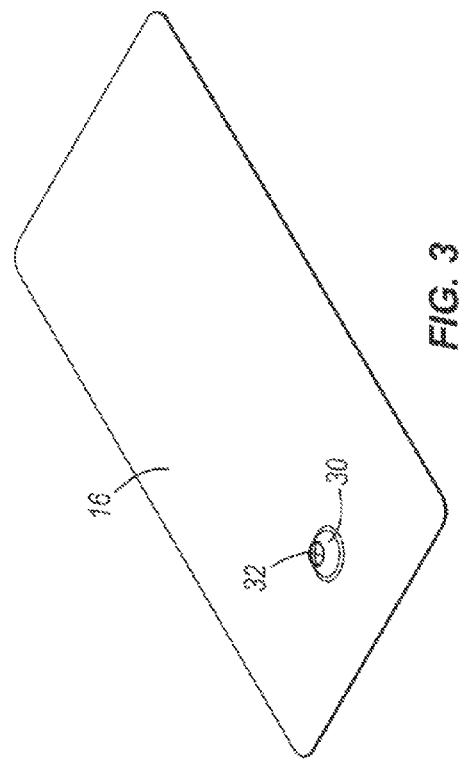
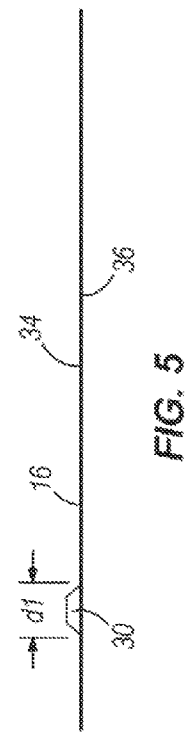
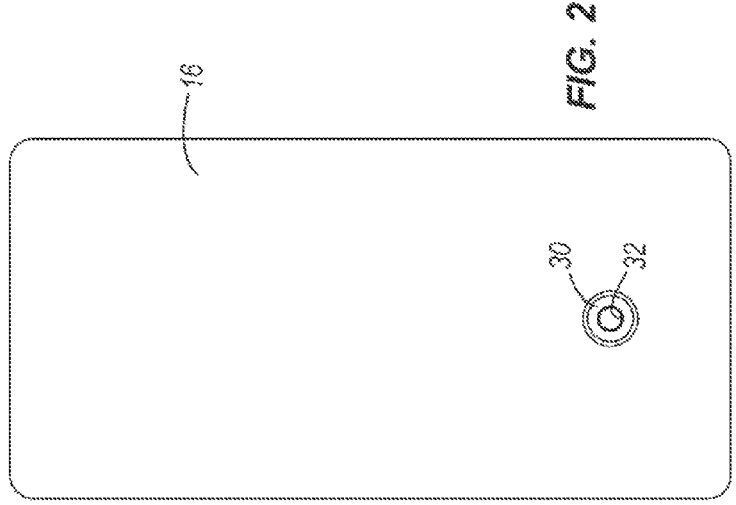

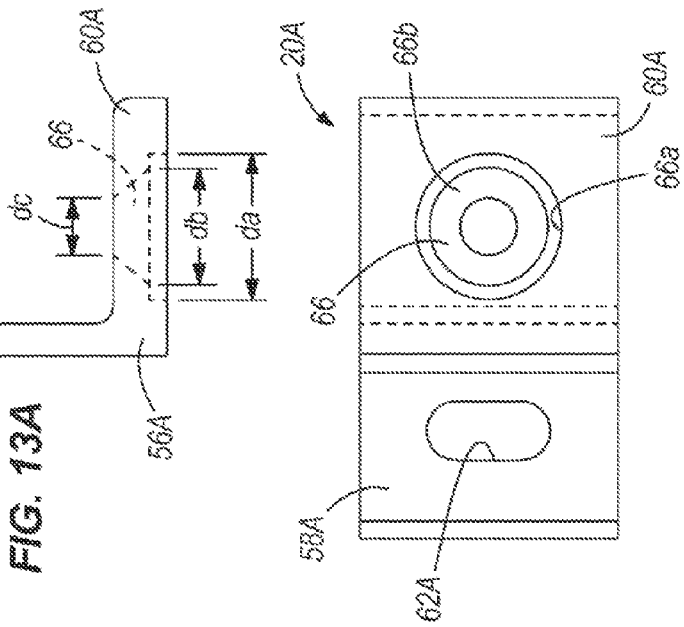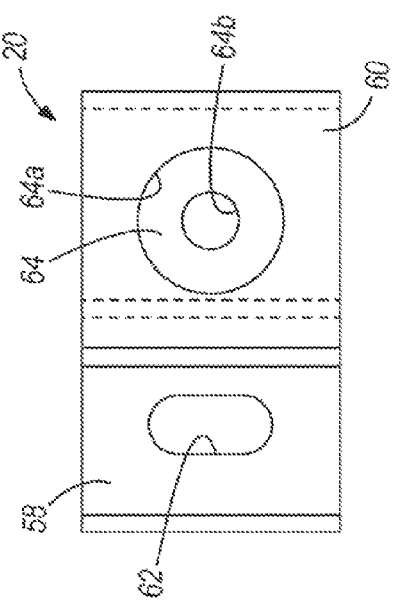

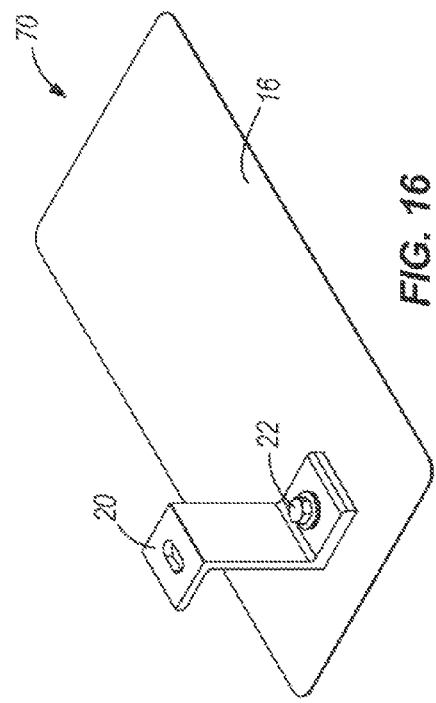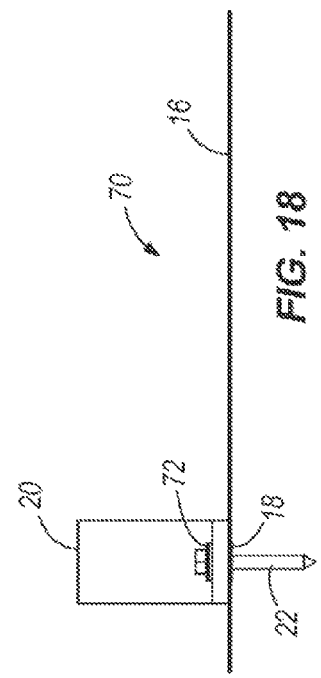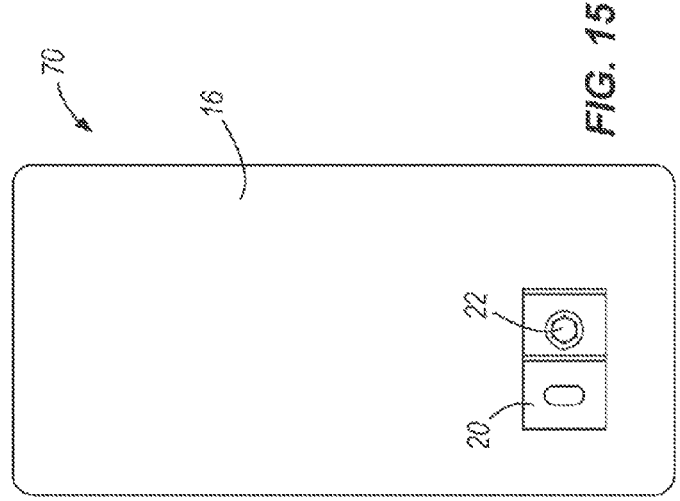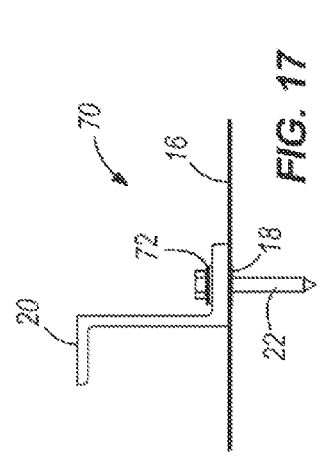

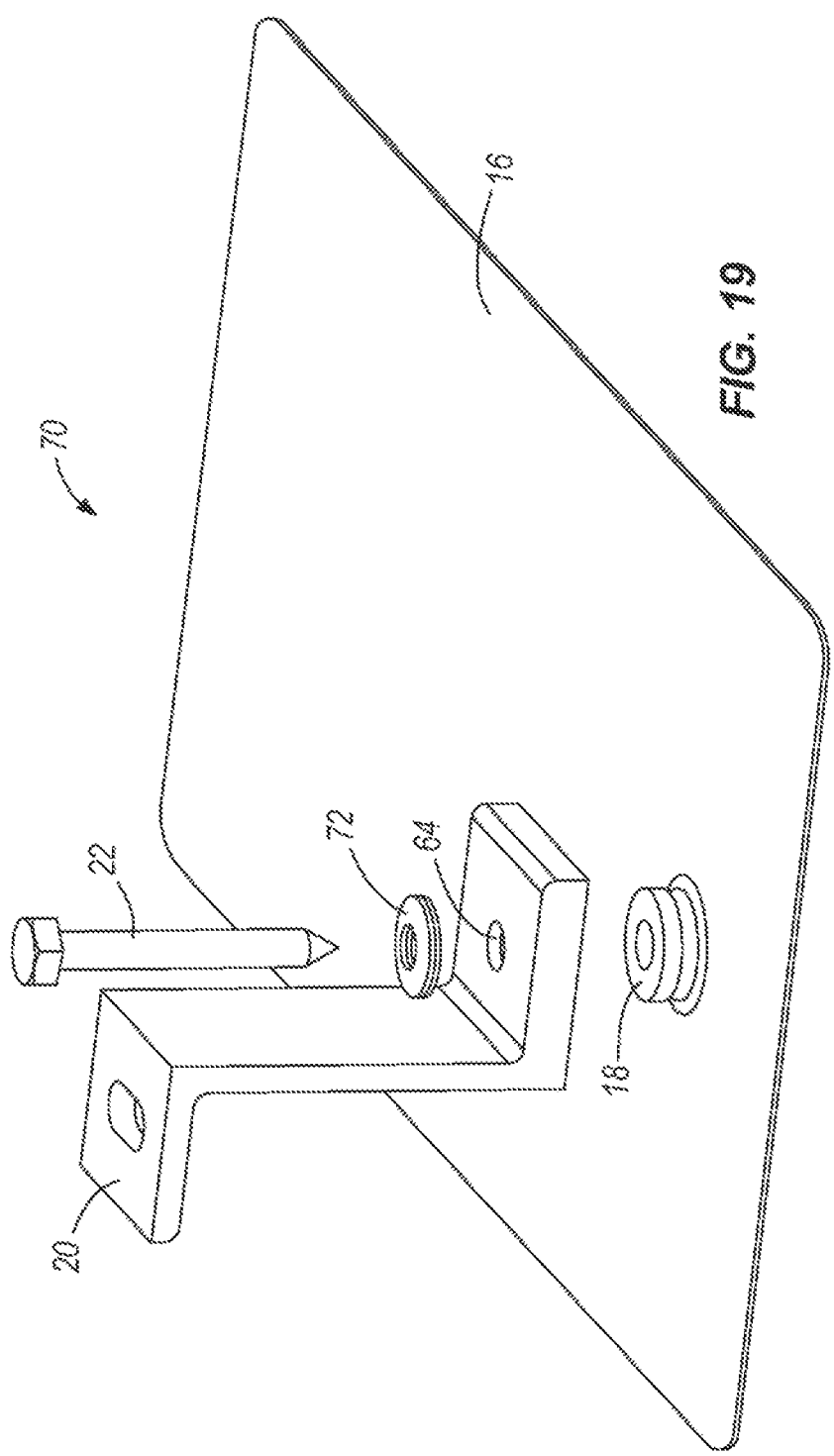

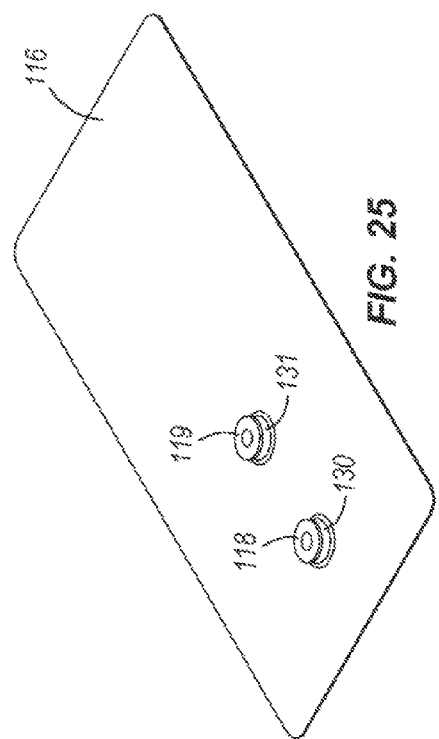

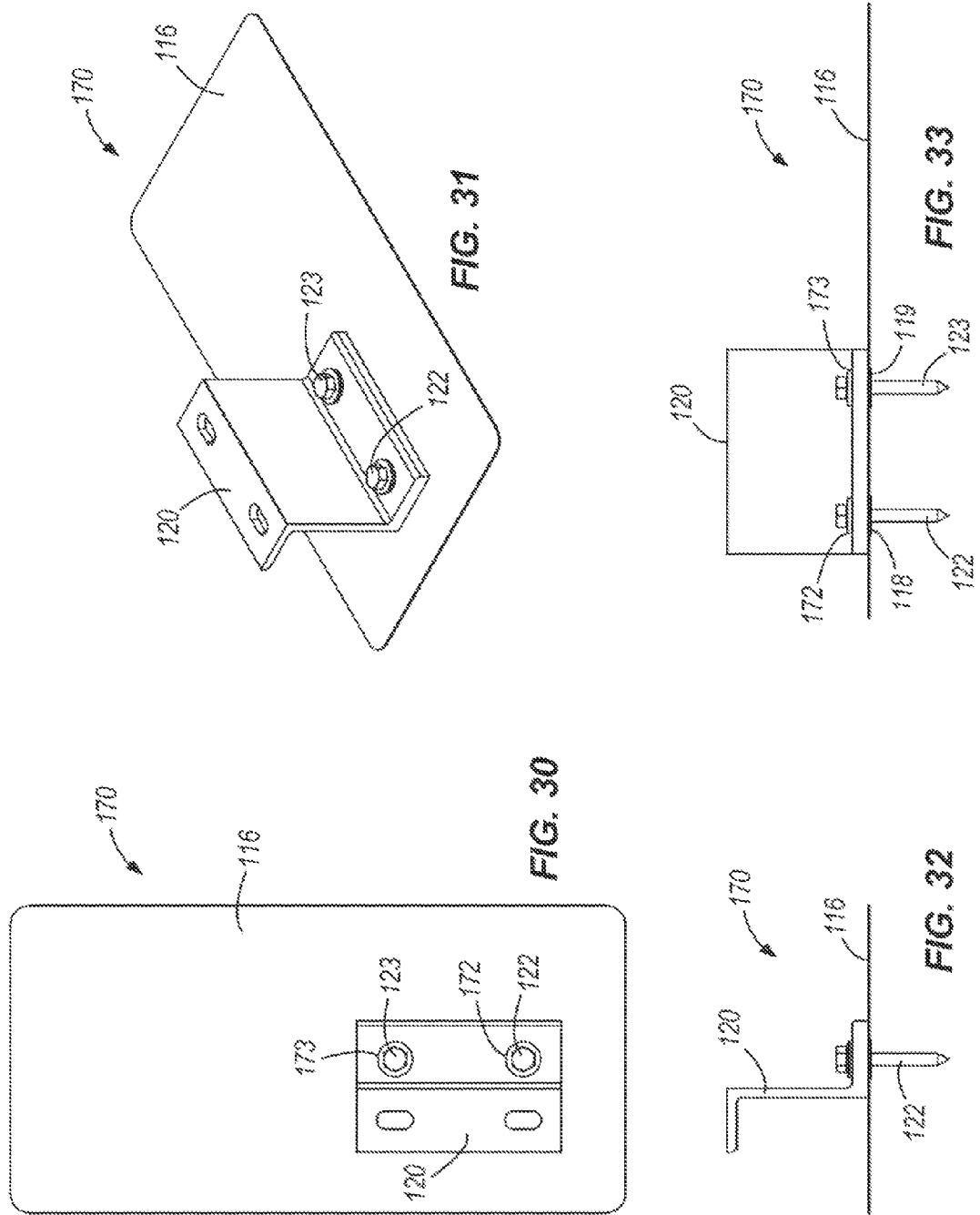

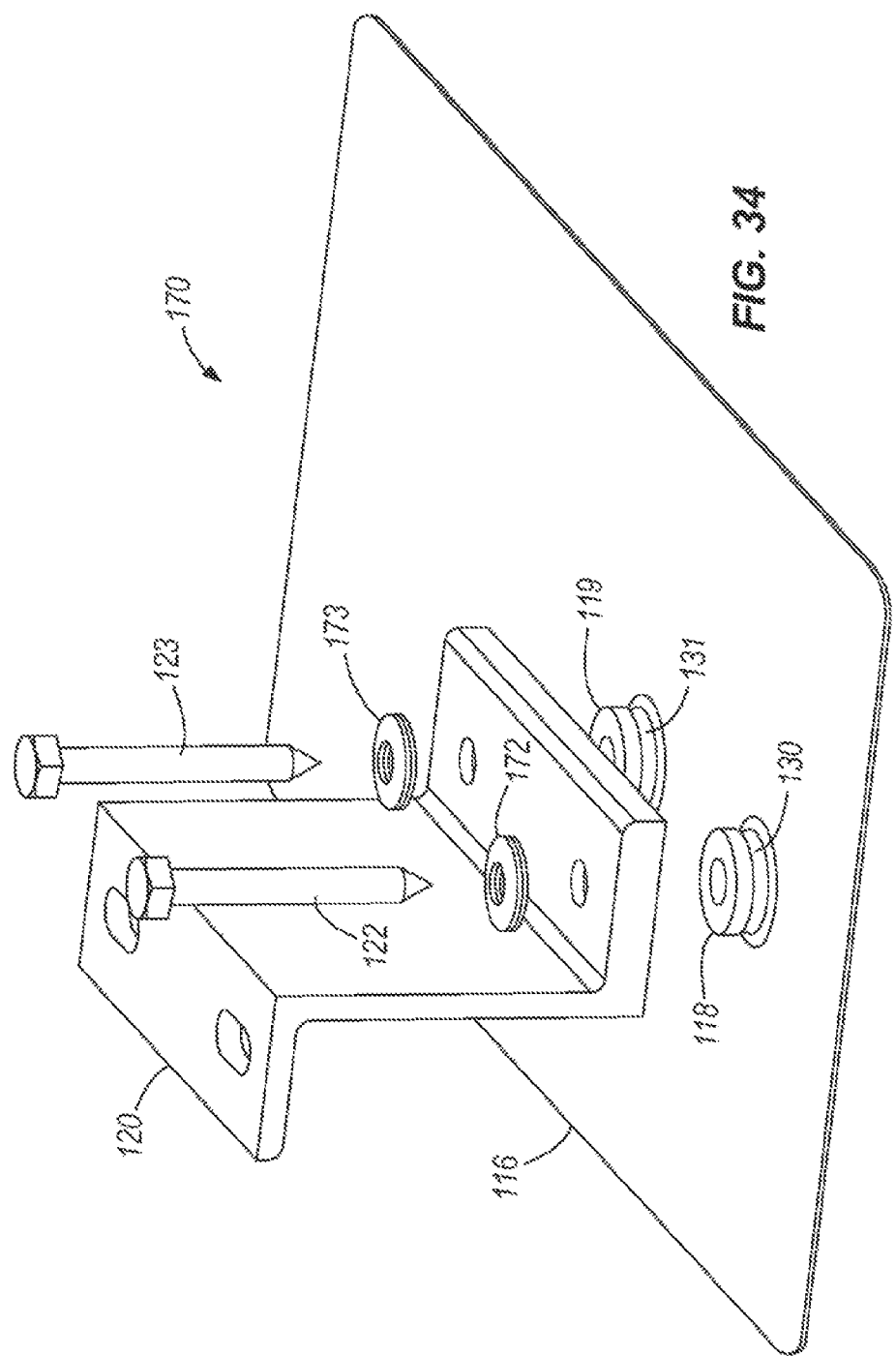

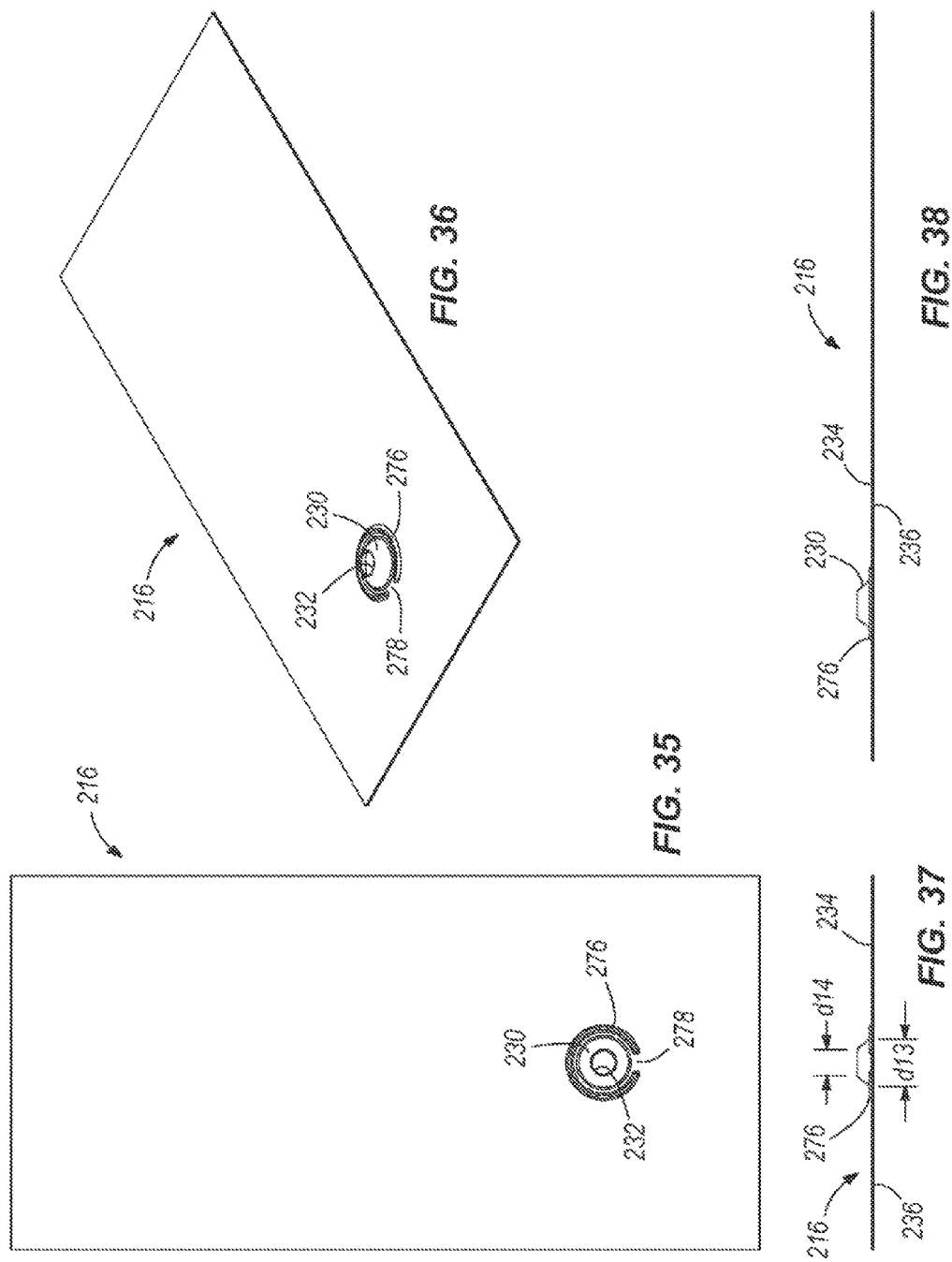

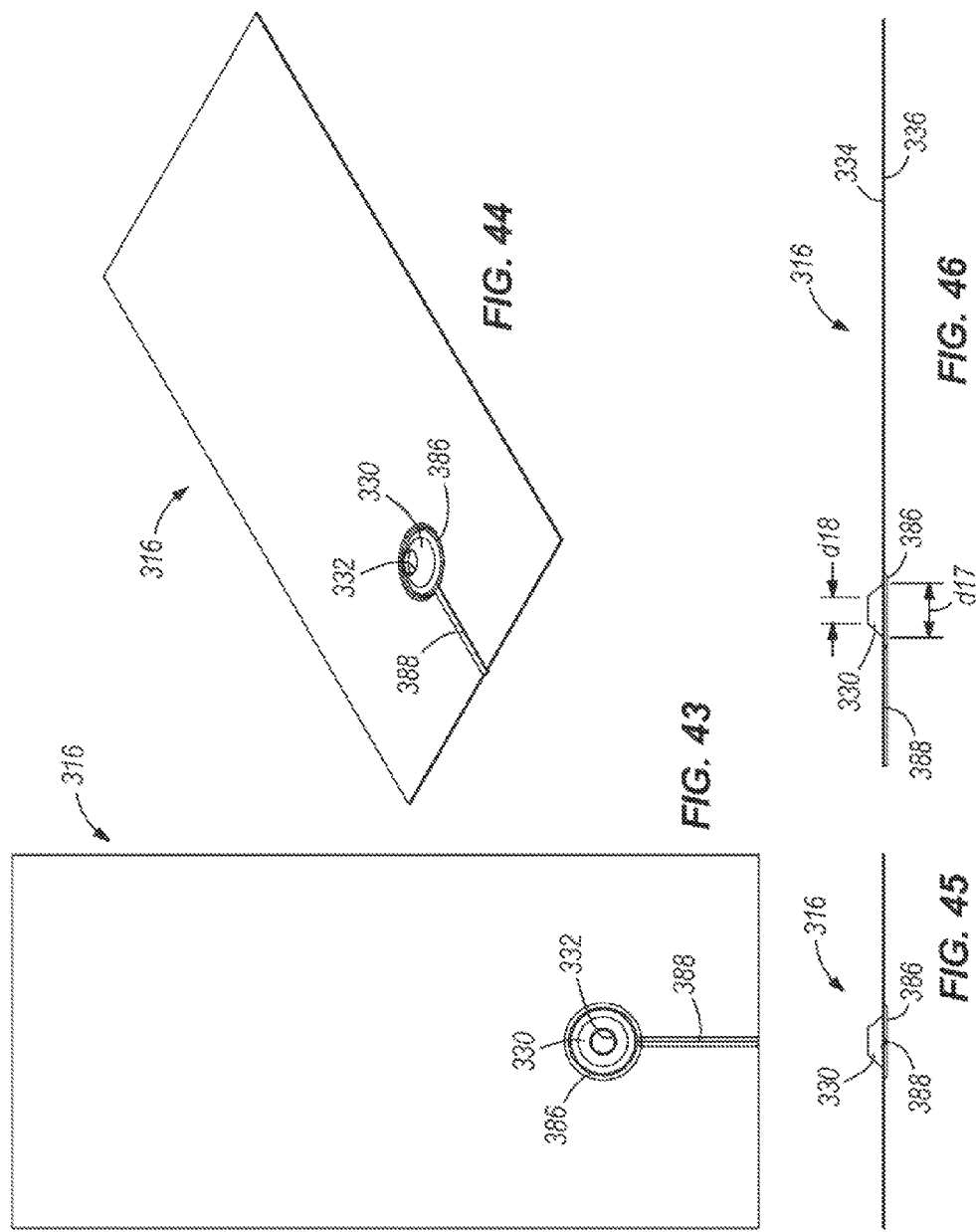

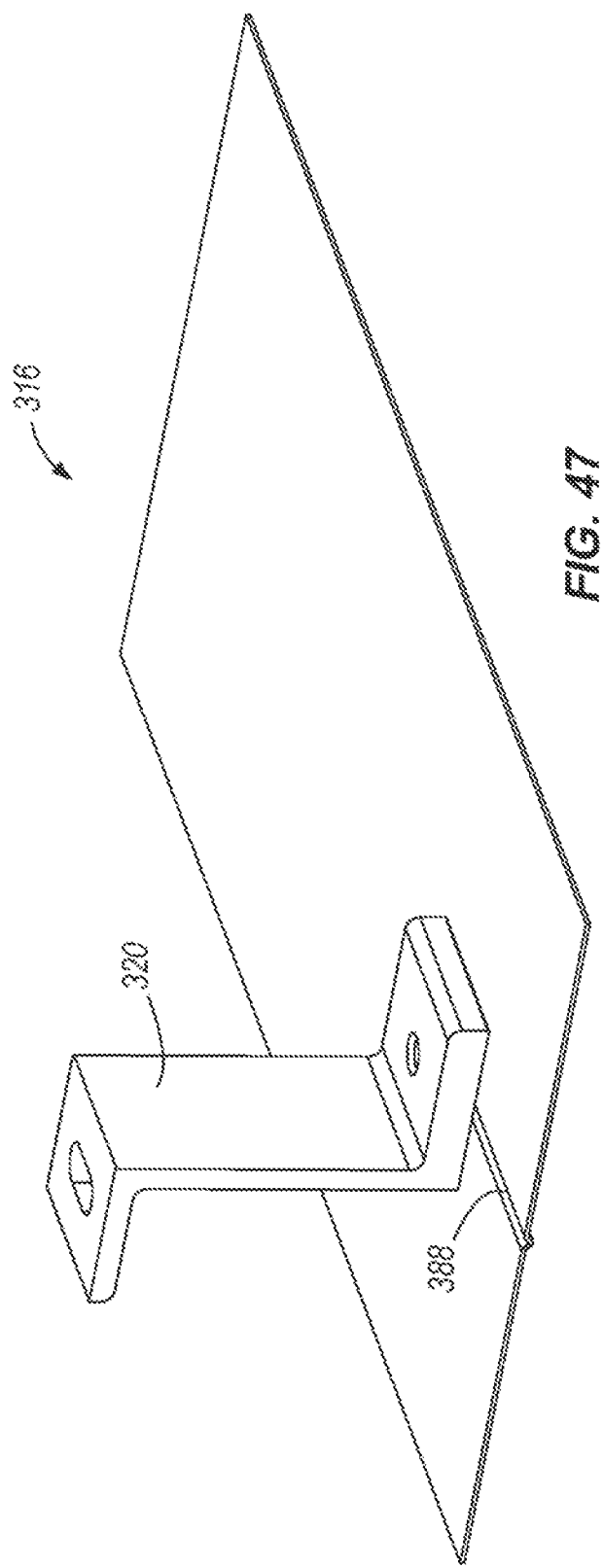

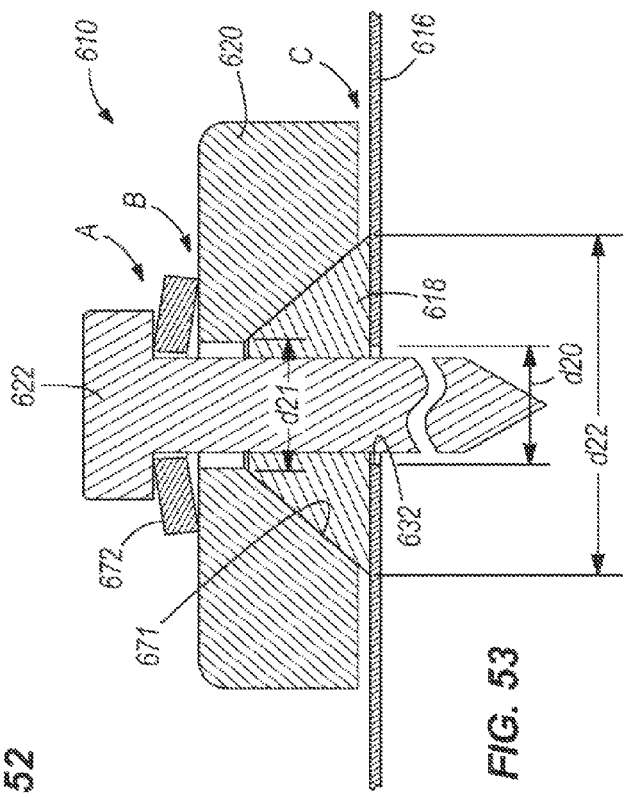
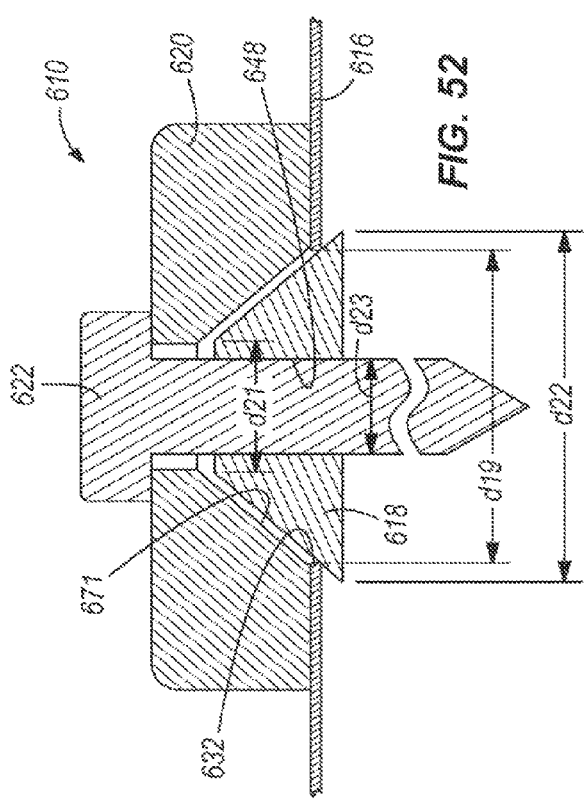
FIG. 52
FIG. 53

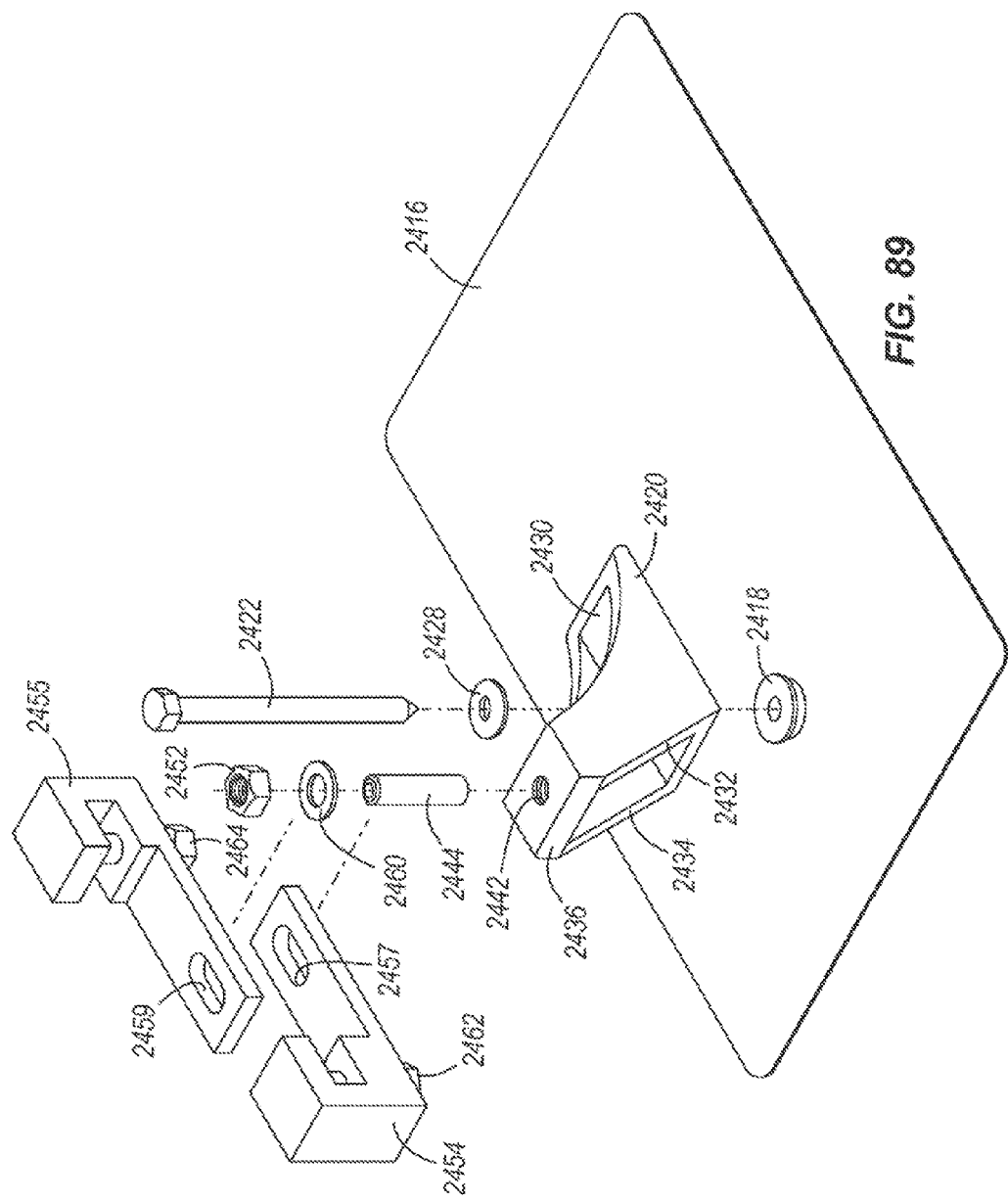

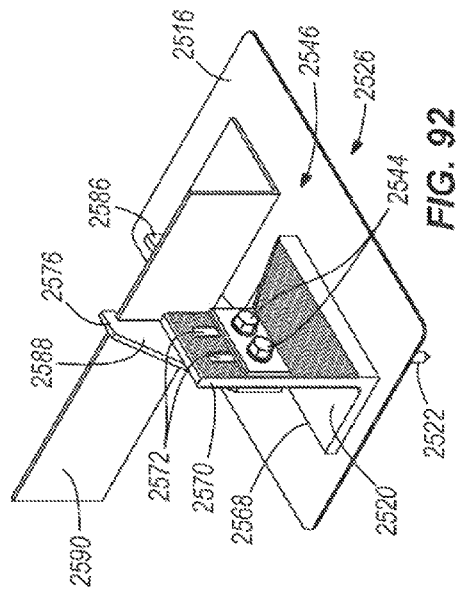
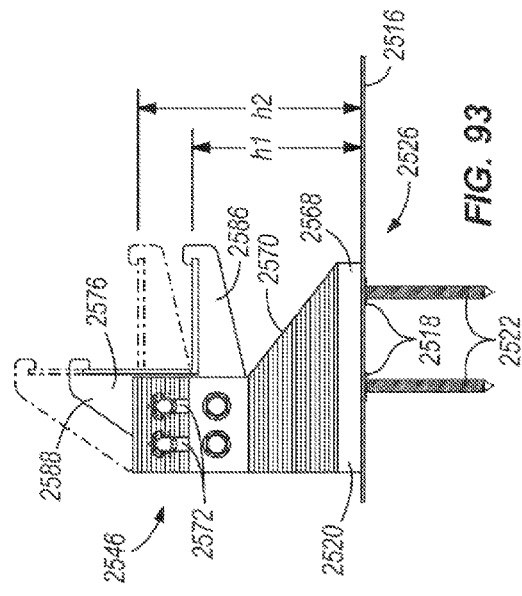
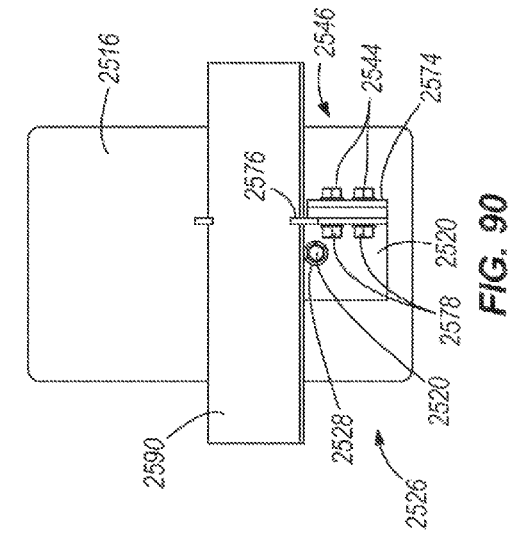
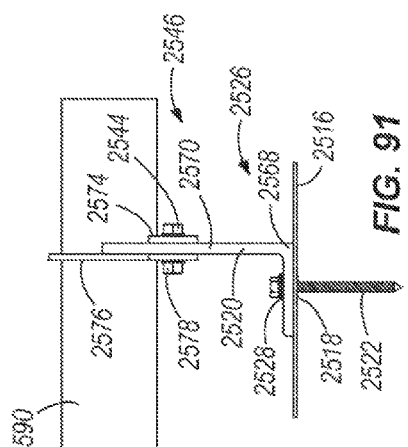

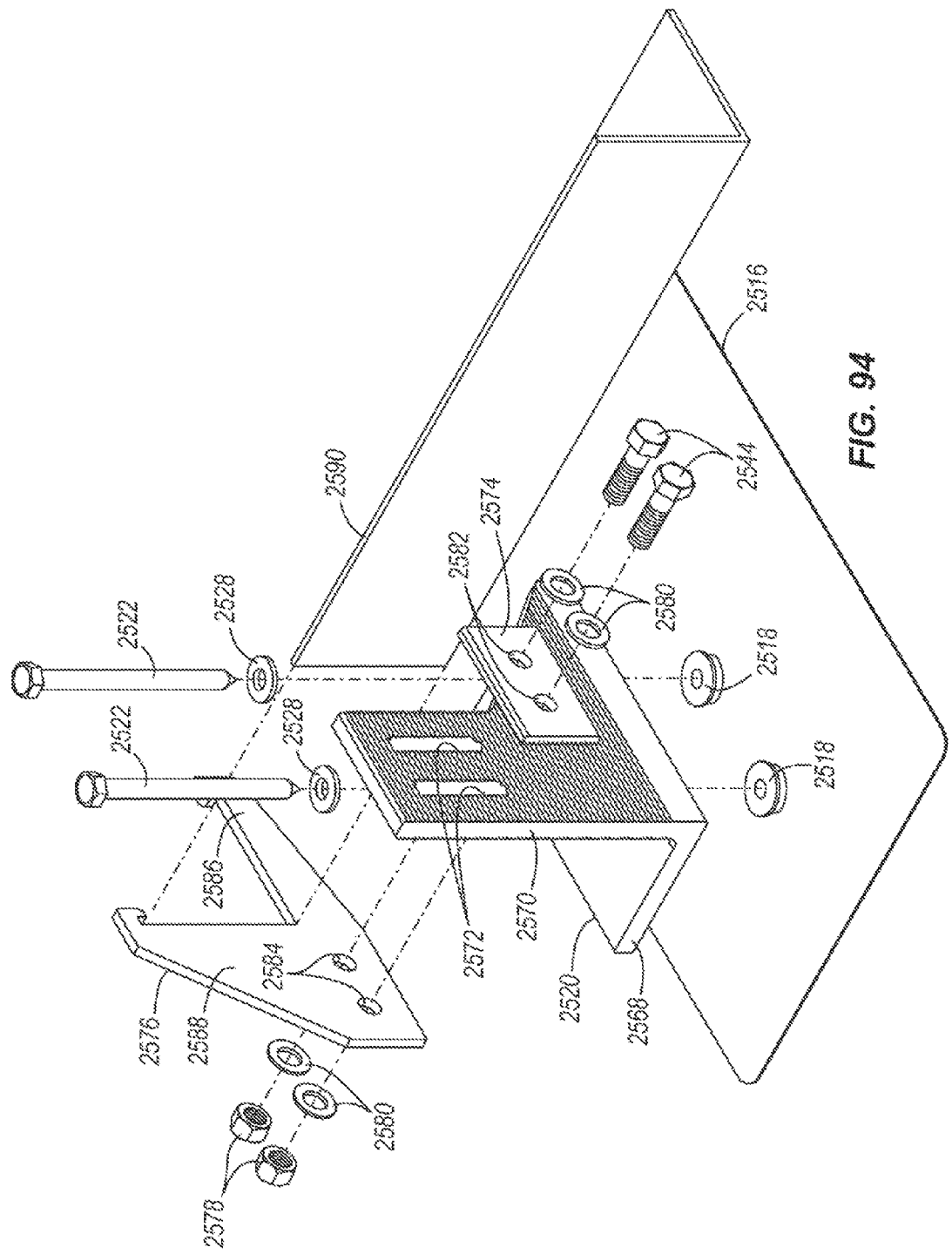

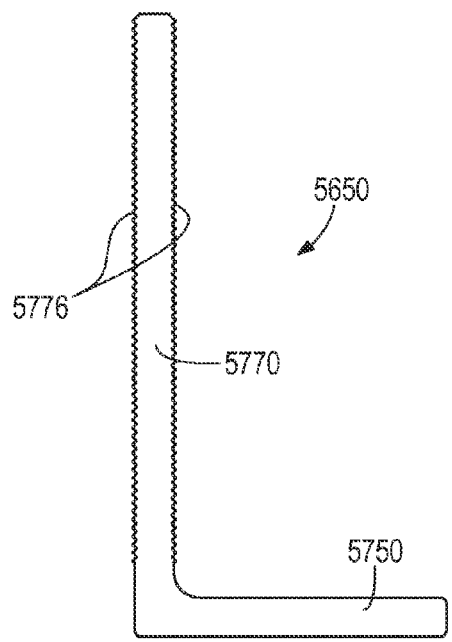
FIG. 132
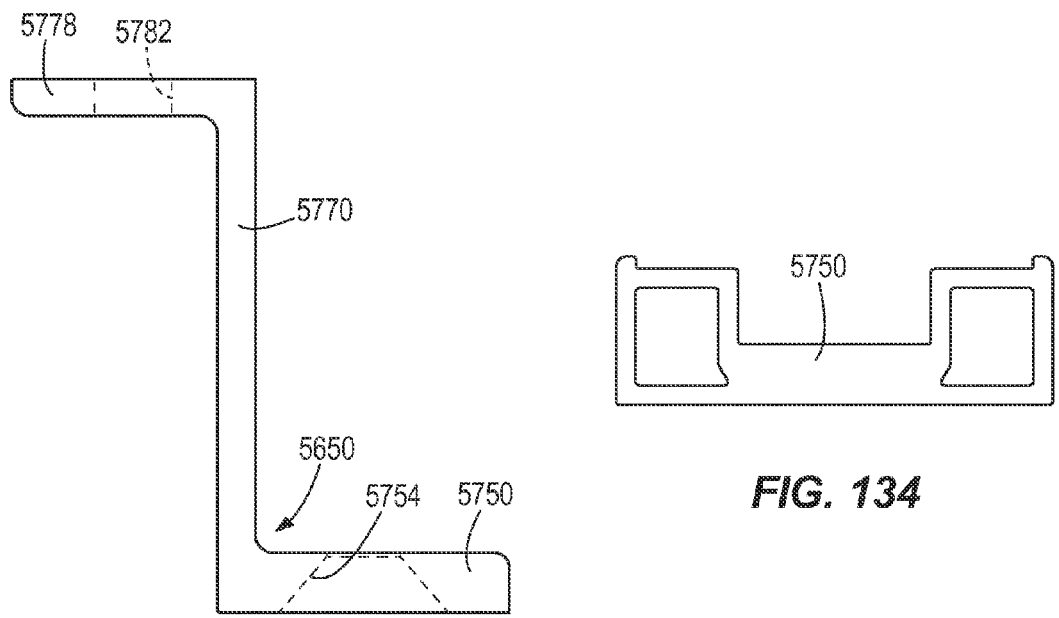
FIG. 133
FIG. 134

ROOF MOUNT ASSEMBLY

CROSS-REFERENCE TO RELATED APPLICATIONS

The present application is a continuation-in-part of U.S. patent application Ser. No. 13/271,650, filed Oct. 12, 2011, which is a continuation of Ser. No. 13/166,542, filed Jun. 22, 2011, now U.S. Pat. No. 8,146,299, issued Apr. 3, 2012, which is a continuation of U.S. patent application Ser. No. 12/914,209, filed Oct. 28, 2010, now U.S. Pat. No. 8,209,914, issued Jul. 3, 2012, which is a continuation-in-part of U.S. patent application Ser. No. 12/727,726, filed Mar. 19, 2010, now U.S. Pat. No. 8,153,700, issued Apr. 10, 2012, which claims priority to U.S. Provisional No. 61/161,668, filed Mar. 19, 2009, the entire contents of all of which are herein incorporated by reference. U.S. patent application Ser. No. 12/914,209 claims priority to U.S. Provisional Application Nos. 61/298,101, filed Jan. 25, 2010 and 61/345,885, filed May 18, 2010, the entire contents of both of which are herein incorporated by reference.

The present application is also a continuation-in-part of U.S. patent application Ser. No. 13/271,650, filed Oct. 12, 2011, which is a continuation of U.S. patent application Ser. No. 12/914,209, filed Oct. 28, 2010, now U.S. Pat. No. 8,209,914, issued Jul. 3, 2012, which is a continuation-in-part of U.S. patent application Ser. No. 12/727,726, filed Mar. 19, 2010, now U.S. Pat. No. 8,153,700, issued Apr. 10, 2012, which claims priority to U.S. Provisional Application No. 61/161,668, filed Mar. 19, 2009, the entire contents of all of which are herein incorporated by reference. U.S. patent application Ser. No. 12/914,209 claims priority to U.S. Provisional Application Nos. 61/298,101, filed Jan. 25, 2010 and 61/345,885, filed May 18, 2010, the entire contents of both of which are herein incorporated by reference.

The present application is also a continuation-in-part of U.S. patent application Ser. No. 13/271,650, filed Oct. 12, 2011, which is a continuation-in-part of U.S. patent application Ser. No. 13/166,378, filed Jun. 22, 2011, now U.S. Pat. No. 8,151,522, issued Apr. 10, 2012, which is a continuation of U.S. patent application Ser. No. 12/727,726, filed Mar. 19, 2010, now U.S. Pat. No. 8,153,700, issued Apr. 10, 2012, which claims priority to U.S. Provisional Application No. 61/161,668, filed Mar. 19, 2009, the entire contents of all of which are herein incorporated by reference.

The present application is also a continuation-in-part of U.S. patent application Ser. No. 13/271,650, filed Oct. 12, 2011, which is a continuation-in-part of U.S. patent application Ser. No. 12/727,726, filed Mar. 19, 2010, now U.S. Pat. No. 8,153,700, issued Apr. 10, 2012, which claims priority to U.S. Provisional Application No. 61/161,668, filed Mar. 19, 2009, the entire contents of all of which are herein incorporated by reference.

The present application is also a continuation-in-part of U.S. patent application Ser. No. 13/272,005, filed Oct. 12, 2011, which claims priority to U.S. Provisional Application Nos. 61/452,983, filed Mar. 15, 2011, and 61/485,693, filed May 13, 2011, the entire contents of all of which are herein incorporated by reference.

The present application is also a continuation-in-part of U.S. patent application Ser. No. 13/623,348, filed Sep. 20, 2012, which claims priority to U.S. Provisional Application No. 61/538,262, filed Sep. 23, 2011, the entire contents of both of which are herein incorporated by reference.

The present application also claims priority to U.S. Provisional Application No. 61/914,936, filed Dec. 11, 2013, the entire contents of which are herein incorporated by reference.

FIELD OF THE INVENTION

The present invention relates to mounting assemblies for supporting solar panels and other structures on roof tops.

SUMMARY

In some embodiments, a roof mount assembly is provided for mounting a structure to a roof, the roof including at least one rafter and a substrate at least partially covering the at least one rafter. The roof mount assembly may generally include flashing positioned on the substrate, the flashing defining a first surface, a second surface opposite the first surface and an aperture extending therethrough; a fastener extending through the aperture; a bracket connected to the flashing by the fastener, the bracket being configured to support at least one roof-mounted structure on the roof; and a seal including a first portion positionable between the first surface of the flashing and the bracket and a second portion positionable to extend through the aperture and between the flashing and the fastener, the seal forming a water-tight seal to inhibit flow of fluid through the aperture.

In some embodiments, a method is provided for mounting a roof mount assembly to a roof, the roof including at least one rafter and a substrate at least partially covering the at least one rafter. The method may generally include inserting a seal into an aperture defined in a flashing; positioning the flashing and the seal on the roof; positioning a bracket on the flashing; extending a fastener through the bracket, the flashing and the seal and into the at least one rafter; retaining the bracket, the flashing and the seal on the roof with the fastener; and inhibiting fluid flow through the aperture with the seal.

In some embodiments, a mount assembly is provided for mounting a structure to a roof having a top surface. The mount includes a flashing including an aperture; a bracket including a first portion and a second portion, the first portion having an opening and a countersink extending around the opening, the second portion extending at an angle away from the flashing, the second portion including a slot configured to be coupled to the structure; a fastener extending through the aperture and through the opening of the bracket; and a seal extending around the aperture and positioned between the flashing and the first portion of the bracket, the seal engaging the countersink of the bracket and being compressed against the flashing.

In some embodiments, a mount assembly is provided for mounting a structure to a roof having a top surface. The mount includes a base coupled to the top surface of the roof; a block coupled to the base and having an upper surface; a flashing including an embossed portion adjacent the upper surface of the block and an aperture positioned on the embossed portion; a bracket including a first portion and a second portion, the first portion having an opening aligned with the aperture and a countersink extending around the opening, the second portion extending at an angle away from the flashing, the second portion including a slot configured to be coupled to the structure; a fastener extending through the aperture and through the opening of the bracket; and a seal extending around the aperture and positioned between the flashing and the first portion of the bracket, the seal engaging the countersink of the bracket and being compressed against the flashing.

In some embodiments, the invention provides a stand for a solar panel. In other embodiments, the present inventions provides a mounting system and assembly for supporting conduit, cables, antennae, panels, electrical elements, and other structures on roof tops.

Independent aspects of the invention will become apparent by consideration of the detailed description, claims and accompanying drawings.

BRIEF DESCRIPTION OF THE DRAWINGS

FIG. 2 is a top view of flashing from the roofing system shown in FIG. 1.

FIG. 3 is a perspective view of the flashing shown in FIG. 2.

FIG. 4 is a front view of the flashing shown in FIG. 2.

FIG. 5 is a side view of the flashing shown in FIG. 2.

FIG. 13 is a side view of a bracket for use with the flashing and seal.

FIG. 13A is a side view of an alternative embodiment of the bracket.

FIG. 14 is a bottom view of the bracket shown in FIG. 13.

FIG. 14A is a bottom view of the bracket shown in FIG. 13A.

FIG. 15 is a top view of an assembly including the flashing, the seal, the bracket and a fastener.

FIG. 16 is a perspective view of the assembly shown in FIG. 15.

FIG. 17 is a front view of the assembly shown in FIG. 15.

FIG. 18 is a side view of the assembly shown in FIG. 15.

FIG. 19 is an exploded view of the assembly shown in FIG. 15.

FIG. 24 is a top view of the flashing shown in FIG. 20 including seals installed in the flashing apertures.

FIG. 25 is a perspective view of the flashing and seals shown in FIG. 24.

FIG. 26 is a front view of the flashing and seals shown in FIG. 24.

FIG. 27 is a side view of the flashing and seals shown in FIG. 24.

FIG. 30 is a top view of an assembly including the flashing, the seals, the bracket and two fasteners.

FIG. 31 is a perspective view of the assembly shown in FIG. 30.

FIG. 32 is a front view of the assembly shown in FIG. 30.

FIG. 33 is a side view of the assembly shown in FIG. 30.

FIG. 34 is an exploded view of the assembly shown in FIG. 30.

FIG. 35 is a top view of a third embodiment of flashing including one aperture.

FIG. 36 is a perspective view of the flashing shown in FIG. 35.

FIG. 37 is a front view of the flashing shown in FIG. 35.

FIG. 38 is a side view of the flashing shown in FIG. 35.

FIG. 43 is a top view of a fourth embodiment of flashing including one aperture.

FIG. 44 is a perspective view of the flashing shown in FIG. 43.

FIG. 45 is a front view of the flashing shown in FIG. 43.

FIG. 46 is a side view of the flashing shown in FIG. 43.

FIG. 47 is a perspective view of an assembly including the flashing shown in FIG. 43 and a bracket.

FIG. 52 is a partial cross-sectional view of another roofing system embodiment.

FIG. 53 is a partial cross-sectional view of the roofing system of FIG. 52 with an alternative flashing arrangement.

FIG. 89 is an exploded view of the mounting assembly of FIG. 86.

FIG. 90 is a top view of a mounting assembly according to some embodiments of the present invention.

FIG. 91 is a front view of the mounting assembly of FIG. 90.

FIG. 92 is a perspective view of the mounting assembly of FIG. 90.

FIG. 93 is a side view of the mounting assembly of FIG. 90.

FIG. 94 is an exploded view of the mounting assembly of FIG. 90.

FIG. 112 is a side view of the tile mount assembly of FIG. 109.

FIG. 113 is an exploded view of a tile mount assembly according to another embodiment.

FIG. 114 is a perspective view of a tile mount assembly according to another embodiment.

FIG. 115 is a front view of the tile mount assembly of FIG. 114.

FIG. 116 is a side view of the tile mount assembly of FIG. 114.

FIG. 117 is an exploded view of the tile mount assembly of FIG. 114.

FIG. 118 is a perspective view of a tile mount assembly according to another embodiment.

FIG. 119 is an exploded view of the tile mount assembly of FIG. 118.

FIG. 120 is a perspective view of a tile mount assembly according to another embodiment.

FIG. 121 is a perspective view of the tile mount assembly of FIG. 120.

FIG. 122 is an exploded view of the tile mount assembly of FIG. 120.

FIG. 123 is a perspective view of a tile mount assembly according to another embodiment.

Figure 123:
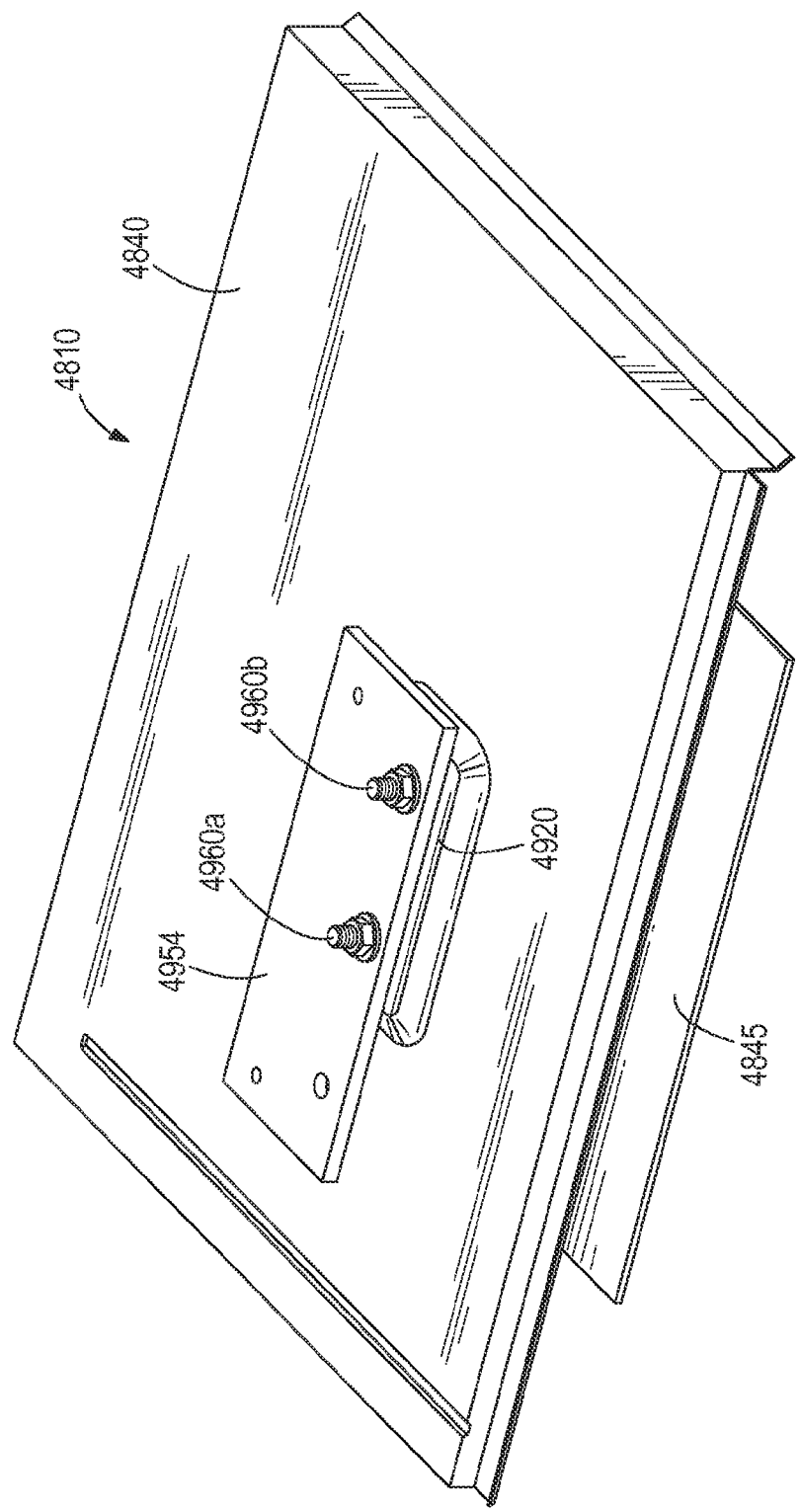
Figure 124:
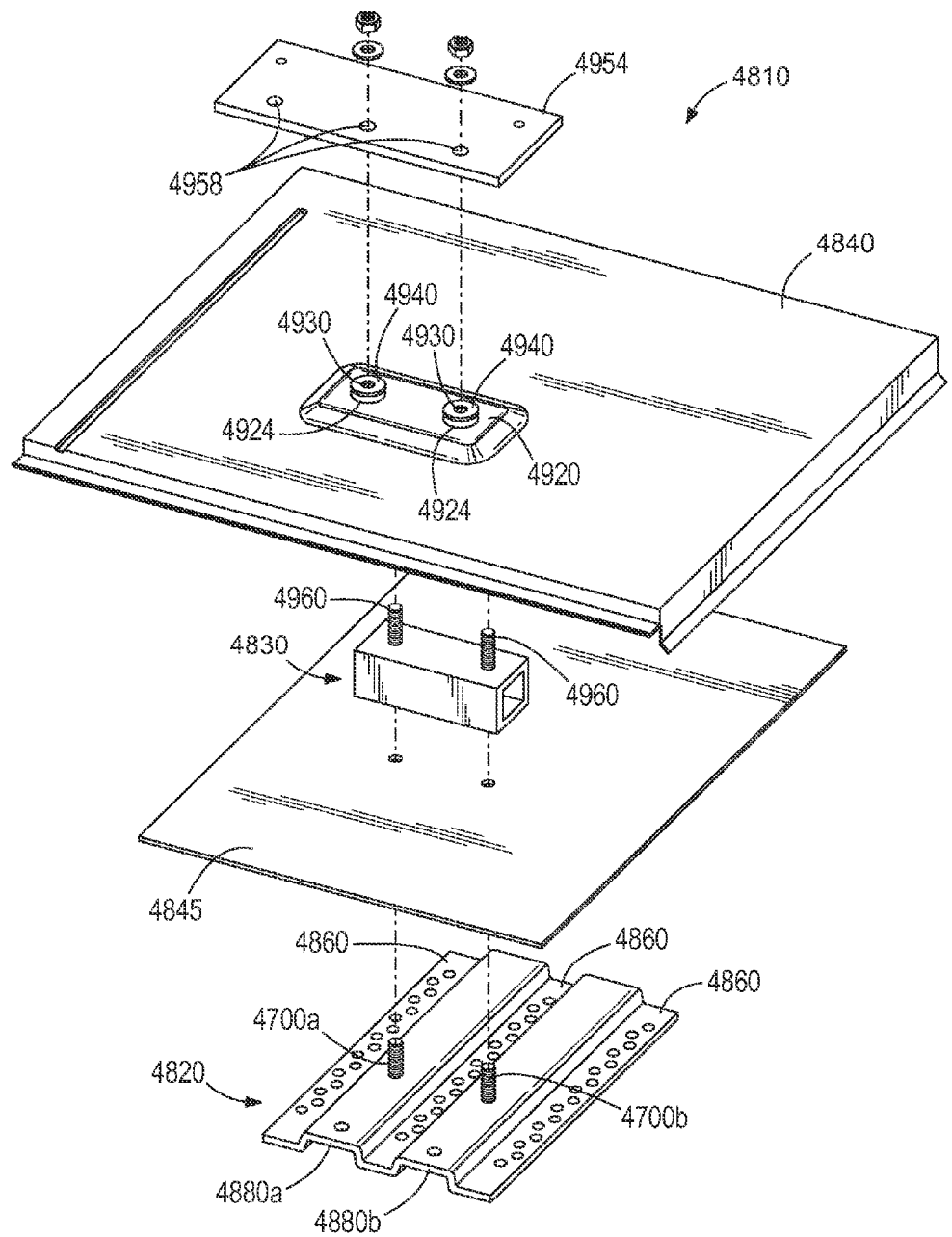

FIG. 124 is an exploded view of the tile mount assembly of FIG. 123.

Figure 125:
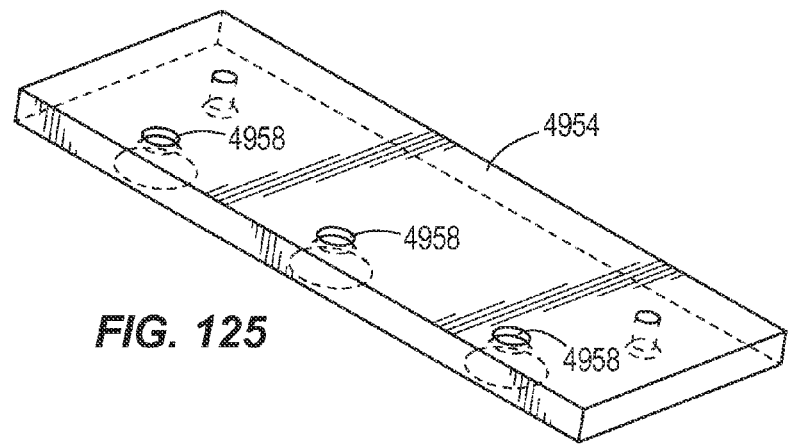

FIG. 125 is a perspective view of a plate.

Figure 126:
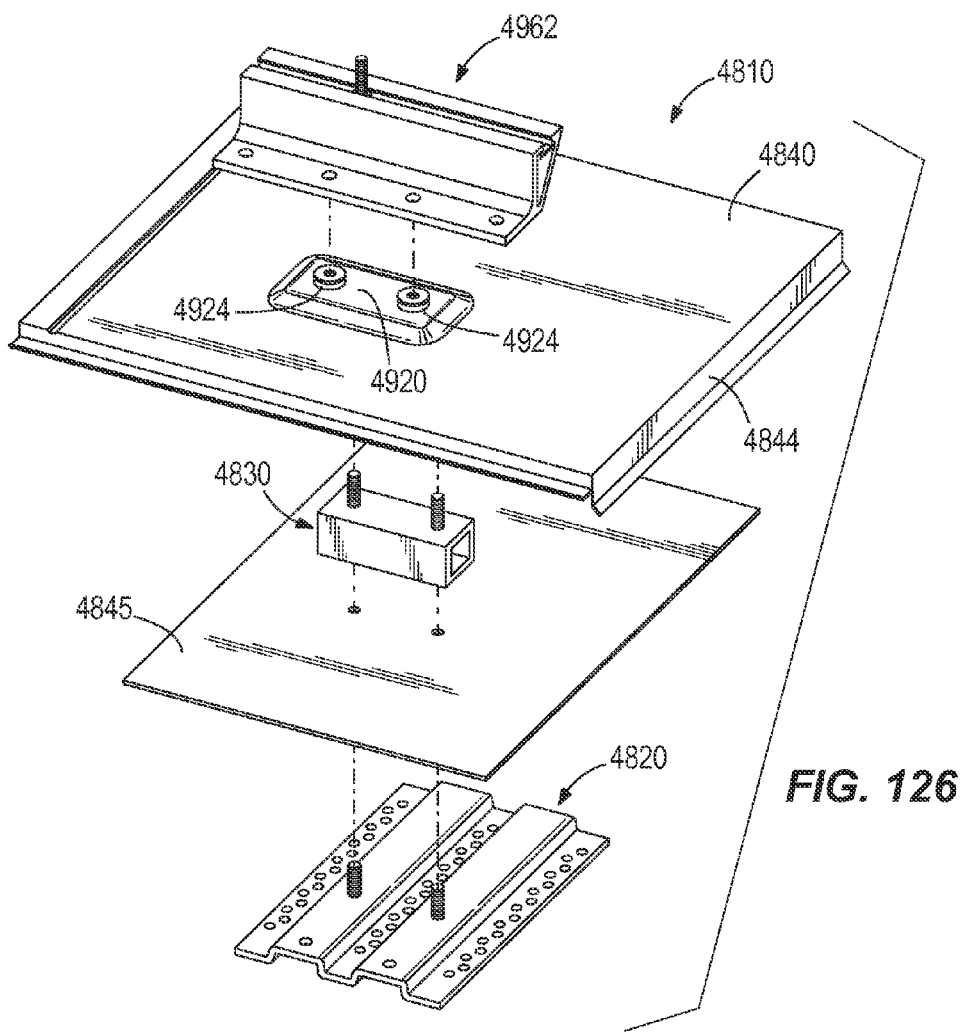

FIG. 126 is an exploded view of a tile mount assembly according to another embodiment.

Figure 127:
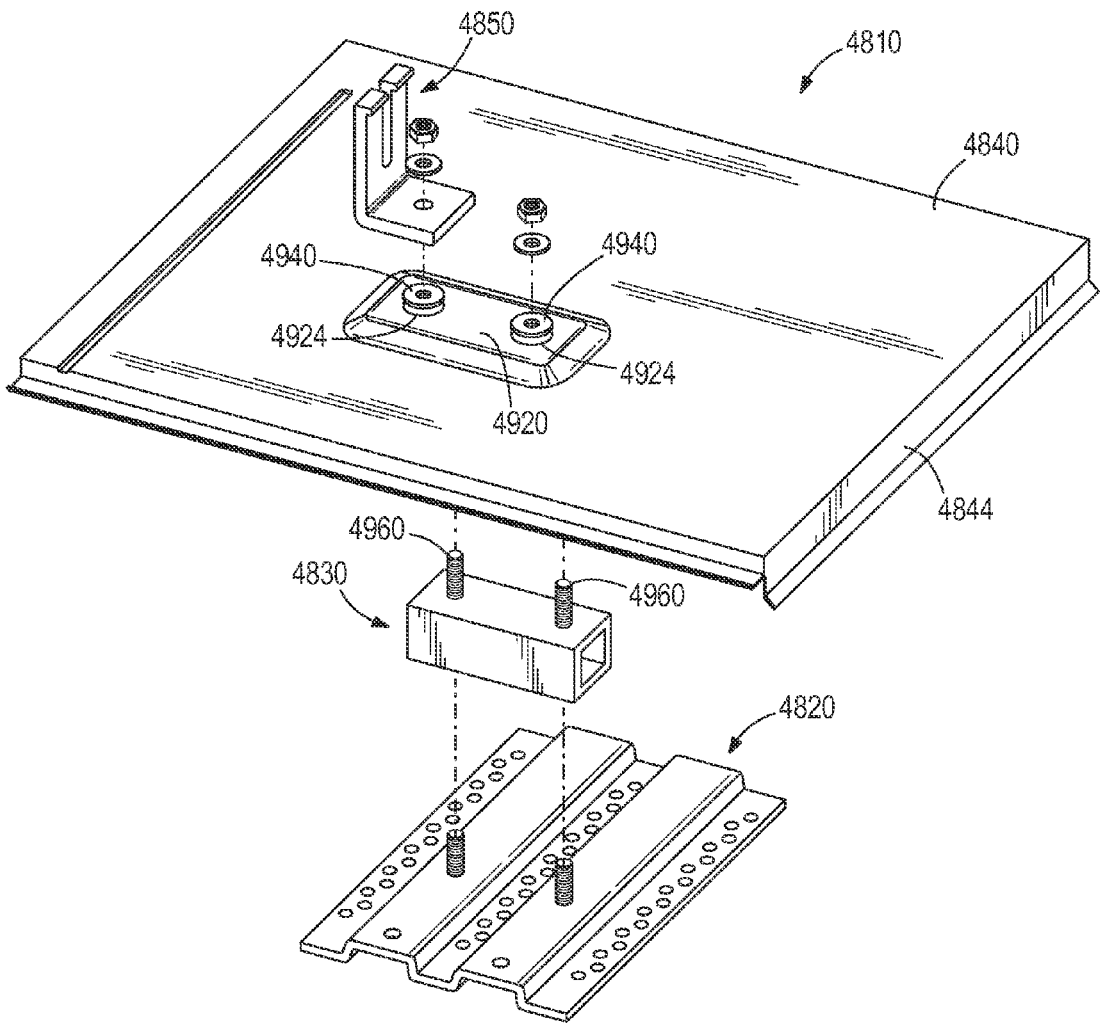

FIG. 127 is an exploded view of a tile mount assembly according to another embodiment.

Figure 128:
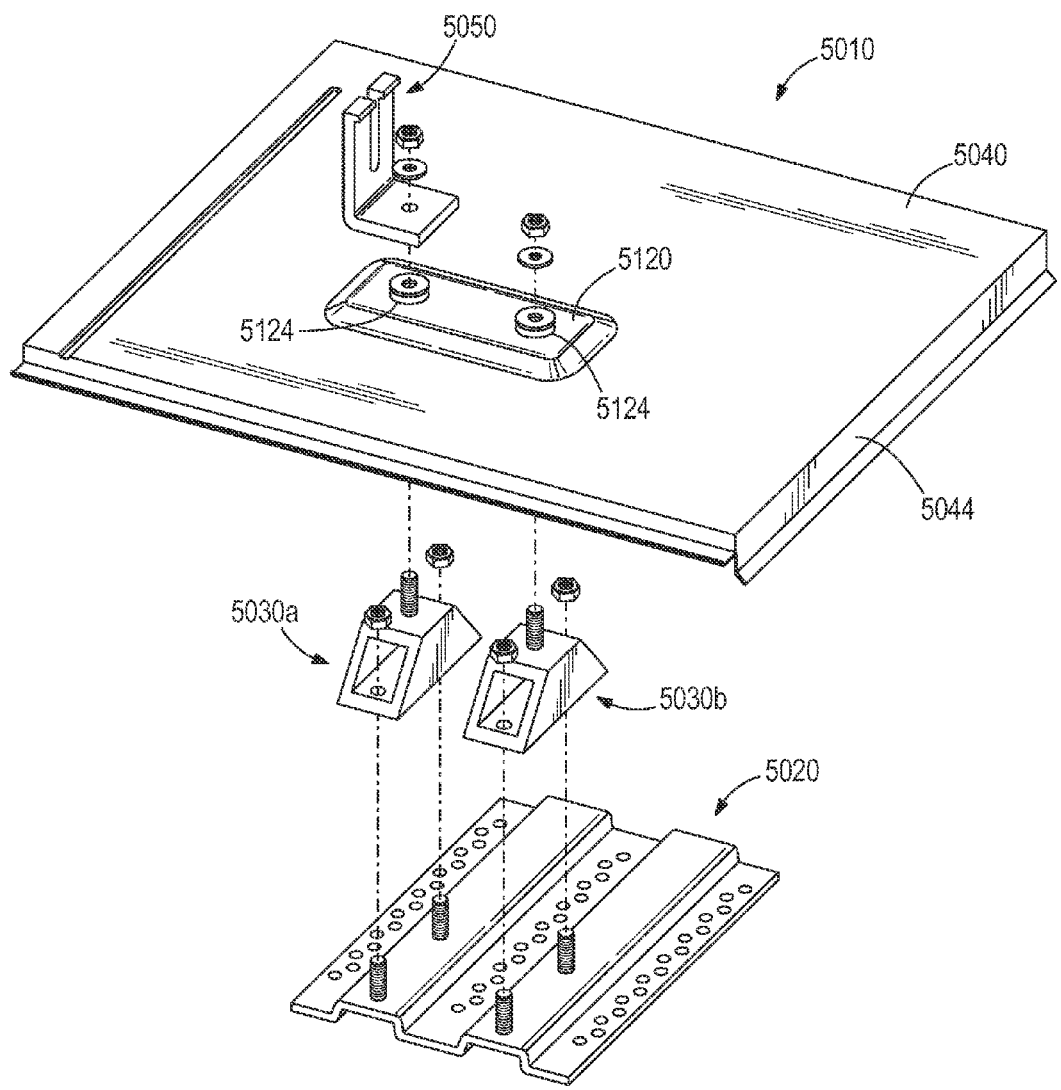

FIG. 128 is an exploded view of a tile mount assembly according to another embodiment.

Figure 129:
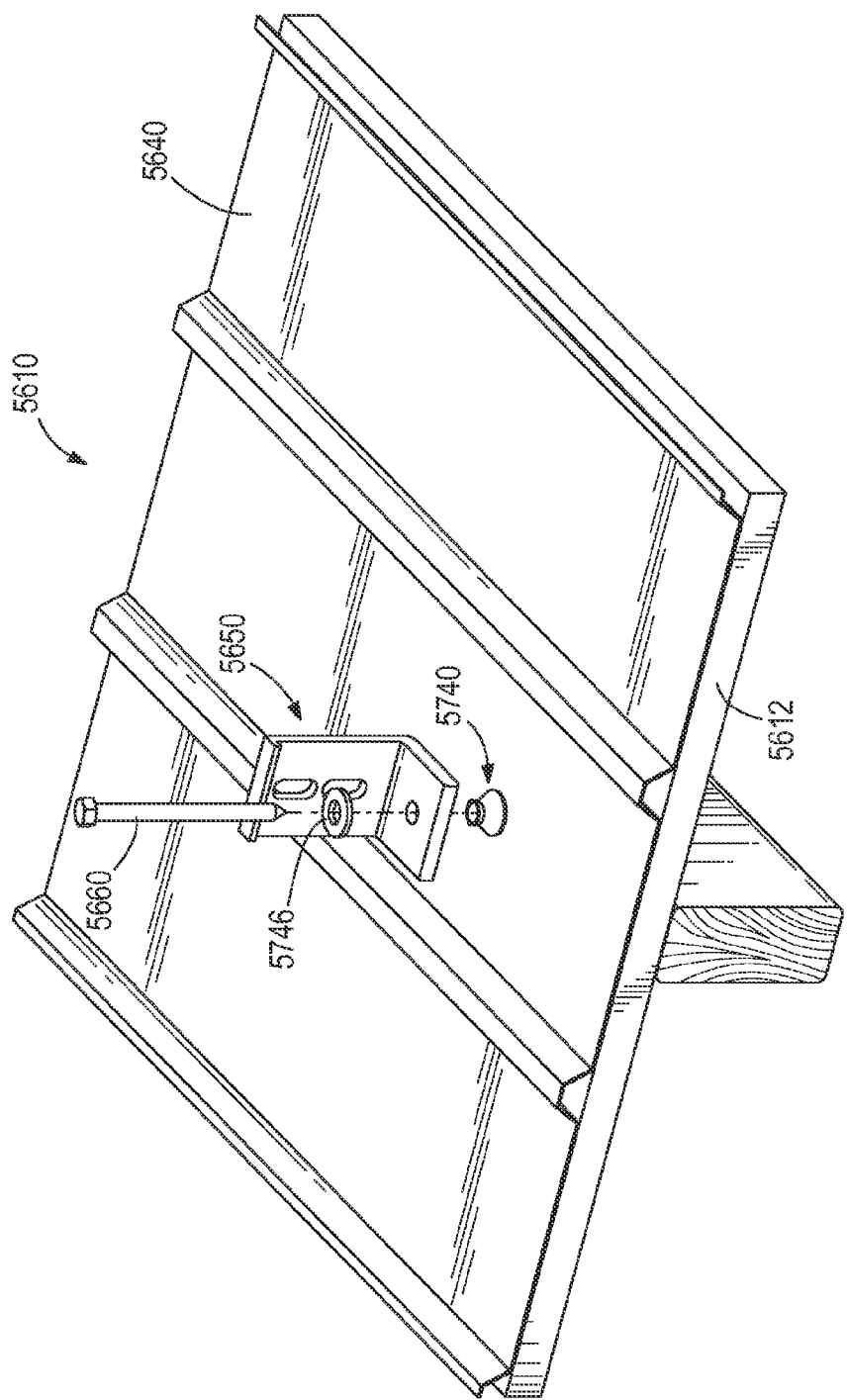

FIG. 129 is an exploded view of a tile mount assembly according to another embodiment.

Figure 130:
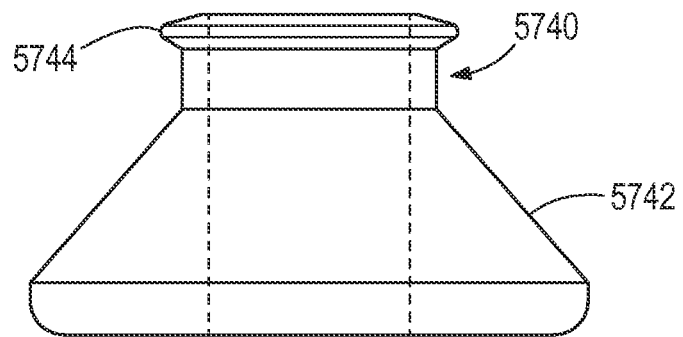

FIG. 130 is a side view of a seal.

Figure 131:
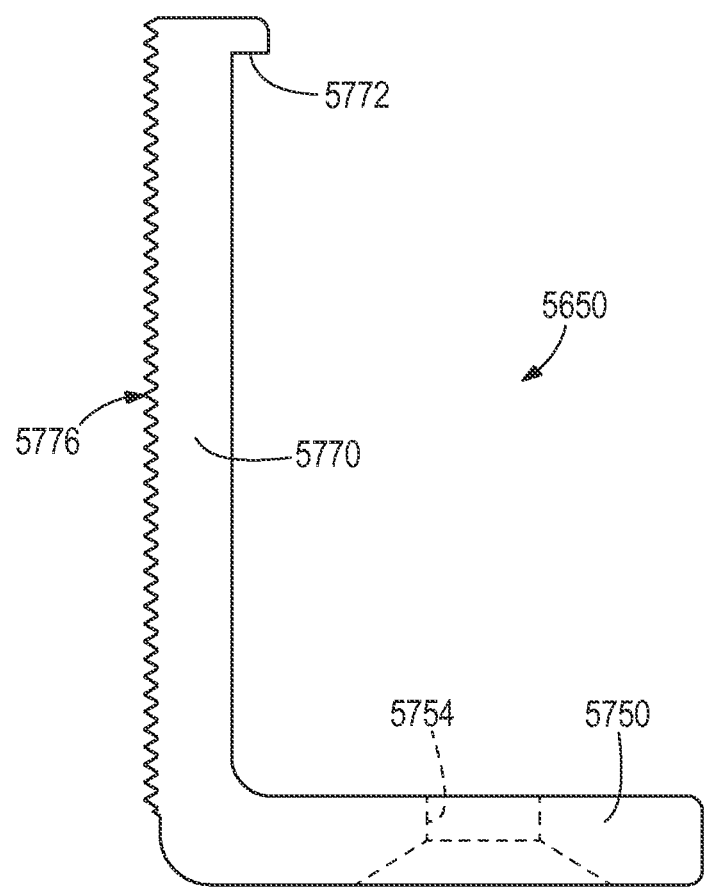

FIG. 131 is a side view of a bracket.

FIG. 132 is a side view of a bracket according to another embodiment.

FIG. 133 is a side view of a bracket according to another embodiment.

FIG. 134 is a front view of a portion of a bracket according to another embodiment.

Figure 135:
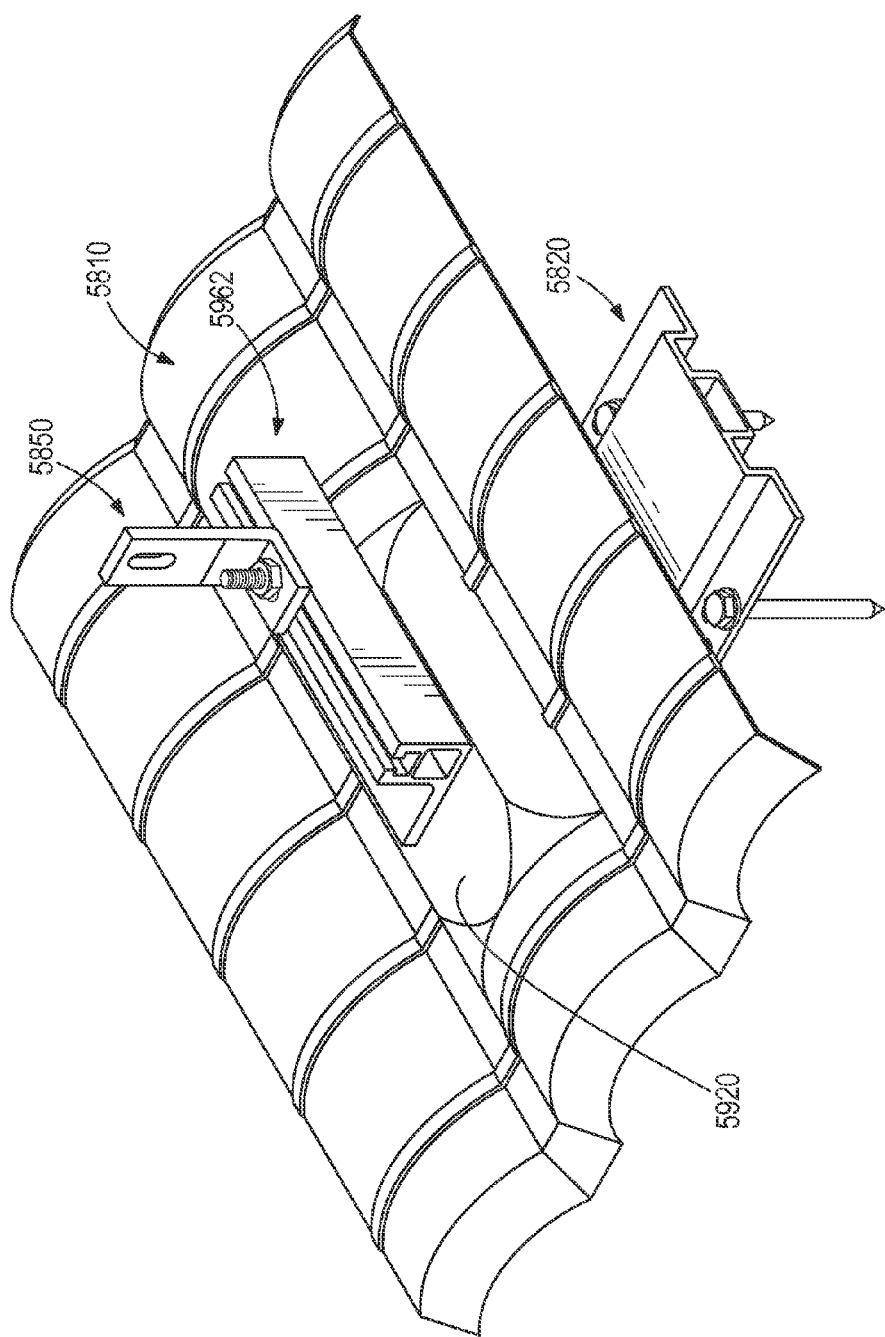

FIG. 135 is a perspective view of a tile mount assembly according to another embodiment.

Figure 136:
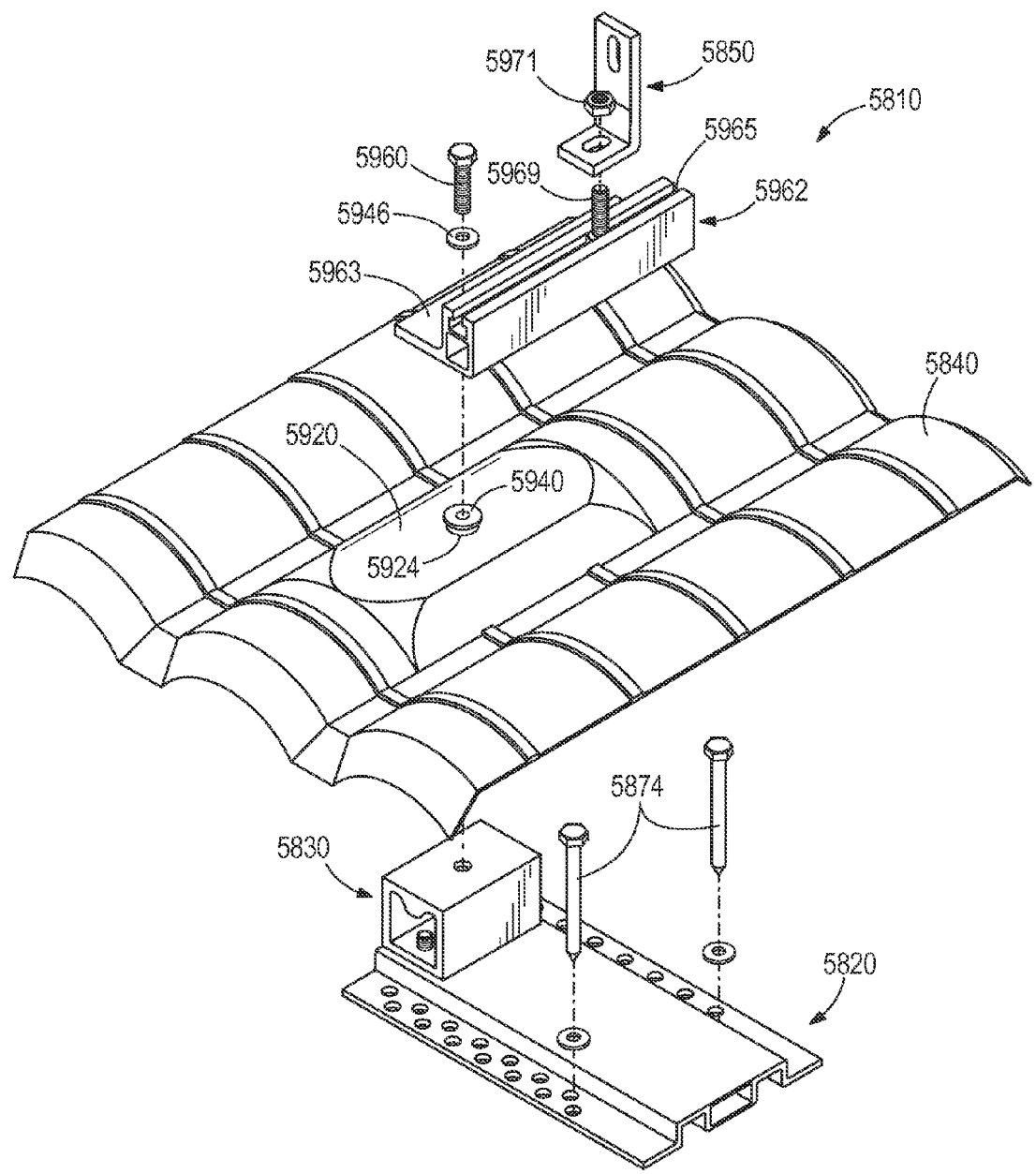

FIG. 136 is an exploded view of the tile mount assembly of FIG. 135.

Figure 137:
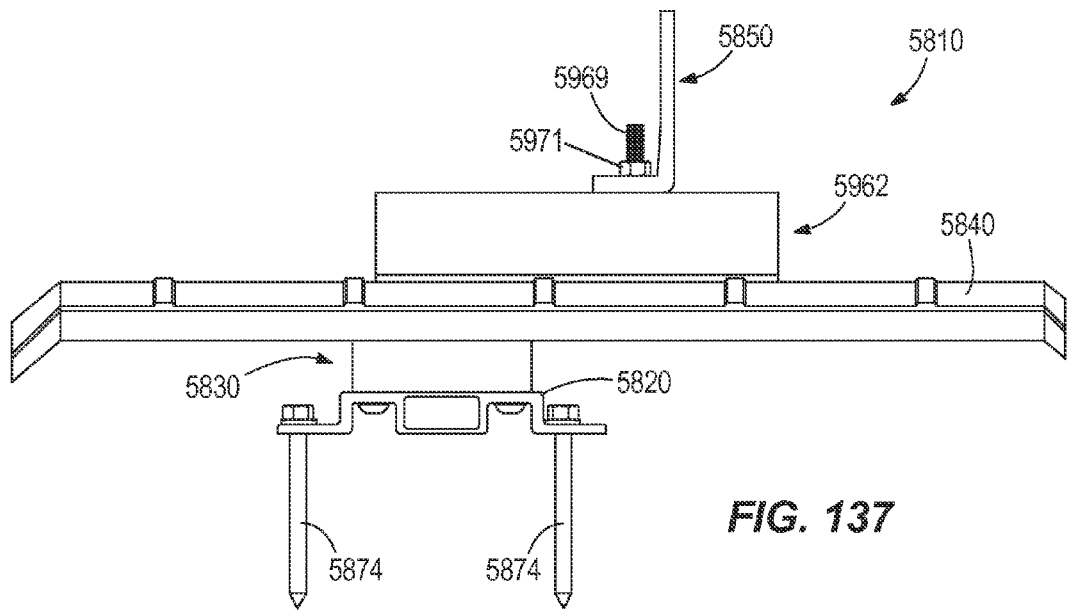

FIG. 137 is a side view of the tile mount assembly of FIG. 135.

Figure 138:
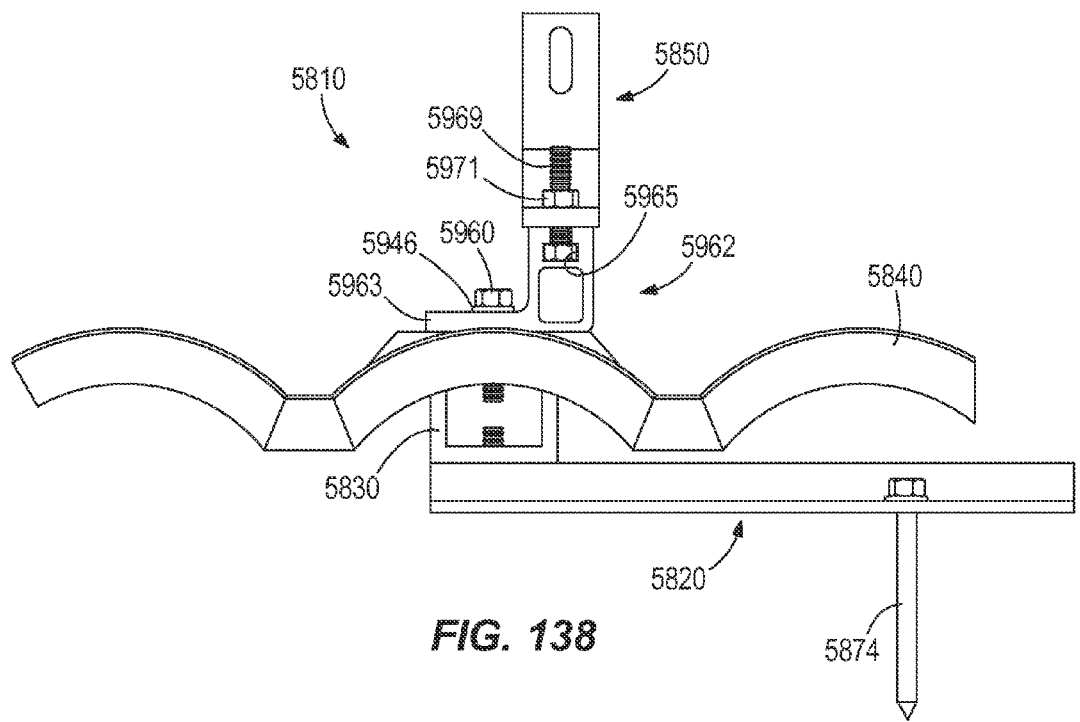

FIG. 138 is a front view of the tile mount assembly of FIG. 135.

Figure 139:
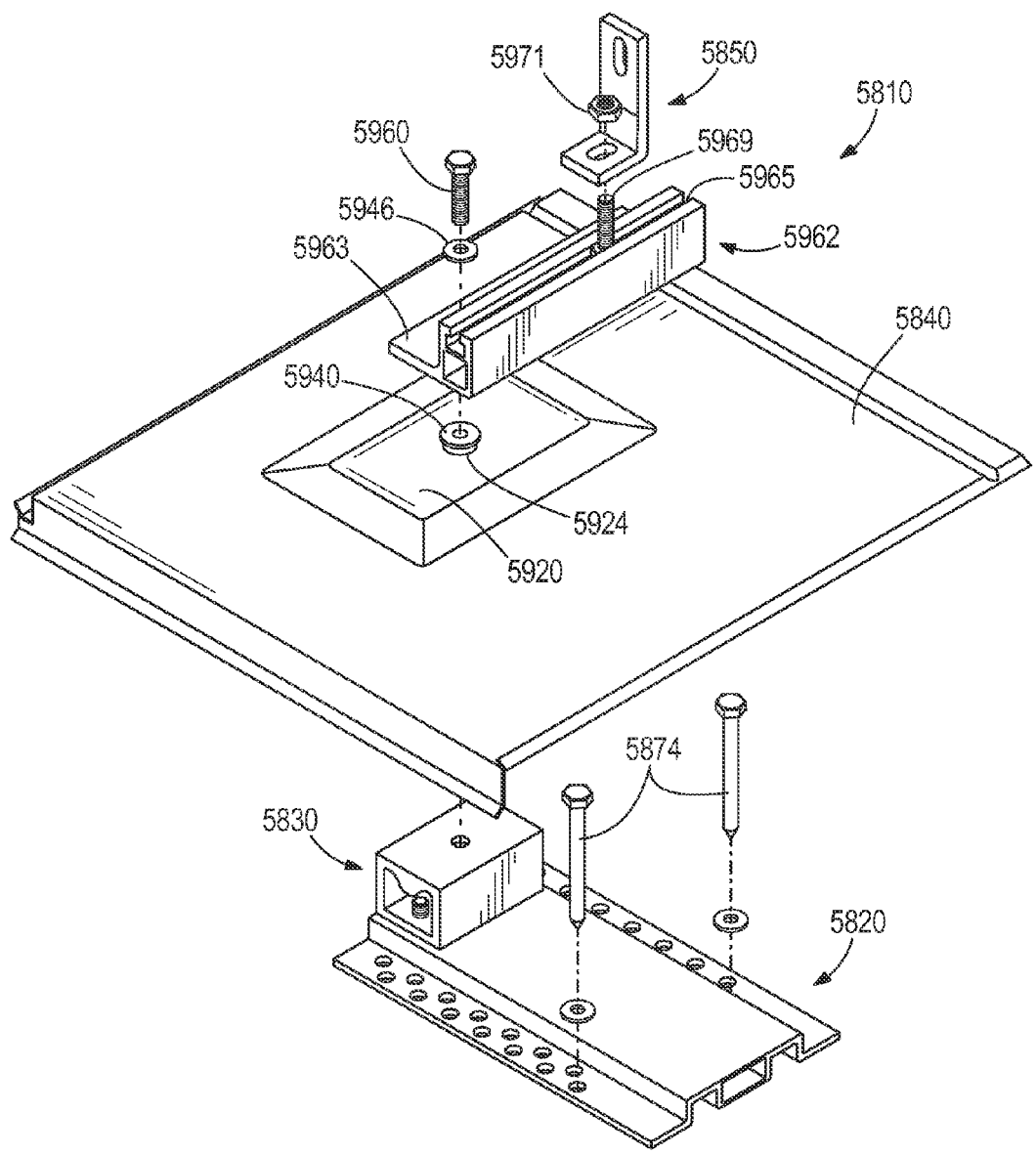

FIG. 139 is a perspective view of a tile mount assembly according to another embodiment.

Figure 140:
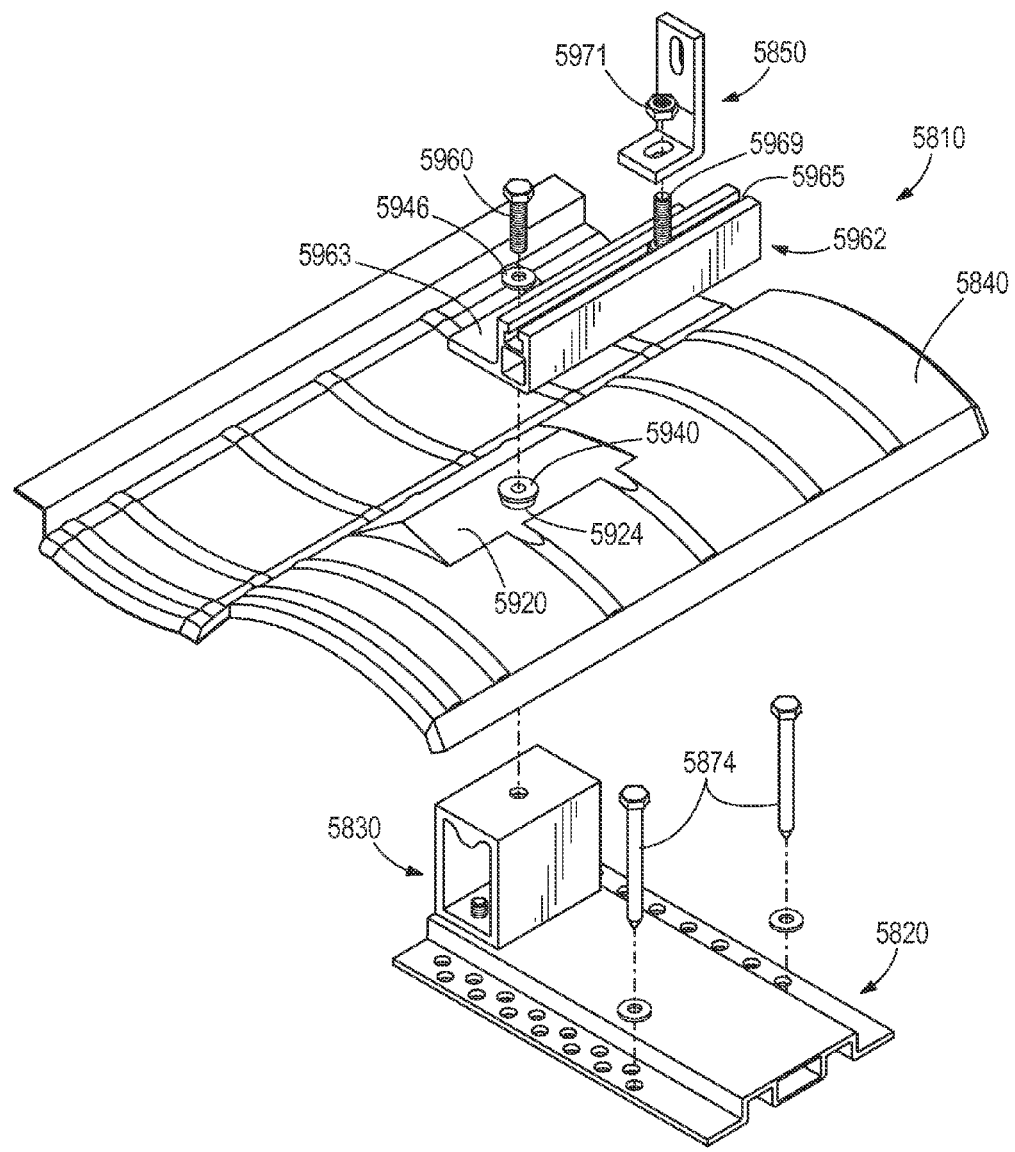

FIG. 140 is a perspective view of a tile mount assembly according to another embodiment.

Figure 141:
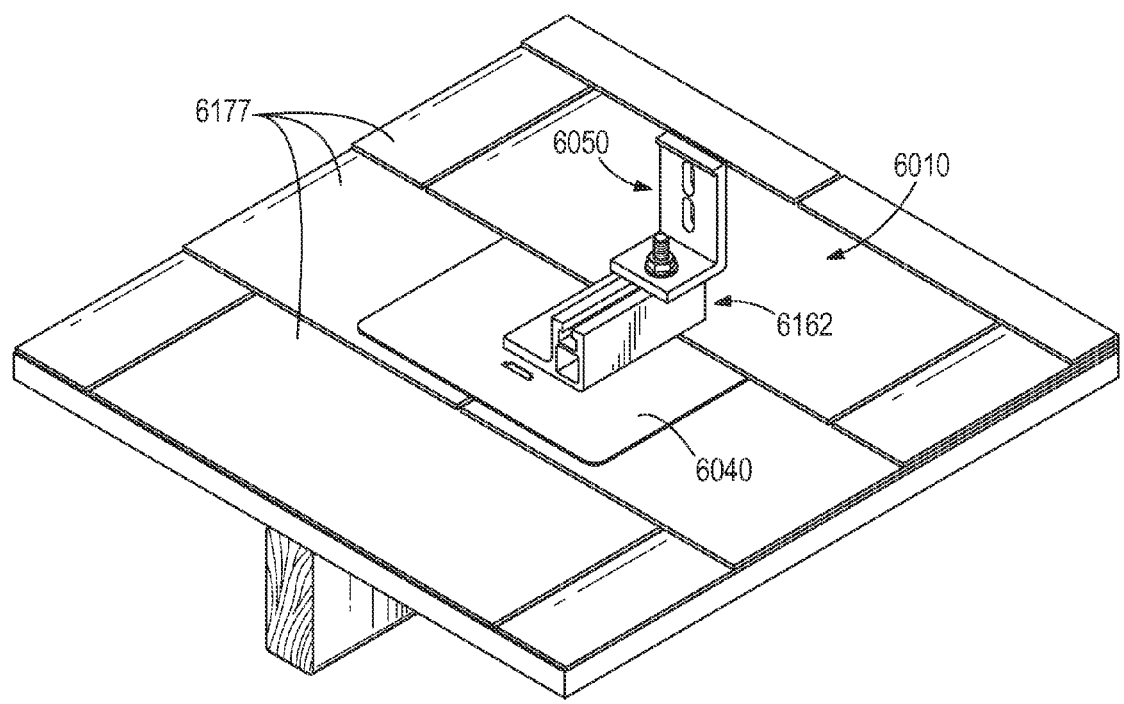

FIG. 141 is a perspective view of a tile mount assembly according to another embodiment with a bracket.

Figure 142:
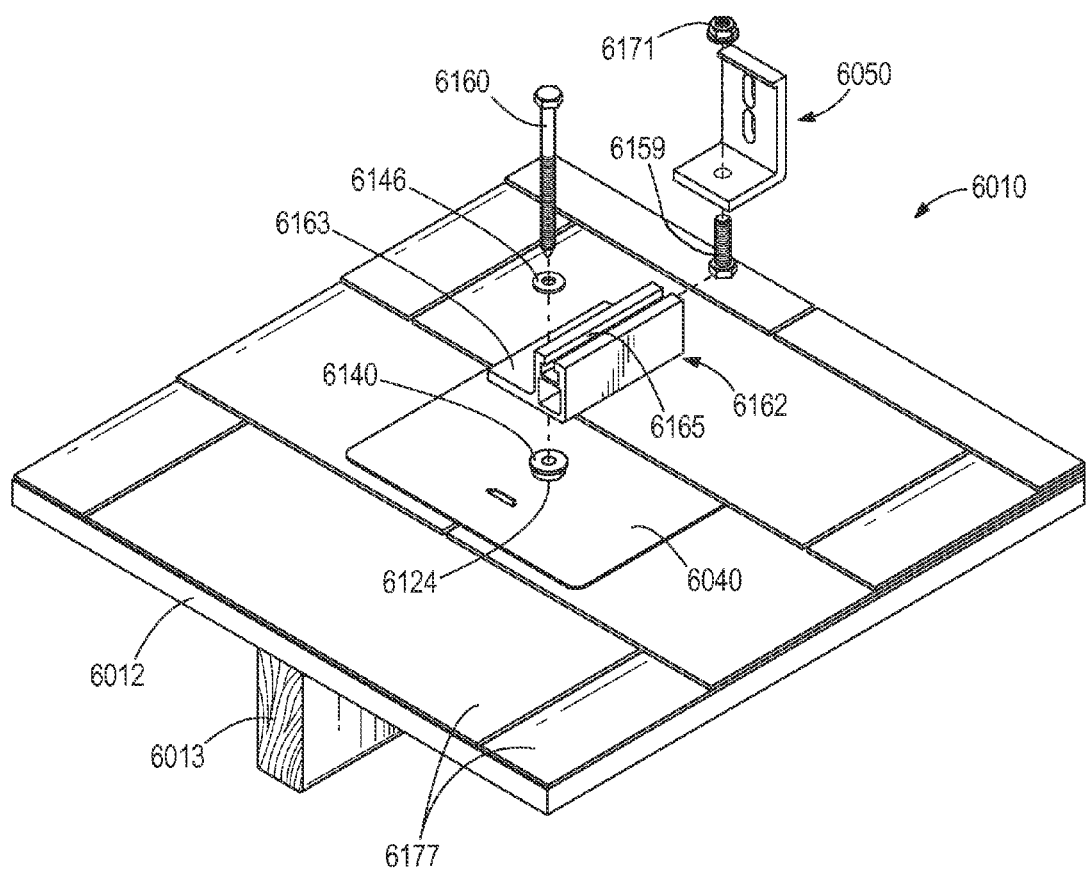

FIG. 142 is an exploded view of the tile mount assembly of FIG. 141 with a bracket.

Figure 143:
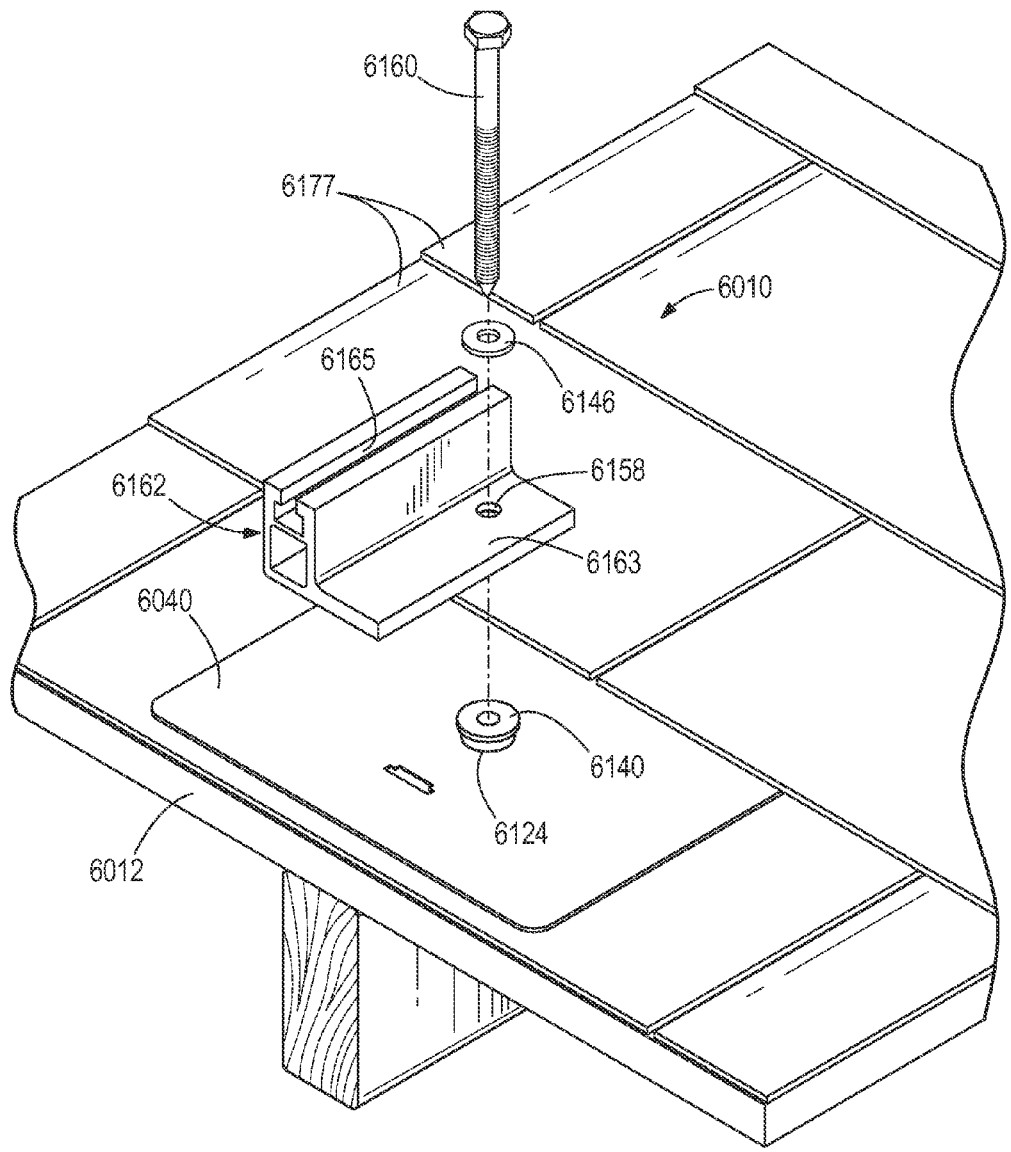

FIG. 143 is an exploded view of the tile mount assembly of FIG. 141.

Figure 144:
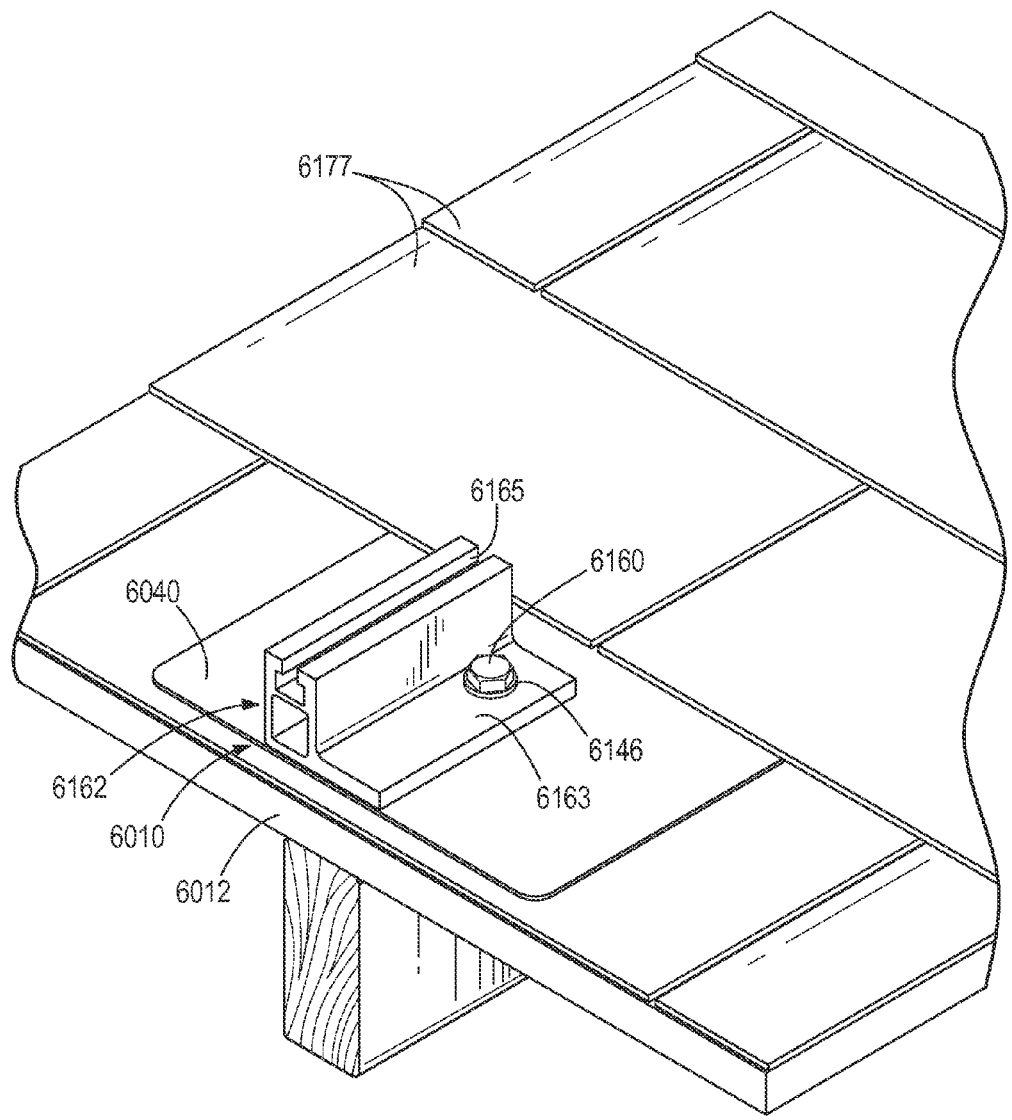

FIG. 144 is a perspective view of the tile mount assembly of FIG. 141.

Figure 145:
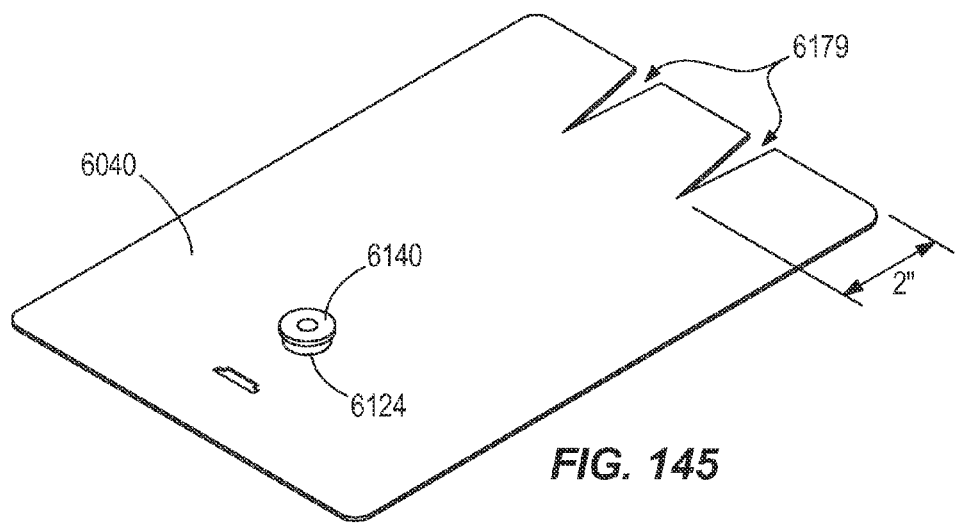

FIG. 145 is a perspective view of a flashing member.

Figure 146:
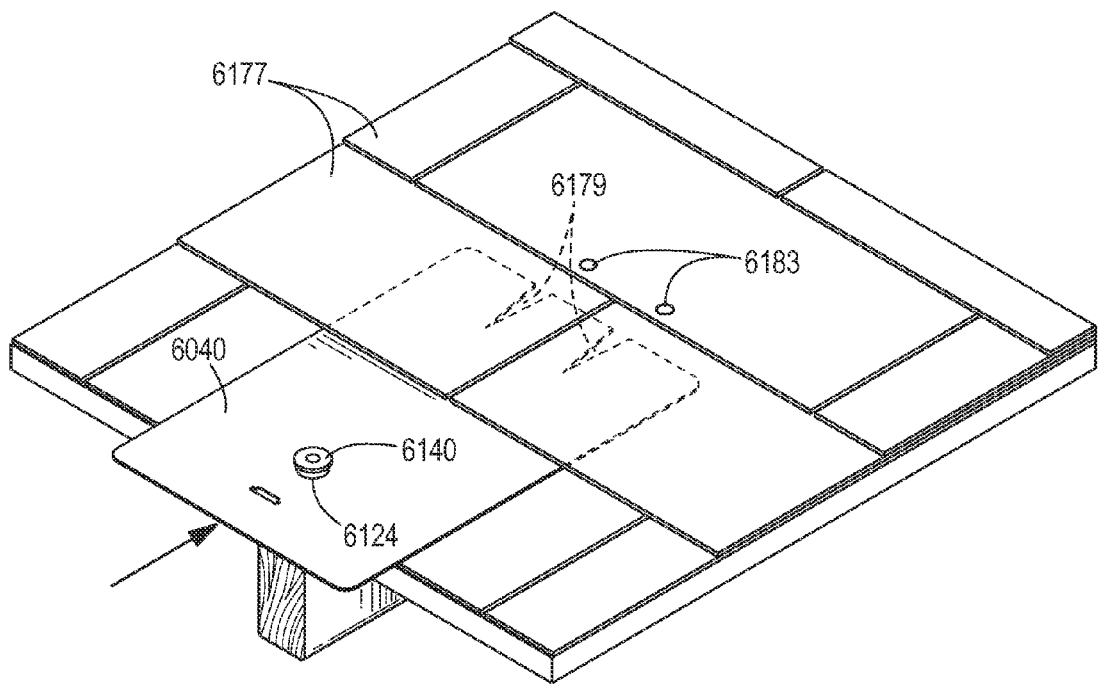

FIG. 146 is a perspective view of the flashing member of FIG. 145 positioned on a roof.

Figure 147:
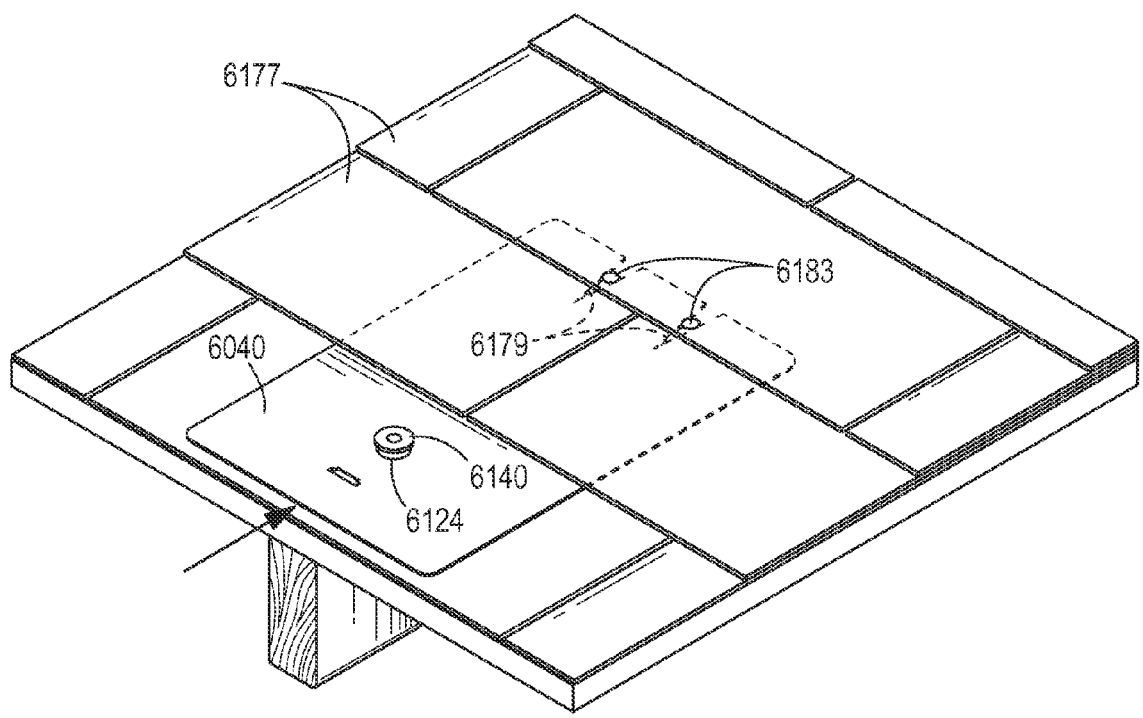

FIG. 147 is a perspective view of the flashing member of FIG. 145 positioned on a roof.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
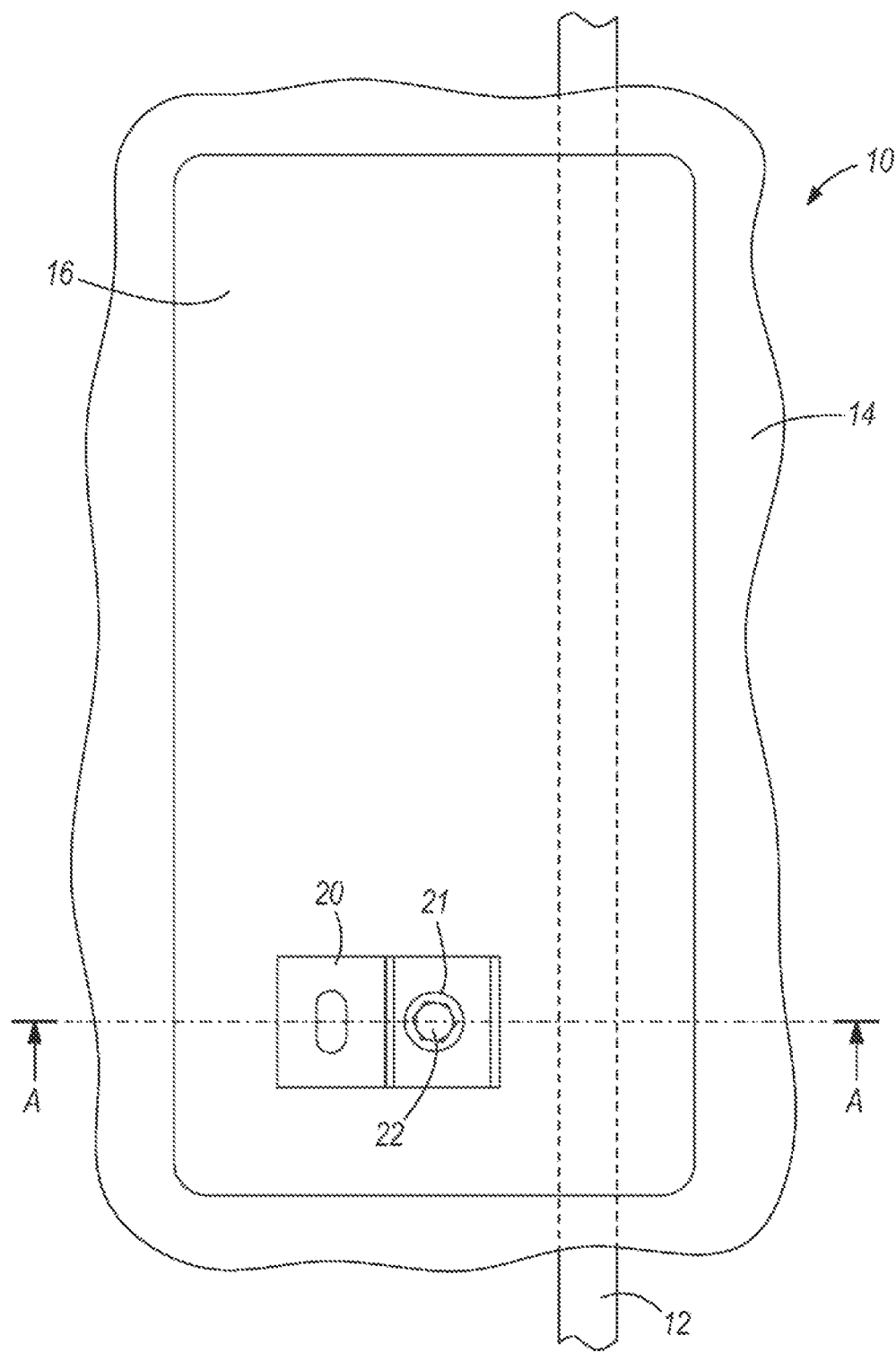
FIG. 1 is a top view of a roofing system according to some embodiments of the present invention.
Figure 1A:
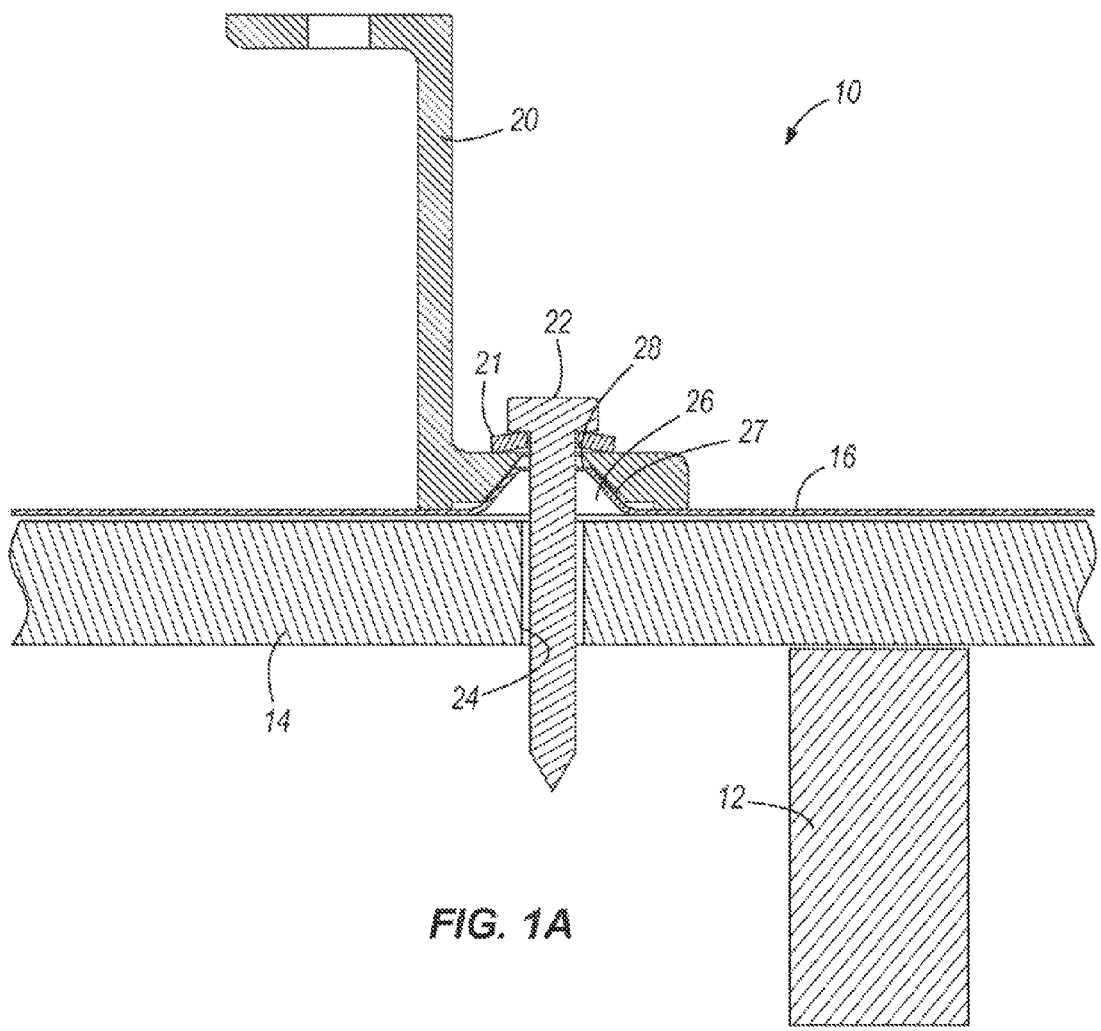
FIG. 1A is a cross-sectional view of the roofing system of FIG. 1, taken along line A-A of FIG. 1.

FIGS. 1 and 1A illustrate a roofing system 10 including a number of rafters or beams 12, a roof substrate 14 (e.g., tarpaper, plywood or other decking material, insulation, and the like) supported on the rafters 12, flashing 16 extending across the substrate 14 (i.e., placed immediately adjacent an upper surface of the substrate 14 or supported on one or more intermediate layers of roofing or sealing material, which in turn are placed on the substrate 14), a seal 18, a mounting bracket 20 and at least one fastener 22 operable to connect the bracket 20 to the roof substrate 14 and the flashing 16. In the illustrated embodiment, the roofing system 10 includes a washer 21 positioned between the mounting bracket 20 and the fastener 22. In some embodiments, the washer 21 can be a spring washer, a compression lock washer, a sealing ring or the like. In some embodiments, the washer 21 is omitted. The roofing system 10 is operable to support any of a variety of roof-mounted fixtures, such as, for example, snow fences, solar panels, an antenna, signs, billboards, or any of a number of other roof-mountable assemblies. Depending on one or more of the geographic location, anticipated quantity and type of precipitation, and anticipated roof and wind loading, the roofing system 10 can include any of a variety of flashing, seal and bracket arrangements, as will be discussed below.

The bracket 20 is operable to support any of a variety of roof-mounted fixtures, such as snow guards, snow fences, solar panels, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No. 6,526,701, filed Dec. 6, 2000, the contents of both of which are herein incorporated by reference.

Prior to installation of the roofing system 10, apertures 24 are drilled or otherwise created in the rafters 12 and/or substrate 14. The illustrated embodiment shows apertures 24 in the substrate 14. The roofing system 10 inhibits leakage of fluids through the flashing 16, and, in some embodiments, may also or alternately inhibit leakage of fluids beyond the flashing to portions of the substrate 14 or areas below the substrate 14. The roofing system 10 can be utilized on any of a variety of roof types, such as slate roofs, membrane roofs, aluminum roofs, standing seam roofs, tile roofs, shingle roofs, and the like.

A first embodiment of flashing 16 for the roofing system 10 is illustrated in FIGS. 2-5. The flashing 16 of the embodiment of FIGS. 2-5 extends substantially along a plane but includes an upwardly extending protrusion, such as the illustrated projection 30 that tapers upward, out of the plane. The upwardly extending projection 30 has a first diameter d1 in the plane, and a second diameter d2 in a second plane that is substantially parallel to but spaced from the plane. The second diameter d2 is less than the first diameter d1, to form a truncated cone or frustoconical shape. In other embodiments, the projections 30 can have other shapes and configurations, corresponding to the shape of an underside of an associated mounting bracket 20.

As best illustrated in FIG. 1A, the projection 30 defines a concave interior side 26, an exterior side 27 and a frustoconical end 28. As used herein, frustoconical includes cones with rounded, flat, non-flat or nearly flat upper portions and truncated cones with rounded, flat, non-flat or nearly flat upper portions. As mentioned above, the projections 30 can have a number of different shapes and configurations. Similarly, in some embodiments, the concave interior side 26 of the projection 30 may have a number of different shapes and configurations, including but not limited to configurations in which the arch provided by the interior side 26 does not include a uniform radius.

The concave interior side 26 and the flashing 16 define a space therebetween. A seal can be positioned within the space to at least partially fill the space to further inhibit leakage through the aperture 24. The seal has been omitted from FIG. 1A for clarity, but is illustrated and described in other embodiments. Any of the seals shown or described herein can be utilized with the roofing system shown in FIGS. 1 and 1A.

With continued reference to FIGS. 2-5, the upwardly extending projection 30 defines an aperture 32 positioned substantially in the second plane. The illustrated upwardly extending projection 30 and aperture 32 are circular, but in other embodiments, can be square, D-shaped, triangular, pentagonal, hexagonal, ovular, or other regular or irregular shapes. The illustrated aperture 32 is substantially centered on the upwardly extending projection 30, but other, non-centered embodiments are possible. The flashing 16 has a first side 34 and a second side 36 opposite the first side 34. The first side 34 and the second side 36 are substantially planar, apart from the projection 30.

In some embodiments, the aperture 32 is sized to receive a seal 18 therethrough. The seal 18 can extend through the flashing 16, such that the seal 18 engages or contacts the first side 34 of the flashing 16 and the second side 36 of the flashing 16. The illustrated seal 18 includes a first end portion 40 that forms a substantially circular disk having a planar end surface 41 and a second end portion 42 that forms a substantially circular disk having a planar end surface 43 substantially parallel to the planar end surface 41. The illustrated seal 18 also defines a stem, such as the illustrated tapered central portion 44, extending between the first end portion 40 and the second end portion 42. The tapered central portion 44 has a first diameter d3 adjacent the planar end surface 41 and a second diameter d4 adjacent the planar end surface 43. The first diameter d3 is less than the second diameter d4. The diameter of the tapered central portion 44 increases from the first diameter d3 to the second diameter d4 substantially linearly to form a taper along a substantially constant angle. The seal 18 has a substantially cylindrical overall shape, with a notch 45 cut out between the first end portion 40 and the second end portion 42 along the tapered central portion 44. The notch 45 is defined by a tapered surface 46 extending between the first and second end portions 40, 42. In the illustrated embodiment, the second diameter d4 is approximately equal to the diameter of the first end portion 40 and the diameter of the second end portion 42.

Figure 7:
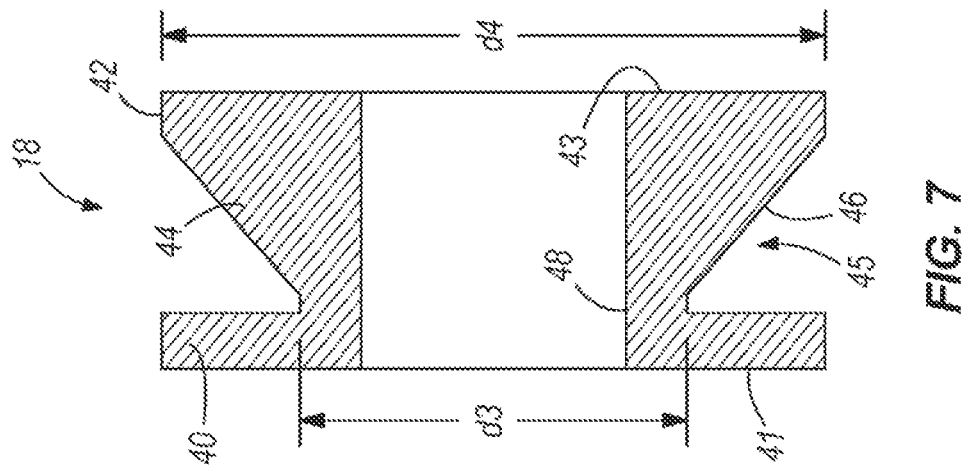
FIG. 7 is a cross-sectional view taken along line 7-7 shown in FIG. 6.

The illustrated seal 18 defines a substantially cylindrical aperture 48 that is substantially centrally located in the seal 18. The aperture 48 extends normal to the outside surfaces of the first and second end portions 40, 42 and parallel to the substantially cylindrical overall shape of the seal 18, in the illustrated embodiment. The aperture 48 has a smaller diameter than the seal first diameter d3, as shown in FIG. 7, so that the seal 18 has an adequate thickness between the first and second end portions 40, 42. The seal 18 can be made from any suitable resilient sealing or elastomeric material, such as polymers, rubbers, plastics, and the like.

The seal 18 is insertable into the aperture 32 to couple the seal 18 to the flashing 16, as illustrated in FIGS. 9-12. The notch 45 is sized to receive the flashing 16 therein. The seal 18 is operable to form a compression seal by being held against the concave interior side 26 of the flashing 16. The seal 18 can be factory-installed in the flashing aperture 32 or can be inserted by on-site at a customer's building. A fixture for a punch press can be sized to install the seals 18 into the respective apertures 32. In some embodiments, the punch press can be utilized to form the projection 30 and the aperture 32 in flashing 16, at the same time. In some embodiments, the punch press can form the projection 30 and the aperture 32 in the flashing 16 and then insert the seal 18 into the aperture 32, either during the same operation or during a separate operation.

In some embodiments, a hand tool can be utilized to insert the seal 18 into the aperture 32. This tool can be operated by a single user to press or otherwise urge the first end portion 40 through the aperture 32, such that the projection 30 contacts the tapered surface 46 of the tapered central portion 44. The tool can include one or more fingers to engage the seal 18 and pull or push the seal 18 through the aperture 32. The fingers can be inserted through the aperture 32 from the flashing first side 34 toward the flashing second side 36. The fingers can then squeeze or pinch the first end portion 40 to temporarily reduce the diameter of the first end portion 40. In another embodiment, the fingers can grasp a portion of the first end portion 40. The first end portion 40 is then pulled through the aperture 32. The seal 18 is resilient, such that the seal 18 returns to its previous shape and size after being inserted into the aperture 32.

Figure 6:
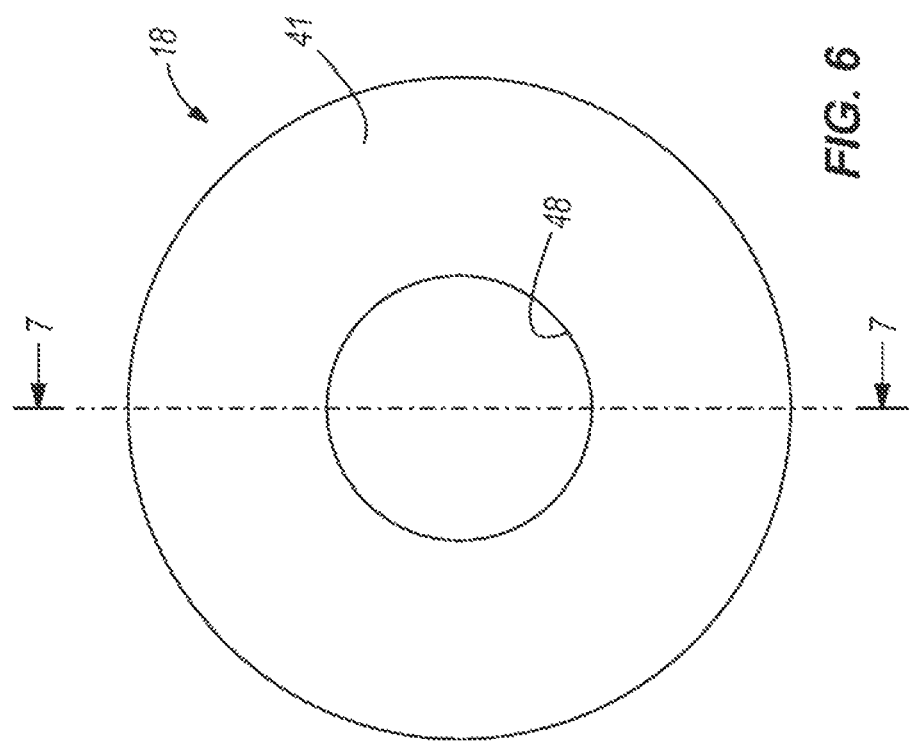
FIG. 6 is a top view of a seal for use with the flashing shown in FIG. 2.
Figure 6A:
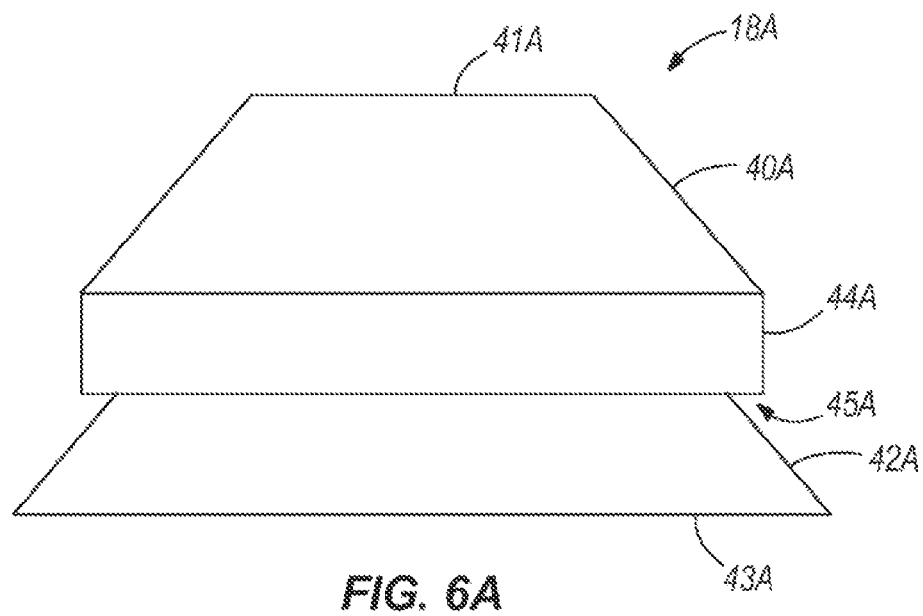
FIG. 6A is a front view of an alternate seal for use with the flashing shown in FIG. 1.

An alternate seal 18A is illustrated in FIGS. 6A-8A. The seal 18A, like seal 18 can extend through the flashing 16 such that the seal 18A engages or contacts the first side 34 of the flashing 16 and the second side 36 of the flashing 16. The illustrated seal 18A includes a first end portion 40A and a second end portion 42A, spaced from the first end portion 40A. The first end portion 40A is tapered from a first diameter dA1 outward to a second diameter dA2, which is greater than the first diameter dA1. The first end portion 40A at the first diameter dA1 has a substantially planar end surface 41A. The illustrated first end portion 40A tapers along a constant slope, but in other embodiments, tapers of varying slope are possible. The second end portion 42A is tapered from a third diameter dA3 inward to a location having a diameter which is less than the third diameter dA3. The second end portion 42A at the third diameter dA3 has a substantially planar end surface 43A, which is substantially parallel to the planar end surface 41A, as shown in FIG. 6A. The illustrated second end portion 42A tapers along a constant slope, but in other embodiments, tapers of varying slope are possible. In the illustrated embodiment, the slope of the first end portion 40A is substantially identical to the slope of the second end portion 42A. In other embodiments, the slope of the first end portion 40A can be greater or less than the slope of the second end portion 42A.

The seal 18A includes a central portion 44A that is positioned between the first end portion 40A and the second end portion 42A. The central portion 44A is substantially disk-shaped and has a substantially constant diameter. In the illustrated embodiment, the central portion 44A has a diameter equal to the second diameter dA2. The central portion 44A extends between the first end portion 40A and the second end portion 42A and defines a notch 45A therebetween. The notch 45A permits the first end portion 40A to be compressed without compressing the second end portion 42A.

Although the illustrated seal 18A does not include an aperture, the seal 18A can define a substantially cylindrical aperture that is substantially centrally located in the seal 18A, similar to the aperture 48 shown in seal 18. The aperture extends normal to the planar end surfaces of the first and second end portions 40A, 42A, in the illustrated embodiment. The aperture can have a smaller diameter than the seal first diameter dA1, so that the seal 18A has an adequate thickness between the first and second end portions 40A, 42A. In some embodiments, the aperture can have a diameter equal to the dA1, such that the first end portion 40A tapers upward toward the aperture. In some such embodiments, the aperture can be formed only when a fastener is inserted through the flashing 16 and the seal 18A during installation of the roofing system 10. In other embodiments, the aperture can be formed in the seal prior to assembly of the roofing system 10. The seal 18A, like seal 18, can be made from any suitable resilient sealing material, such as polymers, rubbers, and the like.

The seal 18A is insertable into the aperture 32 in the flashing 16 to couple the seal 18A to the flashing 16. When installed, the first end portion 40A extends through the aperture 32, such that the flashing 16 is positioned between the first end portion 40A and the second end portion 42A. The notch 45A is sized to receive the flashing 16 therein.

A bracket, such as the bracket 20 illustrated in FIGS. 13 and 14, can be coupled to the seal 18 and flashing 16. The illustrated bracket 20 is generally z-shaped and includes an elongate body portion 52 having a first end 54 and a second end 56 spaced from the first end 54. A first flange 58 is coupled to the first end 54 and extends substantially perpendicular to the elongate body portion 52 in a first direction. A second flange 60 is coupled to the second end 56 and extends substantially perpendicular to the elongate body portion 52 in a second direction, opposite the first direction. The first flange 58 defines an aperture 62 extending substantially parallel to the elongate body portion 52. The illustrated aperture 62 is substantially ovular, but other shapes, such as circular, square, rectangular, hexagonal, and the like are possible. The aperture 62 is sized to receive a fastener, protrusion, or the like therethrough. The ovular shape of the aperture 62 permits flexibility and slight relative movement between the bracket 20 and the fastener, projection or the like, when installed.

The second flange 60 of the bracket 20 defines an aperture 64 that includes a first aperture portion 64a and a second aperture portion 64b. The first aperture portion 64a has a substantially cylindrical shape and defines a first diameter d5. The second aperture portion 64b has a substantially cylindrical shape and defines a second diameter d6 that is less than the first diameter d5. The first aperture portion 64a is sized to receive the seal first end portion 40. The second aperture portion 64b is sized to be smaller than the seal first end portion 40 to permit pre-loading of the seal 18, to thereby seal the aperture 64 with the seal 18.

An alternate embodiment of the bracket 20A is shown in FIGS. 13A and 14A. The bracket 20A differs from the bracket 20 in that the second flange 60A includes an aperture 66. The aperture 66 includes a first aperture portion 66a and a second aperture portion 66b. The first aperture portion 66a has a substantially constant diameter da. The second aperture portion 66b has a variable, tapering diameter starting at diameter db, which is less than da and tapering inward to diameter dc. Diameter dc is less than either da or db. The second aperture portion 66b has a substantially constant slope at which the diameter changes between db and dc. In some embodiments, the aperture 66 is tapered along the entire distance between da and dc. In other embodiments, diameters da and db are substantially equal. In still other embodiments, the slope of the tapered portion 66b is greater or less than the illustrated slope. In yet other embodiments, the relative heights of the first aperture portion 66a and the second aperture portion 66b are variable.

Figure 7A:
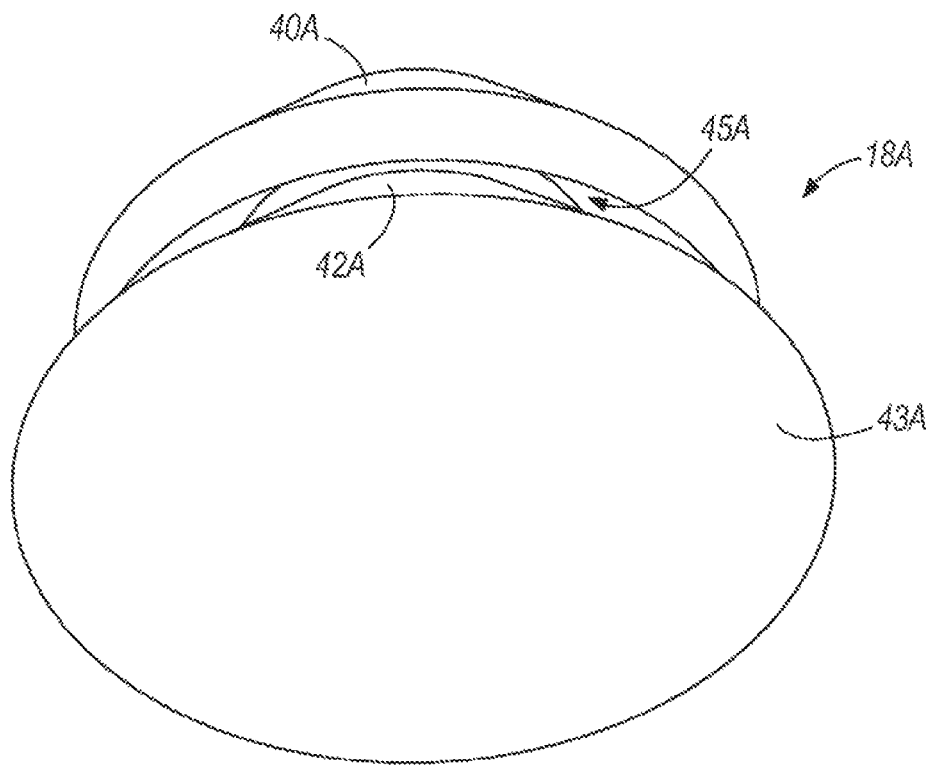
FIG. 7A is a bottom perspective view of the seal shown in FIG. 6A.
Figure 8:
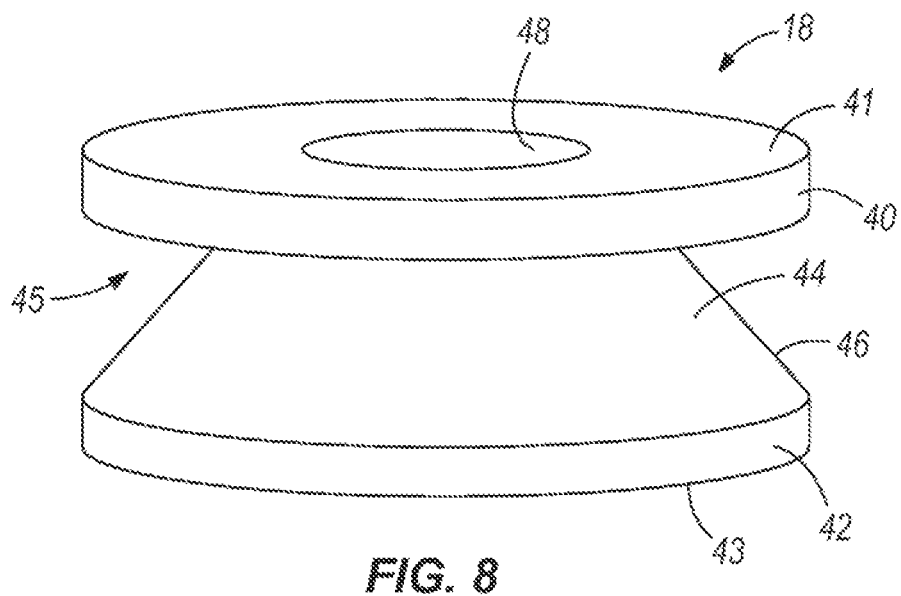
FIG. 8 is a perspective view of the seal shown in FIG. 6.
Figure 8A:
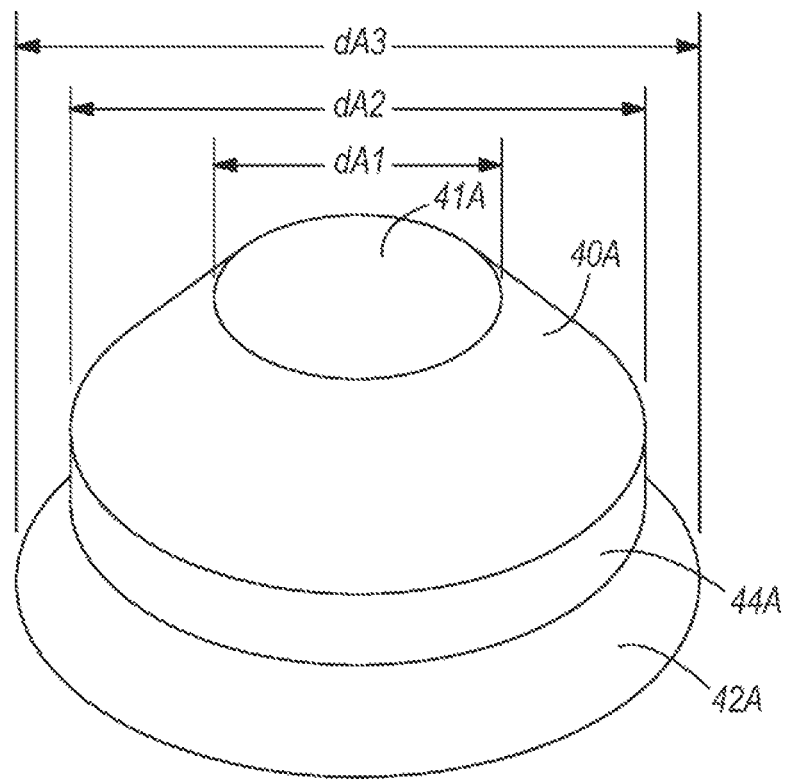
FIG. 8A is a top perspective view of the seal shown in FIG. 6A.
Figure 10:
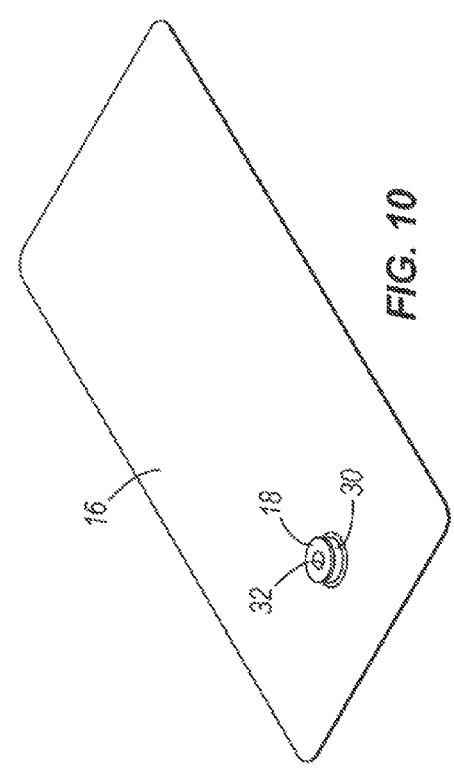
FIG. 10 is a perspective view of the flashing and seal shown in FIG. 9.
Figure 12:
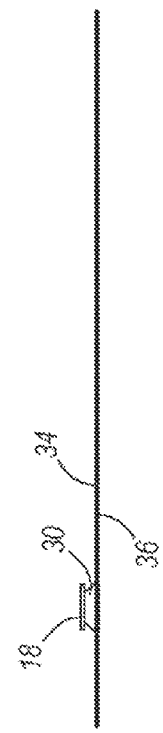
FIG. 12 is a side view of the flashing and seal shown in FIG. 9.
Figure 9:
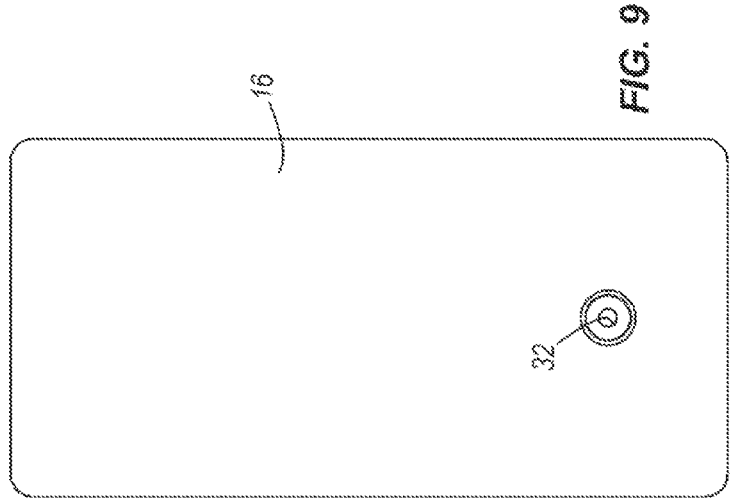
FIG. 9 is a top view of the flashing of FIG. 2 with the seal shown in FIG. 6 installed in the aperture.
Figure 11:
FIG. 11 is a front view of the flashing and seal shown in FIG. 9.
Figure 20:
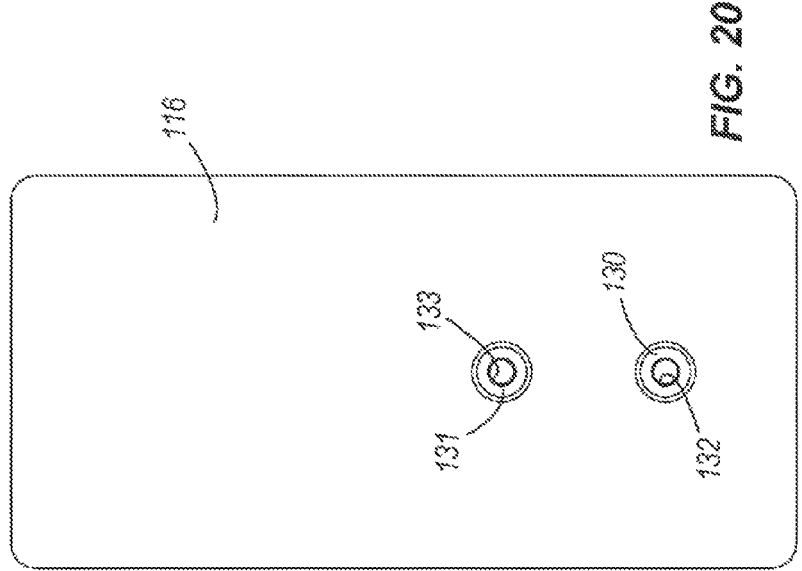
FIG. 20 is a top view of a second embodiment of flashing according to the present invention.
Figure 21:
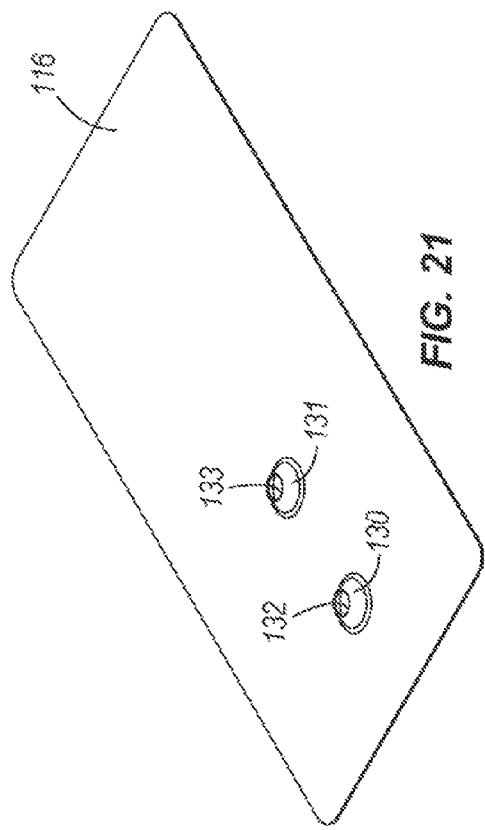
FIG. 21 is a perspective view of the flashing shown in FIG. 20.
Figure 22:
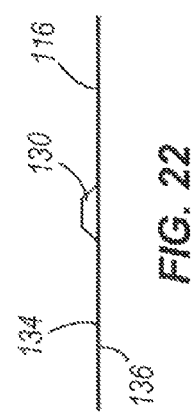
FIG. 22 is a front view of the flashing shown in FIG. 20.
Figure 23:
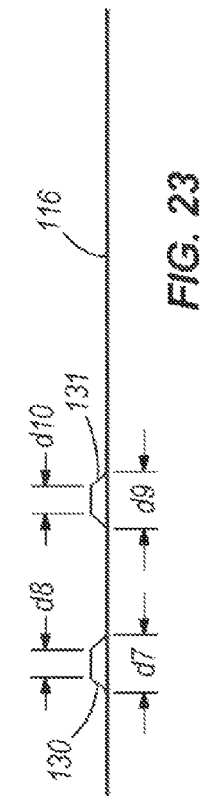
FIG. 23 is a side view of the flashing shown in FIG. 20.

The projection 30 in the flashing 16 is sized to receive the second end portion 42A, as discussed above. The aperture 66 is sized to receive the seal 18A and at least partially pre-load the seal 18A to enhance the seal between the seal 18 and the bracket 20A. In some embodiments, a differently shaped seal can be utilized. One such seal 18A is illustrated in FIGS. 6A and 7A. The seal 18A is sized to substantially mate with the aperture 66, such that the aperture 66 can slightly pre-load the seal 18A. The first aperture portion 66a is sized to receive the central portion 44A, such that da is substantially equal to or slightly less than dA2. In some embodiments, the central portion 44A can be slightly tapered to permit insertion into the first aperture portion 66a when da is slightly less than dA2 . The aperture portion 66b is zed to receive the first end portion 40A, such that dc is substantially equal to or slightly less than dA1, and db is substantially equal to or slightly less than dA2. In embodiments where dc and db are slightly less than dA1 and dA2, respectfully, slight pre-loading occurs when the seal 18A is pressed into the aperture 66. In embodiments where dc and db are substantially equal to dA1 and dA2, respectfully, the seal 18A can be preloaded by pressing the seal 18A into the bracket 20A by use of a fastener and the shape and size of the projection 30 in the flashing 16.

The seals 18 and 18A can be inserted into either or both apertures 64 or 66, and other configurations and arrangements of seals and apertures can be utilized to achieve the desired seal between the flashing 16 and the bracket 20 or 20A.

One or more fasteners can be used to couple the bracket 20 to the seal 18 and flashing 16 to form a roofing assembly. One such assembly 70 is illustrated in FIGS. 15-19 and includes the flashing 16, the seal 18, the bracket 20, one fastener 22, and a washer 72. The washer 72 can be a polymeric compression washer to provide a substantially water-tight seal between the fastener 22 and the bracket aperture 64. In some embodiments, the washer 72 can be omitted or can be replaced by an o-ring or an applied sealant, such as caulk. Alternatively or in addition, the washer 72 can include a stiffening element, such as, for example, a rigid backing, to provide additional support.

The assembly 70 can be installed on a roof. The fastener 22 can extend through the flashing 16, the seal 18, the bracket 20, into the substrate 14 and the rafters 12, as illustrated in FIGS. 1 and 1A. The washer 72 and the seal 18 work together to prevent or inhibit entry of water or other fluid into the aperture 64 or to the rafters 12 and/or substrate 14. Even though the illustrated fasteners are bolts, other fasteners, such as screws, studs, nails, and other removable and non-removable fasteners, can be used.

A similar assembly can be formed with the seal 18A and the bracket 20A. This assembly can also include a fastener 22 and a washer 72, as described above. The seals 18, 18A can be used interchangeably with brackets 20, 20A, and other shapes and arrangements of seals and brackets are possible.

FIGS. 20-34 illustrate another embodiment of a roofing system 110 according to the present invention. This embodiment employs much of the same structure and has many of the same properties as the embodiments of the roofing system 10 described above in connection with FIGS. 1-19. Accordingly, the following description focuses primarily upon structure and features that are different than the embodiments described above in connection with FIGS. 1-19. Reference should be made to the description above in connection with FIGS. 1-19 for additional information regarding the structure and features, and possible alternatives to the structure and features of the roofing system 110 illustrated in FIGS. 20-34 and described below. Features and elements in the embodiment of FIGS. 20-34 corresponding to features and elements in the embodiments described above in connection with of FIGS. 1-19 are numbered in the 100 series of reference numbers.

The second flashing 116 is substantially in the shape of a rectangular sheet having rounded corners. The flashing 116 extends substantially along a plane but includes a first upwardly extending projection 130 that tapers upwardly, out of the plane. The first upwardly extending projection 130 has a first diameter d7 in the plane, and a second diameter d8 in a second plane that is substantially parallel to but spaced from the plane. The second diameter d8 is less than the first diameter d7, to form a truncated cone or frustoconical shape. The diameters d7 and d8 can be the same as or different than the diameters d1 and d2 of the projection 30 described above.

The primary difference between the roofing system 110 embodiment illustrated in FIGS. 20-34 and the roofing system embodiment 10 illustrated in FIGS. 1-19 is that the roofing system 110 includes a second upwardly extending projection 131 in the flashing 116. The second upwardly extending projection 131 has a first diameter d9 in the plane, and a second diameter d10 in a second plane that is substantially parallel to but spaced from the plane. The second diameter d10 is less than the first diameter d9, to form a truncated cone or frustoconical shape. The diameters d9 and d10 can be the same as or different than the diameters d7 and d8 of the first projection 130 described above.

Each of the upwardly extending projections 130, 131 defines an aperture 132, 133 positioned substantially in the second plane. The illustrated projections 130, 131 are substantially the same size and shape as the projection 30, but can have different shapes and configurations. Alternatively, each of the projections 130, 131 can have a different shape or configuration so as to require the corresponding mounting bracket 120 to be installed in a specific desired orientation relative to the flashing 116. The illustrated upwardly extending projections 130, 131 and respective apertures 132, 133 are circular, but in other embodiments, can be square, triangular, pentagonal, hexagonal, ovular, or other regular or irregular shapes. The illustrated apertures 132, 133 are substantially centered on the respective upwardly extending projections 130, 131, but other, non-centered embodiments are possible. The second flashing 116 has a first side 134 and a second side 136 opposite the first side 134. The first side 134 and the second side 136 are substantially planar apart from the projections 130, 131.

First and second seals 118, 119 can be inserted into respective apertures 132, 133, as described above and as illustrated in FIGS. 24-27. In other embodiments, a seal similar to seal 18A can be inserted into the flashing 116. Other aperture 132, 133 and seal configurations are possible and are considered to be within the scope of the present invention. The seals 118, 119 can be inserted into the respective apertures 132, 133 as discussed above, such as with a punch press, a hand tool, or the like.

Figure 28:
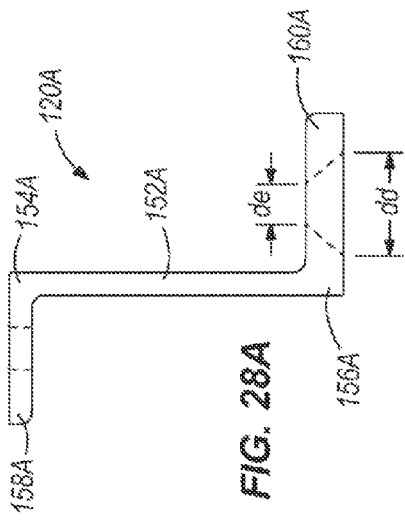
FIG. 28 is a side view of a bracket for use with the flashing and seals shown in FIG. 24.
Figure 29:
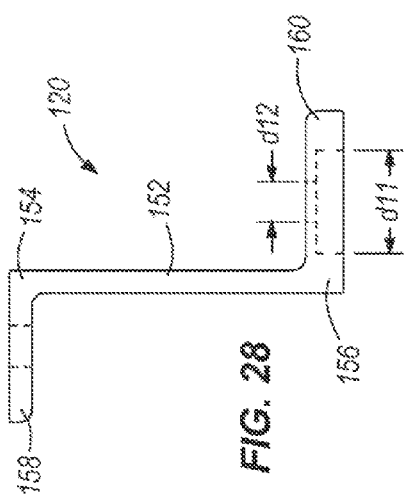
FIG. 29 is a bottom view of the bracket shown in FIG. 28.

A bracket, such as the bracket 120 illustrated in FIGS. 28 and 29, can be coupled to the seals 118, 119 and flashing 116. The illustrated bracket 120 is generally z-shaped and includes an elongate body portion 152 having a first end 154 and a second end 156 spaced from the first end 154. A first flange 158 is coupled to the first end 154 and extends substantially perpendicular to the elongate body portion 152 in a first direction. A second flange 160 is coupled to the second end 156 and extends substantially perpendicular to the elongate body portion 152 in a second direction, opposite the first direction. The first flange 158 defines a pair of apertures 162, 163 extending substantially parallel to the elongate body portion 152. The illustrated apertures 162, 163 are substantially ovular, but other shapes, such as circular, square, rectangular, hexagonal, and the like are possible. The apertures 162, 163 are sized to receive a fastener, projection, or the like therethrough. The ovular shape of the apertures 162, 163 permits flexibility and slight relative movement between the bracket 120 and the fastener, projection or the like, when installed.

The second flange 160 of the bracket 120 defines a first aperture 164 that includes a first aperture portion 164a and a second aperture portion 164b. The second flange 160 of the bracket further defines a second aperture 165 that includes a first aperture portion 165a and a second aperture portion 165b. The first aperture portions 164a, 165a have a substantially cylindrical shape and define a first diameter d11. The second aperture portions 164b, 165b have a substantially cylindrical shape and define a second diameter d12 that is less than the first diameter d11. The first aperture portions 164a, 165a are sized to receive the seal 118. The second aperture portions 164b, 165b are sized to be smaller than the seal 118, to permit pre-loading of the seal 118, to thereby seal the aperture 164 with the seal 118.

The apertures 164, 165 can have the same shape and size as aperture 64, or can be larger than or smaller than the aperture 64. First aperture portions 164a, 165a can have different diameters to denote proper orientation of the bracket 120 on the flashing 116. Other configurations and arrangement of brackets and apertures are possible and are considered to be within the scope of the present invention.

Figure 28A:
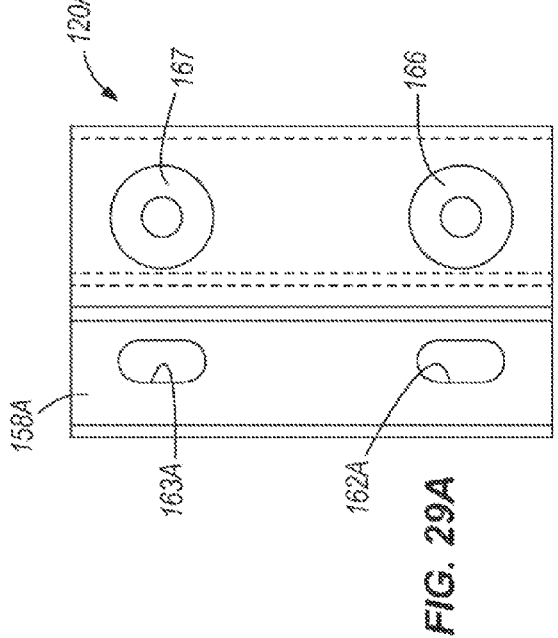
FIG. 28A is a side view of an alternative embodiment of the bracket.
Figure 29A:
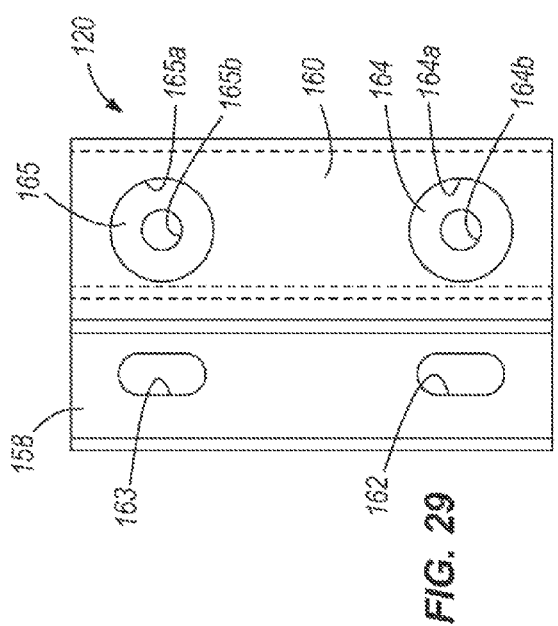
FIG. 29A is a bottom view of the bracket shown in FIG. 28A.

An alternate embodiment of the bracket 120A is shown in FIGS. 28A and 29A. The bracket 120A is similar to the bracket 120 shown in FIGS. 28 and 29, such that items include the indicator "A" to denote the similarity. The bracket 120A differs from the bracket 120 in that the second flange 160A includes apertures 166 and 167. The apertures 166, 167 have a variable, tapering diameter starting at diameter dd, and tapering inward to diameter de. Diameter dc is less than da. The apertures 166, 167 have a substantially constant slope at which the diameter changes between da and dc. In some embodiments, the apertures 166, 167 are tapered along only a portion of the distance between da and dc. In still other embodiments, the slopes of the respective apertures 166, 167 are greater or less than the illustrated slope. The apertures 166, 167 can have the same diameters dd, de or can have different diameters and/or different slopes.

The apertures 166, 167 are sized to receive a seal similar to seal 18A, illustrated in FIGS. 6A-8A, and at least partially pre-loading the seal 18A to enhance the seal between the seal 18 and the bracket 20A. In some embodiments, a differently shaped seal can be utilized. The seals 118, 119 or other similar seals can be inserted into either apertures 164, 165 or 166, 165. Other configurations and arrangements of seals and apertures can be utilized to achieve the desired seal between the flashing 116 and the bracket 120 or 120A.

One or more fasteners can be used to couple the bracket 120, 120A to the seals 118, 119 and flashing 116 to form a roofing assembly. One such assembly 170 is illustrated in FIGS. 30-34 and includes the flashing 116, the seals 118, 119, the bracket 120, two fasteners 122, 123 and two washers 172, 173. The washers 172, 173 can be polymeric compression washers to provide a substantially water-tight seal between the fastener 122, 123 and the bracket apertures 164, 165. In some embodiments, the washers 172, 173 can be omitted or can be replaced by an o-ring or an applied sealant, such as caulk.

The assembly 170 can be installed on a roof. The fasteners 122, 123 can extend through the flashing 116, the respective seals 118, 119, the bracket 120, and into rafters or substrate similar to the embodiment illustrated in FIGS. 1 and 1A. The washers 172, 173 and the seals 118, 119 work together to prevent or inhibit entry of water or other fluid into the apertures 164, 165 or the rafters 12 and/or substrate 14. Even though the illustrated fasteners are bolts, other fasteners, such as screws, studs, nails, and other acceptable removable and non-removable fasteners, can be used.

The bracket 120 is operable to support any of a variety of roof-mounted fixtures, such as snow guards, snow fences, solar panels, an antenna, signs, billboards, walkways, pipe lines, mechanical units, signage, screens, cabling or any other assembly mountable to a roof. The inclusion of two projections 130, 131 can be beneficial to inhibit rotation of a bracket 120 while mounted on a roof and/or to define a specific orientation of a bracket 120 relative to the roof. Other bracket configurations and arrangements are possible, and the illustrated bracket 120 is provided by way of example only. In some embodiments, bracket 20 can be coupled to only one projection 130, 131, such that the brackets 20 can have different orientations, and the unused projection can be sealed with other structure.

A similar assembly can be formed with the seal 118A, 119A and the bracket 120A. This assembly can also include a pair of fasteners 122, 123 and washers 172, 173, as described above. The seals 118, 118A, 119, 119A can be used interchangeably with brackets 120, 120A, and other shapes and arrangements of seals and brackets are possible.

FIGS. 35-42 illustrate another embodiment of a roofing system 210 according to the present invention. This embodiment employs much of the same structure and has many of the same properties as the embodiments of the roofing systems 10, 110 described above in connection with FIGS. 1-34. Accordingly, the following description focuses primarily upon structure and features that are different than the embodiments described above in connection with FIGS. 1-34. Reference should be made to the description above in connection with FIGS. 1-34 for additional information regarding the structure and features, and possible alternatives to the structure and features of the roofing system 210 illustrated in FIGS. 35-42 and described below. Features and elements in the embodiment of FIGS. 35-42 corresponding to features and elements in the embodiments described above in connection with of FIGS. 1-34 are numbered in the 200 series of reference numbers.

A third flashing 216 is illustrated in FIGS. 35-39. The third flashing 216 is substantially in the shape of a rectangular sheet having square corners. The flashing 216 extends substantially along a plane but includes a first upwardly extending projection 230 that tapers upwardly, out of the plane. The first upwardly extending projection 230 has a first diameter d13 in the plane, and a second diameter d14 in a second plane that is substantially parallel to but spaced from the plane. The second diameter d14 is less than the first diameter d13, to form a truncated cone or frustoconical shape. The diameters d13 and d14 can be the same as or different than the diameters d1 and d2 of the projection 30 described above.

The first upwardly extending projection 230 defines an aperture 232 positioned substantially in the second plane. The illustrated upwardly extending projection 230 and aperture 232 are circular, but in other embodiments, can be square, triangular, pentagonal, hexagonal, ovular, or other regular or irregular shapes. The illustrated aperture 232 is substantially centered on the upwardly extending projection 230, but other, non-centered embodiments are possible. The third flashing 216 has a first side 234 and a second side 236 opposite the first side 234. The first side 234 and the second side 236 are substantially planar apart from the projection 230.

The third flashing 216 also includes a second upwardly extending projection 276 extending out of the first plane around a majority of the circumference of the first projection 230. The second upwardly extending projection 276 has a substantially curved shape and forms almost a complete ring around the first projection 230. The second projection 276 forms a channel, slit or other similar narrow aperture or path, such as the illustrated slit 278. The slit 278 can be oriented vertically below the upwardly extending projection 276 to provide a pathway for moisture to move away from the projection 230. Moisture can be moved or drawn away from the aperture 232 by at least one of wicking, capillary action, surface tension, gravity, and evaporation. In some embodiments, the slit 278 is positioned on a downhill side of the roof relative to the aperture 232 to utilize gravity to move fluid away from the projection 230. The projection 276 can further direct fluid away from the projection 230 to inhibit leakage of water into the aperture 232. In some embodiments, the slit 278 includes a cutout or downwardly protruding extension to further move fluid away from the projection 230 and aperture 232.

In other embodiments, the first and second projections 230, 276 can be formed together on a second sheet of flashing or other similar material, and the second sheet can then be secured (i.e., welded, brazed, soldered, glued or fastened in another conventional manner) to the flashing 216.

Figure 39:
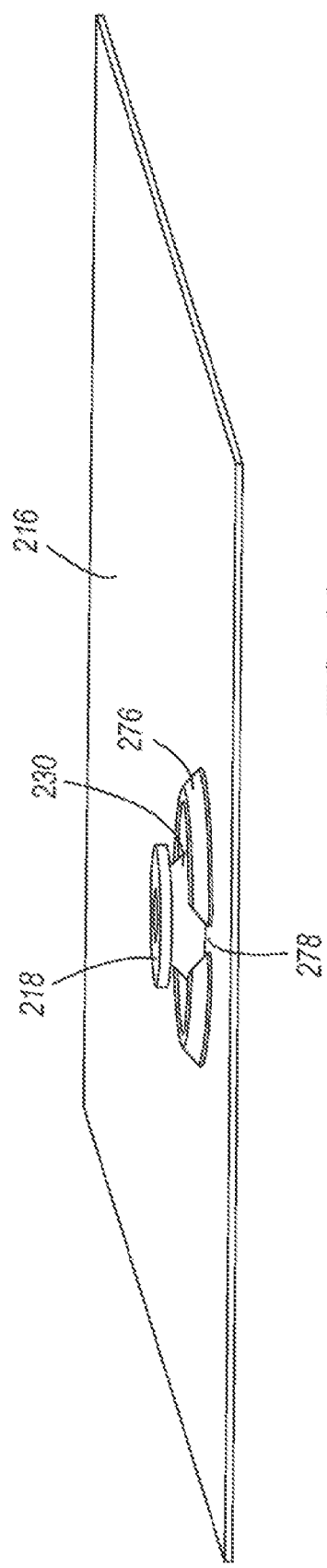
FIG. 39 is a perspective view of the flashing shown in FIG. 35 including the seal shown in FIG. 6.

FIG. 39 illustrates a seal 218 inserted into the aperture 232, similar to the embodiments described above for seals 18 and 118. The seal 218 can contact both the first side 234 and the second side 236 of the flashing 216. The seal 218 can be inserted into the apertures 232 in any of the methods described above. The projection 230, aperture 232, and projection 276 can be formed into the flashing 216 during the same operation or by the same machine as when the seal 218 is inserted into the aperture 232. In other embodiments, the projections 230, 276 and aperture 232 can be formed into the flashing 216 prior to inserting the seal 218 into the aperture 232.

The slit 278 and projection 276 are shown in FIG. 39 more clearly, so as to illustrate the height difference between the flashing plane, the projection 230 and the projection 276. In the instance that fluid would flow over the projection 276 and up the projection 230, seal 218 would inhibit the fluid from entering the aperture 232.

Figure 40:
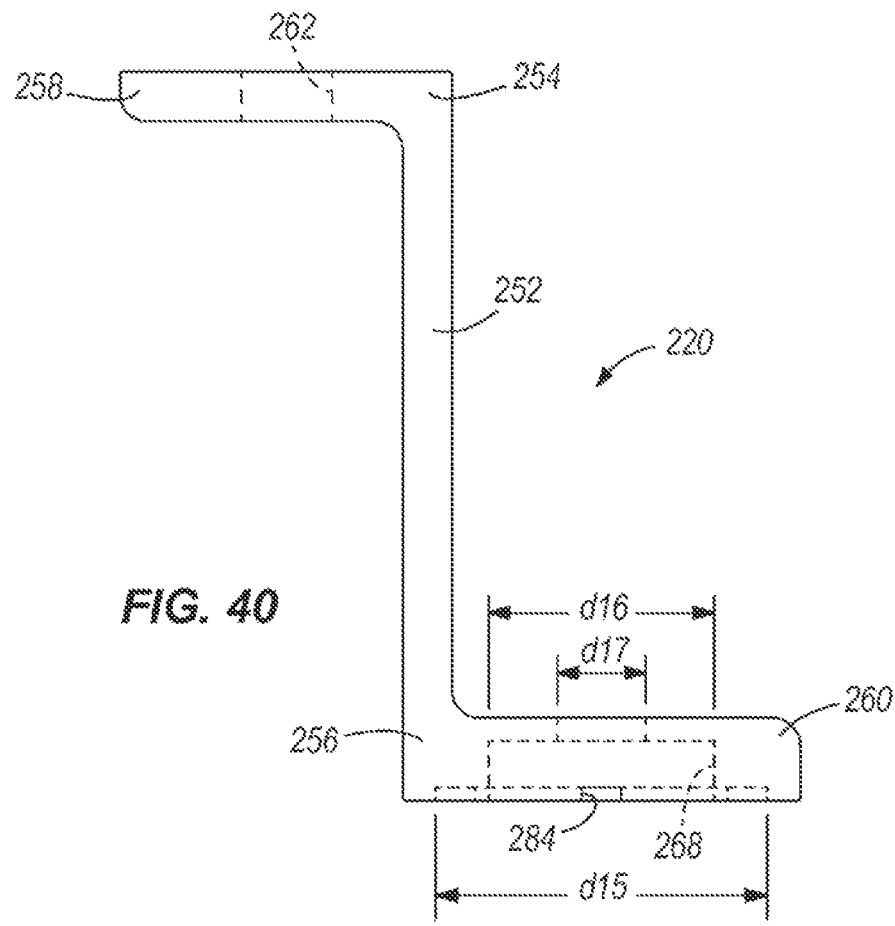
FIG. 40 is a side view of a bracket for use with the flashing and seal shown in FIG. 35.
Figure 41:
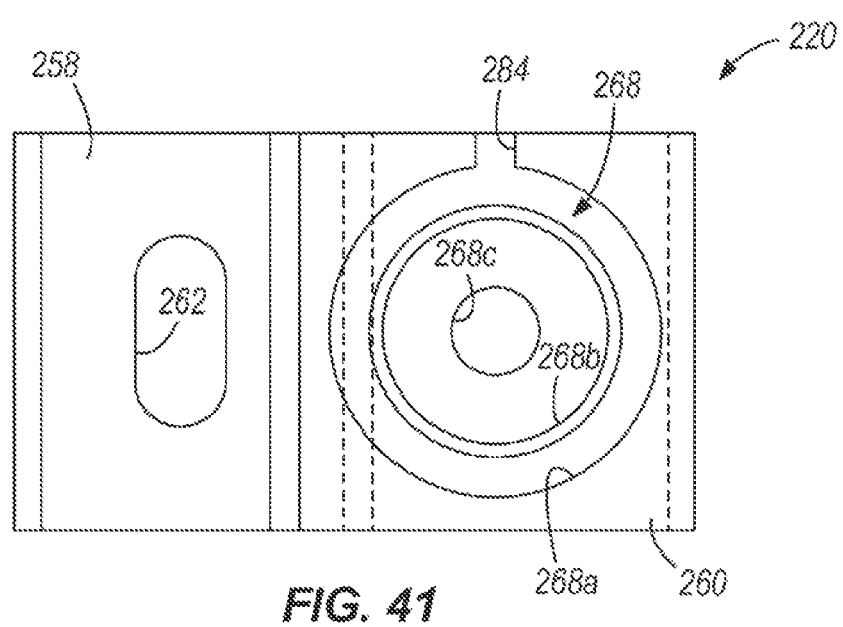
FIG. 41 is a bottom view of the bracket shown in FIG. 40.
Figure 42:
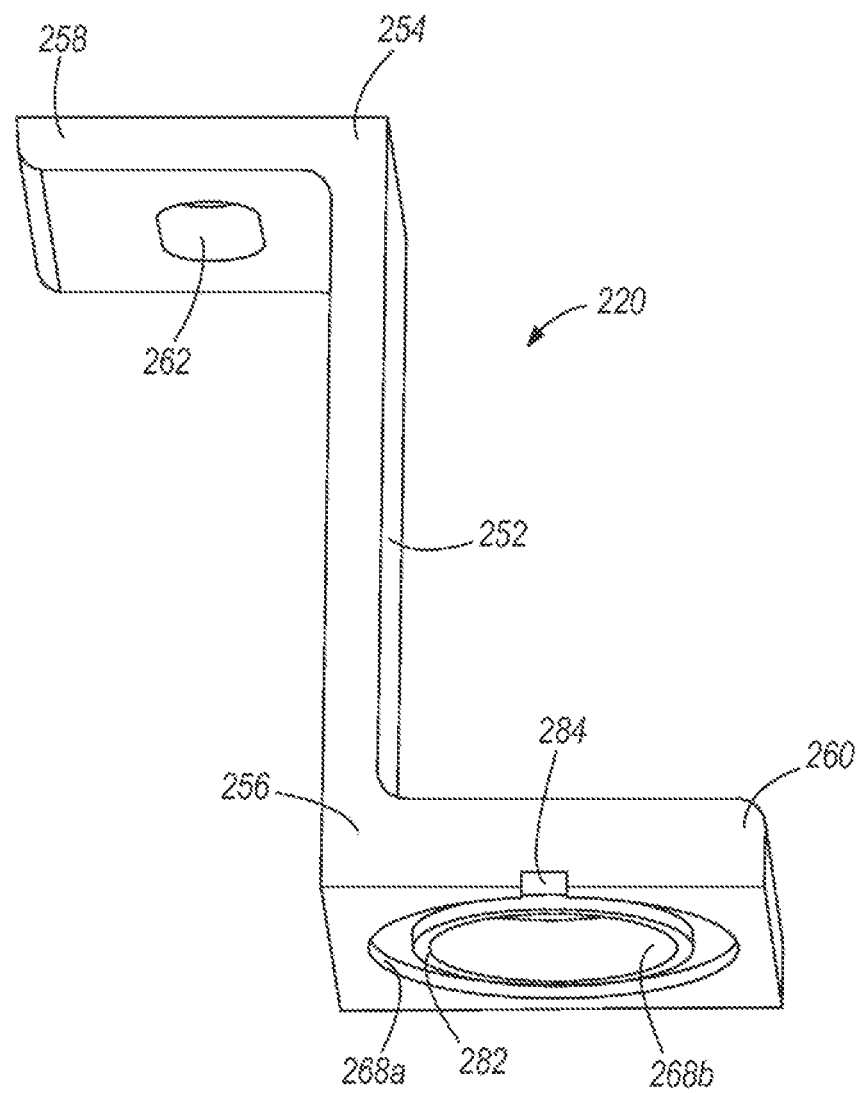
FIG. 42 is a bottom perspective view of the bracket shown in FIG. 40.

The brackets 20, 20A, 120, 120A can be utilized with the embodiment shown in FIGS. 35-42. A bracket 220, as shown in FIGS. 40-42, can be also or alternatively be utilized with the flashing 216. The bracket 220 is generally z-shaped and includes an elongate body portion 252 having a first end 254 and a second end 256 spaced from the first end 254. A first flange 258 is coupled to the first end 254 and extends substantially perpendicular to the elongate body portion 252 in a first direction. A second flange 260 is coupled to the second end 256 and extends substantially perpendicular to the elongate body portion 252 in a second direction, opposite the first direction. The first flange 258 defines an aperture 262 extending substantially parallel to the elongate body portion 252. The illustrated aperture 262 is substantially ovular, but other shapes, such as circular, square, rectangular, hexagonal, and the like are possible. The aperture 262 is sized to receive a fastener, projection, or the like therethrough. The ovular shape of the aperture 262 permits flexibility and slight relative movement between the bracket 220 and the fastener, projection or the like, when installed.

The second flange 260 of the bracket 220 defines an aperture 268 that includes a first aperture portion 268*a*, a second aperture portion 268*b*, and a third aperture portion 268*c*. The first aperture portion 268*a* is substantially ring-shaped and defines a first diameter d15. The second aperture portion 268*b* has a substantially cylindrical shape and defines a second diameter d16 that is less than the first diameter d15. The third aperture portion 286c is substantially circular and has a third diameter d17 that is less than the first and second diameters d15 and d16.

A downwardly protruding annular flange 282 extends between the first aperture portion 268a and the second aperture portion 268b. The first aperture portion 268a is sized to receive the second projection 276. The downwardly protruding annular flange 282 is substantially planar with a distal surface of the second flange 260 of the bracket 220. The second projection 276 and the downwardly protruding annular flange 282 substantially mate, such that the downwardly protruding annular flange 282 contacts the flashing 216 between the first projection 230 and the second projection 276. The second aperture portion 268b is sized to be smaller than the seal 218 to permit pre-loading of the seal 218, to thereby seal the aperture 268 with the seal 218. The first aperture portion 268a, the downwardly protruding annular flange 282 and the second aperture portion 268b, projection 230 and seal 218 work together to form a labyrinth seal to inhibit entry of fluid into the aperture 232.

A notch, channel, recess, or the like, such as the illustrated notch 284, can be defined in the bracket second flange 260. The notch 284 is in fluid communication with the first aperture portion 268a. In the event that fluid flows between the bracket 220 and the flashing 216, the fluid is permitted to flow out through the slit 278 and/or the notch 284. In some embodiments, the slit 278 and notch 284 are substantially aligned and positioned on a downhill side of the roof relative to the projection 230. Gravity is then used to move fluid away from the aperture 232 via the slit 278 and/or notch 284 to further inhibit entry of fluid through aperture 232. Other sizes, shapes, quantities, and configurations of notches can be utilized in combination with the bracket 220.

The bracket 220 can be utilized in the above described embodiments in place of bracket 20 and 120. Alternatively, the brackets 20 and/or 120 can include a notch similar to the illustrated notch 284 to provide a path for fluid to flow away from the respective apertures 32, 132, 133. The bracket 220 can further include a tapered portion, similar to the tapered portions of brackets 20A and 120A. The bracket 220 with a tapered portion can be utilized in place of brackets 20A and 120A and can be shaped to mate with seal 18A. In some embodiments, the brackets 20A and/or 120A can include a notch similar to the illustrated notch 284 to provide a path for fluid flow away from the respective apertures 32, 132, 133.

FIGS. 43-47 illustrate another embodiment of a roofing system 310 according to the present invention. This embodiment employs much of the same structure and has many of the same properties as the embodiments of the roofing systems 10, 110, 210 described above in connection with FIGS. 1-42. Accordingly, the following description focuses primarily upon structure and features that are different than the embodiments described above in connection with FIGS. 1-42. Reference should be made to the description above in connection with FIGS. 1-342 for additional information regarding the structure and features, and possible alternatives to the structure and features of the roofing system 310 illustrated in FIGS. 43-47 and described below. Features and elements in the embodiment of FIGS. 43-47 corresponding to features and elements in the embodiments described above in connection with of FIGS. 1-42 are numbered in the 300 series of reference numbers.

FIGS. 43-47 illustrate a fourth flashing 316 associated with the present invention. The fourth flashing 316 is substantially in the shape of a rectangular sheet having square corners. The flashing 316 extends substantially along a plane but includes an upwardly extending projection 330 that tapers upward, out of the plane. The upwardly extending projection 330 has a first diameter d17 in the plane, and a second diameter d18 in a second plane that is substantially parallel to but spaced from the plane. The second diameter d18 is less than the first diameter d17, to form a truncated cone or frustoconical shape. The diameters d17 and d18 can be the same as or different than the diameters d1 and d2 of the projection 30 described above.

The projection 330, like the projections 30, 130, and 230, can define an aperture 332 positioned substantially in the second plane. The illustrated upwardly extending projection 330 and aperture 332 are circular, but in other embodiments, can be square, triangular, pentagonal, hexagonal, ovular, or other regular or irregular shapes. The illustrated aperture 332 is substantially centered on the upwardly extending projection 330, but other, non-centered embodiments are possible. The fourth flashing 316 has a first side 334 and a second side 336 opposite the first side 334. The first side 334 and the second side 336 are substantially planar apart from the projection 330.

The flashing 316 can further define other non-planar features, such as a trench 386 extending circumferentially around the projection 330 and a channel 388, extending between the trench 386 and an edge of the flashing 316. The trench 386 can provide a pathway for fluid around the projection 330 to inhibit fluid flow up the projection 330, similar to the function of the projection ridge 276 shown in FIGS. 35-39. The channel 388 can provide a pathway for fluid to move away from the projection 330, similar to the function of the slit 278 shown in FIGS. 35-39.

Moisture can be moved or drawn away from the aperture 232 by at least one of wicking, capillary action, surface tension, gravity, and evaporation. In some embodiments, the channel 388 is positioned on a downhill side of the roof relative to the aperture 332 to utilize gravity to move fluid away from the projection 330. The trench 386 can further direct fluid away from the projection 330 to inhibit leakage of water into the aperture 232. In some embodiments, the channel 388 includes a cutout, scoring or downwardly protruding extension that extends a portion of the way to the edge of the flashing to further move fluid away from the projection 330 and aperture 332.

Although not specifically illustrated, a seal, such as seal 18, 18A, 118 or 218 can be inserted into the aperture 332, similar to the embodiments described above for seals 18, 18A, 118, and 218. Reference should be made to the descriptions of the above-described and illustrated seals 18, 18A, 118, and 218 for specific details on seals that can be utilized with flashing 316. The seal can contact both the first side 334 and the second side 336 of the flashing 316. In the instance that fluid would flow past the trench 386 and up the projection 330, seal 318 would inhibit the fluid from entering the aperture 332.

The seal can be inserted into the apertures 332 using any of the methods described above. The projection 330, aperture 332, trench 386, and channel 388 can be formed into the flashing 316 during the same operation or by the same machine as when the seal is inserted into the aperture 332. In other embodiments, the projection 330, trench 386, channel 388, and aperture 432 can be formed into the flashing 316 prior to inserting the seal into the aperture 332.

As shown in FIG. 47, a bracket 320 can be coupled to the flashing 316. Although a bracket similar to bracket 20 is shown, any of the above-described brackets, such as 20, 20A, 120, 120A or 220, can be utilized with the flashing 316. The flashing 316 can define two projections and thereby two trenches and a channel joining the trenches and extending to an edge of the flashing 316. In another embodiment, the flashing 316 can define two projections and two trenches, such that each trench joins a separate channel and each channel separately extends to an edge of the flashing 316. Other combinations and configurations of projections, slits, trenches and channels can be utilized within the scope of the present invention.

Figure 49:
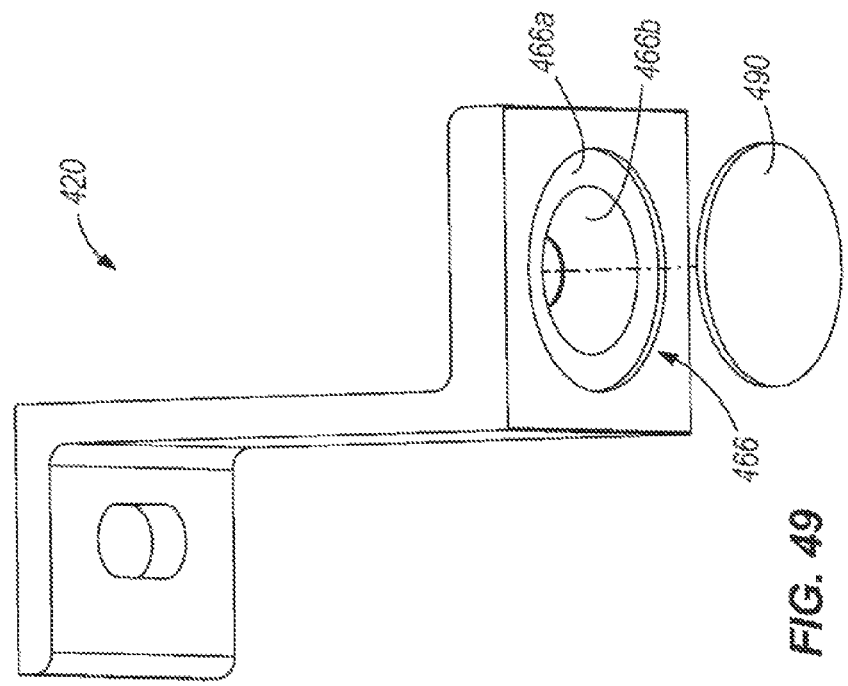
FIG. 49 is a bottom perspective of the bracket and membrane of FIG. 48.
Figure 48:
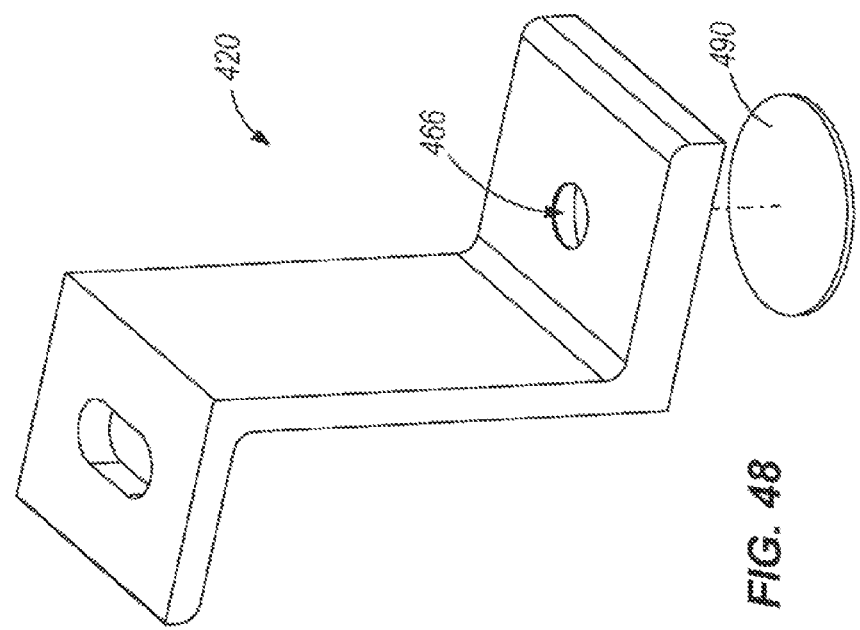
FIG. 48 is a top perspective view of a bracket including a membrane exploded off of the bracket for clarity.

FIGS. 48 and 49 illustrate another embodiment of a bracket 420 according to the present invention. This embodiment employs much of the same structure and has many of the same properties as the embodiments of the brackets 20, 20A, 120, 120A, 220 or 320 described above in connection with FIGS. 1-47. Accordingly, the following description focuses primarily upon structure and features that are different than the embodiments described above in connection with FIGS. 1-47. Reference should be made to the description above in connection with FIGS. 1-47 for additional information regarding the structure and features, and possible alternatives to the structure and features of the bracket 420 illustrated in FIGS. 48 and 49 and described below. Features and elements in the embodiment of FIGS. 48 and 49 corresponding to features and elements in the embodiments described above in connection with of FIGS. 1-47 are numbered in the 400 series of reference numbers.

FIGS. 48 and 49 illustrate a bracket 420 similar to the bracket 20A shown in FIGS. 13A and 14A. The bracket 420 further includes a flexible membrane 490 coupled thereto adjacent aperture 466. The aperture 466 can be sized to receive the flexible membrane 490 in a first aperture portion 466a, that has a diameter substantially equal to a diameter of the flexible membrane 490. The aperture 466 can further include a second aperture portion 466b that is substantially tapered or frustoconical and has first and second diameters, both of which are less than the membrane diameter.

The flexible membrane 490 can be permanently or removably coupled to the bracket 420. The flexible membrane 490 can be affixed to the bracket 420 by a suitable adhesive. In some embodiments, a protective sheet or "sticker" is affixed to the flexible membrane 490 to protect the membrane 490 during manufacturing and shipping. The sticker is then removed from the membrane 490 prior to installation. The flexible membrane 490 can comprise a polymer, rubber, plastic or other suitable elastomeric material.

The bracket 420 can be coupled to any of the above-described flashing 16, 116, 216 or 316 or any other suitable flashing. The aperture 466 is sized to receive at least one of a projection and a seal, such as any of the projections and seals described herein. The flexible membrane 490 can deform around a projection without rupturing or cracking. In some embodiments, the flexible membrane 490 is used in place of a seal because the flexible membrane 490 sufficiently seals the aperture 466. A fastener, such as any of the fasteners illustrated and described herein can be inserted into the flexible membrane 490 to form an aperture in the flexible membrane 490. The flexible membrane 490 is operable to substantially retain its shape and resist further tearing or ripping. The flexible membrane 490 can closely adhere to the fastener to substantially seal the aperture 466. In embodiments that utilize brackets like 120 or 120A, a flexible membrane can be coupled to the bracket adjacent each aperture, whereas in other embodiments, a single flexible membrane can be coupled to the bracket covering both apertures.

Figure 50:
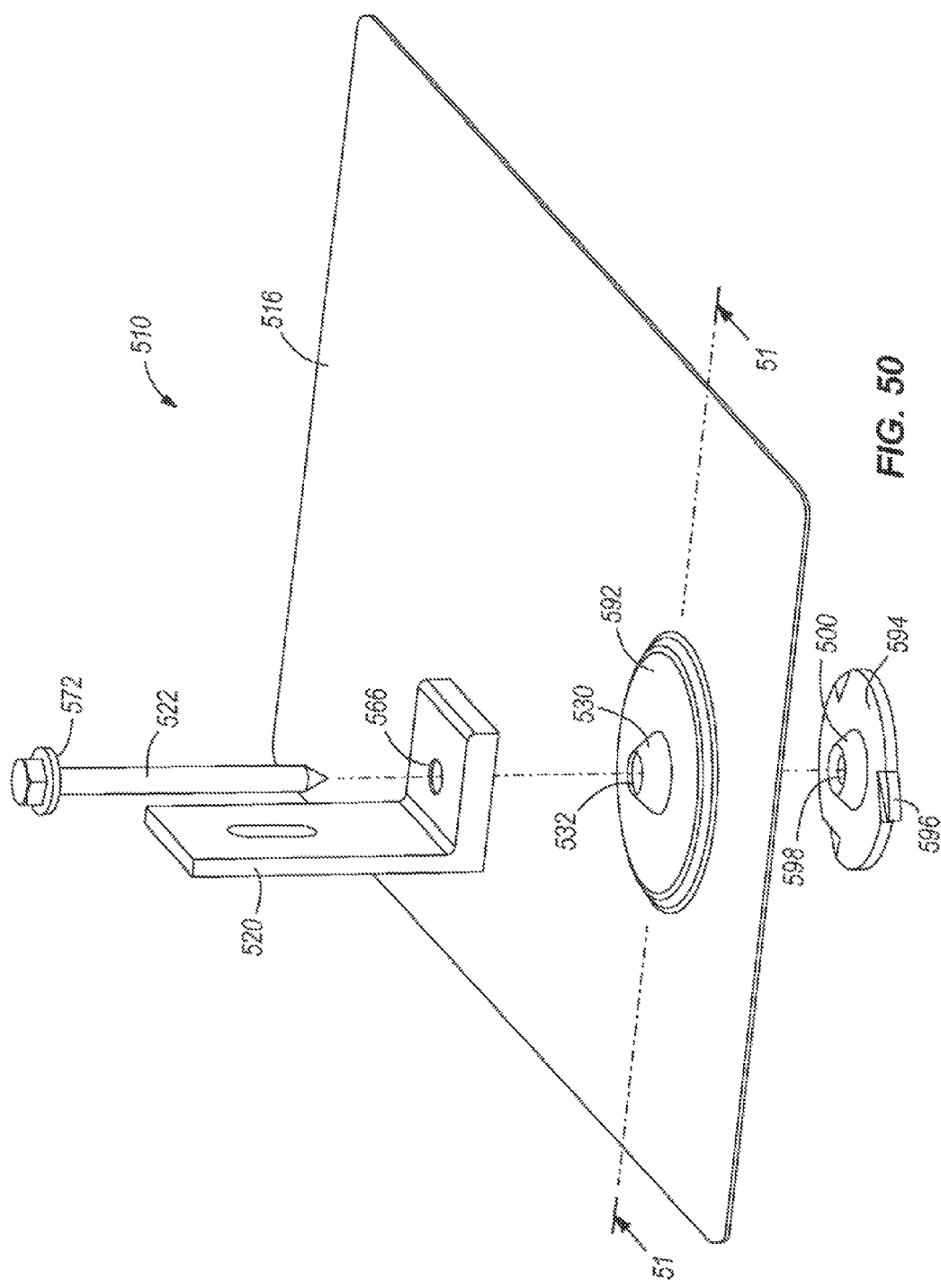
FIG. 50 is an exploded view of another roofing system embodiment.
Figure 51:
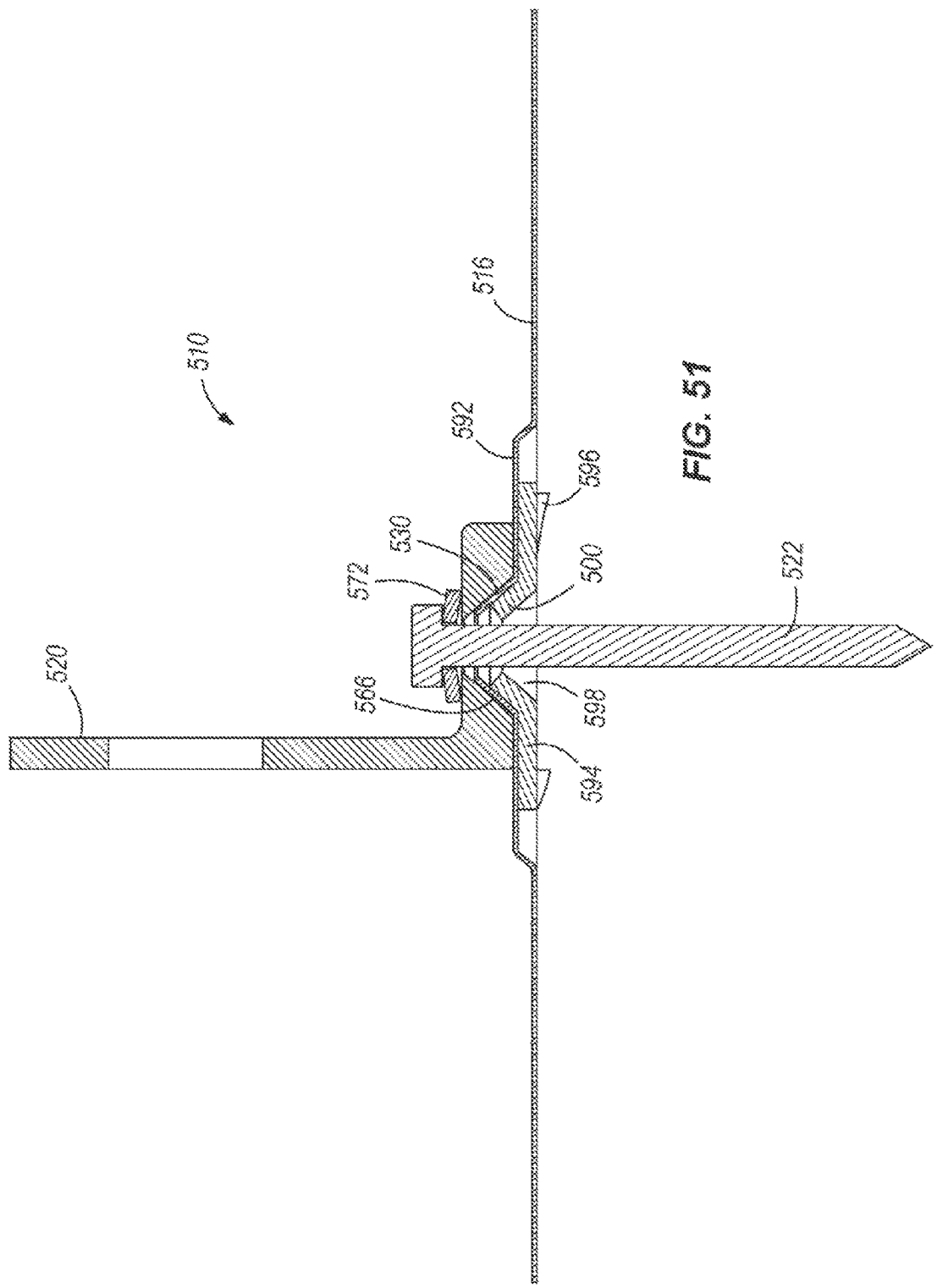
FIG. 51 is a cross-sectional view of FIG. 50, taken along line 51-51 of FIG. 50.

FIGS. 50 and 51 illustrate another embodiment of a roofing system 510 according to the present invention. This embodiment employs much of the same structure and has many of the same properties as the embodiments of the roofing systems described above in connection with FIGS. 1-49. Accordingly, the following description focuses primarily upon structure and features that are different than the embodiments described above in connection with FIGS. 1-49. Reference should be made to the description above in connection with FIGS. 1-49 for additional information regarding the structure and features, and possible alternatives to the structure and features of the roofing system 510 illustrated in FIGS. 50 and 51 and described below. Features and elements in the embodiment of FIGS. 50 and 51 corresponding to features and elements in the embodiments described above in connection with of FIGS. 1-49 are numbered in the 500 series of reference numbers.

FIGS. 50 and 51 illustrate another roofing system 510 including flashing 516, a bracket 520, a fastener 522, and a compression washer 572. In some embodiments, such as the illustrated embodiment of FIGS. 50 and 51, the flashing 516 is formed of a rigid or semi-rigid material and includes a first projection 530 similar to the previously-described projections 30, 130, 230, and 330. In other embodiments, the flashing 516 can be elastic or membranous, or alternatively, rigid or semi-rigid flashing can be supplemented with a flexible membrane. The flexible membrane can be similar to the flexible membrane 490 or can extend over substantially the entire surface area of the flashing 516. The flexible membrane can comprise a polymer, rubber, plastic or other similar material.

In embodiments in which the flexible membrane replaces the flashing 516, the projections 530 and 592 need not be formed into the flexible membrane. Rather, the flexible membrane can stretch and conform to the base 594 to include projections similar in shape and size to projections 530 and 592.

In the illustrated embodiments of FIGS. 50 and 51, the flashing 516 further includes a second projection 592 that extends in substantially the same direction as the first projection 530. The second projection 592 can be substantially circular, as illustrated, or can be ovular, square, rectangular, triangular, or other regular or non-regular shape. The second projection 592 is sized to at least partially receive or engage a rigid base 594 between the flashing 516 and a roof substrate. In embodiments in which the flashing 516 can be elastic or membranous, the first and/or second projections 530, 592 can be formed when the flashing 516 is draped across the base 594.

The illustrated base 594 is substantially circular, but can be ovular, square, rectangular, triangular or other regular or non-regular shapes. The geometry of the base 594 can correspond with the geometry of the second projection 592, or as mentioned above, can cause the flashing 516 to be formed around the contours of the base 594 such that the flashing 516 matingly engages the base 594.

The base 594 can include at least one tooth 596 depending downwardly therefrom. The illustrated base 594 includes three teeth 596 extending away from the flashing 516. The teeth 596 can bear against or grip a roof substrate to inhibit movement of the flashing 516 with respect to the roof substrate. In some embodiments, a user can press, push or pound the base 594 against the roof substrate, such as with a hammer. The base 594 retains the flashing 516 against the roof substrate to limit or eliminate gaps created by movement of the flashing 516 relative to the roof, roof substrate, and the like. The base 594 further permits the fastener 522 to be tightened against the flashing 516 and the bracket 520 without denting, deforming or damaging the flashing 516.

The illustrated base 594 further includes an aperture 598 and a projection 500 through which the aperture 598 extends. The illustrated aperture 598 and projection 500 are substantially centered on the base 594. The aperture 598 is sized to receive the fastener 522 and can be the same size or a similar size as aperture 532. The illustrated projection 500 extends into the space provided by the projection 530, and substantially mates with the projection 530, such that projections 530 and 500 extend together. The projections 530 and 500 work together to inhibit relative movement of the flashing 516 with respect to the roof.

The illustrated bracket 520 is substantially L-shaped and includes an elongate body portion 552 and a first flange 558. The illustrated elongate body portion 552 includes an aperture 569 that is sized to receive a fastener to support at least one of a snow guard, a snow fence, a solar panel, an antenna, a sign, and a billboard, or related components. The illustrated first flange 558 includes a tapered aperture 566 that is sized to at least partially receive the first projection 530 and the washer projection 500. The tapered aperture 566 is also sized to receive the fastener 522 therethrough.

In the illustrated embodiment, the compression washer 572 includes a washer and a seal, such as an o-ring. The fastener 522 has a head that bear against the washer and the washer bears against the o-ring to provide a resilient seal between the fastener head and the bracket 520.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

FIGS. 52 and 53 illustrate another embodiment of a roofing system 610 according to the present invention. This embodiment employs much of the same structure and has many of the same properties as the embodiments of the roofing systems described above in connection with FIGS. 1-51. Accordingly, the following description focuses primarily upon structure and features that are different than the embodiments described above in connection with FIGS. 1-51. Reference should be made to the description above in connection with FIGS. 1-51 for additional information regarding the structure and features, and possible alternatives to the structure and features of the roofing system 610 illustrated in FIGS. 52 and 53 and described below. Features and elements in the embodiment of FIGS. 52 and 53 corresponding to features and elements in the embodiments described above in connection with of FIGS. 1-51 are numbered in the 600 series of reference numbers.

FIGS. 52 and 53 illustrate a roofing system 610 that includes a piece of flashing 616 defining an aperture 632 therethrough. The flashing aperture 632 defines a diameter d19 in FIG. 52 and diameter d20 in FIG. 53. The diameter d19 of FIG. 52 is greater than the diameter d20 of FIG. 53. In some embodiments, the flashing 616 can include a projection defining a substantially frustoconical shape, similar to the projections described above. The roofing system 610 further includes a roof bracket 620, which can include any of the previously-illustrated and described brackets. The illustrated bracket 620 is only partially shown, to more clearly illustrate the details of the engagement between the bracket 620 and the flashing 616. The illustrated bracket 620 includes an aperture 671 extending through the bracket 620 and having a substantially frustoconical shape.

The roofing system 610 also includes a seal 618 having a generally frustoconical shape and defining an aperture 648 extending therethrough. The seal 618 has a first narrow end 641 that defines a narrow seal diameter d21 and a second wide end 643 that defines a wide seal diameter d22. The narrow seal diameter d21 is less than the wide seal diameter d22. The first narrow end is spaced from the roof surface and the second wide end is proximate to or adjacent to the roof surface.

The roofing system 610 further includes at least one fastener, such as the illustrated fastener 622. The fastener 622 can be any threaded or unthreaded fastener suitable to retain the roofing system 610 on a roof. The fastener 622 extends through the flashing aperture 632, the seal aperture 648, and the bracket aperture 671. The fastener 622 has a fastener diameter d23, that is less than the flashing diameter d19 of FIG. 52 and is less than or substantially equal to the flashing diameter d20 of FIG. 53. The diameter of the fastener 622 is less than or substantially equal to the narrow seal diameter d21 and is less than the wide seal diameter d22. The seal aperture 648 can be sized to receive the fastener 622 and to optionally form a substantially water-tight seal with the fastener 622.

The roofing system 610 can further include a washer 672, as illustrated in FIG. 53. The washer 672 can be included in the embodiment of FIG. 52, or could be omitted from the embodiment illustrated in FIG. 53. The washer 672 can be a polymeric compression washer to provide a substantially water-tight seal between the fastener 622 and the bracket aperture 671. In some embodiments, the washer 672 can be omitted or can be replaced by an o-ring or an applied sealant, such as caulk. Alternatively or in addition, the washer 672 can include a stiffening element, such as, for example, a rigid backing, to provide additional support. The washer 672 can have an aperture that defines an diameter that is larger than or substantially equal to the diameter of the fastener 622.

FIG. 53 illustrates possible leak points of the roofing system 610. A first possible leak point A is between the head of the fastener 622 and the washer 672. A second possible leak point B is between the washer 672 and the bracket 620. A third possible leak point C is between the bracket 620 and the flashing 616. The washer 672, the fastener 622, the bracket 620 and the seal 618 work together to substantially inhibit or prevent flow of fluid through first and second leak points A, B. The bracket 620, the seal 618 and the flashing 616 work together to substantially inhibit or prevent flow of fluid through the third leak point C.

Figure 54:
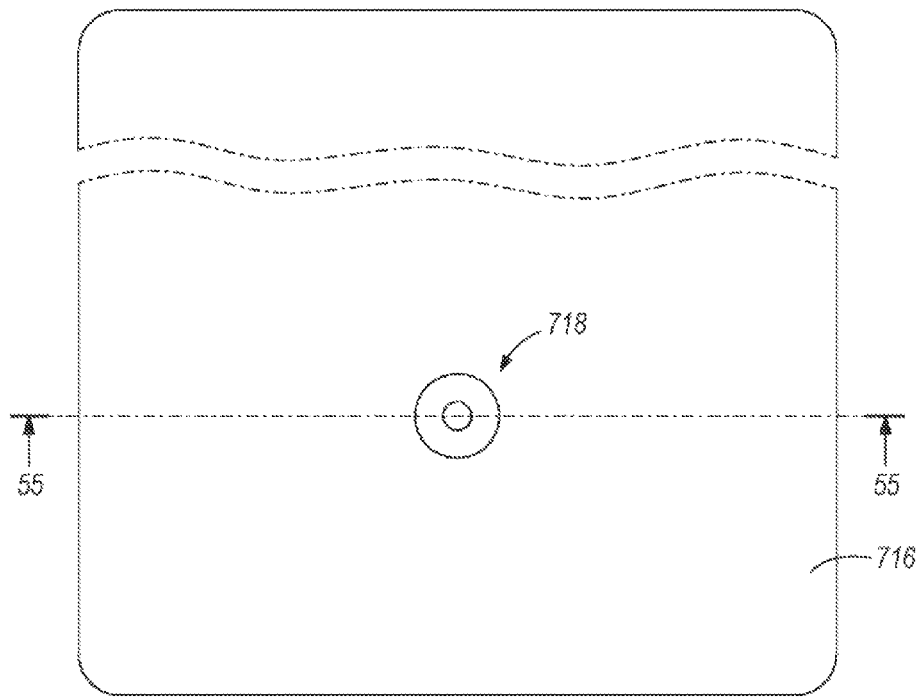
FIG. 54 is a top view of a flashing and seal according to some independent embodiments of the present invention.
Figure 55:
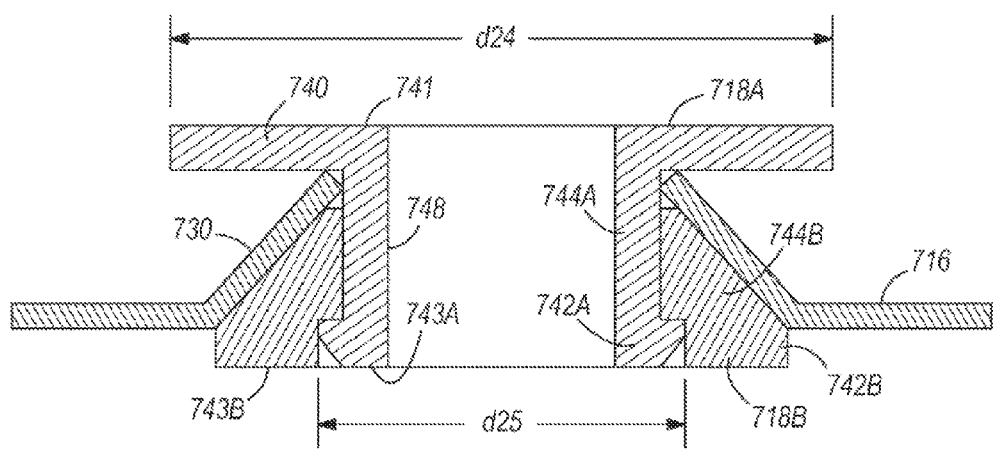
FIG. 55 is a cross-sectional view taken generally along line 55-55 of FIG. 54 and illustrating the seal.
Figure 56:
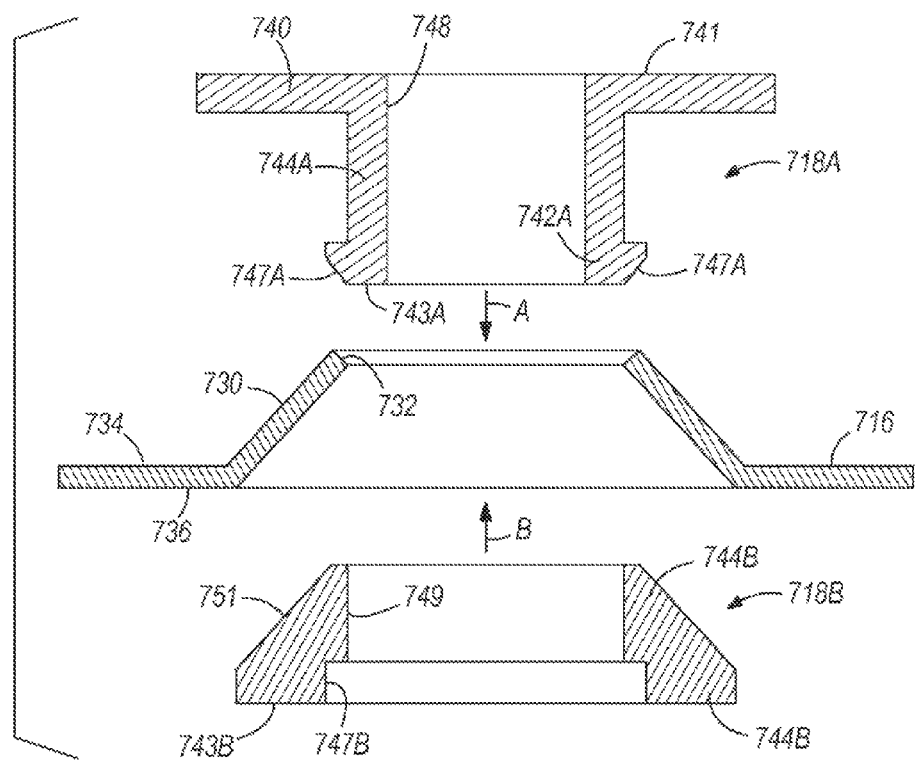
FIG. 56 is an exploded view of the flashing and the seal of FIGS. 54 and 55.

FIGS. 54-56 illustrate an alternative seal arrangement that can be used with any of the above-described applications. FIGS. 54-56 illustrate flashing 716 having a protrusion 730 defining an aperture 732 and a seal 718 extending therethrough. The flashing 716 includes a first surface 734 and a second surface 736 opposite the first surface 734. As shown in FIGS. 55-56, the seal 718 includes a first seal member 718A and a second seal member 718B. The first seal member 718A substantially mates with the second seal member 718B to have substantially the same shape as the seal 18 shown in FIGS. 6-7.

The illustrated first seal member 718A has a substantially T-shaped cross section and includes a first end portion 740A, a second end portion 742A and a middle portion 744A. The first seal member 718A defines a seal aperture 748 extending therethrough between the first end portion 740A and the second end portion 742A. The first end portion 740A of the illustrated embodiment has a first planar end surface 741 and a first outer diameter d24. The illustrated second end portion 742A defines an outwardly protruding flange 747A and has a second planar end surface 743A. The illustrated outwardly protruding flange 747A defines a second outer diameter d25 less than the first outer diameter d24.

The outwardly protruding flange 747A is deformable, such that the first seal member 718A is insertable into the aperture 732. In the illustrated embodiment, the outwardly protruding flange 747A retains the first seal member 718A in the aperture 732. As shown by arrow A in FIG. 56, the first seal member 718A is inserted into the aperture 732 from the flashing first surface 734 toward the flashing second surface 736. In the illustrated embodiment, the outwardly protruding flange 747A defines at least one cutout configured to decrease a force necessary to deform the outwardly protruding flange 747A. The outwardly protruding flange 747A is shown by way of example only and can take on many other sizes, shapes and configurations. In some embodiments, the outwardly protruding flange 747A may be omitted completely.

The illustrated second seal member 718B has a substantially frustoconical shape and includes a first end portion 744B and a second end portion 742B. The first end portion 744B is in substantial engagement with the middle portion 744A of the first seal member 718A, and the second end portion 742B is in substantial engagement with the second end portion 742A. The first and second seal members 718A and 718B are sized and shaped to form a water-tight seal therebetween. The second end portion 742B of the second seal member 718B defines a cutout 747B shaped to receive the outwardly protruding flange 747A. The illustrated flange 747A and cutout 747B are provided by way of example only, and other mating, inter-engaging configurations and arrangements of parts can be used in place of the illustrated flange 747A and cutout 747B. In the illustrated embodiment, the surface 743A is substantially co-planar with a second planar end surface 743B of the second end portion 742B. In other embodiments, the surface 743A is not co-planar with the second planar end surface 743B.

The second seal member 718B includes an inner surface 749 and an outer surface 751. The inner surface 749 includes the cutout 747B and substantially abuts against the middle portion 744A and the second end portion 742A of the first seal member 718A. The outer surface 751 has a substantially frustoconical shape and substantially abuts against the second surface 736 of the flashing 716. As shown by arrow B, the second seal member 718B is inserted into the protrusion 730 from the flashing second surface 736 into abutting engagement with the flashing second surface 736. The first and second seal members 718A and 718B can be pressed into mating engagement and retained on the flashing 716 by the inter-engagement of the outwardly protruding flange 747A and the cutout 747B.

A user can install the seal 718 on the flashing 716 on site by hand, without the use of special tools or equipment. The assembled flashing 716 and seal 718 may be positioned on the roof. A bracket may then be positioned on the seal 718 and the flashing 716, and a fastener may be installed to fix the assembly to the roof. The portion 740 of the seal 718 is between the flashing 716 and the bracket, and the portion 744A of the seal 718 is between the flashing 716 and the fastener, thus forming a water-tight seal to inhibit flow of fluid through the aperture 732.

Figure 57:
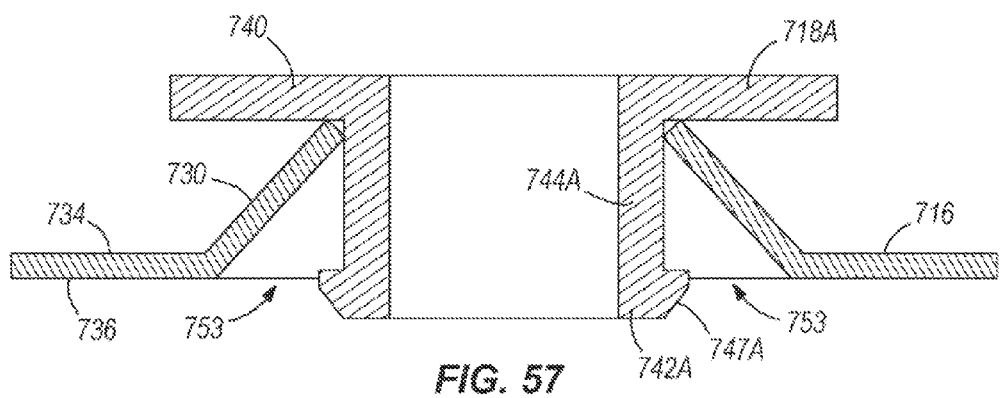
FIG. 57 is an alternate construction of the flashing shown in FIGS. 54-56.

FIG. 57 illustrates an alternative arrangement to provide a seal in the protrusion 730 with only the first seal member 718A. The illustrated first seal member 718A is the same as the first seal member 718A of FIGS. 54-56 but can have a different shape or configuration. A void 753 is defined between the middle portion 744A, the second end portion 742A and the protrusion 730. The void 753 is substantially the same size and shape of the second seal member 718B shown in FIGS. 54-56. The void 753 is substantially sealed from the outside environment by the first seal member 718A.

Figure 58:
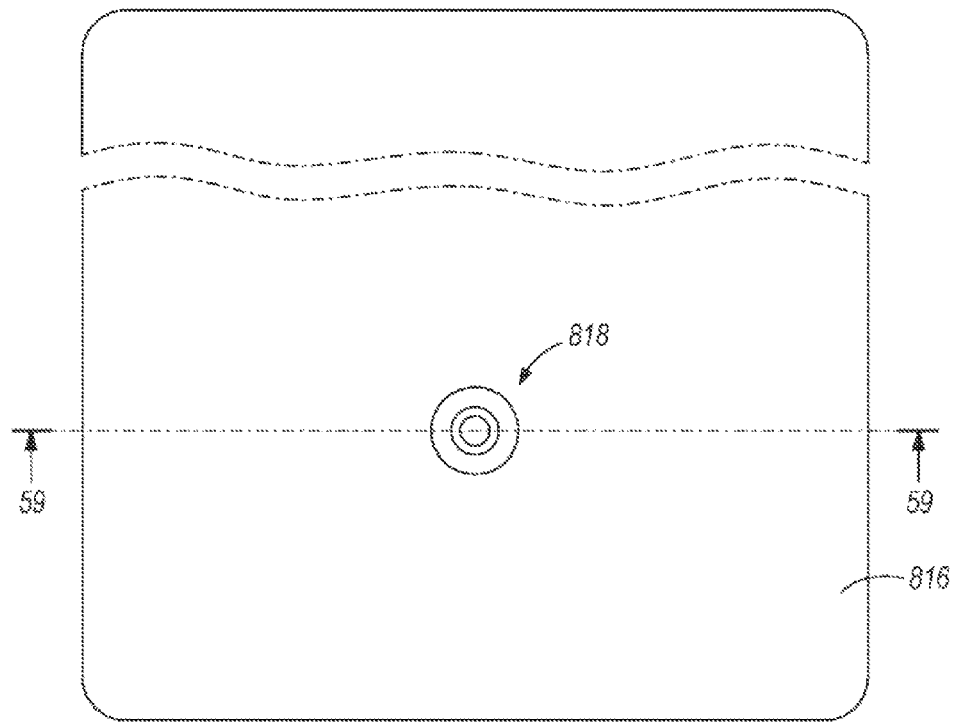
FIG. 58 is a top view of a flashing and the seal according to some independent embodiments of the present invention.
Figure 59:
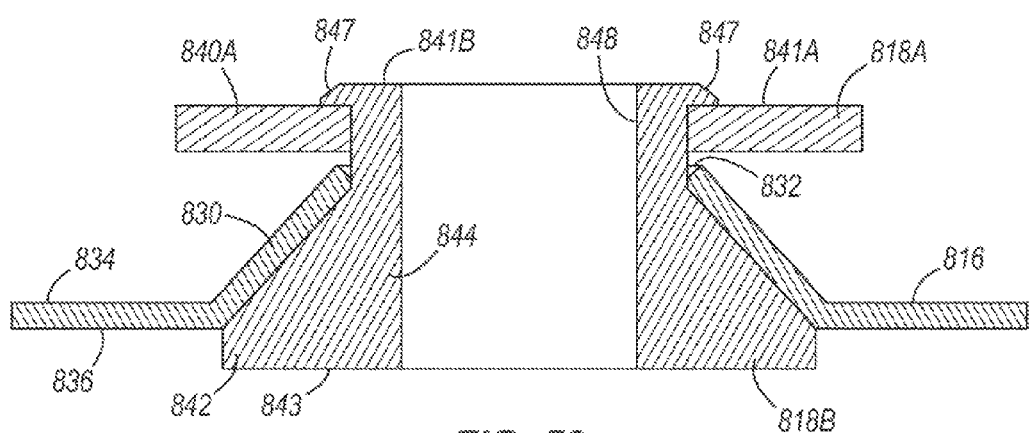
FIG. 59 is a cross-sectional view taken generally along line 59-59 of FIG. 58 and illustrating the seal.

FIGS. 58-59 illustrate an alternate seal arrangement that can be used with any of the above-described applications. FIGS. 58-59 illustrate flashing 816 having a protrusion 830 defining an aperture 832 and a seal 818 extending therethrough. The flashing 816 includes a first surface 834 and a second surface 836 opposite the first surface 834. As shown in FIG. 59, the seal 818 includes a first seal member 818A and a second seal member 818B. The first seal member 818A substantially mates with the second seal member 818B to have shape similar to the seal 18 shown in FIGS. 6-7.

The first seal member 818A includes a ring 840 having a first surface 841A. The second seal member 818B includes a first end portion 840B, a second end portion 842 and a middle portion 844. The second seal member 818B has a first surface 841B and a second surface 843. The second seal member 818B defines an aperture 848 extending therethrough. The first surface 841A of the first seal member 818A and the first surface 841B of the second seal member 818B are not illustrated as co-planar but can be substantially co-planar in other embodiments (not shown).

The first end portion 840B includes an outwardly protruding flange 847 sized and shaped to retain the first seal member 818A in engagement with the second seal member 818B. The outwardly protruding flange 847 is flexible and deformable, thereby permitting the first seal member 818A to be pressed onto the second seal member 818B over the outwardly protruding flange 847. The flange 847 deforms and subsequently, returns to the original shape and thereby retains the first seal member 818A in engagement with the second seal member 818B. The first and second seal members 818A and 818B cooperate to form a substantially water-tight seal in the aperture 832. Like the seal arrangements illustrated in FIGS. 56-59, the seal 818 can be installed on the flashing 816 by hand on site, without the use of special tools or equipment.

Any of the illustrated seal embodiments can include a single monolithic piece or two or more pieces that combine to form the illustrated seal shapes and configurations.

Figure 60:
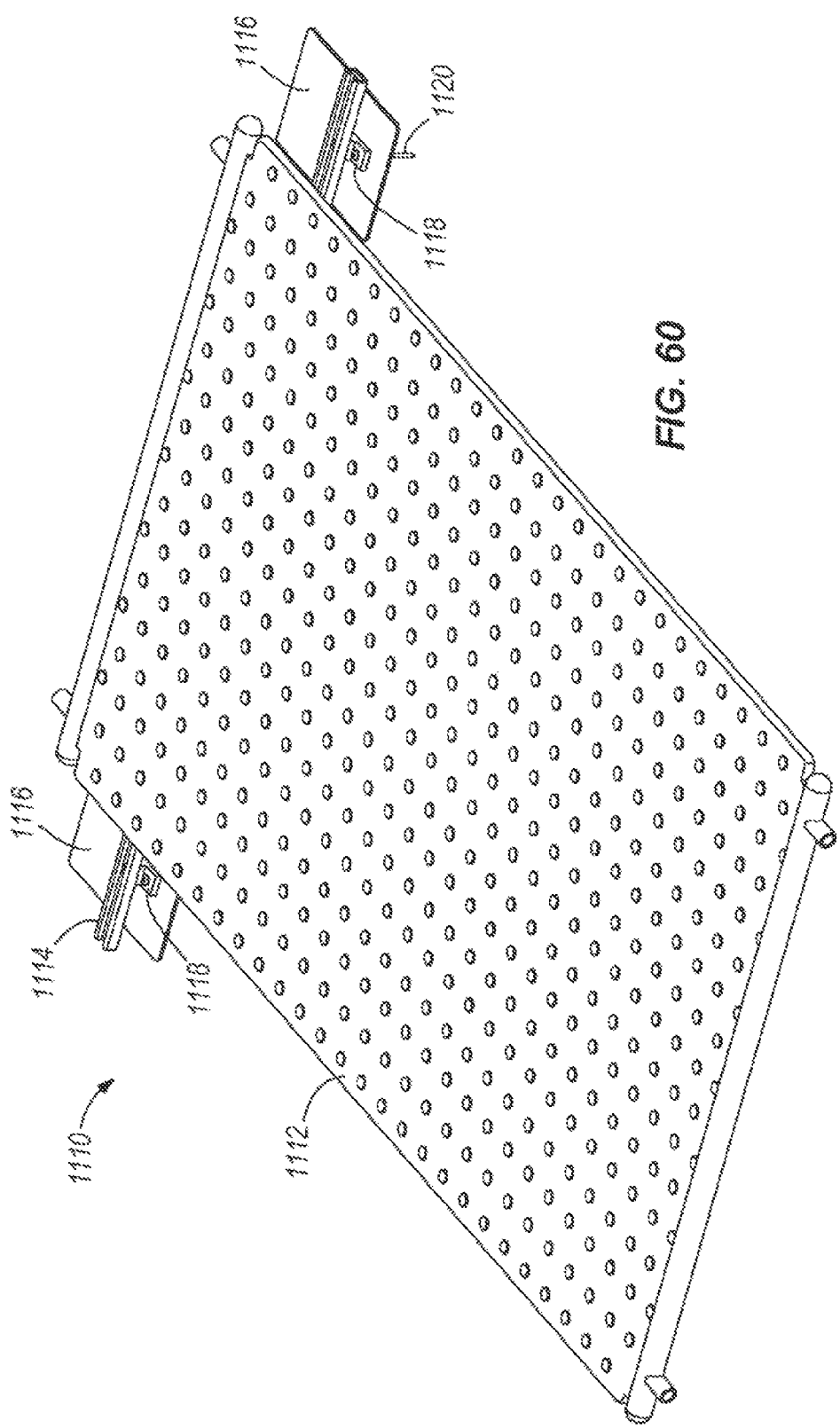
FIG. 60 is a perspective view of a panel mounted to a track system for mounting to a roof surface.
Figure 61:
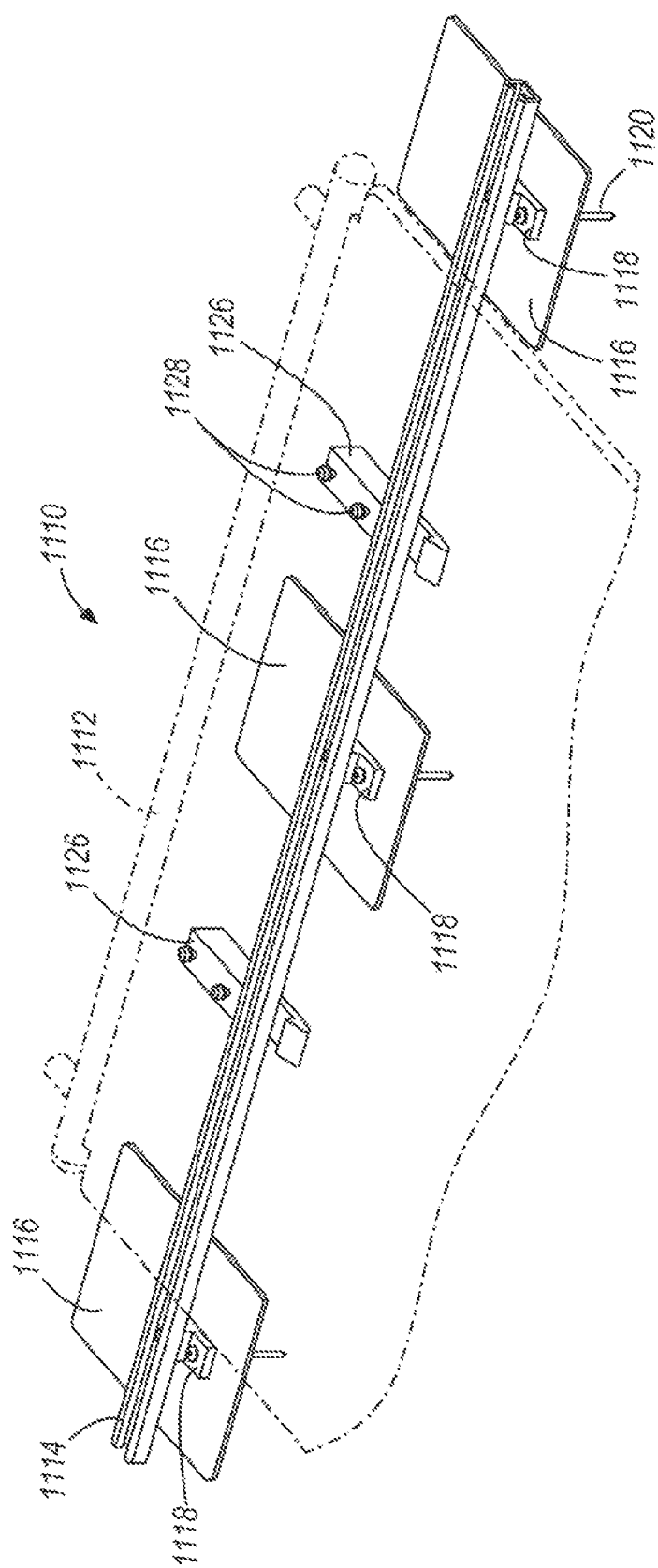
FIG. 61 is a close-up perspective view of FIG. 60 with the panel shown in phantom, to more clearly illustrate the connection between the panel and the track system.
Figure 62:
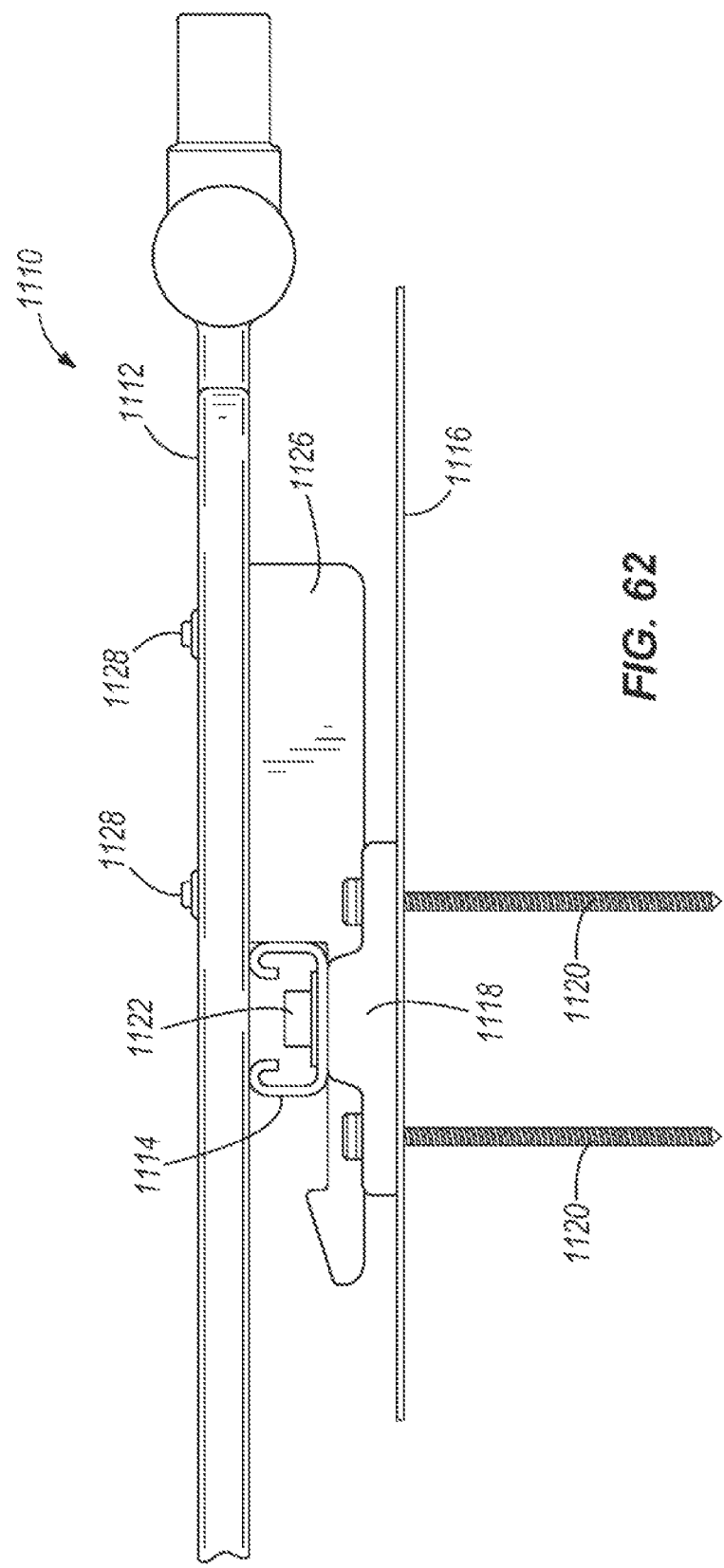
FIG. 62 is a side view of the panel and snow fence of FIGS. 60 and 61.

FIGS. 60-62 illustrate another embodiment of a roofing system 1110 according to the present invention. This embodiment employs much of the same structure and has many of the same properties as the embodiments of the roofing system described above in connection with FIGS. 1-59. Accordingly, the following description focuses primarily upon structure and features that are different than the embodiments described above in connection with FIGS. 1-59. Reference should be made to the description above in connection with FIGS. 1-59 for additional information regarding the structure and features, and possible alternatives to the structure and features of the roofing system 1110 illustrated in FIGS. 60-62 and described below. Features and elements in the embodiment of FIGS. 60-62 corresponding to features and elements in the embodiments described above in connection with of FIGS. 1-59 are numbered in the 1100 series of reference numbers.

FIGS. 60-62 disclose a roofing system 1110 including a solar panel 1112 mounted to a track 1114 that is mountable to a roof in a substantially vertical orientation (i.e. extending substantially normal to a roof apex). A plurality of sections of flashing 1116 are provided where the solar panel 1112 and/or track 1114 are coupled to the roof. A plurality of brackets 1118 are positioned between the respective sections of flashing 1116 and the solar panel 1112. A plurality of fasteners 1120 extend through the respective bracket 1118, flashing 1116 and into the roof. Further fasteners 1122 couple the respective bracket 1118 to the track 1114. A second plurality of brackets 1126 are coupled to the solar panel 1112 and engage the roof in some embodiments, and are spaced above the roof in other embodiments. The second plurality of brackets 1126 are coupled to the solar panel 1112 with a plurality of fasteners 1128. The illustrated brackets 1118, 1126 are shown by way of example only. Any suitable brackets can be utilized, such as any of the brackets shown and described herein.

Figure 63:
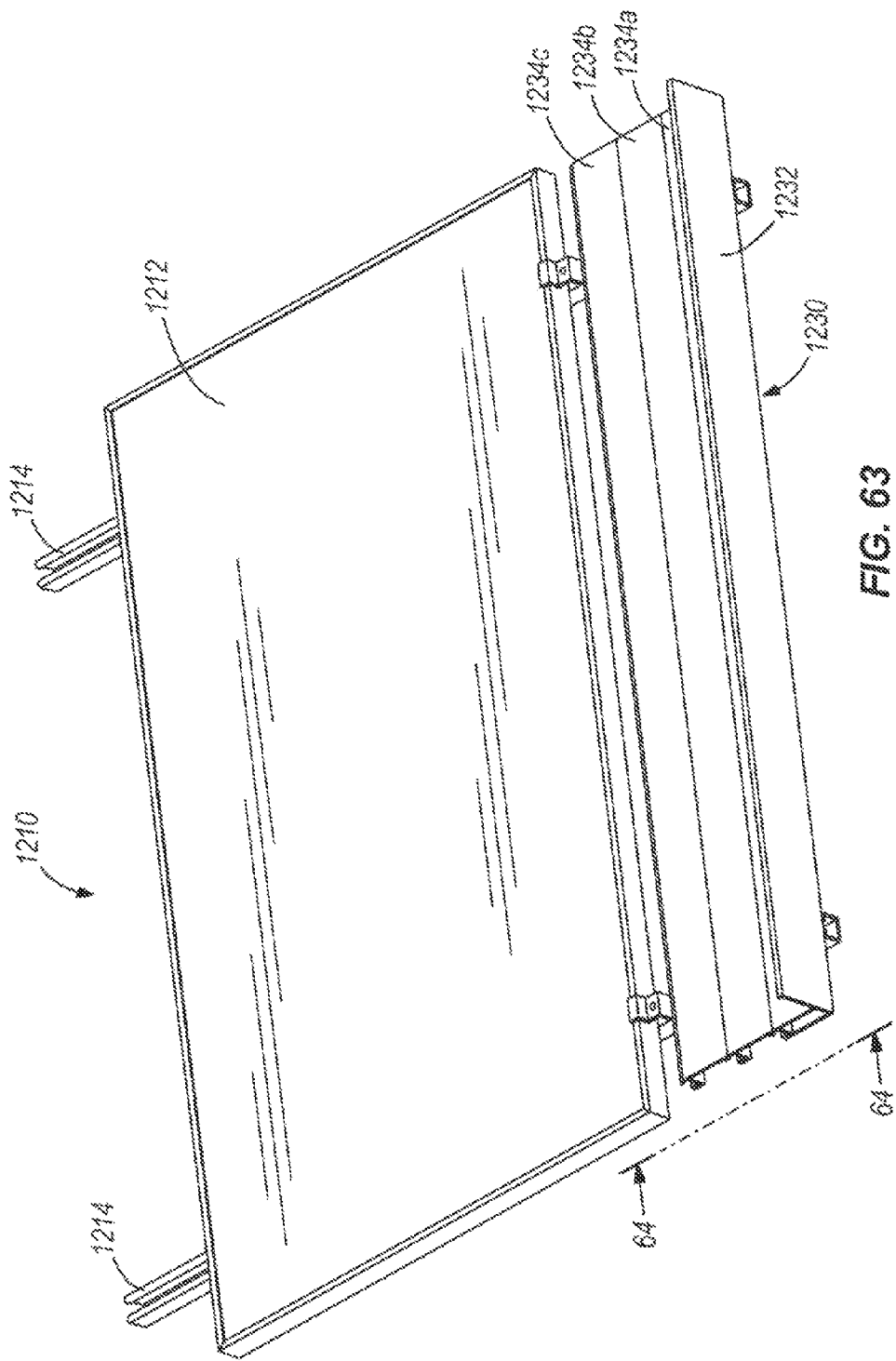
FIG. 63 is a perspective view of a panel and a snow fence mounted to a track system for mounting to a roof surface.
Figure 64:
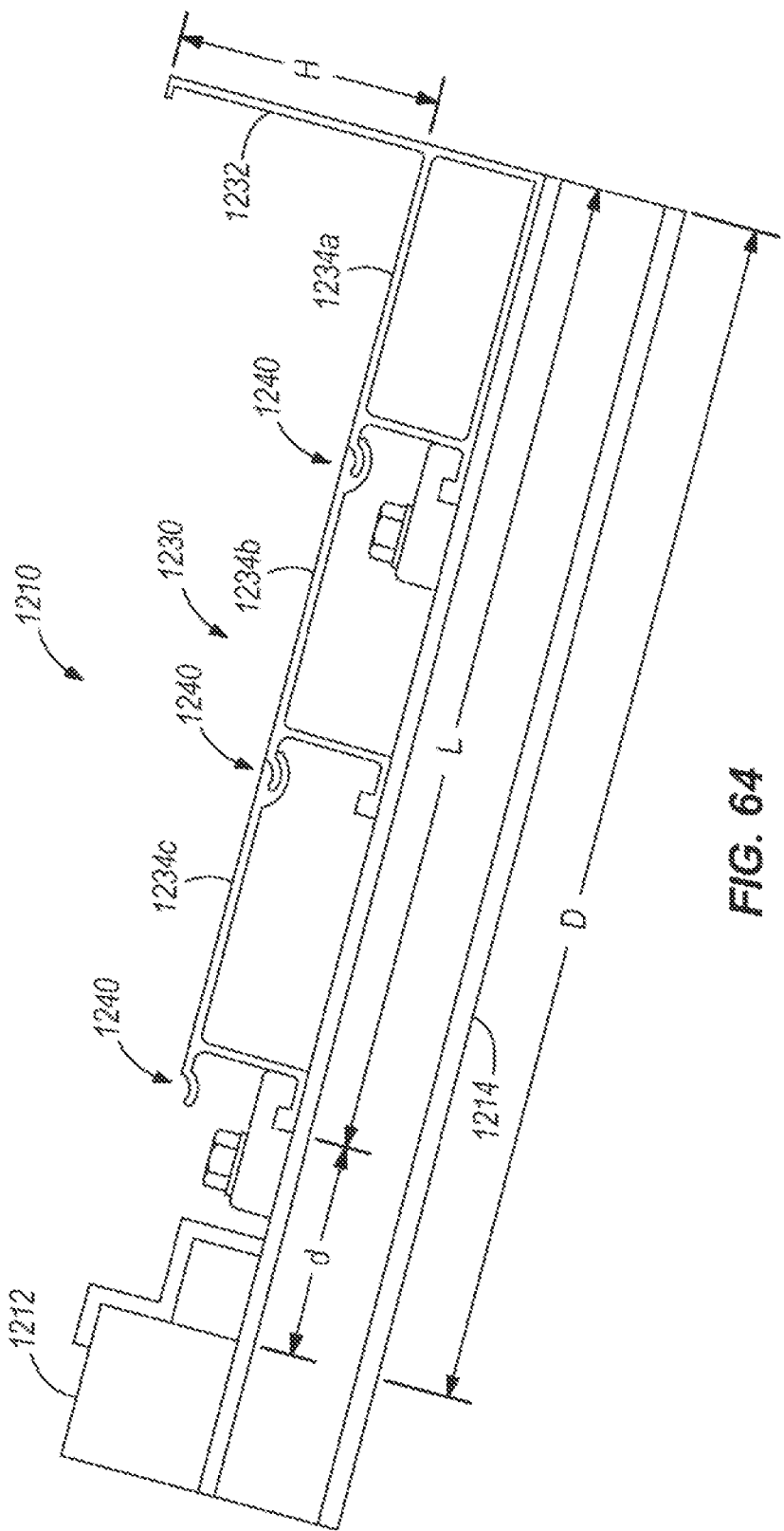
FIG. 64 is a cross-sectional view of the panel and snow fence taken along line 64-64 of FIG. 63.

FIGS. 63 and 64 disclose a roof system 1210 including a solar panel 1212 mounted to a track 1214 that is mountable to a roof in a substantially horizontal orientation (i.e. extending substantially parallel to a roof apex). The roof system 1210 also includes a snow fence 1230 including a snow guard 1232 extending substantially perpendicular to a roof surface and a plurality of extensions 1234a, 1234b, etc. extending substantially parallel to the roof surface.

The illustrated snow fence 1230 is modular, such that any suitable number of extensions 1234a, 1234b, etc. can be utilized to achieve a desired length L of the snow fence 1230. The extensions 1234a, 1234b, etc. include a locking structure 1240 to releasably couple the extensions 1234a, 1234b, etc. to an adjacent extension.

The snow guard 1232 extends away from the extension 1234a along a height of H. The snow guard 1232 is positioned a distance D away from the nearest edge of the solar panel 1212. In some embodiments H is less than or equal to two times D (H<2*D or H=2*D). The height H and distance D can vary for different angles of roofs and global locations. Preferably the height H and distance D are selected to limit or avoid shadows from the snow guard 1232 to partially or substantially cover the solar panel 1212.

The solar panel 1212 is spaced from the snow fence 1230 a desired distance d, in which d=D−L, to permit rain, snow or other precipitation from the solar panel 1212 to flow under the snow fence 1230. The precipitation can flow between the tracks 1214, optionally into a gutter, and off the roof. The snow guard 1232 can be positioned an angle that is non parallel to the roof apex to permit precipitation to flow off of one side of the snow guard 1232. The snow fence can be orientated at a non-parallel angle with respect to the roof to permit precipitation to flow off of one side of the snow fence 1230.

In some embodiments, a top surface of the extensions 1234a, 1234b, etc. can have a greater coefficient of friction than a top surface of the solar panel 1212. As precipitation slides along the solar panel 1212 the precipitation can gain speed and "fly" off the roof if not slowed or stopped. In some climates, this scenario can pose problems, depending upon the quantity and type(s) of precipitation experienced. The snow fence 1230 can slow or stop snow and ice from flying off the roof, but can permit rain to fall off of the roof. As the snow and/or ice melt, the water can run off of the extensions 1234a, 1234b by changing the angle of the snow guard 1232 and the extensions 1234a, 1234b, etc. with respect to the roof.

In some embodiments, one or more portions of the snow fence 1230 and track 1214 can function as a rain diverter by directing rain or snow melt away from doorways or walkways.

Figure 65:
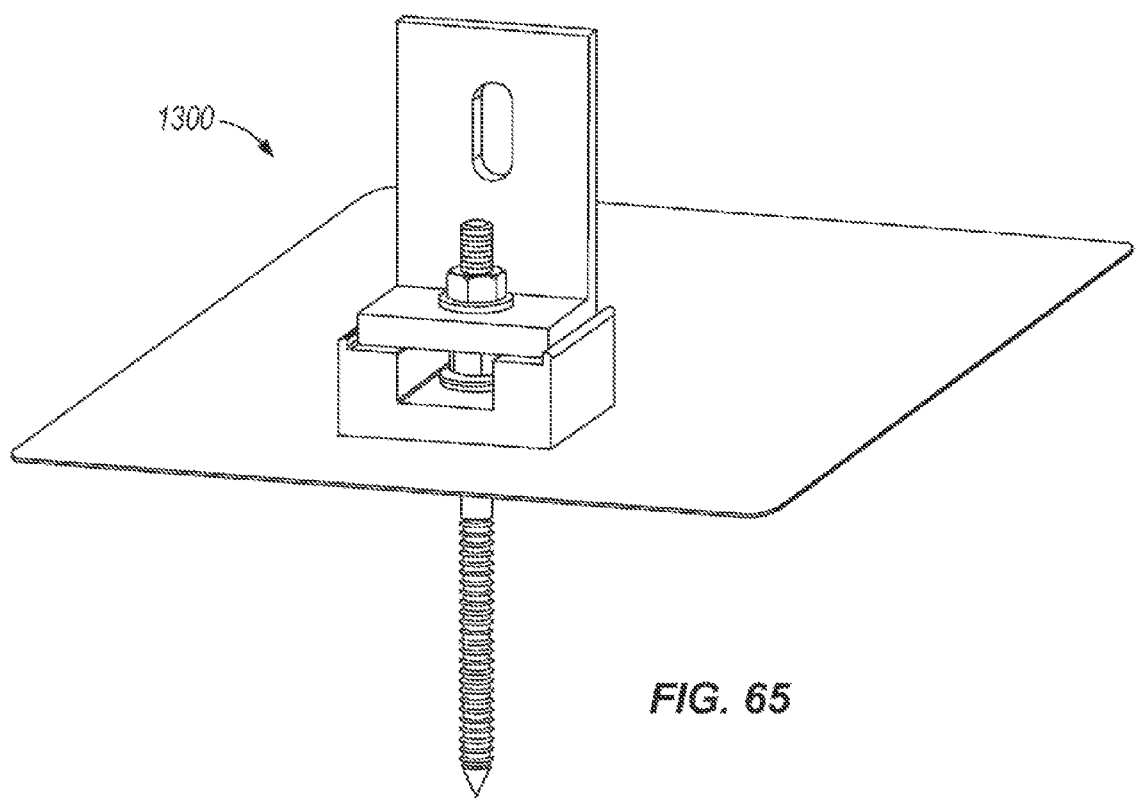
FIG. 65 is a perspective view of a structure for mounting the panel and snow fence to the roof without the use of a track that can be utilized with any of the embodiments disclosed herein.

FIG. 65 illustrates a bracket and fastener arrangement 1300 that can be utilized with any of the embodiments disclosed herein.

Figure 66:
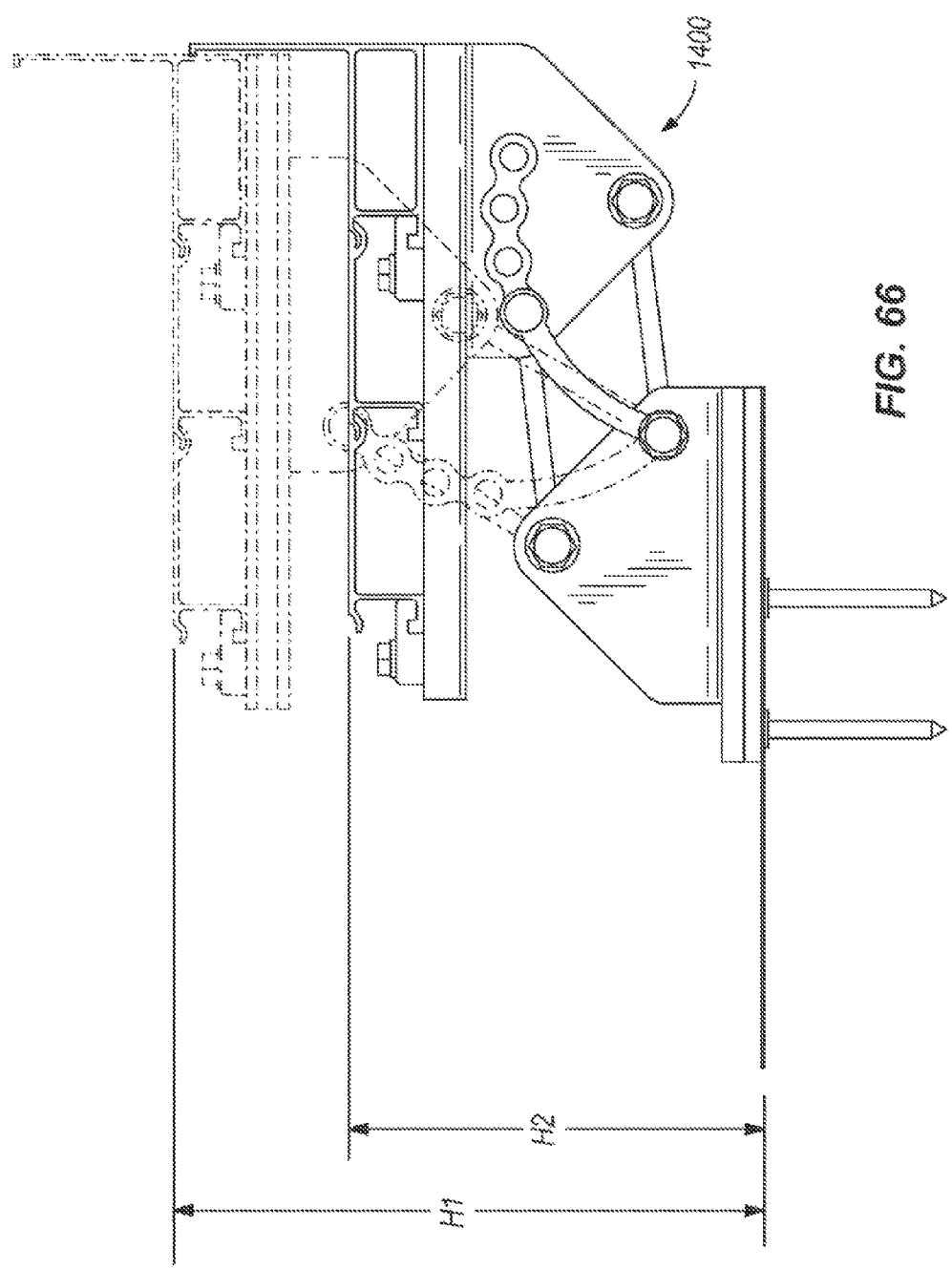
FIG. 66 is a side view of a first adjustable bracket shown in a first position in solid and a second position in phantom that can be utilized with any of the embodiments of the present invention.
Figure 67:
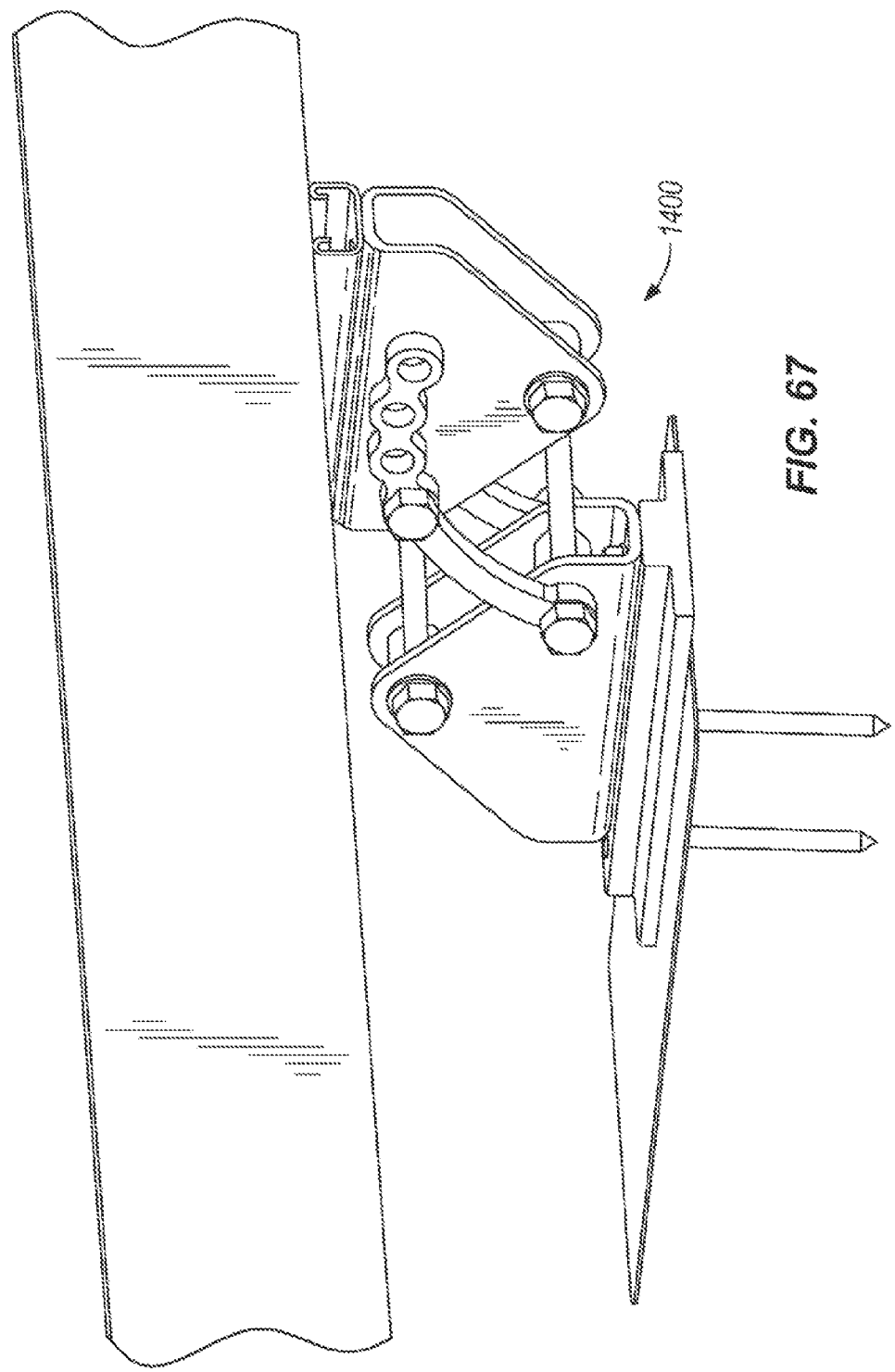
FIG. 67 is a perspective view of the first adjustable bracket of FIG. 66.

FIGS. 66 and 67 illustrate an adjustable height bracket 1400 that can be utilized with any of the embodiments disclosed herein. The illustrated bracket 1400 permits an end user to select the distance between the roof and the solar panel and/or the distance between the roof and snow fence. FIGS. 66 and 67 illustrate the bracket 1400 in a first position that extends the height of the bracket to H1 (shown in phantom in FIG. 66). FIGS. 66 and 67 illustrates the bracket 1400 in a second position that retracts the height of the bracket to H2 (shown in solid in FIGS. 66 and 67). FIG. 66 illustrates the bracket in the second position in solid and in the first position in phantom. The illustrated bracket 1400 includes four possible heights, but brackets with other quantities and ranges of heights can be utilized.

Figure 68:
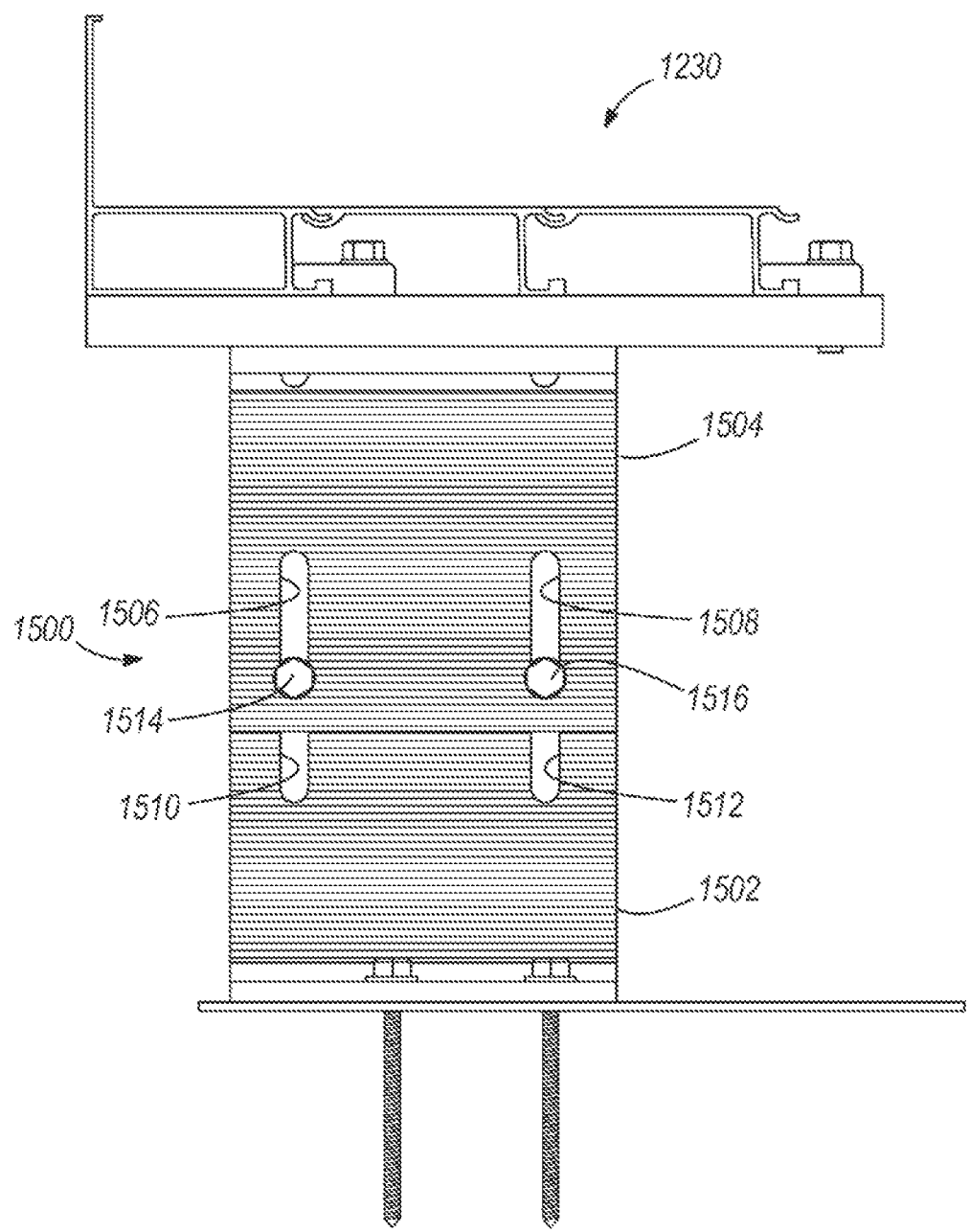
FIGS. 68-70 are various views of a second adjustable bracket that can be utilized with any of the embodiments of the present invention.
Figure 69:
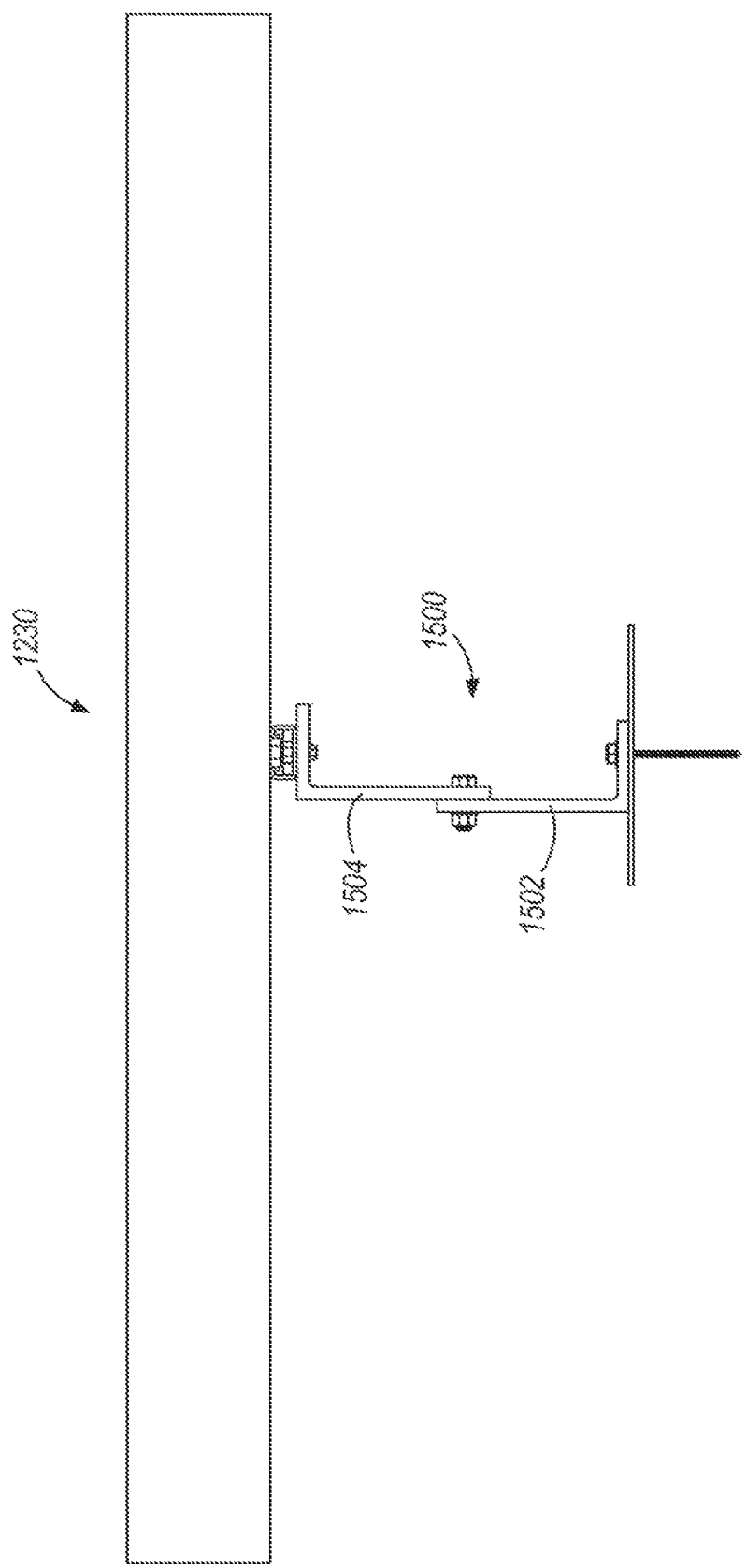
Figure 70:
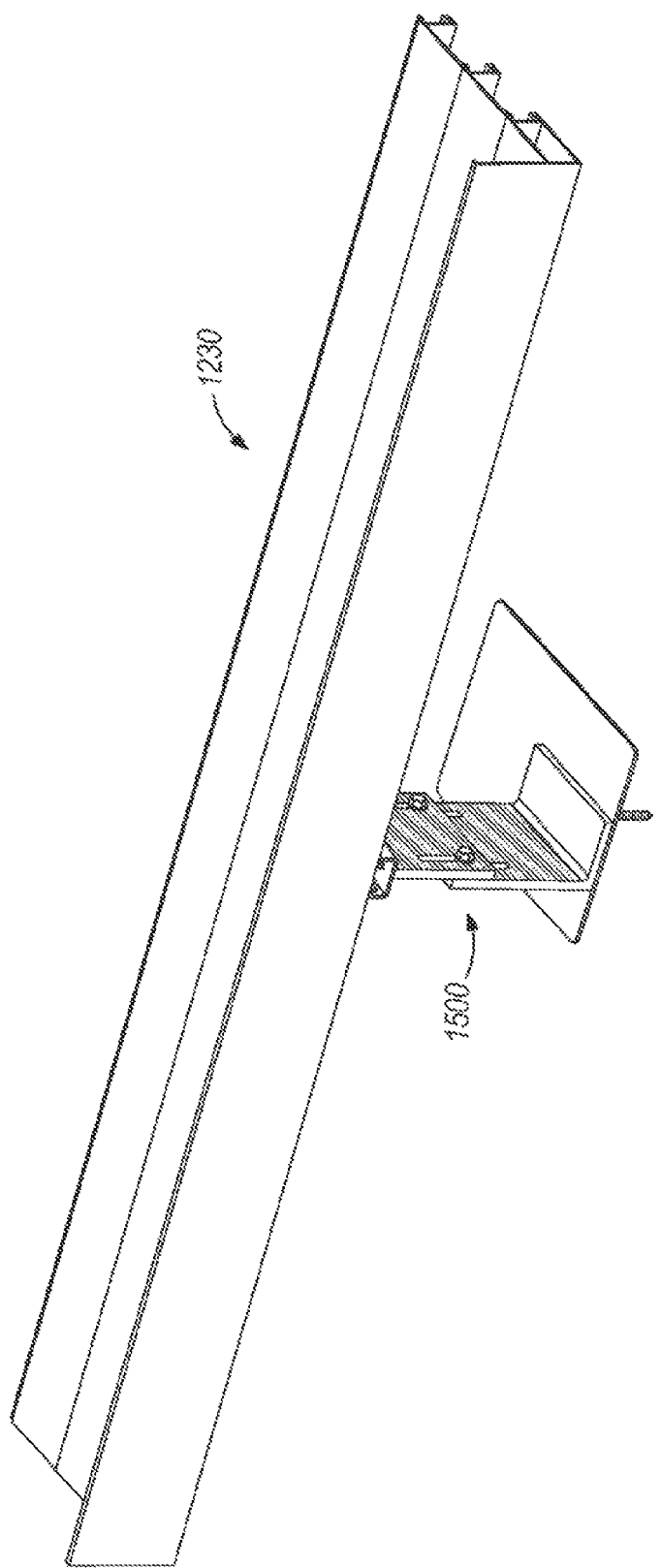

FIGS. 68-70 illustrate an adjustable height bracket 1500 that can be utilized with any of the embodiments disclosed herein. The illustrated bracket 1500 permits an end user to select the distance between the roof and the solar panel and/or the distance between the roof and snow fence. The illustrated bracket 1500 is coupled to the snow fence 1230 and a portion of flashing. The illustrated bracket 1500 can be adjusted to any of a number of positions within a range. The illustrated bracket 1500 includes a first, generally L-shaped portion 1502 and a second, generally L-shaped portion 1504. The first, generally L-shaped portion 1502 includes a first pair of slots 1506, 1508 and the second, generally L-shaped portion includes a second pair of slots 1510, 1512. The first pair of slots 1506, 1508 are substantially aligned with the second pair of slots 1510, 1512 and a pair of fasteners 1514, 1516 are inserted into the respective slots 1506 and 1510, 1508 and 1512.

The first and second portions 1502, 1504 each include at least one rough surface that is formed, machined, molded, sanded or otherwise manufactured to have a high coefficient of friction. Two rough surfaces are illustrated, however, both a front and a back of the L-shaped portions 1502, 1504 can form rough surfaces. In such an embodiment, the rough surfaces face one another to engage and substantially "lock" together when the fasteners 1514 and 1516 are tightened. The height of the adjustable height bracket 1500 can be adjusted to any height in a range of heights. The range is at least partially dependent upon the length and location of the slots 1506, 1508, 1510, 1512. Other quantities, locations and orientations of slots and brackets can be utilized in combination with the present invention.

FIGS. 71-74 illustrate another embodiment of roofing assemblies 2026, 2046 according to the present invention. This embodiment employs much of the same structure and has many of the same properties as the embodiments of the roofing assemblies described above in connection with the embodiments of FIGS. 1-70. Accordingly, the following description focuses primarily upon structure and features that are different than the embodiments described above in connection with FIGS. 1-70. Reference should be made to the description above in connection with FIGS. 1-70 for additional information regarding the structure and features, and possible alternatives to the structure and features of the roofing assemblies 2026, 2046 illustrated in FIGS. 71-74 and described below. Features and elements in the embodiment of FIGS. 71-74 corresponding to features and elements in the embodiments described above in connection with of FIGS. 1-70 are numbered in the 2000 series of reference numbers.

Figure 71:
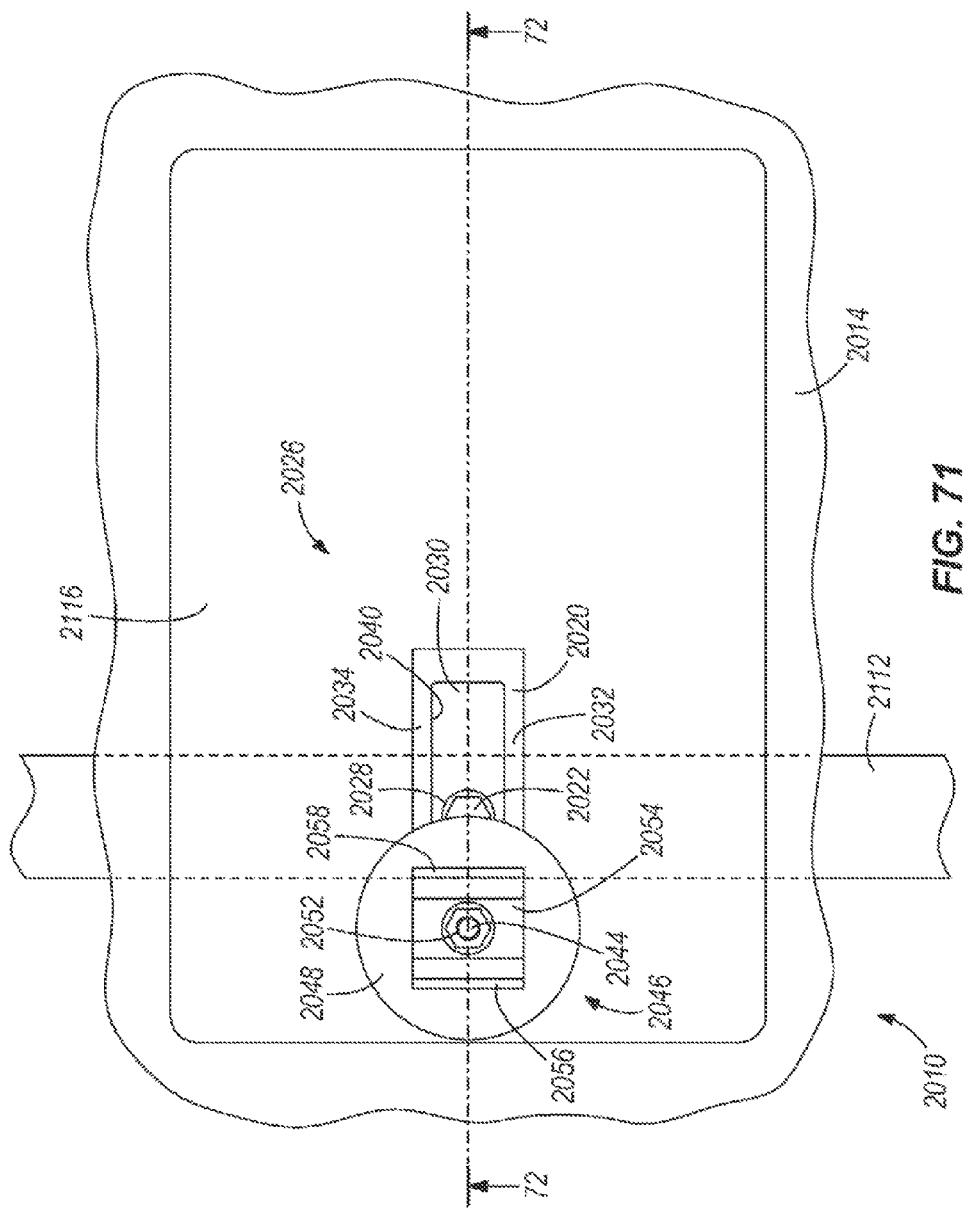
FIG. 71 is a top view of a roofing system according to some embodiments of the present invention.
Figure 72:
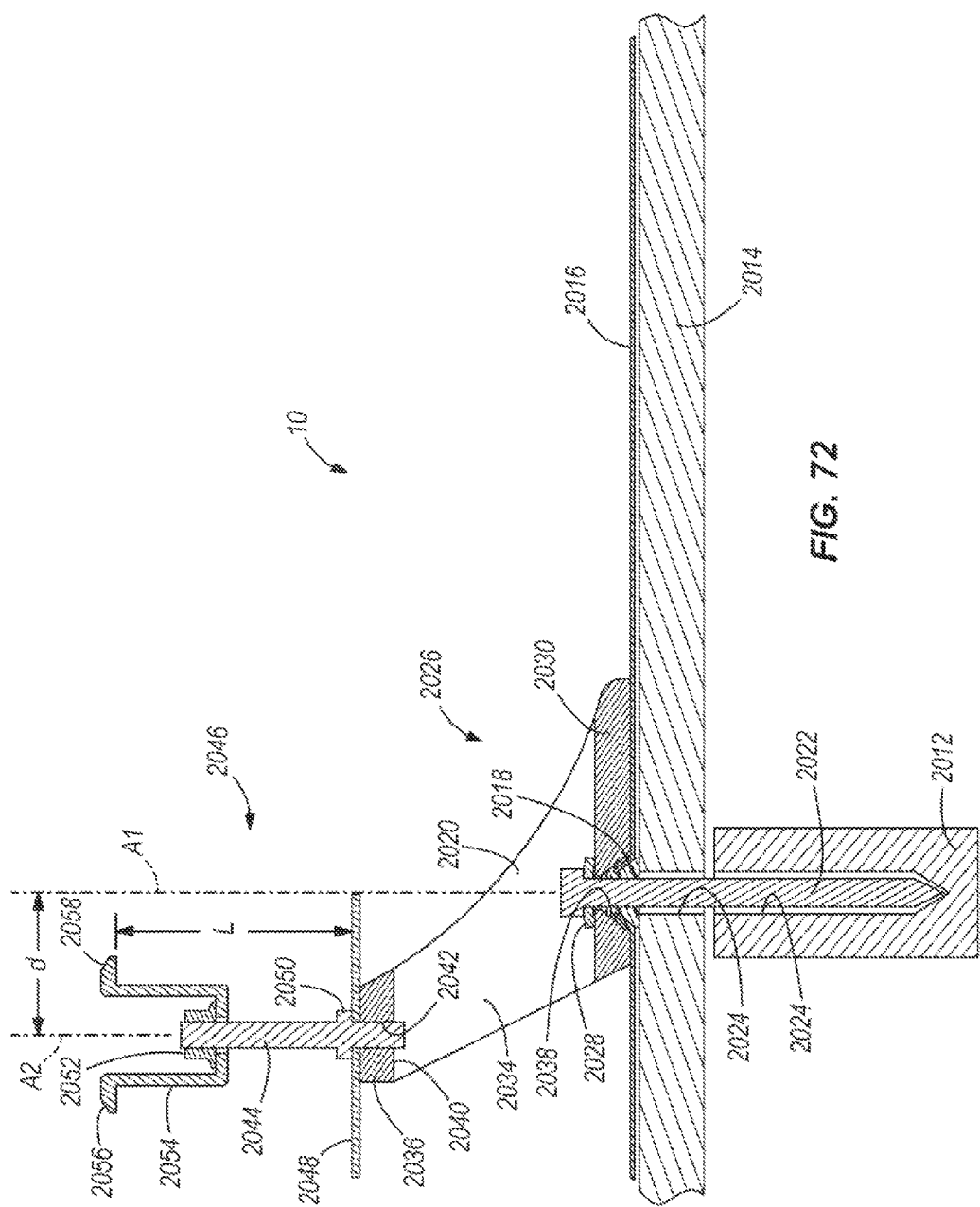
FIG. 72 is a cross-sectional view of the roofing system of FIG. 71, taken along line 72-72 of FIG. 71.
Figure 73:
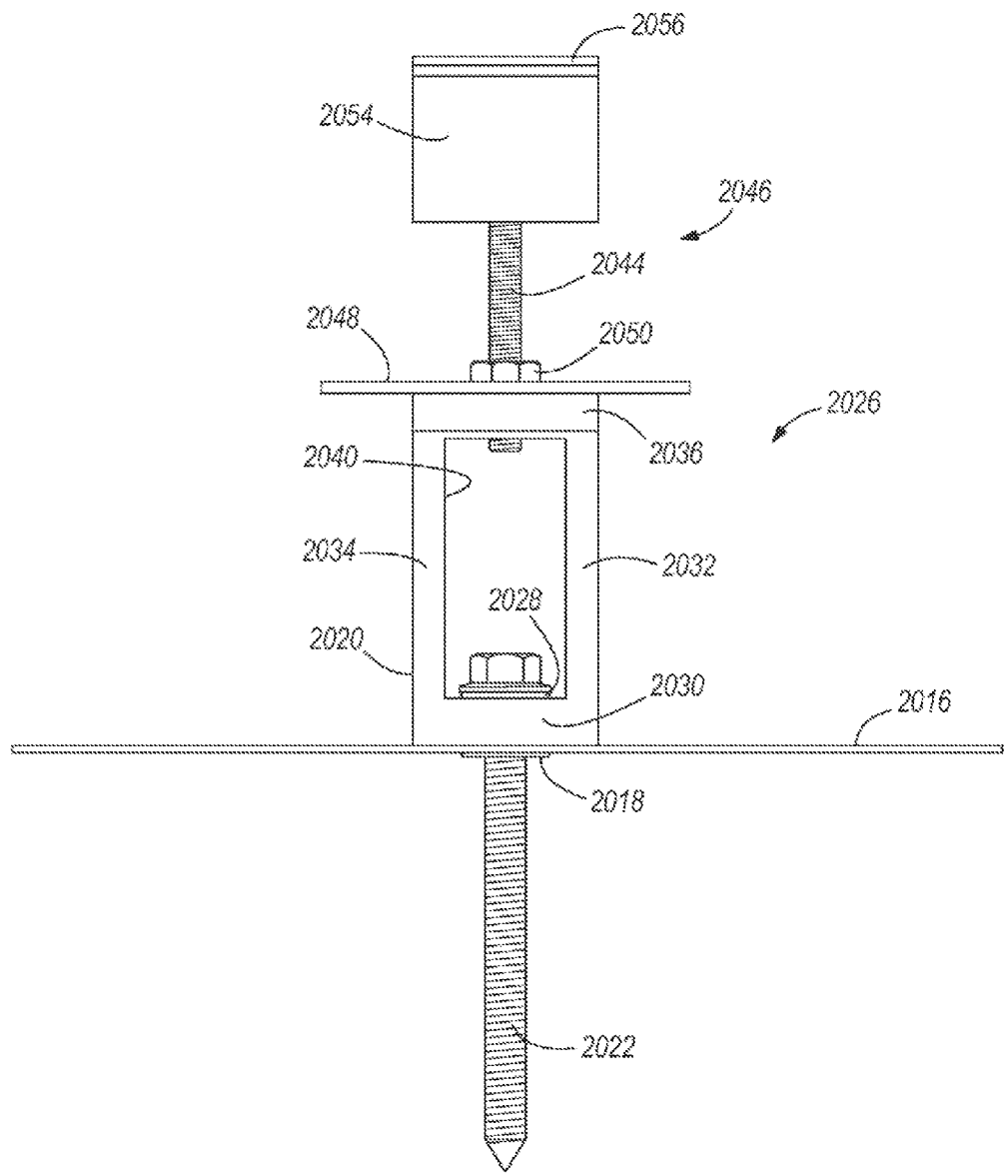
FIG. 73 is a front view of a mounting assembly from the roofing system of FIGS. 71 and 72.
Figure 74:
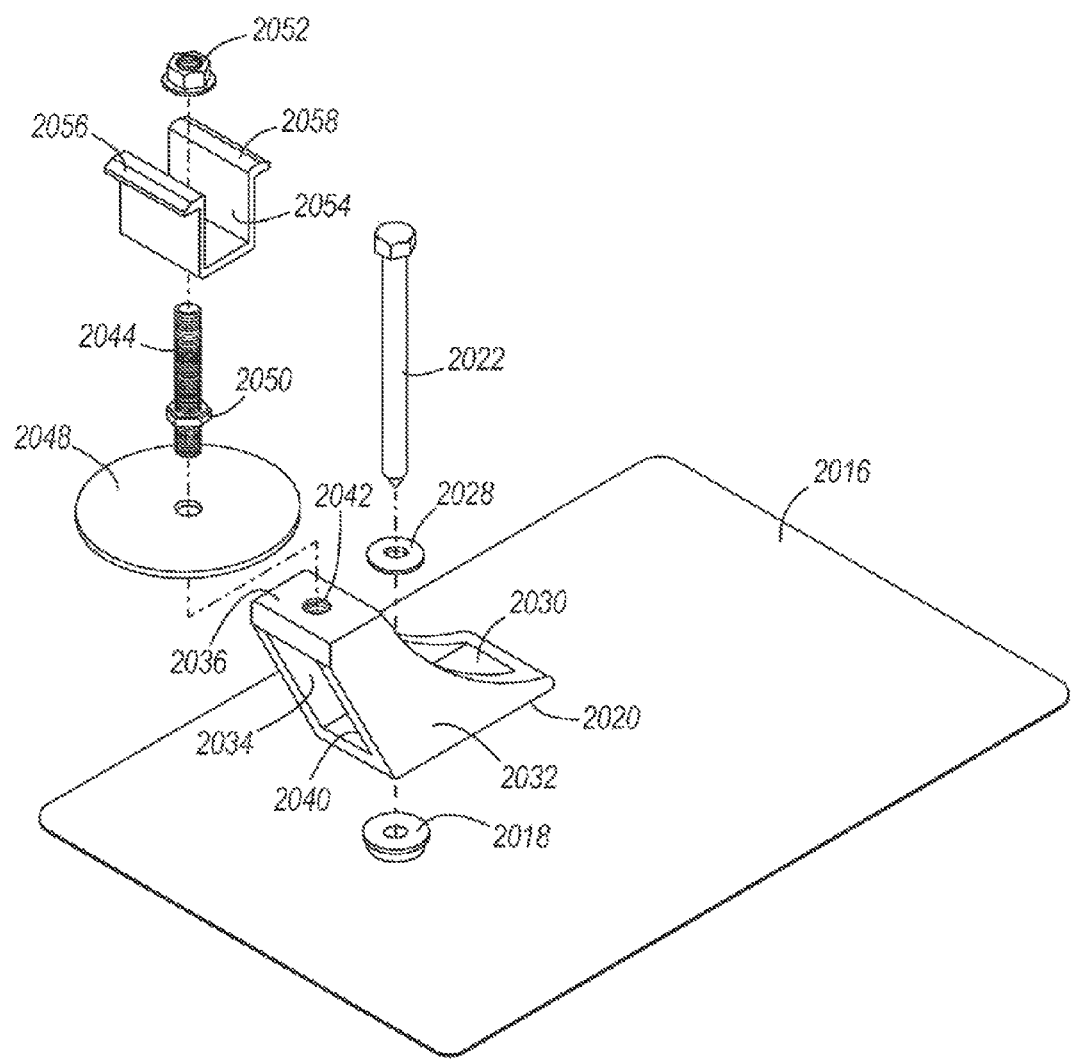
FIG. 74 is an exploded view of the mounting assembly of FIGS. 71-73.
Figure 75:
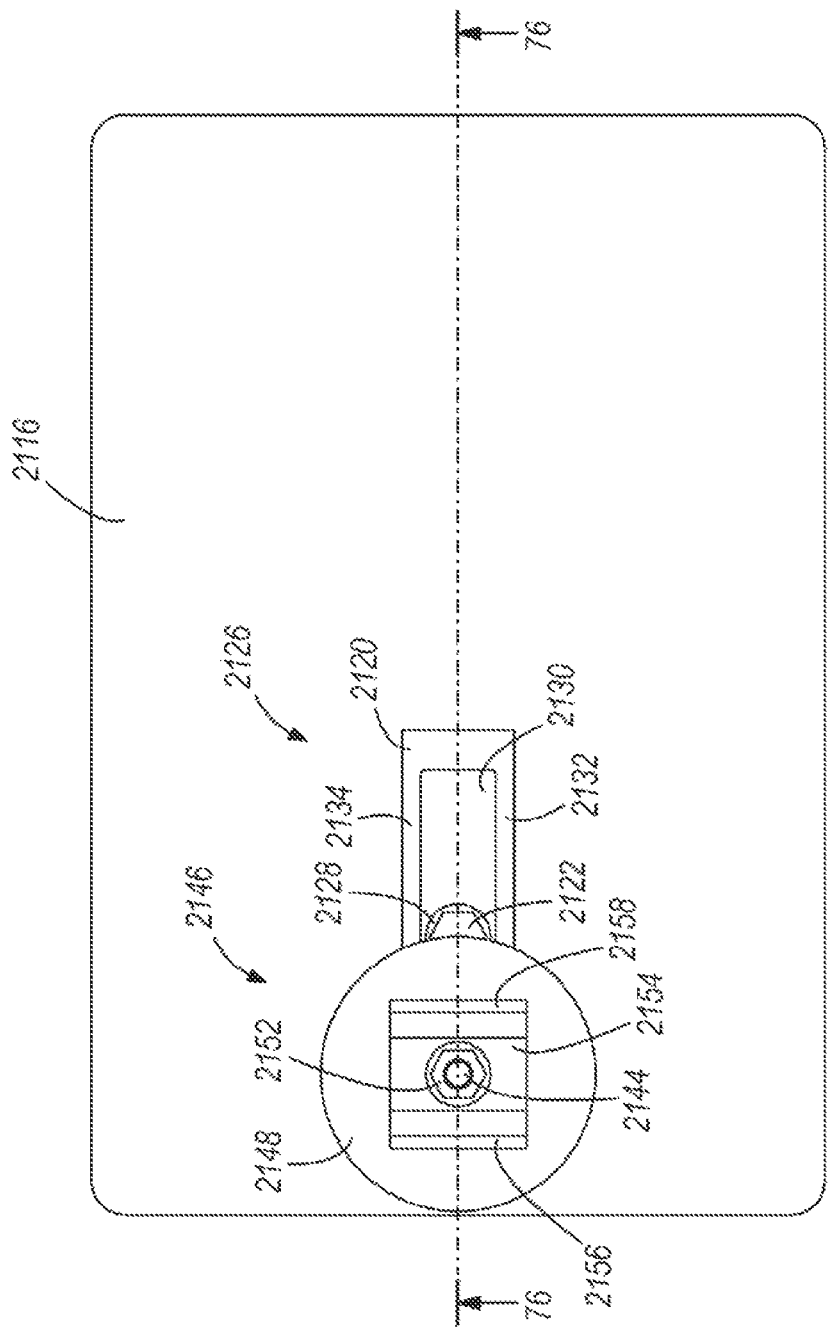
FIG. 75 is a top view of a mounting assembly according to some embodiments of the present invention.

FIGS. 71 and 72 show a roofing system 2010 including a number of rafters or beams 2012 (one such rafter 2012 is illustrated), a roof substrate 2014 (e.g., tarpaper, plywood or other decking material, insulation, and the like) supported on the rafters 2012, flashing 2016 extending across the substrate 2014 (i.e., placed immediately adjacent an upper surface of the substrate 2014 or supported on one or more intermediate layers of roofing or sealing material, which in turn are placed on the substrate 2014), a seal 2018, a first mounting bracket 2020 and at least one fastener 2022 operable to connect the first bracket 2020 to the roof substrate 2014 and the flashing 2016. In the illustrated embodiment, the roofing system 2010 includes a washer 2021 positioned between the first mounting bracket 2020 and the fastener 2022. In some embodiments, the washer 2021 can be a spring washer, a compression lock washer, a sealing ring or the like. In some embodiments, the washer 2021 is omitted. The roofing system 2010 is operable to support any of a variety of roof-mounted fixtures, such as, for example, snow fences, solar panels, an antenna, signs, billboards, or any of a number of other roof-mountable assemblies. Depending on one or more of the geographic location, anticipated quantity and type of precipitation, and anticipated roof and wind loading, the roofing system 10 can include any of a variety of flashing, seal and bracket arrangements, as will be discussed below.

The first bracket 2020 is operable to support any of a variety of roof-mounted fixtures, such as snow guards, snow fences, solar panels, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No. 6,526,701, filed Dec. 6, 2000.

Prior to installation of the roofing system 2010, apertures 2024 are drilled or otherwise created in the rafters 2012 and/or substrate 2014. The illustrated embodiment shows an aperture 2024 in the rafter 2012 and the substrate 2014. The roofing system 2010 inhibits leakage of fluids through the flashing 2016, and, in some embodiments, may also or alternately inhibit leakage of fluids beyond the flashing to portions of the substrate 2014 or areas below the substrate 2014. The roofing system 2010 can be utilized on any of a variety of roof types, such as slate roofs, membrane roofs, aluminum roofs, standing seam roofs, tile roofs, shingle roofs, and the like.

One or more fasteners can be used to couple the first bracket 2020 to the seal 2018 and flashing 2016 to form a mounting assembly. One such assembly 2026 is illustrated in FIGS. 71-74 and includes the flashing 2016, the seal 2018, the first bracket 2020, one fastener 2022, and a washer 2028. The washer 2028 can be a spring washer, a sealing ring, a compression washer, or the like, to provide a substantially watertight seal between the fastener 2022 and the first bracket 2020. In some embodiments, the washer 2028 can be omitted or can be supplemented by an o-ring or an applied sealant, such as caulk. Alternatively or in addition, the washer 2021 can include a stiffening element, such as, for example, a rigid backing, to provide additional support.

The assembly 2026 can be installed on a roof. The fastener 2022 can extend through the flashing 2016, the seal 2018, the first bracket 2020, into the substrate 2014 and the rafters 2012, as illustrated in FIGS. 71 and 72. The washer 2028 and the seal 2018 work together to prevent or inhibit entry of water or other fluid between the flashing 2016 and the first bracket 2020 or under the flashing 2016 to the rafters 2012 and/or substrate 2014. Even though the illustrated fasteners are bolts, other fasteners, such as screws, studs, nails, and other removable and non-removable fasteners, can be used.

The illustrated first bracket 2020 includes a substantially planar first end 2030, first and second arms 2032, 2034 and a substantially planar second end 2036. The first end 2030 defines an aperture 2038 extending therethrough, through which the seal 2018 and fastener 2022 extend. The seal 2018 illustrated in FIG. 72 is substantially frustoconical in shape, but other shapes, configurations and arrangements can be utilized to provide a seal between the flashing 2016 and the first bracket 2020. The first bracket 2020 can have a suitably sized and shaped aperture to receive the seal 2018. The illustrated aperture 2038 includes a vertical portion and a tapered portion. The vertical portion is positioned near the washer 2028 and the tapered portion is positioned near the seal 2018. The tapered portion substantially mates with the seal 2018 to substantially inhibit flow of fluid through the aperture 2038. The flashing 2016 can also include a substantially frustoconical projection extending at least partially into the bracket aperture. Multiple suitable seals and receiving apertures are illustrated and described herein.

The illustrated first bracket 2020 defines an aperture 2040 bound by the first end 2030, the first and second arms 2032, 2034 and the second end 2036. The illustrated aperture 2040 is substantially rectangular in cross-section. Other aperture shapes, sizes and locations can be formed by the first bracket 2020. The first bracket 2020 can be cast, extruded, molded, or otherwise formed. In some embodiments, the first bracket 2020 is formed from steel, but in other embodiments, other metals or non-metallic materials can be utilized to form the first bracket 2020.

The illustrated second end 2036 defines an aperture 2042 sized to receive a second fastener 2044 therethrough. The second fastener 2044 is part of a second roofing assembly 2046 that further includes a plate 2048, a first nut 2050, a second nut 2052 and a second bracket 2054. The second roofing assembly 2046 is coupled to the assembly 2026 by the engagement of the fastener 2044 in the aperture 2042 in the second end 2036 of the first bracket 2020. The first nut 2050 can be positioned along the second fastener 2044 to adjust the relative length of the second fastener 2044 extending above the aperture 2042.

The illustrated second bracket 2054 is substantially U-shaped and includes a first flange 2056 and a second flange 2058. Other sizes, shapes and configurations can be utilized in place of the illustrated second bracket 2054. The first and second nuts 2050, 2052 permit adjustment of the length of the second fastener 2044 above the first bracket 2020. Specifically, a length L between the plate 2048 and the first and second flanges 2056, 2058 is variable due to the engagement of the first and second nuts 2050, 2052 and the second fastener 2044. The length L is adjustable to retain any of a variety of roof-mounted structures between the plate 2048 and the flanges 2056, 2058.

The first fastener 2022 defines a first axis A1 and the second fastener 2044 defines a second axis A2. A distance d between the first axis A1 and the second axis A2 is shown in FIG. 72. The second fastener 2044 is offset from the first fastener 2022 by the distance d. The first fastener 2022 extends into one of the beams 2012 and supports the second roofing assembly 2046 spaced from the beam 2012. This provides much greater flexibility for installation of the roofing system 2010, such that the second roofing assembly 2046 can be offset from the beams 2012 and still be supported by the beams 2012.

FIGS. 75-78 illustrate another embodiment of roofing assemblies 2126, 2146 according to the present invention. This embodiment employs much of the same structure and has many of the same properties as the embodiments of the roofing assemblies described above in connection with the embodiments of FIGS. 1-74. Accordingly, the following description focuses primarily upon structure and features that are different than the embodiments described above in connection with FIGS. 1-74. Reference should be made to the description above in connection with FIGS. 1-74 for additional information regarding the structure and features, and possible alternatives to the structure and features of the roofing assemblies 2126, 2146 illustrated in FIGS. 75-78 and described below. Features and elements in the embodiment of FIGS. 75-78 corresponding to features and elements in the embodiments described above in connection with of FIGS. 1-74 are numbered in the 2100 series of reference numbers.

The roofing assembly 2126 includes flashing 2116, a seal 2118, a first bracket 2120, a first fastener 2122 and a washer 2128. The flashing 2116, seal 2118, fastener 2122 and washer 2128 are similar to the flashing, seal, fastener and washer of previously-described embodiments. Reference should be made to the description of FIGS. 1-70 for the flashing 2116, seal 2118, fastener 2122 and washer 2128.

The illustrated first bracket 2120 includes a substantially planar first end 2130, a first side arm 2132, a middle arm 2133, a second side arm 2134, and a substantially planar second end 2136. The first end 2130 defines an aperture 2138 extending therethrough, through which the seal 2118 and fastener 2122 extend. The first bracket 2120 has generally the same overall shape as the first bracket 2020, but has a generally Z-shaped cross section. The middle arm 2133 includes an aperture 2138 extending therethrough proximate a head of the first fastener 2122. The aperture 2138 can permit fluid to drain away from the seal 2118, the first fastener 2122, and the washer 2128.

The illustrated second end 2136 defines an aperture 2142 sized to receive a second fastener 2144 therethrough. The second fastener 2144 is part of the second roofing assembly 2146 that further includes a plate 2148, a first nut 2150, a second nut 2152 and a second bracket 2154. The second roofing assembly 2146 is coupled to the roofing assembly 2126 by the engagement of the fastener 2144 in the aperture 2142 in the second end 2136 of the first bracket 2120. The first nut 2150 can be positioned along the second fastener 2144 to adjust the length of the second fastener 2144 extending above the aperture 2142 in the second end 2136. The second roofing assembly 2146 is similar to the second roofing assembly 2046 in the previous embodiment.

The illustrated second bracket 2154 is substantially U-shaped and includes a first flange 2156 and a second flange 2158. Other sizes, shapes and configurations can be utilized in place of the illustrated second bracket 2154. The first and second nuts 2150, 2152 permit adjustment of the relative length of the second fastener 2144 above the first bracket 2120. Specifically, a length L1 between the plate 2148 and the first and second flanges 2156, 2158 is variable due to the engagement of the first and second nuts 2150, 2152 and the second fastener 2144. The length L1 is adjustable to retain any of a variety of roof-mounted structures between the plate 2148 and the flanges 2156, 2158.

Figure 76:
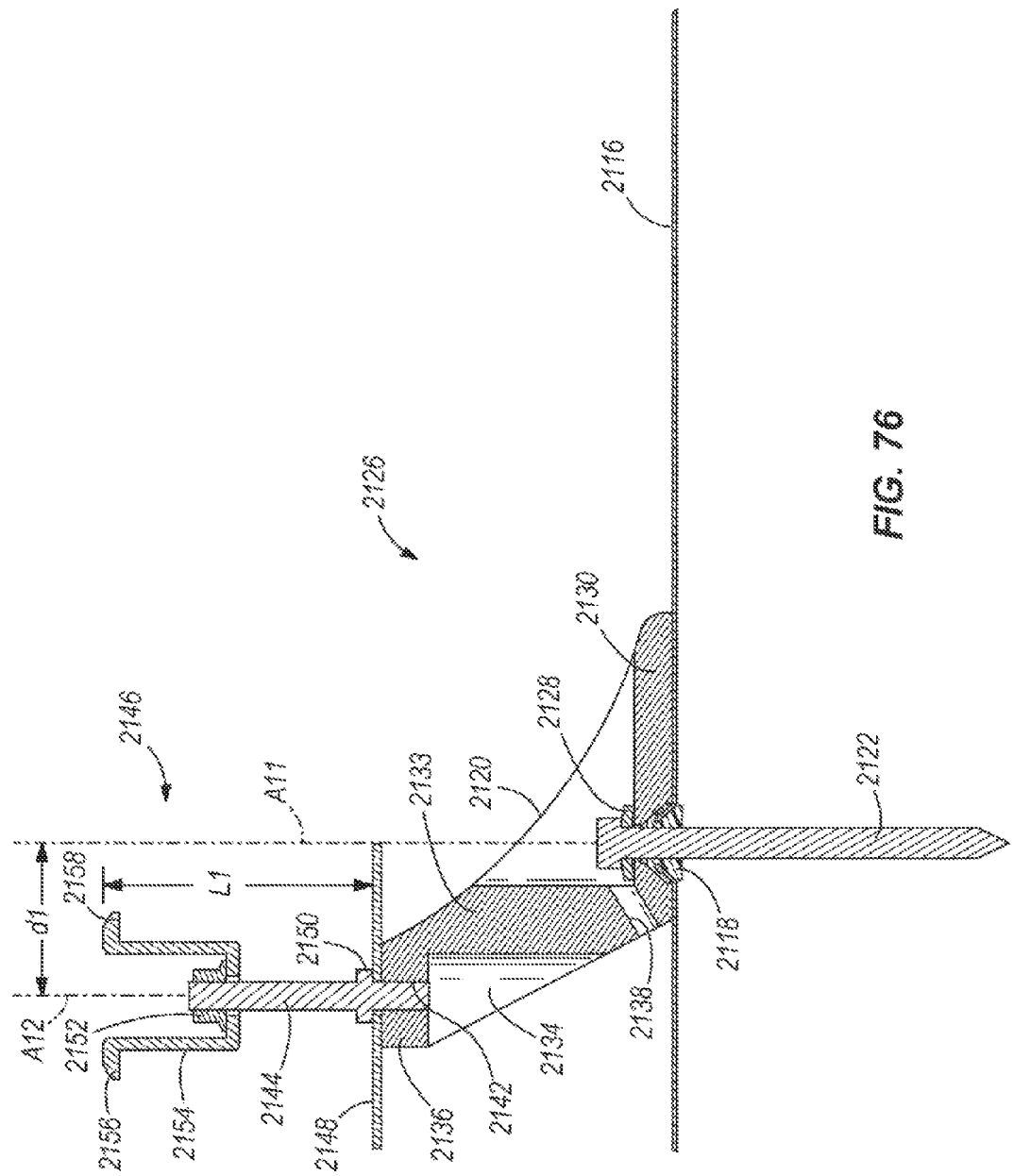
FIG. 76 is a cross-sectional view of the mounting assembly of FIG. 75, taken along line 76-76 of FIG. 75.
Figure 77:
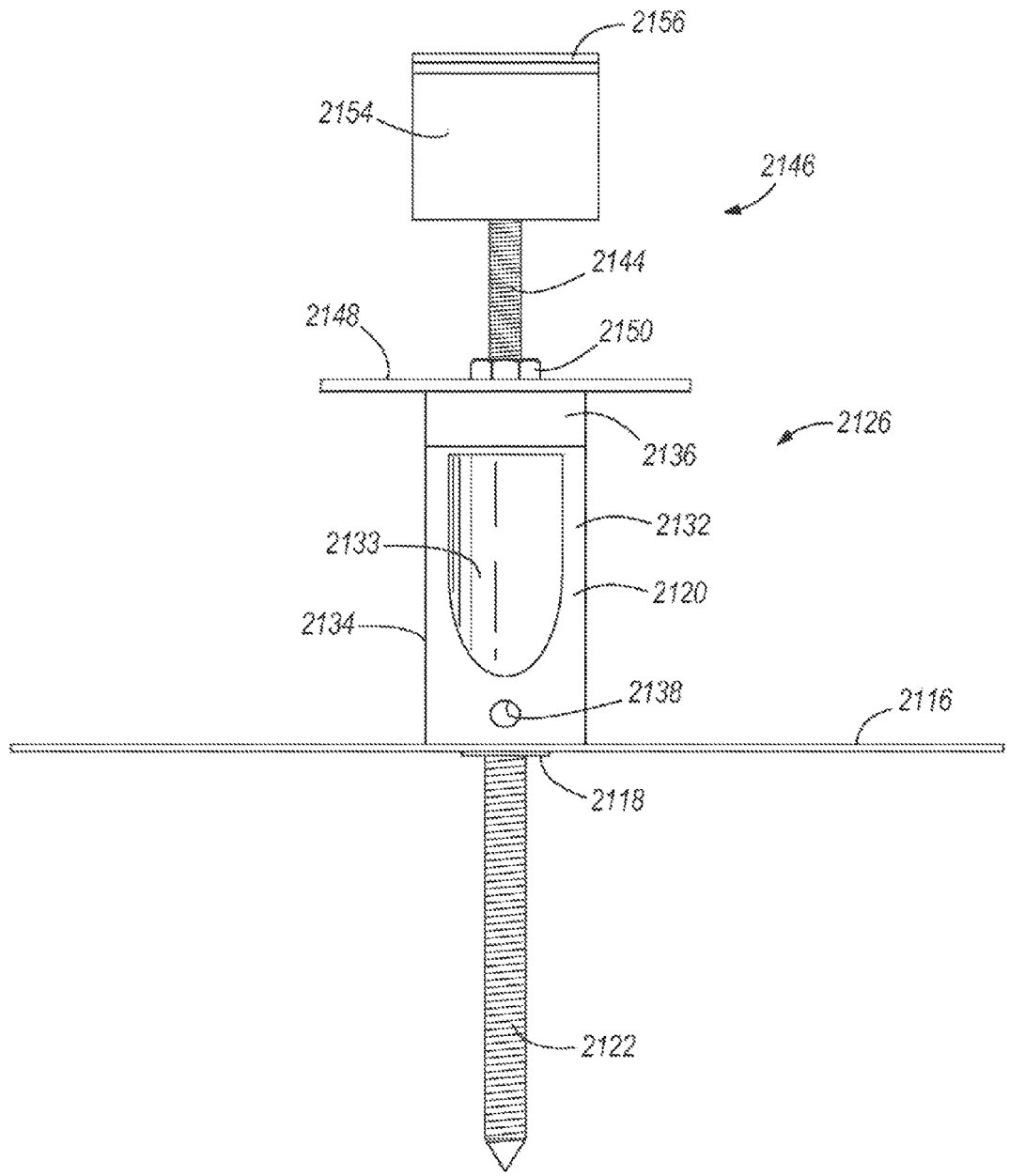
FIG. 77 is a front view of the mounting assembly of FIG. 75.
Figure 78:
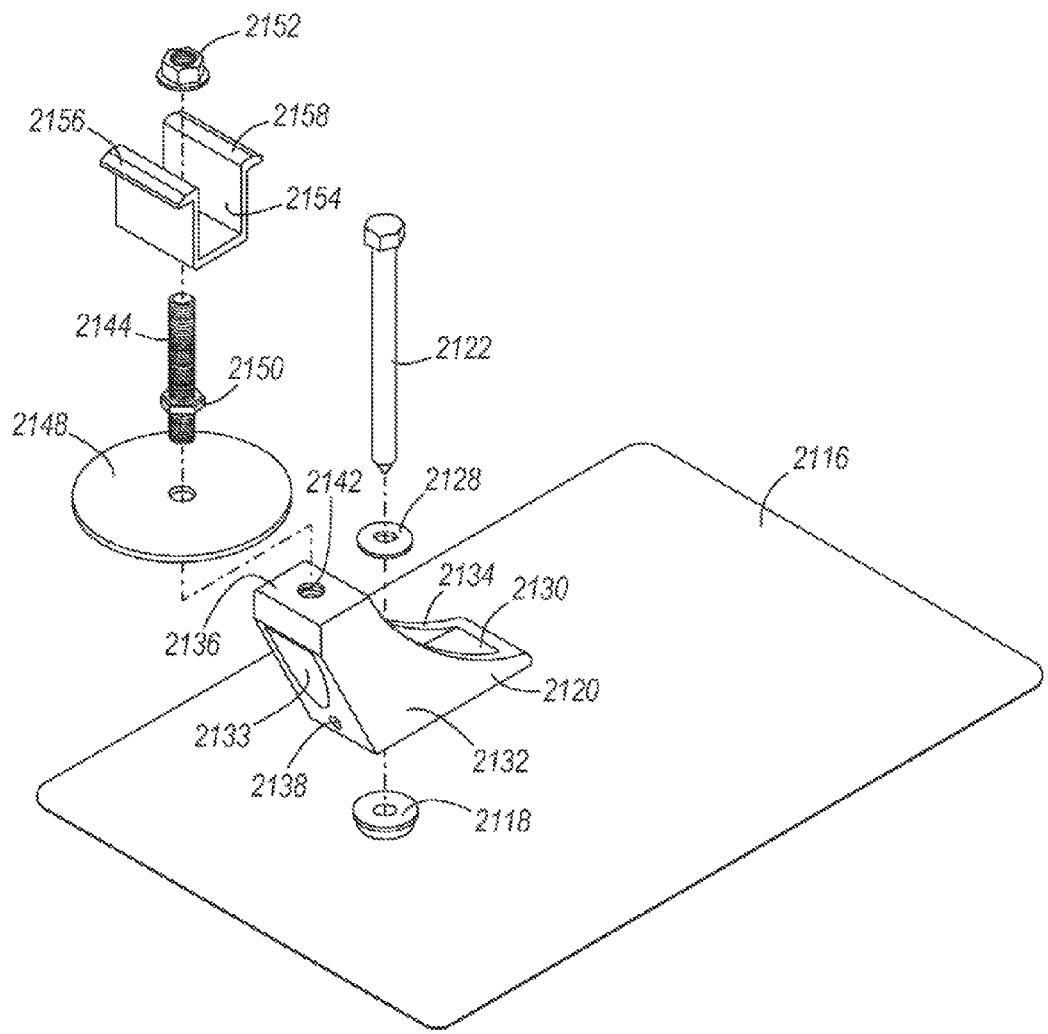
FIG. 78 is an exploded view of the mounting assembly of FIG. 75.
Figure 80:
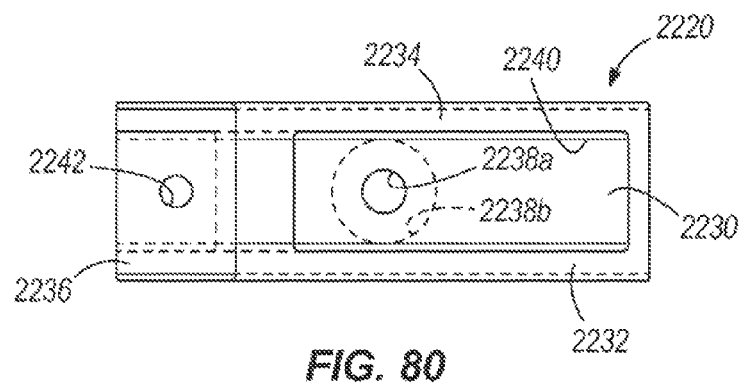
FIG. 80 is a top view of the bracket of FIG. 79.
Figure 79:
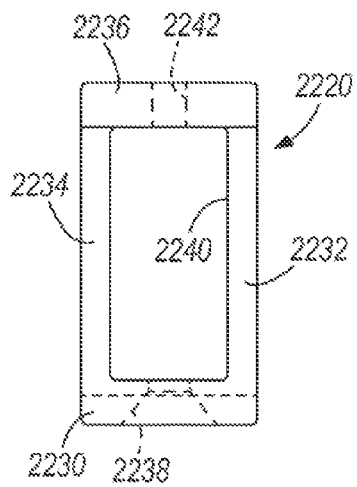
FIG. 79 is an end view of a bracket according to some embodiments of the present invention.
Figure 81:
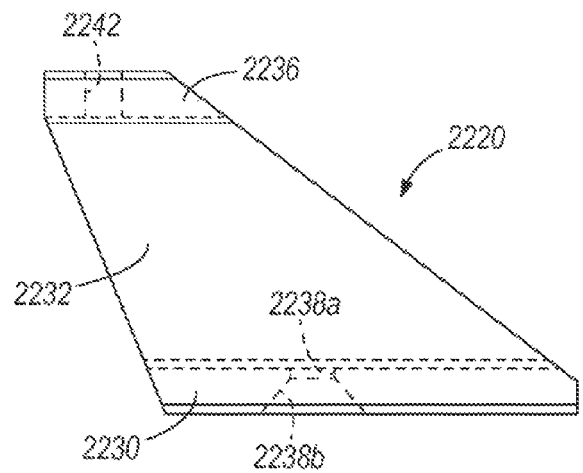
FIG. 81 is a side view of the bracket of FIG. 79.
Figure 82:
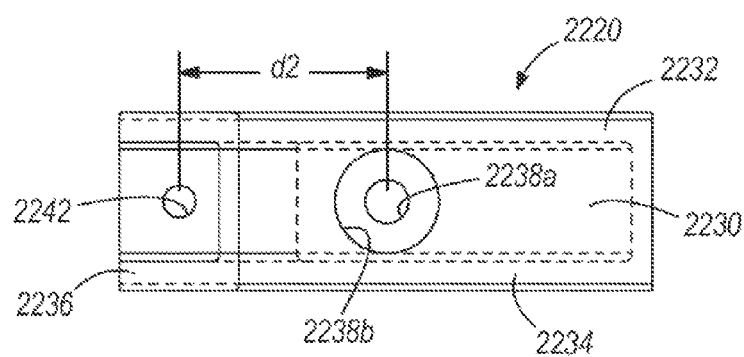
FIG. 82 is a bottom view of the bracket of FIG. 79.

The first fastener 2122 defines a first axis A11 and the second fastener 2144 defines a second axis A12. A distance d1 between the first axis A11 and the second axis A12 is shown in FIG. 76. The second fastener 2144 is offset from the first fastener 2122 by the distance d1. The first fastener 2122 extends into one of the beams 2012 (illustrated in FIGS. 71 and 72) and supports the second roofing assembly 2146 spaced from the beam 2012. This provides much greater flexibility for installation of the roofing system 2010 (illustrated in FIGS. 71 and 72), such that the second roofing assembly 2146 can be offset from the beams 2012 and still be supported by the beams 2012.

FIGS. 79-82 illustrate another embodiment of a first bracket 2220 according to the present invention. This embodiment employs much of the same structure and has many of the same properties as the embodiments of the brackets described above in connection with FIGS. 1-78. Accordingly, the following description focuses primarily upon structure and features that are different than the embodiments described above in connection with FIGS. 1-78. Reference should be made to the description above in connection with FIGS. 1-78 for additional information regarding the structure and features, and possible alternatives to the structure and features of the first bracket 2220 illustrated in FIGS. 79-82 and described below. Features and elements in the embodiment of FIGS. 79-82 corresponding to features and elements in the embodiments described above in connection with of FIGS. 1-78 are numbered in the 2200 series of reference numbers.

The illustrated first bracket 2220 includes a substantially planar first end 2230, first and second arms 2232, 2234 and a substantially planar second end 2236. The first end 2230 defines an aperture 2238 extending therethrough, through which a seal and fastener can extend. The illustrated aperture 2238 includes a vertical portion 2238a and a tapered portion 2238b.

The illustrated first bracket 2220 defines an aperture 2240 bound by the first end 2230, the first and second arms 2232, 2234 and the second end 2236. The illustrated aperture 2240 is substantially rectangular in cross-section. Other aperture shapes, sizes and locations can be formed by the first bracket 2220. The first bracket 2220 can be cast, extruded, molded, or otherwise formed. In some embodiments, the first bracket 2220 is formed from steel, but in other embodiments, other metals or non-metallic materials can be utilized to form the first bracket 2220.

The illustrated second end 2236 defines an aperture 2242 sized to receive a fastener, such as the second fastener 2244 therethrough. The aperture 2238 is spaced from the aperture 2242 by a distance d2. As described in greater detail above, this provides much greater flexibility for installation of the bracket 2220 on a roof, such that a second assembly (such as 2046, 2146) can be offset from the beams 2012 and still be supported by the beams 2012.

Figure 83:
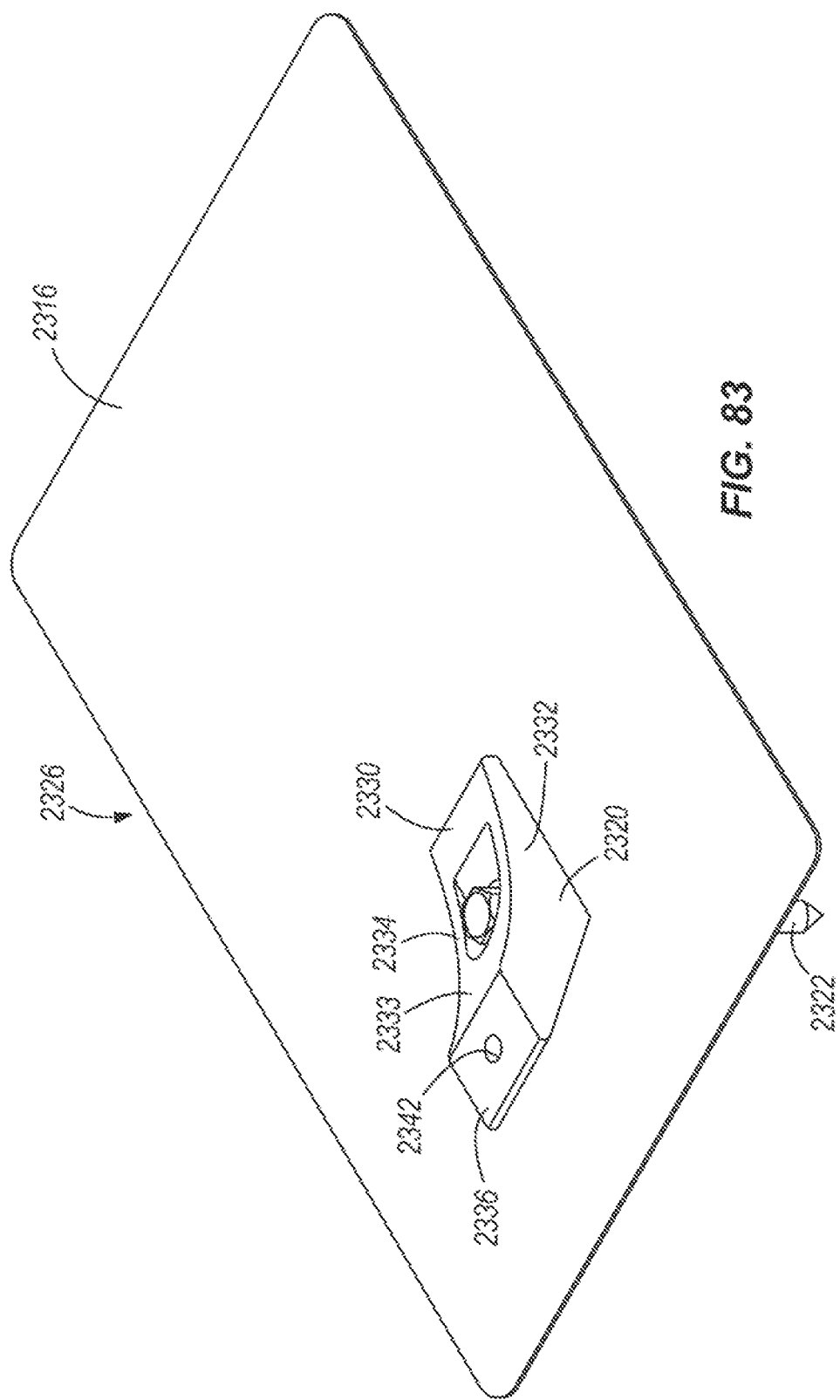
FIG. 83 is a perspective view of the mounting assembly according to some embodiments of the present invention.
Figure 84:
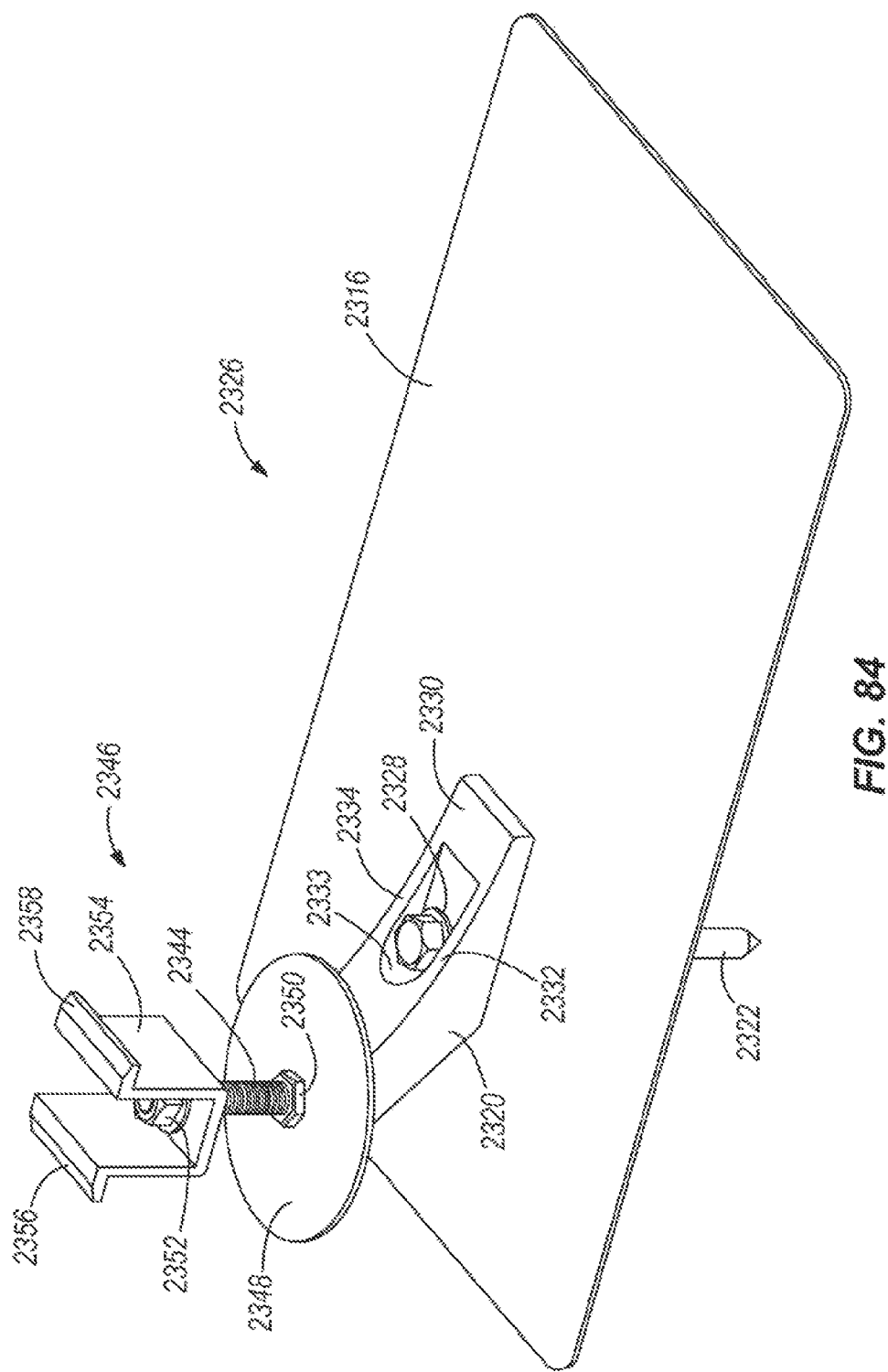
FIG. 84 is a perspective view of the mounting assembly of FIG. 83 and including an attachment bracket.
Figure 85:
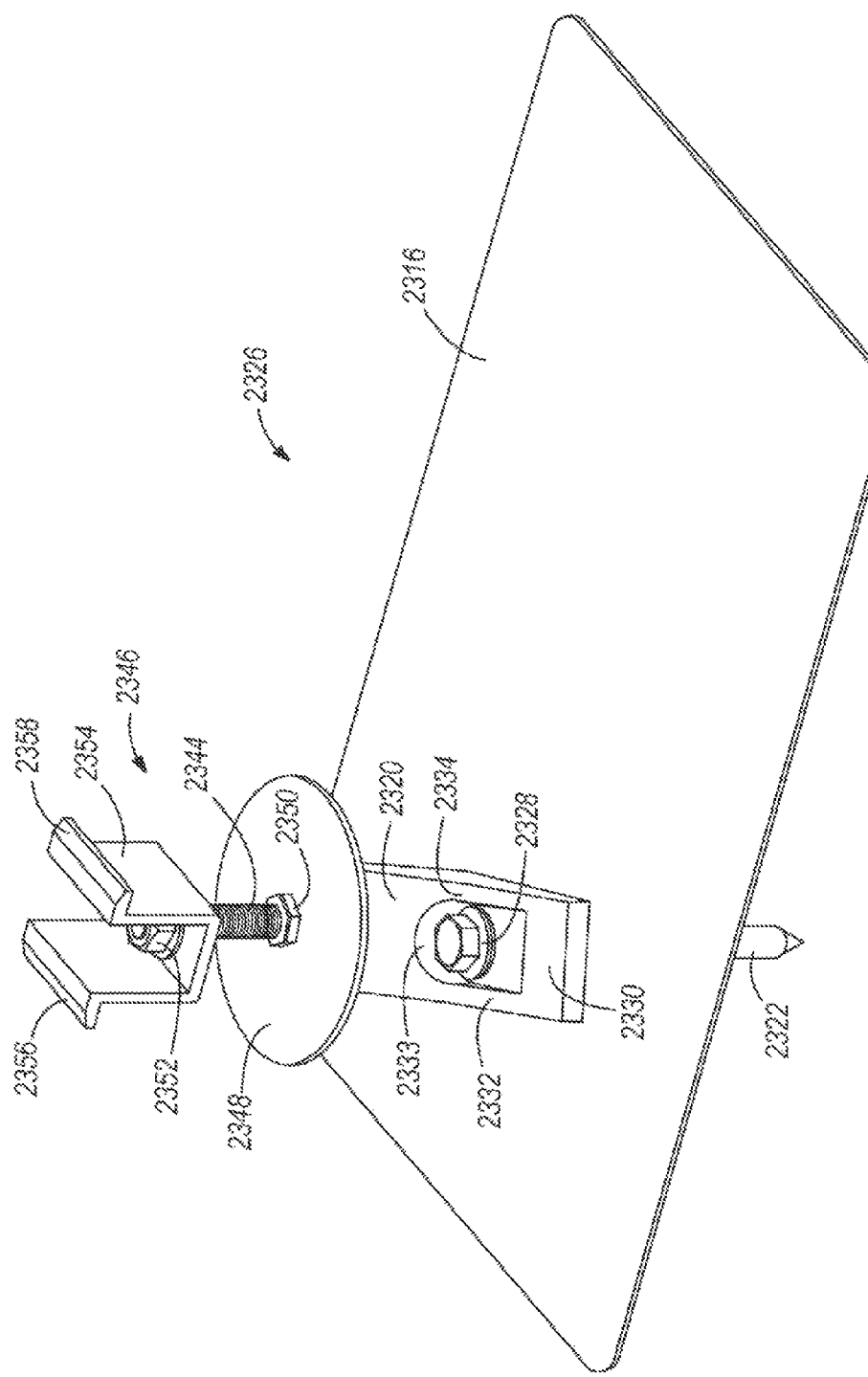
FIG. 85 is a perspective view of the mounting assembly of FIGS. 83 and 84 in an alternate orientation.

FIGS. 83-85 illustrate another embodiment of roofing assemblies 2326, 2346 according to the present invention. This embodiment employs much of the same structure and has many of the same properties as the embodiments of the roofing assemblies described above in connection with FIGS. 1-82. Accordingly, the following description focuses primarily upon structure and features that are different than the embodiments described above in connection with FIGS. 1-82. Reference should be made to the description above in connection with FIGS. 1-82 for additional information regarding the structure and features, and possible alternatives to the structure and features of the roofing assemblies 2326, 2346 illustrated in FIGS. 83-85 and described below. Features and elements in the embodiment of FIGS. 83-85 corresponding to features and elements in the embodiments described above in connection with of FIGS. 1-82 are numbered in the 2300 series of reference numbers.

The roof mounting assembly 2326 includes flashing 2316, a seal (not shown), a first bracket 2320, a first fastener 2322 and a washer 2328. The flashing 2316, seal, fastener 2322 and washer 2328 are similar to the flashing, seal, fastener and washer of previously-described embodiments. Reference should be made to the description of FIGS. 1-82 for the flashing 2316, seal, fastener 2322 and washer 2328.

The illustrated first bracket 2320 includes a substantially planar first end 2330, a first side arm 2332, a middle arm 2333, a second side arm 2334 and a substantially planar second end 2336. The first end 2330 defines an aperture through which the fastener 2322 extends. The first bracket 2320 has the same general overall shape as the bracket 2120. The middle arm 2333 can include an aperture extending therethrough to permit fluid to drain away from the first fastener 2322 and the washer 2328.

The illustrated second end 2336 defines an aperture 2342 sized to receive a second fastener 2344 therethrough. The second fastener 2344 is part of a second roof mounting assembly 2346 that further includes a plate 2348, a first nut 2350, a second nut 2352 and a second bracket 2354. The second roof mounting assembly 2346 is coupled to the roof mounting assembly 2326 by the engagement of the second fastener 2344 in the aperture 2342 in the second end 2336 of the first bracket 2320. The first nut 2350 can be positioned along the second fastener 2344 to adjust the length of the second fastener 2344 extending above the second aperture 2342. The second roof mounting assembly 2346 is similar to the second roofing assembly 2046 in the previously-described embodiment. Reference should be made to the description of FIGS. 1-82 for details of the second roof mounting assembly 2346.

The illustrated second bracket 2354 is substantially U-shaped and includes a first flange 2356 and a second flange 2358. Other sizes, shapes and configurations can be utilized in place of the illustrated second bracket 2354. The first and second nuts 2350, 2352 permit adjustment of the relative length of the second fastener 2344 above the first bracket 2320. Specifically, a length between the plate 2348 and the first and second flanges 2356, 2358 is variable due to the engagement of the first and second nuts 2350, 2352 and the second fastener 2344, to retain any of a variety of roof-mounted structures between the plate 2348 and the flanges 2356, 2358.

As in the above-described embodiments, the first fastener 2322 is spaced from the second fastener 2344. The first fastener 2322 can extend into one of the beams 2012 (illustrated in FIGS. 71 and 72) and support the second roof mounting assembly 2346 spaced from the beam 2012. This provides much greater flexibility for installation of the roofing system 2010 (illustrated in FIGS. 71 and 72), such that the second roof mounting assembly 2346 can be offset from the beams 2012 and still be supported by the beams 2012.

Additionally, FIGS. 83 and 84 illustrate the first roof mounting assembly 2326 in a first orientation and FIG. 85 illustrates the first roof mounting assembly 2326 in a second orientation, rotated about the first fastener 2322 from the first orientation. In some embodiments, the first roof mounting assembly 2326 can rotate about 360 degrees to permit infinite adjustment of spacing between the first and second fasteners 2322, 2344 along an axis, within a range of distances. Such adjustment permits the second roof mounting assembly 2346 to be offset from the beam 2012 by varying distances without sacrificing structural integrity of the roof mounting structure.

Figure 86:
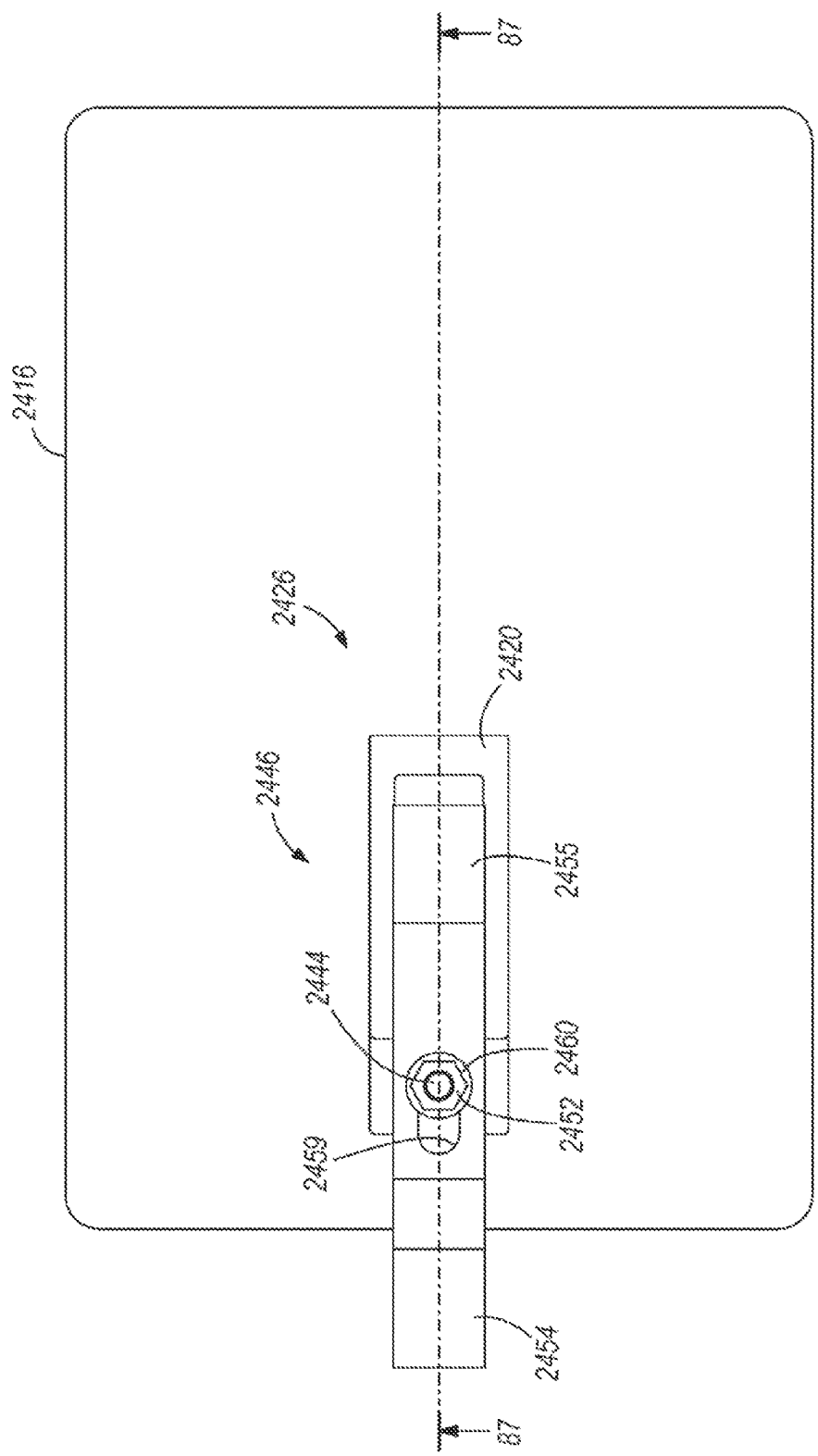
FIG. 86 is a top view of a mounting assembly according to some embodiments of the present invention.
Figure 87:
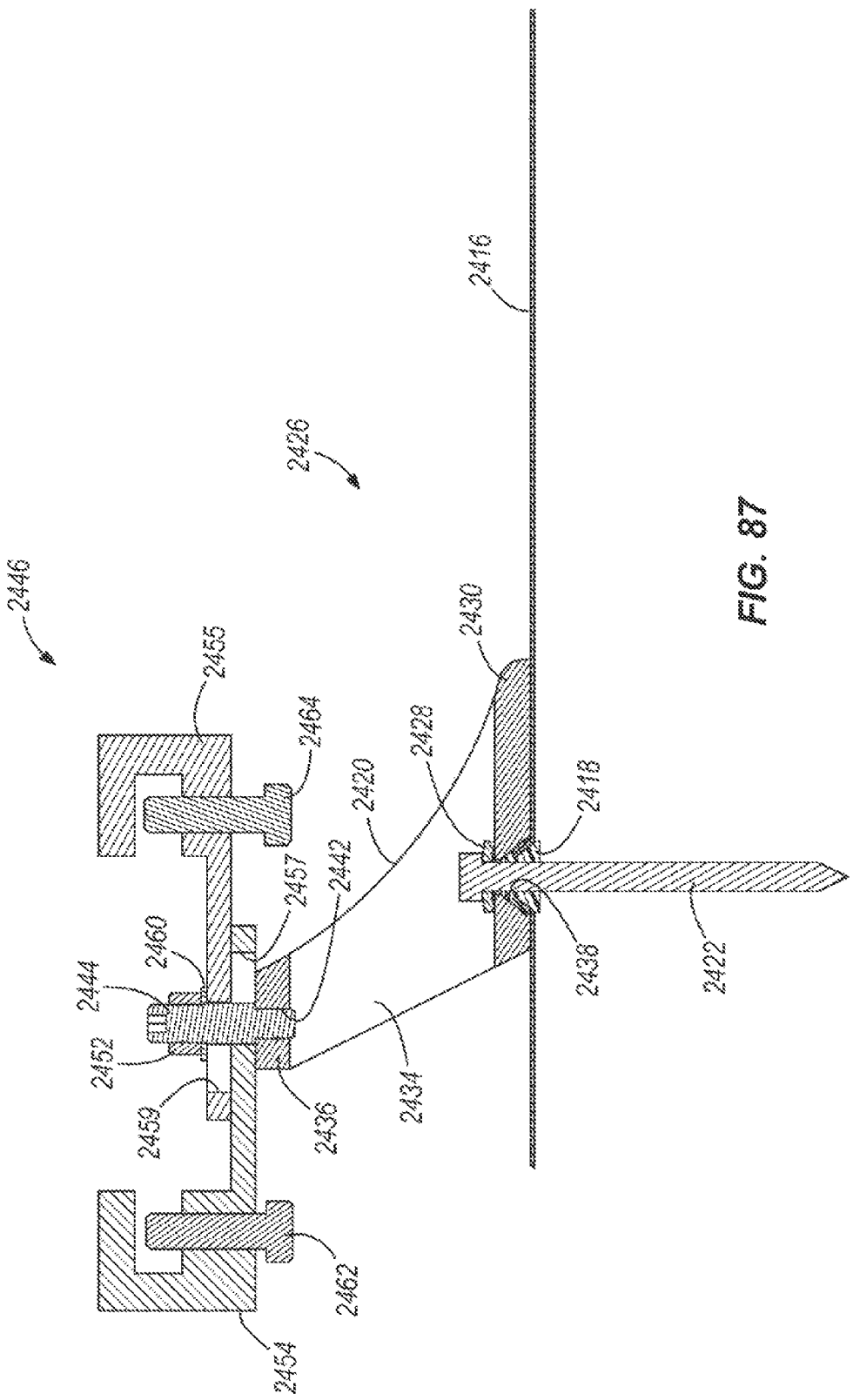
FIG. 87 is a cross-sectional view of the mounting assembly of FIG. 86, taken along line 87-87 of FIG. 86.
Figure 88:
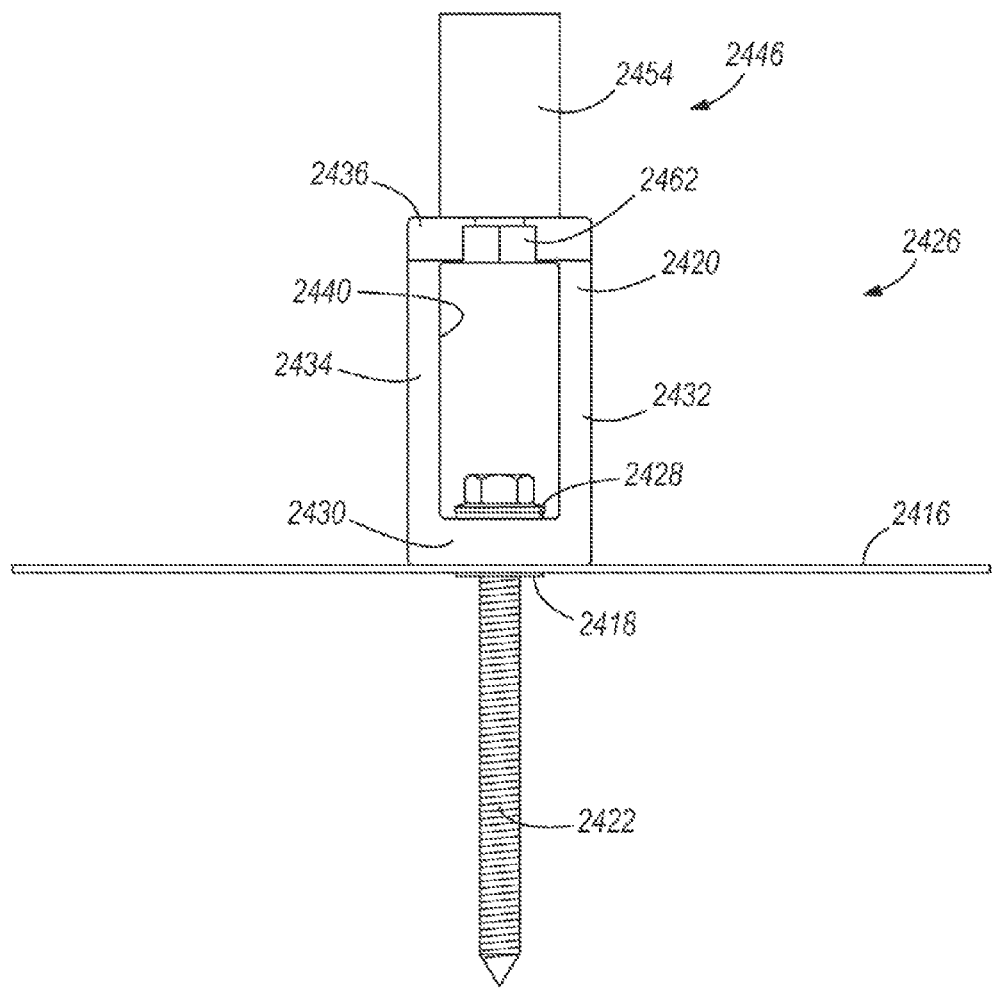
FIG. 88 is a front view of the mounting assembly of FIG. 86.

FIGS. 86-88 illustrate another embodiment of roofing assemblies 2426, 2446 according to the present invention. This embodiment employs much of the same structure and has many of the same properties as the embodiments of the roofing assemblies described above in connection with FIGS. 1-85. Accordingly, the following description focuses primarily upon structure and features that are different than the embodiments described above in connection with FIGS. 1-85. Reference should be made to the description above in connection with FIGS. 1-85 for additional information regarding the structure and features, and possible alternatives to the structure and features of the roofing assemblies 2426, 2446 illustrated in FIGS. 86-88 and described below. Features and elements in the embodiment of FIGS. 86-88 corresponding to features and elements in the embodiments described above in connection with of FIGS. 1-85 are numbered in the 2400 series of reference numbers.

The roof mounting assembly 2426 includes flashing 2416 a seal 2418, a first bracket 2420, a first fastener 2422 and a washer 2428. The flashing 2416, seal 2418, fastener 2422 and washer 2428 are similar to the flashing, seal, fastener and washer of the previously-described embodiments. Reference should be made to the description of FIGS. 1-85 for the flashing 2416, seal 2418, fastener 2422 and washer 2428.

The illustrated first bracket 2420 includes a substantially planar first end 2430, a first side arm 2432, a second side arm 2434, and a substantially planar second end 2436. The first end 2430 defines an aperture 2438 extending therethrough, through which the seal 2418 and fastener 2422 extend. The first bracket 2420 has the same general overall shape as the first bracket 2020.

The illustrated first bracket 2420 defines an aperture 2440 bound by the first end 2430, the first and second arms 2432, 2434 and the second end 2436. The illustrated aperture 2440 is substantially rectangular in cross-section. Other aperture shapes, sizes and locations can be formed by the first bracket 2420. The first bracket 2420 can be cast, extruded, molded, or otherwise formed. In some embodiments, the first bracket 2420 is formed steel, but in other embodiments, other metals or non-metallic materials can be utilized to form the first bracket 2420.

The illustrated second end 2436 defines an aperture 2442 sized to receive a second fastener 2444 therethrough. The second fastener 2444 is part of the second roof mounting assembly 2446 that further includes a nut 2452, a second bracket 2454 and a third bracket 2445. The second and third brackets 2454, 2456 each include a respective slot 2457, 2459 through which the second fastener 2444 extends. The nut 2452 retains the second and third bracket 2454, 2456 on the first bracket 2420. The illustrated embodiment includes a washer 2460 positioned between the nut 2452 and the third bracket 2456. The illustrated second and third brackets 2454, 2456 are substantially J-shaped. Other sizes, shapes and configurations can be utilized in place of the illustrated second and third brackets 2454, 2456.

The illustrated second roof mounting assembly 2446 further includes a third fastener 2462 coupled to the second bracket 2454 and a fourth fastener 2464 coupled to the third bracket 2456. The third and fourth fasteners 2462, 2464 are positioned to selectively releasably retain one or more roof mounted structures on the second and third bracket 2454, 2456.

The slots 2457, 2459 permit movement of the second and third brackets 2454, 2456 toward and away from the first fastener 2422 to provide greater flexibility for installation. Specifically, the fastener 2422 extends into one of the beams 2012 (illustrated in FIGS. 71 and 72) and supports the second roof mounting assembly 2446 spaced from the beam 2012. This provides much greater flexibility for installation of the roofing system 2010 (illustrated in FIGS. 71 and 72), such that the second roof mounting assembly 2446 can be offset from the beams 2012 and still be supported by the beams 2012. Further, the distance between the third and fourth fasteners 2462, 2464 is variable within a range, to permit the second roof mounting assembly 2446 to be coupled to any of a variety of roof mountable structures.

FIGS. 90-94 illustrate another embodiment of roofing assemblies 2526, 2546 according to the present invention. This embodiment employs much of the same structure and has many of the same properties as the embodiments of the roofing assemblies described above in connection with FIGS. 1-89. Accordingly, the following description focuses primarily upon structure and features that are different than the embodiments described above in connection with FIGS. 1-89. Reference should be made to the description above in connection with FIGS. 1-89 for additional information regarding the structure and features, and possible alternatives to the structure and features of the roofing assemblies 2526, 2546 illustrated in FIGS. 90-94 and described below. Features and elements in the embodiment of FIGS. 90-94 corresponding to features and elements in the embodiments described above in connection with of FIGS. 1-89 are numbered in the 2500 series of reference numbers.

The roof mounting assembly 2526 includes flashing 2516 a pair of seals 2518, a first bracket 2520, a first pair of fasteners 2522 and a pair of washers 2528. In some embodiments, the pair of washers 2528 include Neoprene bonded washers. The flashing 2516, seals 2518, fasteners 2522 and washers 2528 are similar to the flashing, seal, fastener and washer of the previously-described embodiments. Reference should be made to the description of FIGS. 1-89 for the flashing 2516, seals 2518, fasteners 2522 and washers 2528.

The illustrated first bracket 2520 includes a first substantially planar portion 2568 and a second substantially planar portion 2570. The first portion 2568 extends substantially perpendicular to the second portion 2570. The illustrated first bracket 2520 is substantially L-shaped. The first portion 2568 defines a pair of apertures (not shown) extending therethrough, through which the seals 2518 and fasteners 2522 extend. The first bracket 2520 can be cast, extruded, molded, or otherwise formed. In some embodiments, the first bracket 2520 is formed from steel, but in other embodiments, other metals or non-metallic materials can be utilized to form the first bracket 2520.

The second portion 2570 defines a pair of slots 2572 extending therethrough. The illustrated slots 2572 extend in a substantially vertical direction, but other shapes, sizes and orientations of slots can be formed in the first bracket 2520. The slots 2572 are sized to receive a respective one of a pair of second fastener 2544 therethrough. The pair of second fasteners 2544 is part of the second roof mounting assembly 2546 that further includes a first plate 2574, a second plate 2576 a pair of nuts 2578 and optionally, a plurality of washers 2580. The first plate 2574 includes a pair of apertures 2582 and the second plate 2576 includes a pair of apertures 2584, such that the apertures 2582, 2584 are sized to receive one of the second fasteners 2544.

The second roof mounting assembly 2546 is coupled to the first roof mounting assembly 2526 by the engagement of the fasteners 2544 in the slots 2572 in the second portion 2570 of the first bracket 2520 and the apertures 2582, 2584 in the first and second plates 2574, 2576, respectively. The pair of nuts 2578 is coupled to a respective one of the pair of fasteners 2544 to retain the fasteners 2544 in the slots 2572 and apertures 2582, 2584. The first plate 2574 is positioned on a first side of the second portion 2570 and the second plate 2576 is positioned on a second side of the second portion 2570, such that the second portion 2570 is sandwiched between the first and second plates 2574, 2576. In some embodiments, one or more of the second portion 2570, first plate 2574 and second plate 2576 include at least one textured surface. In the illustrated embodiment, the first and second sides of the second portion 2570 include serrated portions and the first plate 2574 includes a serrated portion, sized to engage the serrated portion(s) of the second portion 2570. The textured surface(s) can increase friction and thereby strength the engagement between the second portion 2570 and the first and second plates 2574, 2576.

The illustrated second plate 2576 includes a first flange 2586 and a second flange 2588. The first flange 2586 extends substantially parallel to the flashing 2516 and the second flange extends substantially perpendicular to the flashing 2516. The illustrated first and second flanges 2586, 2588 are sized and shaped to receive and support an L-shaped bar 2590. In some embodiments, the L-shaped bar 2590 is part of a structure to be mounted to a roof. In other embodiments, the L-shaped bar 2590 is sized to support a structure to be mounted to a roof. Other bars, brackets, rods, or other fixtures can be coupled to the second roof mounting assembly 2546 and the L-shaped bar 2590 is provided by way of example only.

The slots 2572 permit adjustment of the relative location of the first and second plates 2574, 2576 and thus the L-shaped bar 2590 with respect to the flashing 2516. The length and location of the slots 2572 are selected at least partially based upon the desired range of heights between the first flange 2586 and the flashing 2516. In a first position, the first flange 2586 is spaced above the flashing 2516 a first height h1, and in a second position, the first flange 2586 is spaced above the flashing 2516 a second height h2, greater than the first height h1, see FIG. 93.

Figure 95:
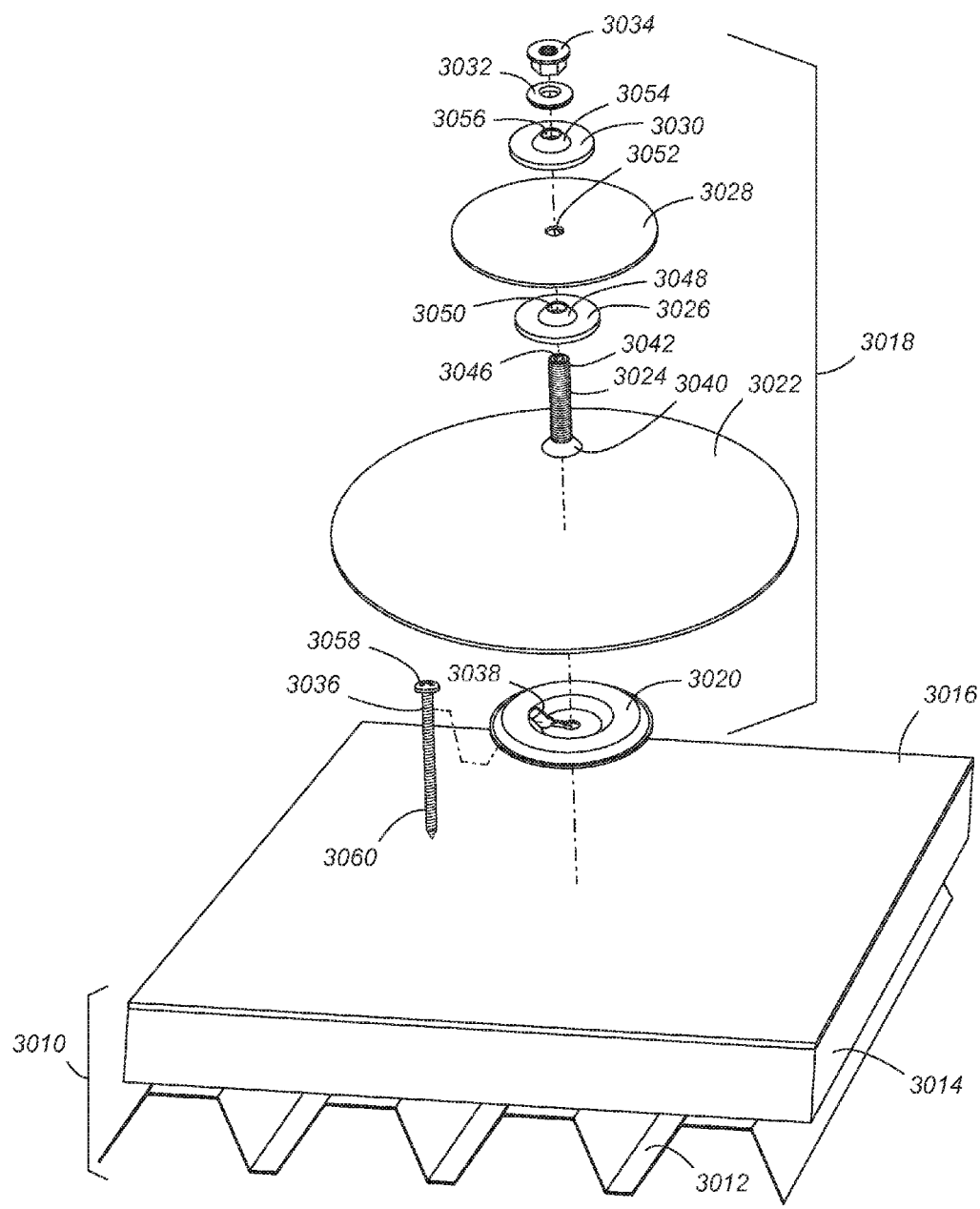
FIG. 95 is an exploded perspective view of a roof mount assembly over a roof according to some embodiments of the present invention.
Figure 96:
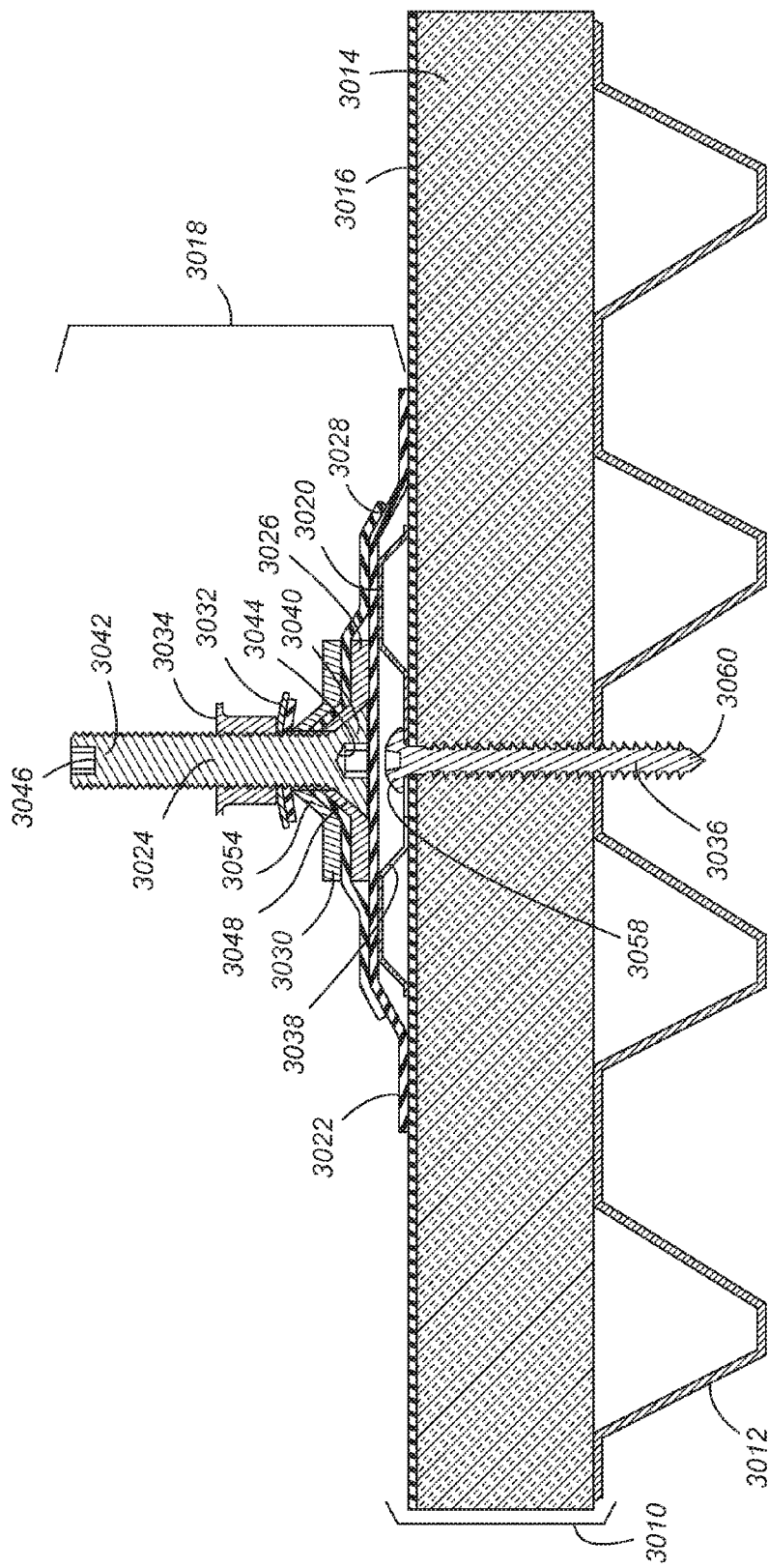
FIG. 96 is a cross-sectional view of the roof mount assembly taken along line 96-96 of FIG. 95.

FIGS. 95 and 96 illustrate another embodiment of a roofing system 3010 including a metal roof deck 3012, a roof substrate 3014 (e.g., insulation, tarpaper, plywood or other decking material, and the like) supported on the roof deck 3012, a membrane 3016 extending across the substrate 3014 (i.e., placed immediately adjacent an upper surface of the substrate 3014 or supported on one or more intermediate layers of roofing or sealing material, which in turn are placed on the substrate 3014). The roofing system 3010 can be utilized on any of a variety of roof types, such as slate roofs, membrane roofs, aluminum roofs, standing seam roofs, tile roofs, shingle roofs, and the like.

The roofing system 3010 is operable to support any of a variety of roof-mounted fixtures, such as, for example, snow fences, solar panels, conduit for solar panels, cables for lighting rods, an antenna, signs, billboards, or any of a number of other roof-mountable assemblies. Depending on one or more of the geographic location, anticipated quantity and type of precipitation, and anticipated roof and wind loading, the roofing system 3010 can include any of a variety of membrane, flashing, seal and plate arrangements, as will be discussed below.

Figure 97:
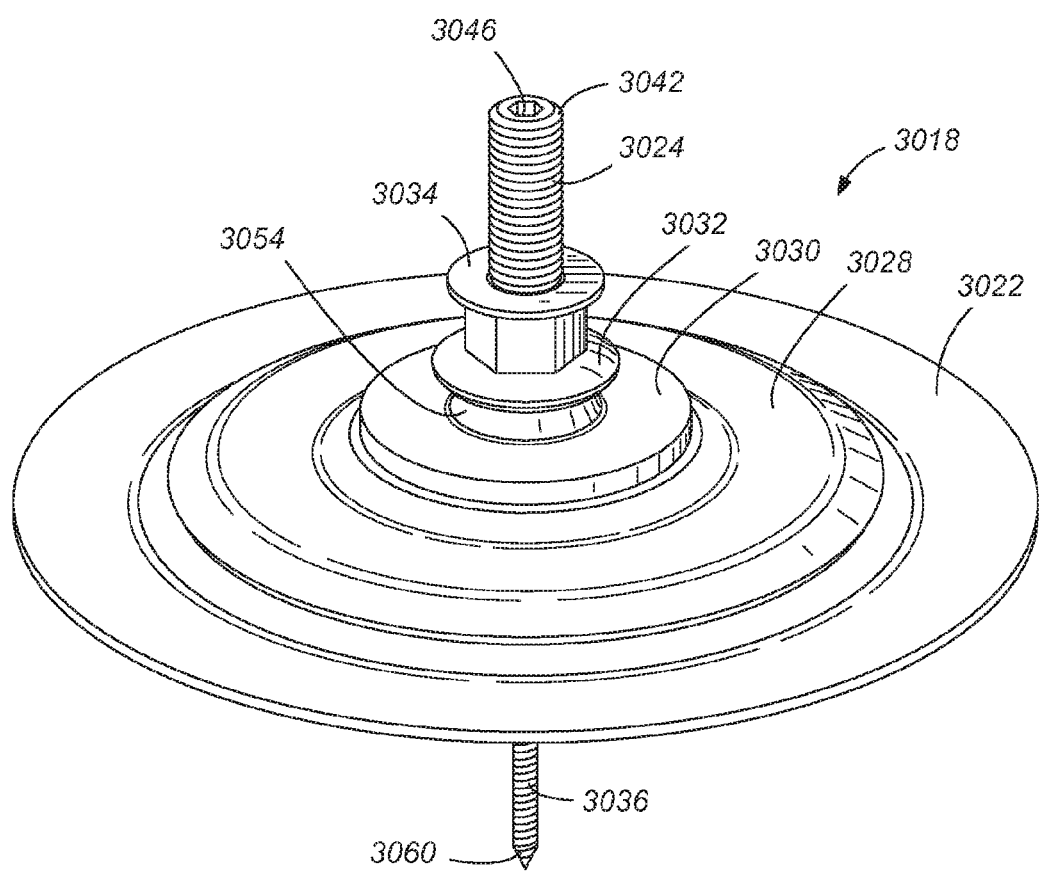
FIG. 97 is a perspective view of the roof mount assembly according to some embodiments of the present invention.

A roof attachment assembly 3018 can be coupled to the roofing system 3010 with few or no fasteners extending through the membrane 3016. One such roof attachment assembly 3018 is illustrated in FIGS. 95-97 and includes a plate 3020, a first membrane patch 3022, a first fastener 3024, a first disc 3026, a second membrane patch 3028, a second disc 3030, a washer 3032 and a nut 3034.

The roof attachment assembly 3018 can be coupled to the roofing system 3010 with any suitable non-penetrating fastening method, such as welding, adhering, gluing, bonding, and the like or by any suitable penetrating method, such as by one or more fasteners extending through the membrane 3016. The illustrated roof attachment assembly 3018 is coupled to the roofing system 3010 by at least one of a second fastener 3036 extending into the roofing system 3010 and a weld formed between the first membrane patch 3022 and the membrane 3016. The first membrane patch 3022 seals any penetrations caused by the second fastener 3036.

As illustrated in FIGS. 95 and 96, the illustrated roof attachment assembly 3018 includes a modified RhinoBond® plate as the plate 3020. The illustrated plate 3020 is metallic and includes a slot 3038. In other embodiments, the plate 3020 can include a polymeric or a ceramic material. Other plates, such as a plate provided by Centrix™ electrobonding system can be utilized. A variety of plates, discs and the like can be used in place of plate 3020 and reference is made to the discussion of FIGS. 99-101 below for some examples of suitable plates.

The roof attachment assembly 3018 is operable to support any of a variety of roof-mounted fixtures, such as snow guards, snow fences, solar panels, conduit for solar panels, cables for lighting rods, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No.

6,526,701, filed Dec. 6, 2000, the contents of both of which are herein incorporated by reference.

The first membrane patch 3022 is flexible and conformable to the contour of the plate 3020. The first membrane patch 3022 is coupleable to the membrane 3016 to substantially seal any aperture caused by the second fastener 3036. In some embodiments, the first membrane patch 3022 is a target patch that can be welded to the membrane 3016. One such welding technique is provided by Rhinobond®. Another such welding technique is provided by Centrix™ electrobonding. Other welding or coupling techniques can be utilized to affix the first membrane patch 3022 to the membrane 3016.

The illustrated first fastener 3024 includes a head 3040 and a shaft 3042 and is a socket flat head cap screw with double hex ends. The head 3040 includes a first hex socket 3044 and the shaft 3042 includes a second hex socket 3046. The illustrated head 3040 is tapered outward from the shaft 3042.

The nut 3034 is tightened onto the first fastener 3024 by a user inserting a tool, such as a hex key, into the first hex socket 3044 and by grasping the nut 3034 with a tool, such as a wrench. The first disc 3026, the second membrane patch 3028, the second disc 3030 and the washer 3032 are compressed between the head of the first fastener 3024 and the nut 3034. The first fastener 3024 is operable to support one or more roof mounted fixtures. The roof mounted fixture(s) is coupled to the first fastener 3024 and a user tightens a nut or other suitable fastener on the first fastener 3024. In order to tighten the nut, the user can insert a tool, such as a hex key, into the second hex socket 3046 to prevent the first fastener 3024 from rotating.

The illustrated first disc 3026 includes a substantially centrally located frustoconical protrusion 48 with an aperture 3050. The illustrated first disc 3026 is metallic, but in other embodiments, can include plastic, ceramic or a combination of plastic, ceramic and metal.

The illustrated second membrane patch 3028 includes a substantially centrally located aperture 3052. The second membrane patch 3028 is flexible and conformable to the frustoconical protrusion 3048. The illustrated frustoconical protrusion 3048 substantially corresponds to the outwardly tapered head 3040 of the first fastener 3024. The second membrane patch 3028 is coupleable to the first membrane patch 3022 to form a substantially water-tight seal.

The illustrated second disc 3030 is substantially identical to the illustrated first disc 3026. The illustrated second disc 3030 includes a substantially centrally located frustoconical protrusion 3054 with an aperture 3056. The illustrated frustoconical protrusion 3054 substantially corresponds to the frustoconical protrusion 48 and the outwardly tapered head 3040 of the first fastener 3024. The illustrated second disc 3030 is metallic, but in other embodiments, can include plastic, ceramic or a combination of plastic, ceramic and metal. In some embodiments, at least of the first disc 3026 and the second disc 3030 can be omitted.

The illustrated washer 3032 is a bonded washer that includes a metallic portion and a polymeric portion. Other washers or similar configurations can be utilized in place of the illustrated washer 3032.

The illustrated nut 3034 is a flange nut having a hexagonal portion and a circular portion. Other nuts or fastening devices can be utilized in place of the illustrated nut 3034.

When the roof attachment assembly 3018 is assembled, the first fastener 3024 extends through the aperture 3050 of the first disc 3026, the aperture 3052 of the second membrane patch 3028, the aperture 3056 of the second disc 3030, the washer 3032 and the nut 3034. The second membrane patch 3028 is compressed between the first disc 3026 and the second disc 3030 and is deformed by the frustoconical protrusions 3050 and 3056. The second membrane patch 3028 is connected to the first membrane patch 3022, and the plate 3020 is connected to the first membrane patch 3022, for example by welding. The plate 3020, the first membrane patch 3022, the first fastener 3024, the first disc 3026, the second membrane patch 3028, the second disc 3030, the washer 3032 and the nut 3034 are coupled to form the roof attachment assembly 3018 as a single unit, as illustrated in FIGS. 95-97.

The first fastener 3024 and the first disc 3026 are not welded or fixed to either the first membrane patch 3022 or the second membrane patch 3028. Rather, the first fastener 3024 and the first disc 3026 are free to move with respect to the first membrane patch 3022 and with respect to the second membrane patch 3028. Further, the second disc 3030 is not welded or fixed to the second membrane patch 3028. Rather, the second disc 3030 is free to move with respect to the second membrane patch 3028.

The second fastener 3036 includes a head 3058 and a shaft 3060. The head 3058 has a diameter that is substantially larger than a diameter of the shaft 3060.

The roof attachment assembly 3018 is coupled to the roofing system 3010 by the second fastener 3036 extending through the slot 3038 and into the roofing system 3010 and by connecting (for example, welding) the first membrane patch 3022 to the plate 3020 and to the membrane 3016. When the roof attachment assembly 3018 is coupled to the roofing system 3010, the first mode of failure is pulling the first disc 3026 through the second membrane patch 3028. The first mode of failure is accomplished by either stretching the second membrane patch 3028 to permit the first disc 3026 to escape through the aperture 3052 of the second membrane patch 3028 or by tearing of the second membrane patch 3028. In one trial, and given by way of example only, the first failure mode occurs around about 250 pounds of force pulling the roof attachment assembly 3018 off of the roofing system 3010. In contrast, the weld formed between the membrane 3016 and the first membrane patch 3022 and/or the weld formed between the first membrane patch 3022 and the second membrane patch 3026 fails around about 500 lbs force pulling the roof attachment assembly 3018 off of the roofing system 3010. The configuration of the present application designs the roof attachment assembly 3018 to fail in such a way as to avoid damage to the roofing system 3010.

In some embodiments, the second membrane patch 3028 stretches from between one to two inches without tearing, and without permanently deforming. Specifically, after stretching from between about one to two inches, the second membrane patch 3028 reassumes the previous shape. Such stretching provides resilience in windy climates and in locations with seismic activity. In some embodiments, the second membrane patch 3028 can stretch about one-half inch laterally and about one inch axially (along an axis of the first fastener 3024) without breaking or permanently deforming.

Figure 98:
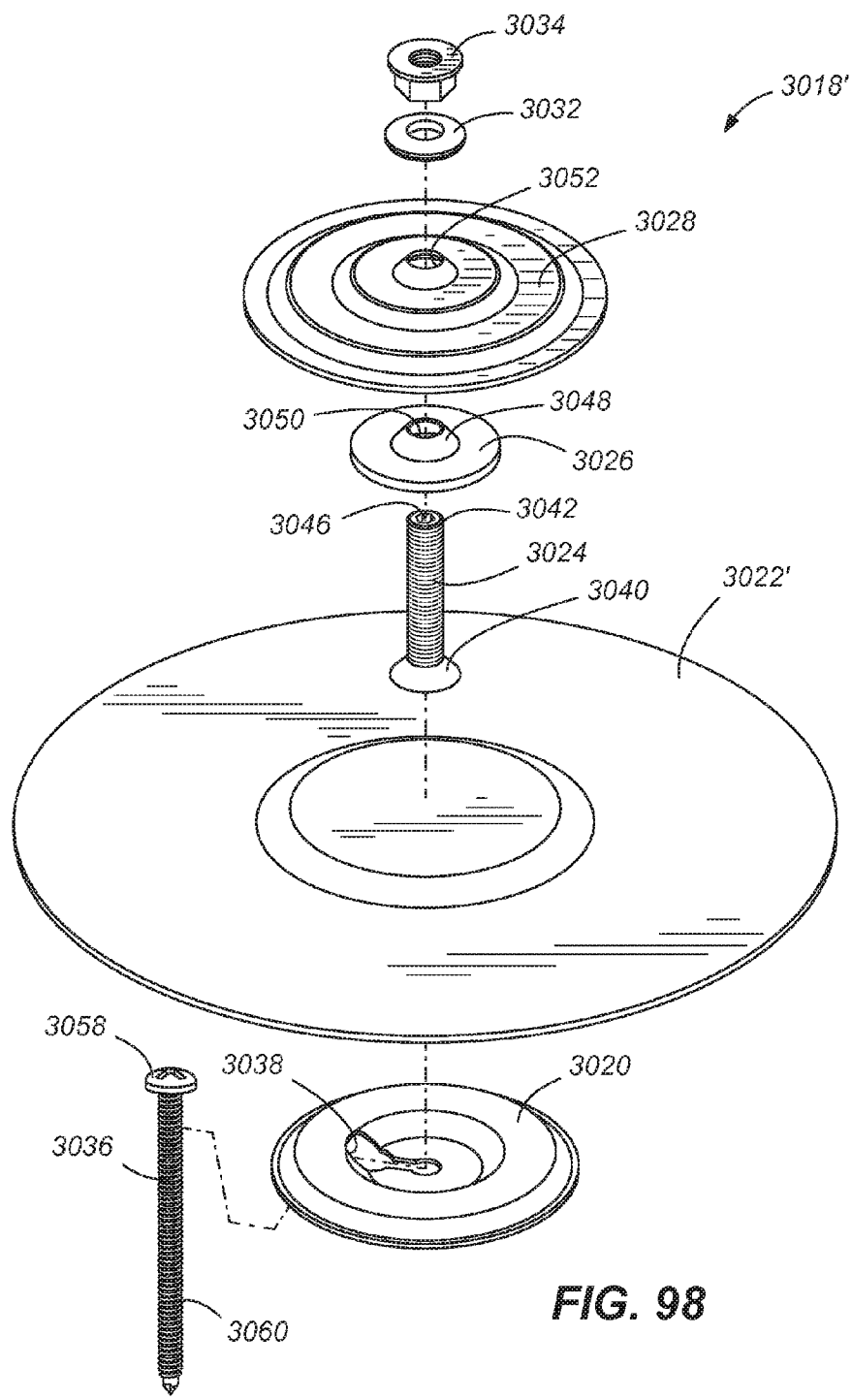
FIG. 98 is an exploded perspective view of a roof mount assembly according to some embodiments of the present invention.

An alternative embodiment of a roof attachment assembly 3018' is illustrated in FIG. 98. The roof attachment assembly 3018' is similar to the roof attachment assembly 3018 and only the differences will be discussed in detail herein. The components which are identical are given the same numeral used in FIGS. 95-97 and the components which differ are given a prime (') after the numeral used in FIGS. 95-97. The primary difference is that the roof attachment assembly 3018' omits the second disc 3030. Another difference is that the first membrane patch 3022' has a greater diameter than the first membrane patch 3022. The first membrane patch 3022' and the second membrane patch 3028 of FIG. 98 are shown with the deformations or contours that are formed when the roof attachment assembly 3018' is assembled.

Figure 99:
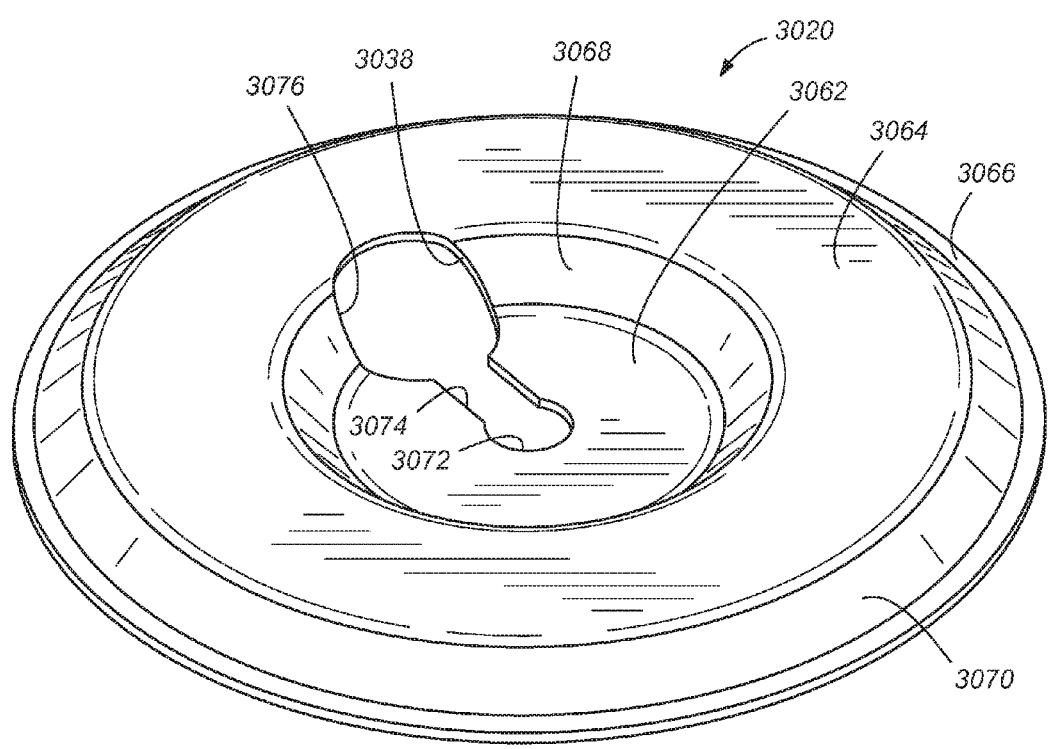
FIG. 99 is a perspective view of a plate from the roof mount assembly according to some embodiments of the present invention.

FIG. 99 more clearly illustrates the plate 3020 with the slot 3038 of the embodiments shown in FIGS. 95-98. The plate 3020 includes a central recessed portion 3062, a middle raised portion 3064 and an outer recessed portion 3066. The middle raised portion 3064 is substantially ring-shaped and substantially encircles the central recessed portion 3062. The middle raised portion 3064 is positioned in a plane that is spaced from a plane defined by the central recessed portion 3062. A first tapered portion 3068 extends between the central recessed portion 3062 and the middle raised portion 3064. The outer recessed portion 3066 is substantially ring-shaped and substantially encircles the central recessed portion 3062 and the middle raised portion 3064. The outer recessed portion 3066 is positioned in a plane that is spaced from the plane defined by the middle raised portion 3064. In the illustrated embodiment, the central recessed portion 3062 and the outer recessed portion 3066 are substantially co-planar. A second tapered portion 3070 extends between the middle raised portion 3064 and the outer recessed portion 3066.

The slot 3038 includes a first slot portion 3072, a second slot portion 3074 and a third slot portion 3076. The illustrated first slot portion 3072 is positioned in the central recessed portion 3062, is substantially centrally located and is substantially circular. The illustrated second slot portion 3074 is substantially linear, extends radially along the central recessed portion 3062 and is connected to the first slot portion 3072. The illustrated third slot portion 3076 is connected to the second slot portion 3074 and extends from the central recessed portion 3062, across the first tapered portion 3068 and onto the middle raised portion 3064. The first slot portion 3072 defines a first width (which is a diameter in the illustrated embodiment), the second slot portion 3074 defines a second width and the third slot portion 3076 defines a third width. The first width is greater than the second width and the third width is greater than the first width and is greater than the second width. The first width is wider than the shaft 3060 of the second fastener 3036, but is narrower than the head 3058 of the second fastener 3036. The second width is substantially identical to the shaft 3060 of the second fastener 3036 and is narrower than the head 3058 of the second fastener 3036. The third width is wider than both the shaft 3060 and the head 3058 of the second fastener 3036. The second fastener 3036 is insertable through the third slot portion 3076, along the second slot portion 3074 and into the first slot portion 3072. The slot 3038 is sized to receive the second fastener 3036 after the second fastener 3036 has been installed in the roofing system 3010.

Installation of the roof attachment assembly 3018, 3018' on the roofing system 3010 according to some embodiments is accomplished by the following steps: installing the second fastener 3036 into the roofing system 3010, positioning the assembled roof attachment assembly 3018, 3018' proximate the second fastener 3036, lifting a portion of the first membrane patch 3022 to expose the slot 3038, inserting the head 3058 of the second fastener 3036 through the third slot portion 3076, sliding the shaft 3060 of the second fastener 3036 along the second slot portion 3074 until the shaft 3060 abuts the first slot portion 3072, and welding the first membrane patch 3022 to the membrane 3016. In some embodiments, the roof attachment assembly 3018, 3018' is oriented such that the slot 3038 is positioned on a downhill part of the roof (such as when the roofing system 3010 is sloped).

Figure 100:
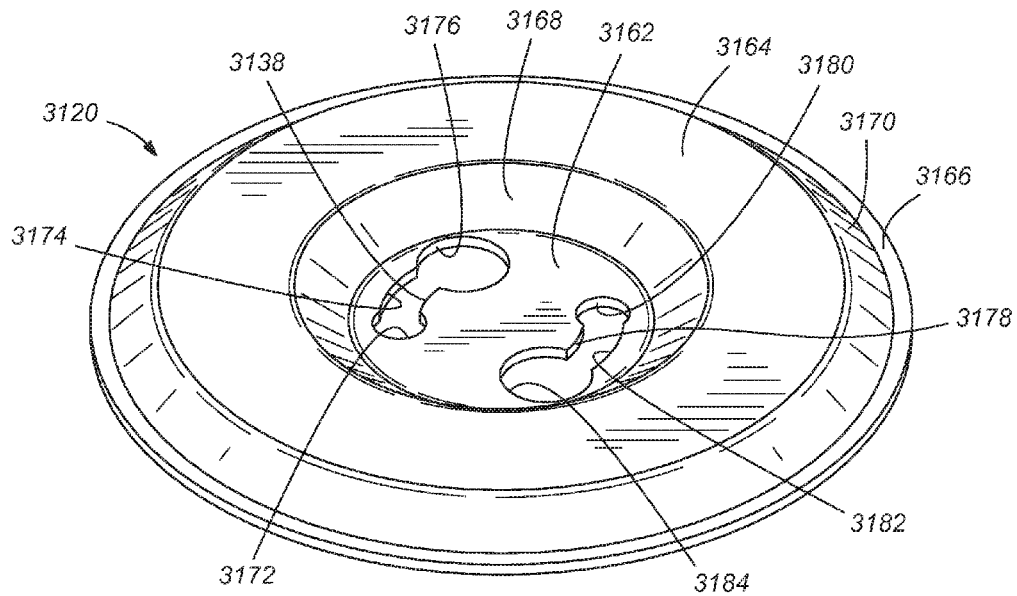
FIG. 100 is a top view of a plate for a roof mount assembly according to some embodiments of the present invention.

Other configurations of plates can be utilized in place of the plate 3020. FIG. 100 illustrates a plate 3120 that has a similar overall shape of plate 3020. Specifically, the plate 3120 includes a central recessed portion 3162, a middle raised portion 3164 and an outer recessed portion 3166. The middle raised portion 3164 is substantially ring-shaped and substantially encircles the central recessed portion 3162. The middle raised portion 3164 is positioned in a plane that is spaced from a plane defined by the central recessed portion 3162. A first tapered portion 3168 extends between the central recessed portion 3162 and the middle raised portion 3164. The outer recessed portion 3166 is substantially ring-shaped and substantially encircles the central recessed portion 3162 and the middle raised portion 3164. The outer recessed portion 3166 is positioned in a plane that is spaced from the plane defined by the middle raised portion 3164. In the illustrated embodiment, the central recessed portion 3162 and the outer recessed portion 3166 are substantially co-planar. A second tapered portion 3170 extends between the middle raised portion 3164 and the outer recessed portion 3166.

The illustrated plate 3120 includes a first slot 3138 having a first slot portion 3172, a second slot portion 3174 and a third slot portion 3176 and a second slot 3178 having a first slot portion 3180, a second slot portion 3182 and a third slot portion 3184. The first slot 3138 and the second slot 3178 are defined in the central recessed portion 3162. The plate 3120 is connected to the remaining components of the roof attachment assembly 3018, 3018' to form a single assembled unit.

The first slot 3138 is substantially identical to the second slot 3178 and is circumferentially offset from the second slot 3178. Only the first slot 3138 will be discussed in detail herein, but the discussion equally applies to the second slot 3178. The illustrated first slot portion 3172 is positioned in the central recessed portion 3162 and is substantially circular. The illustrated second slot portion 3174 is substantially arcuate, extends along the central recessed portion 3162 and is connected to the first slot portion 3172. The illustrated third slot portion 3176 is connected to the second slot portion 3174 and is positioned on the central recessed portion 3162. The first slot portion 3172 defines a first width (which is a diameter in the illustrated embodiment), the second slot portion 3174 defines a second width and the third slot portion 3176 defines a third width. The first width is greater than the second width and the third width is greater than the first width and is greater than the second width. The first width is wider than the shaft 3060 of the second fastener 3036, but is narrower than the head 3058 of the second fastener 3036. The second width is substantially identical to the shaft 3060 of the second fastener 3036 and is narrower than the head 3058 of the second fastener 3036. The third width is wider than both the shaft 3060 and the head 3058 of the second fastener 3036. The second fastener 3036 is insertable through the third slot portion 3176, along the second slot portion 3174 and into the first slot portion 3172. The first slot 3138 is sized to receive the second fastener 3036 after the second fastener 3036 has been installed in the roofing system 3010.

Installation of the roof attachment assembly 3018, 3018' with the plate 3120 on the roofing system 3010 according to some embodiments is accomplished by the following steps: installing two of the second fasteners 3036 into the roofing system 3010 spaced apart from one another, positioning the roof attachment assembly 3018, 3018' with the plate 3120 above the second fasteners 3036, lowering the roof attachment assembly 3018, 3018' onto the roofing system 3010 such that the second fasteners 3036 are received in the respective first and second slots 3138, 3178, rotating the roof attachment assembly 3018, 3018' with the plate 3120 such that the second fasteners 3036 move from the first slot portions 3176, 3184, along the second slot portions 3174, 3182 and into the first slot portions 3172, 3180, respectively, and welding the first membrane patch 3022 onto the membrane 3016.

Figure 101:
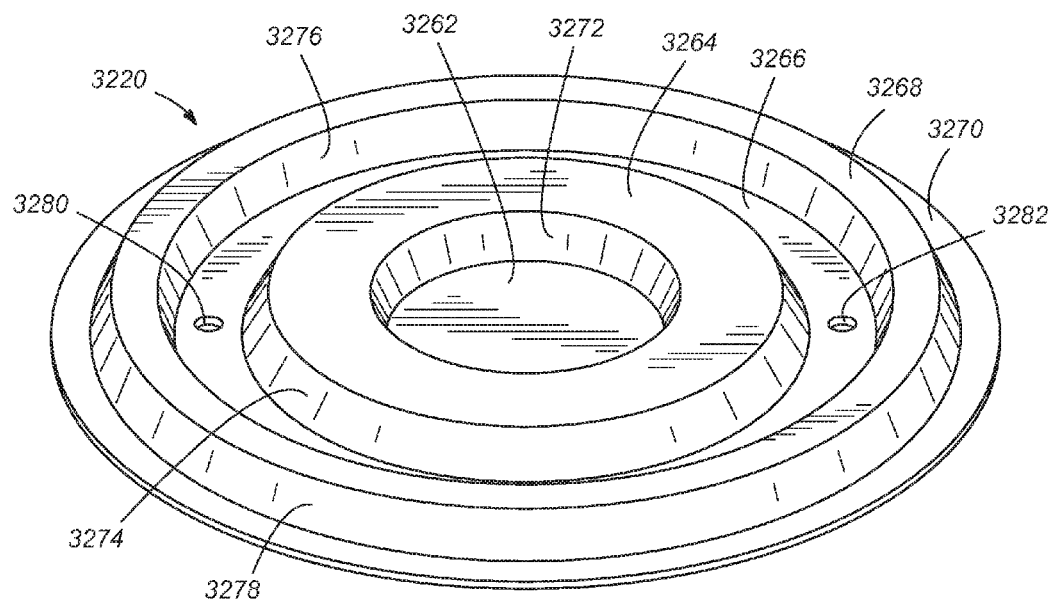
FIG. 101 is a perspective cross-sectional view of a plate for a roof mount assembly according to some embodiments of the present invention.

Another plate 3220 that is useable with the roof attachment assembly 3018, 3018' is illustrated in FIG. 101. The plate 3220 includes a first recessed portion 3262, a first raised portion 3264, a second recessed portion 3266, a second raised portion 3268 and a third recessed portion 3270.

The first recessed portion 3262 is substantially centrally located in the plate 3220 and is substantially circular.

The first raised portion 3264 is substantially ring-shaped and substantially encircles the first recessed portion 3262. The first raised portion 3264 is positioned in a plane that is spaced from a plane defined by the first recessed portion 3262. A first tapered portion 3272 extends between the first recessed portion 3262 and the first raised portion 3264.

The second recessed portion 3266 is substantially ring-shaped and substantially encircles the first recessed portion 3262 and the first raised portion 3264. The second recessed portion 3266 is positioned in a plane that is spaced from the plane defined by the first raised portion 3264. In the illustrated embodiment, the first recessed portion 3262 and the second recessed portion 3266 are substantially co-planar. A second tapered portion 3274 extends between the first raised portion 3264 and the second recessed portion 3266.

The second raised portion 3268 is substantially ring-shaped and substantially encircles the first recessed portion 3262, the first raised portion 3264 and the second recessed portion 3266. The second raised portion 3268 is positioned in a plane that is spaced form the plane defined by the first and second recessed portions 3262 and 3266. In the illustrated embodiment, the first raised portion 3264 and the second raised portion 3268 are substantially co-planar. A third tapered portion 3276 extends between the second recessed portion 3266 and the second raised portion 3268.

The third recessed portion 3270 is substantially ring-shaped and substantially encircles the first recessed portion 3262, the first raised portion 3264, the second recessed portion 3266 and the second raised portion 3268. The third recessed portion 3270 is positioned in a plane that is spaced from the plane defined by the first and second raised portions 3264 and 3268. In the illustrated embodiment, the first recessed portion 3262, the second recessed portion 3266 and the third recessed portion 3270 are substantially co-planar. A fourth tapered portion 3278 extends between the second raised portion 3268 and the third recessed portion 3270.

The illustrated plate 3220 defines a first aperture 3280 and a second aperture 3282 defined in the second recessed portion 3266. Other apertures can be formed in the second recessed portion (to have three, four or more total apertures). Also, one or more apertures can be provided in other portions of the plate 3220. The plate 3220 is connected to the remaining components of the roof attachment assembly 3018, 3018' to form a single assembled unit.

Installation of the roof attachment assembly 3018, 3018' with the plate 3220 on the roofing system 3010 according to some embodiments is accomplished by the following steps: positioning the roof attachment assembly 3018, 3018' with the plate 3220 on the roofing system 3010, lifting a first portion of the first membrane patch 3022 to expose the first aperture 3280, inserting one second fastener 3036 into the first aperture 3280 and installing the second fastener 3036 in the roofing system 3010, lifting a second portion of the first membrane patch 3022 to expose the second aperture 3282, inserting another second fastener 36 into the second aperture 282 and installing the second fastener 3036 in the roofing system 3010, and welding the first membrane patch 3022 onto the membrane 3016.

Other shapes and quantities of recessed portions and raised portions can be utilized and the plates 3020, 3120, 3220 illustrated in FIGS. 99-101 are given by way of example only.

Although the illustrated roof attachment assembly 3018, 3018' is substantially circular, other shapes are possible. For example, the roof attachment assembly 3018 can be square, ovular, round, rectangular, triangular, pentagonal or other regular or non-regular shape.

Figure 102:
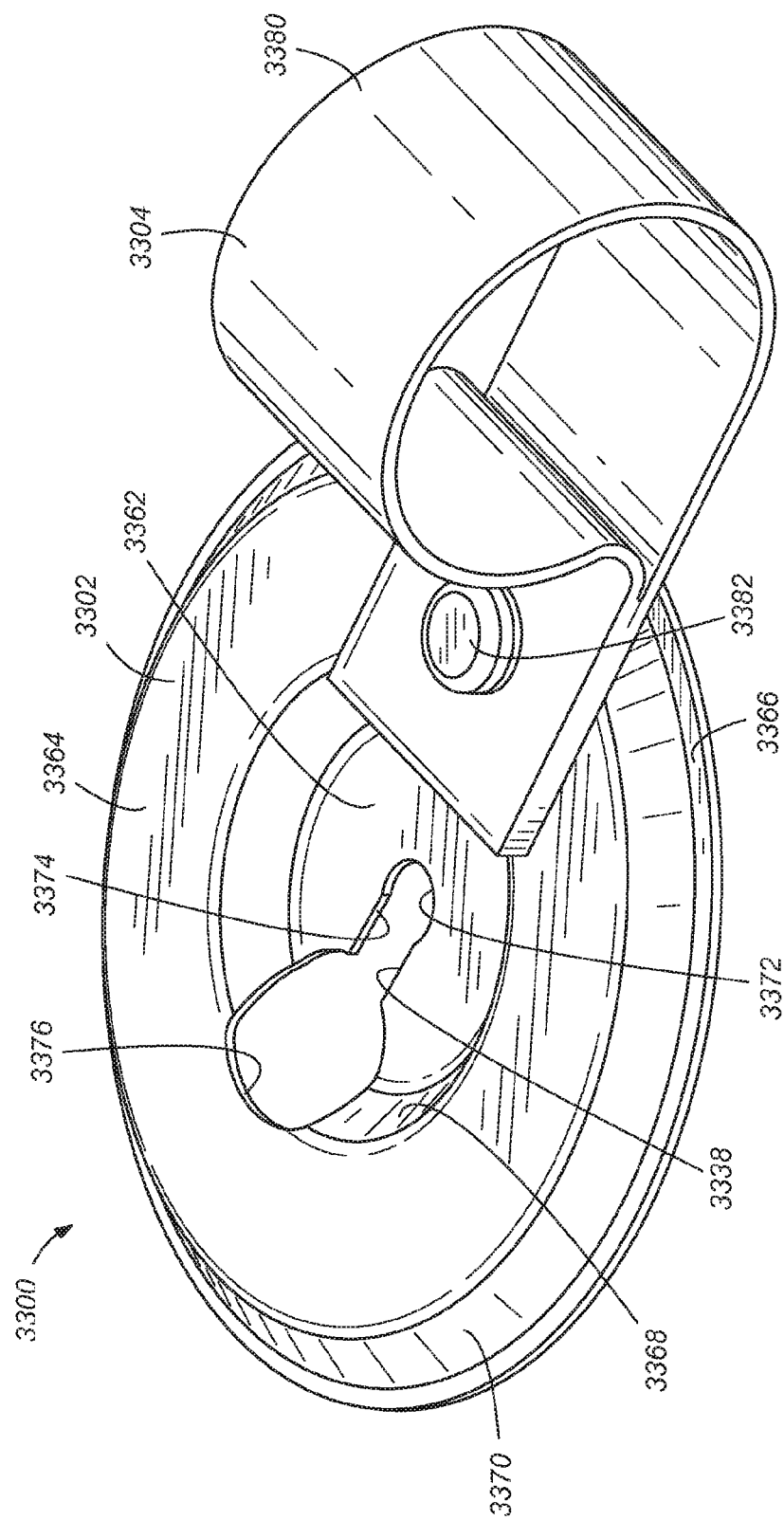
FIG. 102 is a perspective view of a screw depth measuring tool according to some embodiments of the present invention.

In some embodiments, a gauge can be utilized to assure that the second fastener(s) 3036 are drilled to the proper depth, thereby leaving a sufficient amount of the shaft 3060 above the roofing system 3010 to permit the plate 3020, 3120 to be installed on the second fastener(s) 3036. One such gauge 3300 is illustrated in FIG. 102. The illustrated gauge 3300 includes a plate portion 3302 which is similar to the plate 3020, and a handle 3304. The plate portion 3302 defines a slot 3338 and includes a central recessed portion 3362, a middle raised portion 3364 and an outer recessed portion 3366. The middle raised portion 3364 is substantially ring-shaped and substantially encircles the central recessed portion 3362. The middle raised portion 3364 is positioned in a plane that is spaced from a plane defined by the central recessed portion 3362. A first tapered portion 3368 extends between the central recessed portion 3362 and the middle raised portion 3364. The outer recessed portion 3366 is substantially ring-shaped and substantially encircles the central recessed portion 3362 and the middle raised portion 3364. The outer recessed portion 3366 is positioned in a plane that is spaced from the plane defined by the middle raised portion 3364. In the illustrated embodiment, the central recessed portion 3362 and the outer recessed portion 3366 are substantially co-planar. A second tapered portion 3370 extends between the middle raised portion 3364 and the outer recessed portion 3366.

The slot 3338 includes a first slot portion 3372, a second slot portion 3374 and a third slot portion 3376. The illustrated first slot portion 3372 is positioned in the central recessed portion 3362, is substantially centrally located and is substantially circular. The illustrated second slot portion 3374 is substantially linear, extends radially along the central recessed portion 3362 and is connected to the first slot portion 3372. The illustrated third slot portion 3376 is connected to the second slot portion 3374 and extends from the central recessed portion 3362, across the first tapered portion 3368 and onto the middle raised portion 3364. The first slot portion 3372 defines a first width (which is a diameter in the illustrated embodiment), the second slot portion 3374 defines a second width and the third slot portion 3376 defines a third width. The first width is greater than the second width and the third width is greater than the first width and is greater than the second width. The first width is wider than the shaft 3360 of the second fastener 3336, but is narrower than the head 3358 of the second fastener 3336. The second width is substantially identical to the shaft 3360 of the second fastener 3336 and is narrower than the head 3358 of the second fastener 3336. The third width is wider than both the shaft 3360 and the head 3358 of the second fastener 3336.

The illustrated handle 3304 includes a loop of material 3380 and is coupled to the plate portion 3302 with a fastener 3382. Other shapes, sizes and configurations can be utilized in place of the illustrated handle 3304, as long as it is graspable by a user to move the gauge 3300.

A user can grasp the handle 3304 while installing one of the second fasteners 3036 through the first slot portion 3372, such that the second fastener 3036 is positioned at an appropriate depth in the roofing system 3010. Then, the user can move the plate 3320 with respect to the roofing system 3010 to slide the second fastener 3036 along the second slot portion 3374 and through the third slot portion 3376 to remove the plate 3320 from the second fastener 3036. The gauge 3300 can be used multiple times to properly calibrate the distance the head 3058 between the second fastener 3036 and the roofing system 3010 required to permit installation of the plate 3020, 3120 on the second fastener 3036.

Figure 103:
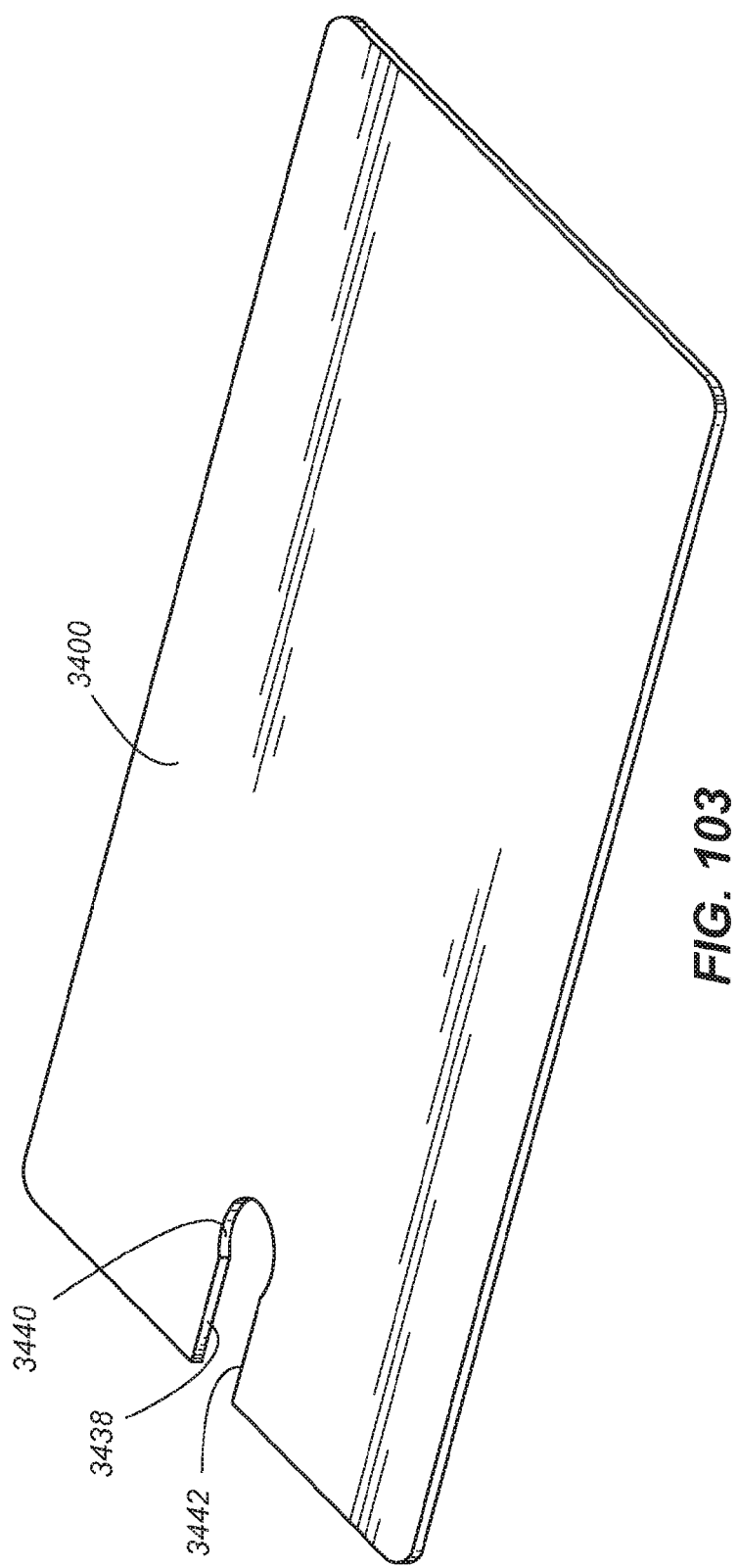
FIG. 103 is a perspective view of a screw depth measuring tool according to some embodiments of the present invention.

Another embodiment of a gauge 3400 is illustrated in FIG. 103. The illustrated gauge 3400 is a planar and is substantially rectangular in shape. The illustrated gauge 3400 defines a slot 3438 having a first slot portion 3440 and a second slot portion 3442. The illustrated first slot 3438 is sized to receive the shaft 3060 of the second fastener 3036 therethrough, but is smaller than the head 3058 of the second fastener 3036. In some embodiments, the gauge 3400 is approximate the size of a credit card, to permit a user to store the gauge 3400 in a pocket or wallet.

A user can grasp the gauge 3400 while installing one of the second fasteners 3036 through the first slot portion 3440, such that the second fastener 3036 is positioned at an appropriate depth in the roofing system 3010. Then, the user can move the gauge 3400 with respect to the roofing system 3010 to slide the second fastener 3036 along the second slot portion 3442 and out of the slot 3438 to remove the gauge 3400 from the second fastener 3036. The gauge 3400 can be used multiple times to properly calibrate the distance the head 3058 between the second fastener 3036 and the roofing system 3010 required to permit installation of the plate 3020, 3120 on the second fastener 3036.

Figure 104:
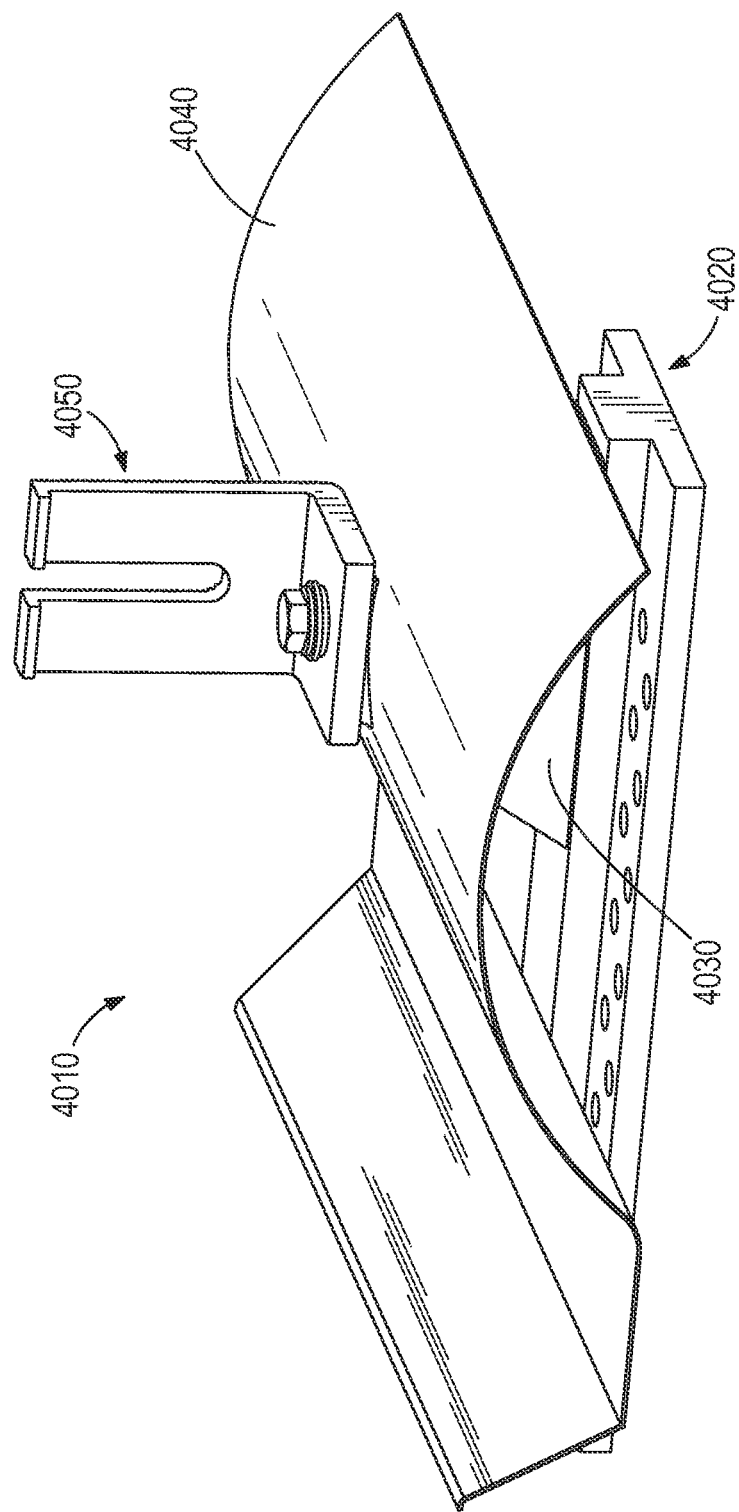
FIG. 104 is a perspective view of a tile mount assembly according to another embodiment.
Figure 105:
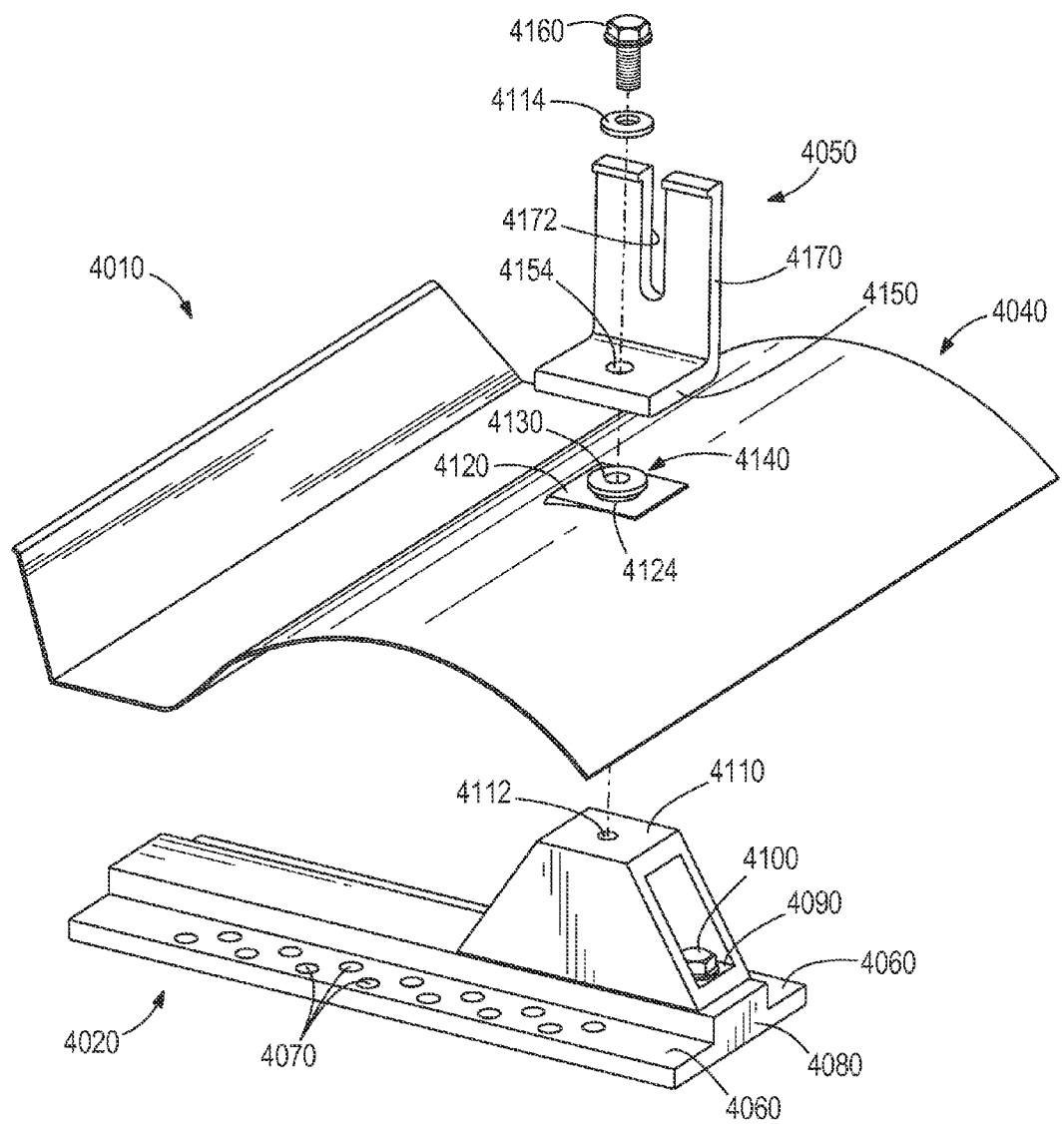
FIG. 105 is an exploded view of the tile mount assembly of FIG. 104.
Figure 106:
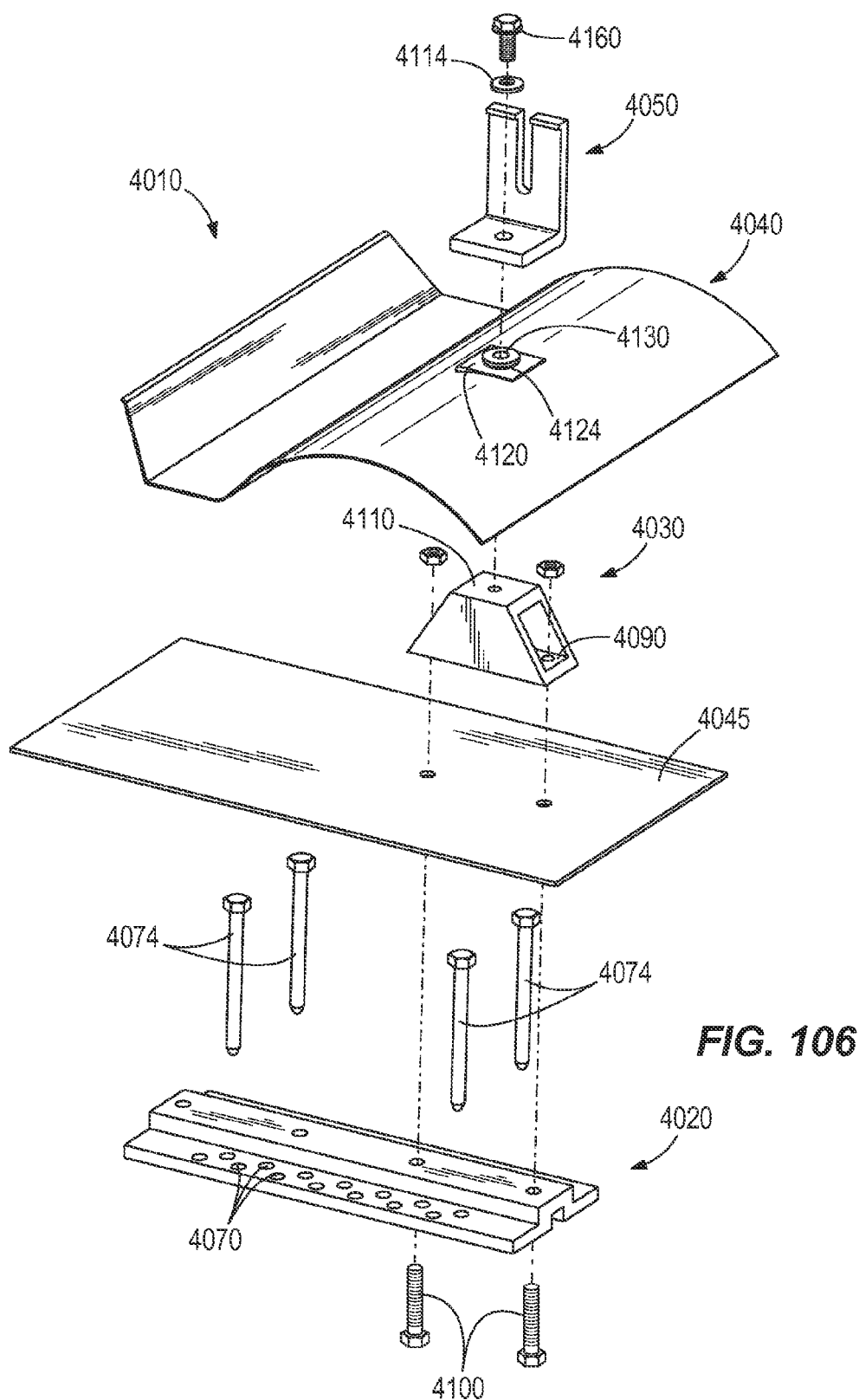
FIG. 106 is an exploded view of a tile mount assembly according to another embodiment.

FIGS. 104 and 105 illustrate a tile mount assembly 4010 for a solar panel (not shown) according to another embodiment. The tile mount assembly 4010 is coupled to an upper surface of a roof 4012 (see FIG. 111). The tile mount 4010 includes a base 4020, a block or standoff 4030, a flashing 4040, and a bracket 4050. As best shown in FIGS. 105 and 106, the base 4020 includes a pair of flanges 4060 including multiple holes 4070 for receiving fasteners 4074 (FIG. 106), such as a nail or screw. The flanges 4060 extend longitudinally along the base 4020. Due to the multiple holes, the base 4020 may be adjusted or moved parallel to its longitudinal axis so that the base 4020 can be positioned and secured to the roof 4015 in a desired spot (e.g., such that a fastener 4074 is anchored to a roof joist).

Figure 107:
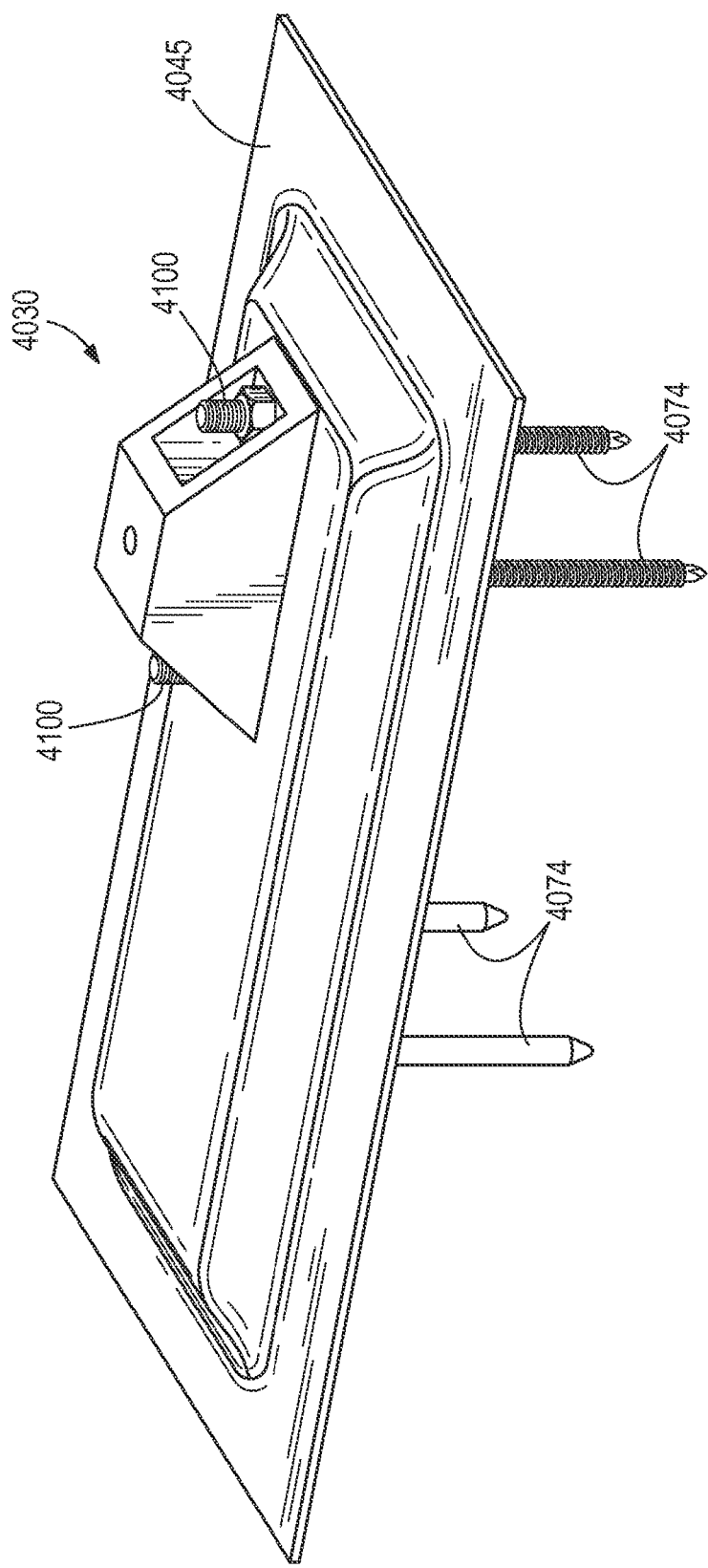
FIG. 107 is a perspective view of a standoff and a secondary flashing member.

A central portion 4080 of the base 4020 supports the standoff 4030. In the illustrated embodiment, the standoff 4030 is a trapezoidal-shaped member including flat surfaces 4090 on each end for receiving a fastener 4100 to couple the standoff 4030 to the central portion 4080 of the base 4020. The standoff 4030 also includes a flat top surface 4110. In one embodiment (FIG. 105), the standoff 4030 is directly coupled to the base 4020. In another embodiment (FIG. 106), a secondary or additional piece of flashing 4045 is inserted between the standoff 4030 and the base 4020 to act as a shield from ice and water. In still another embodiment (FIG. 107), the additional flashing 4045 is formed to conform to the shape of the base 4020 to provide a better seal against the roof surface. Also, in the embodiment of FIG. 105, the top surface 4110 includes an opening 4112 for receiving a fastener 4160 to couple the bracket 4050 to the standoff 4030; in other embodiments, the fastener 4160 extends upwardly from the top surface 4110. Furthermore, in the illustrated embodiment, the assembly 4010 includes a washer 4114, which may include an bonded EPDM-stainless steel washer.

Referring again to FIGS. 105 and 106, the flashing 4040 includes an embossed portion or boss 4120 for mating with the top surface 4110 of the standoff 4030. In the illustrated embodiment, the boss 4120 is positioned at or near a peak of the flashing 4040. A hole 4130 extends through the boss 4120 having a frustoconical protrusion 4124 (FIG. 105) and a grommet or seal 4140 is positioned within the hole 4130. The bracket 4050 includes a base portion 4150 that is coupled to the boss 4120 (e.g., by a fastener 4160 extending through the hole 4130 and seal 4140), and an upright portion 4170 for supporting the solar panel (not shown). In the illustrated embodiment, the base portion 4150 includes a countersink hole 4154 to accommodate the frustoconical protrusion 4124 and seal 4140. In some embodiments, the bracket 4050 has a substantially L-shaped cross-section and includes a slot 4172 for receiving a fastener (not shown) connected to a solar panel. The slot 4172 accommodates various positions of the fastener, providing a mechanism for adjusting the height of the solar panel relative to the flashing 404 and/or adjacent roof tiles. At least one surface of the upright portion 4170 is scored or serrated to provide a surface to grip or engage the solar panel.

In one embodiment, the seal 4140 is press fit into the hole 4130 and includes a flange portion extending outwardly around the hole 4130. The seal 4140 is compressed against the frustoconical protrusion 4124 when the bracket base portion 4150 is tightened against the boss 4120. The operation of the frustoconical protrusion 4124 and the seal 4140 is described in U.S. patent application Ser. No. 13/271,650, filed Oct. 12, 2011, U.S. patent application Ser. No. 13/272,005, filed Oct. 12, 2011, and U.S. patent application Ser. No. 13/623,348, filed Sep. 20, 2012. The entire contents of these three published applications is hereby incorporated by reference herein. In other embodiments, the bracket 4050 may have a different shape, and/or the seal 4140 may be formed integrally with the base portion 4150 of the bracket 4050.

Figure 108A:
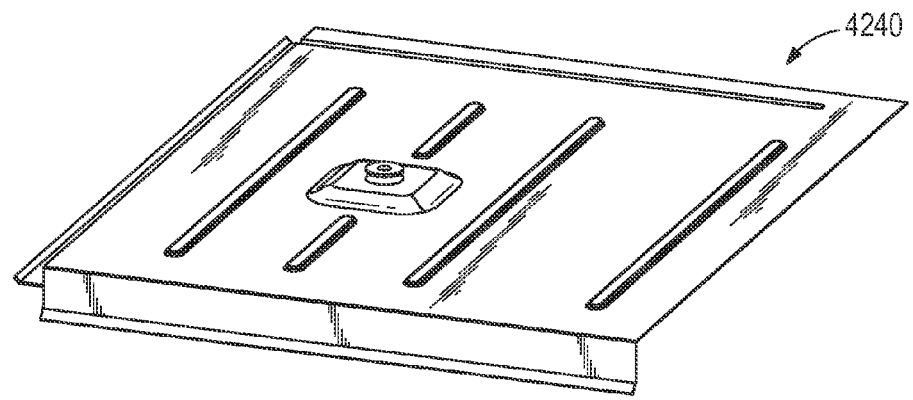
FIG. 108A is a perspective view of a flat flashing member.
Figure 108B:
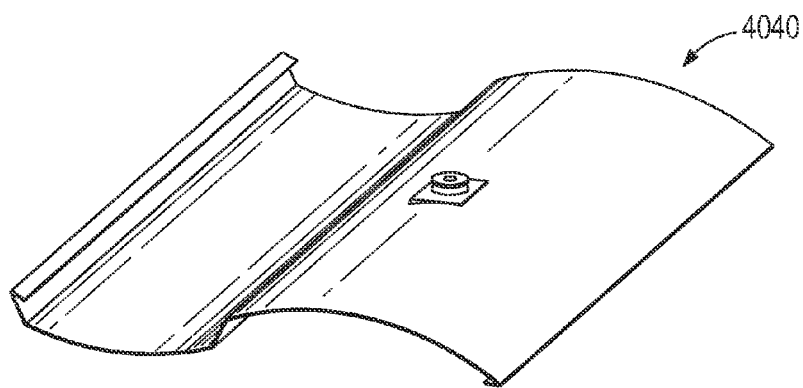
FIG. 108B is a perspective view of an S-shaped flashing member.
Figure 108C:
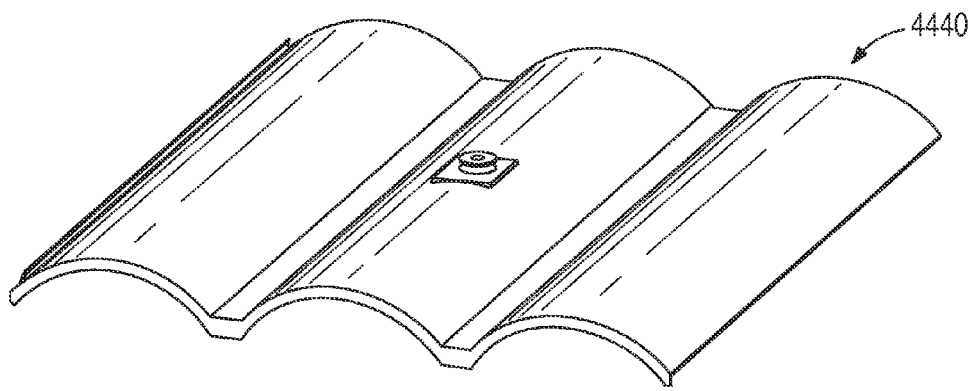
FIG. 108C is a perspective view of a W-shaped flashing member.

In the embodiment of FIGS. 104-106, the flashing 4040 has an S-shaped cross-section similar to the flashing shown in FIG. 108B. In other embodiments, the flashing 4240 (FIG. 108A) is formed as a substantially flat member. In another embodiment, the flashing 4440 (FIG. 108C) is formed with a wavy, W-shaped cross-section. In general, the flashing 4040 is formed in a shape that corresponds to the shape of the other tiles supported on the roof so that that flashing 4040 will mate with the other tiles and blend in with the other tiles by mimicking their appearance. The flashing 4040 is formed to replace an existing tile on a roof and interlock with the adjacent tiles (e.g., by grooves 4242 and/or tabs 4244).

Figure 109:
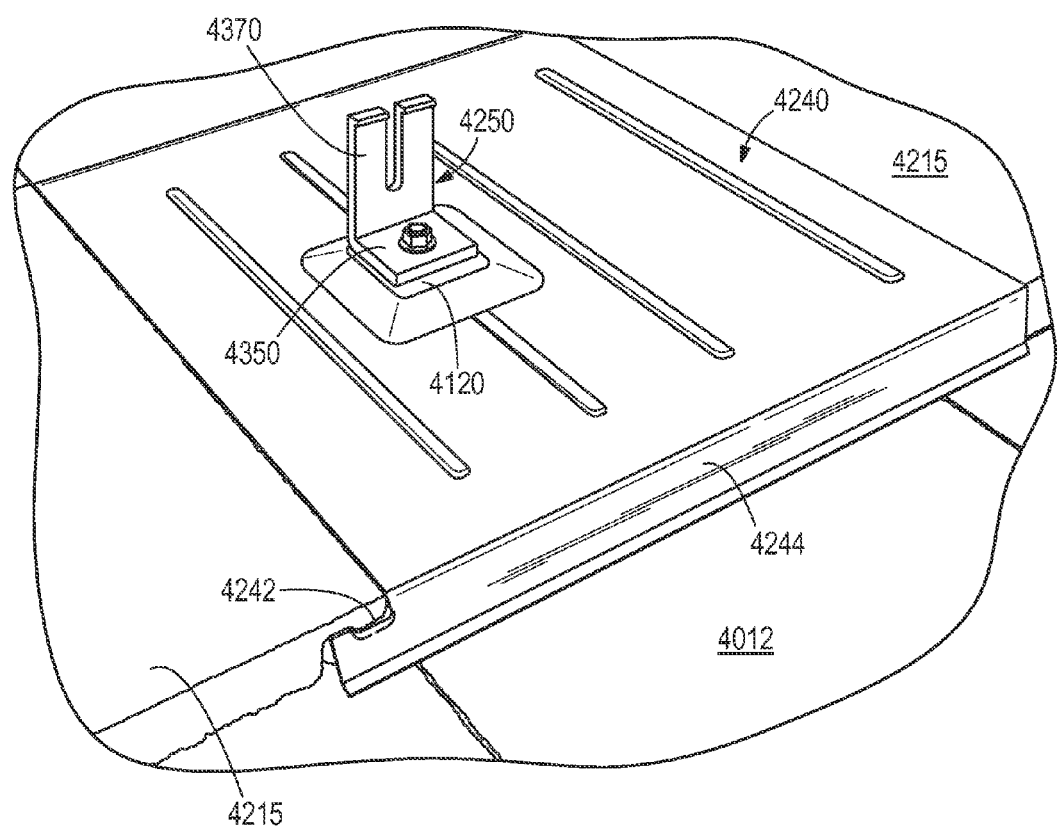
FIG. 109 is a perspective view of a tile mount assembly according to another embodiment.

FIGS. 109-113 illustrate a tile mount assembly 4210 according to another embodiment. The components of this embodiment are substantially similar to the components of the tile mount 4010, and are indicated with similar reference numbers, plus 200. As shown in FIG. 109, the flashing 4240 is formed as a substantially flat member and includes one or more grooves 4242 and tabs 4244 proximate the edges of the flashing member 4240 to interlock and engage the adjacent tiles 4215.

Figure 110:
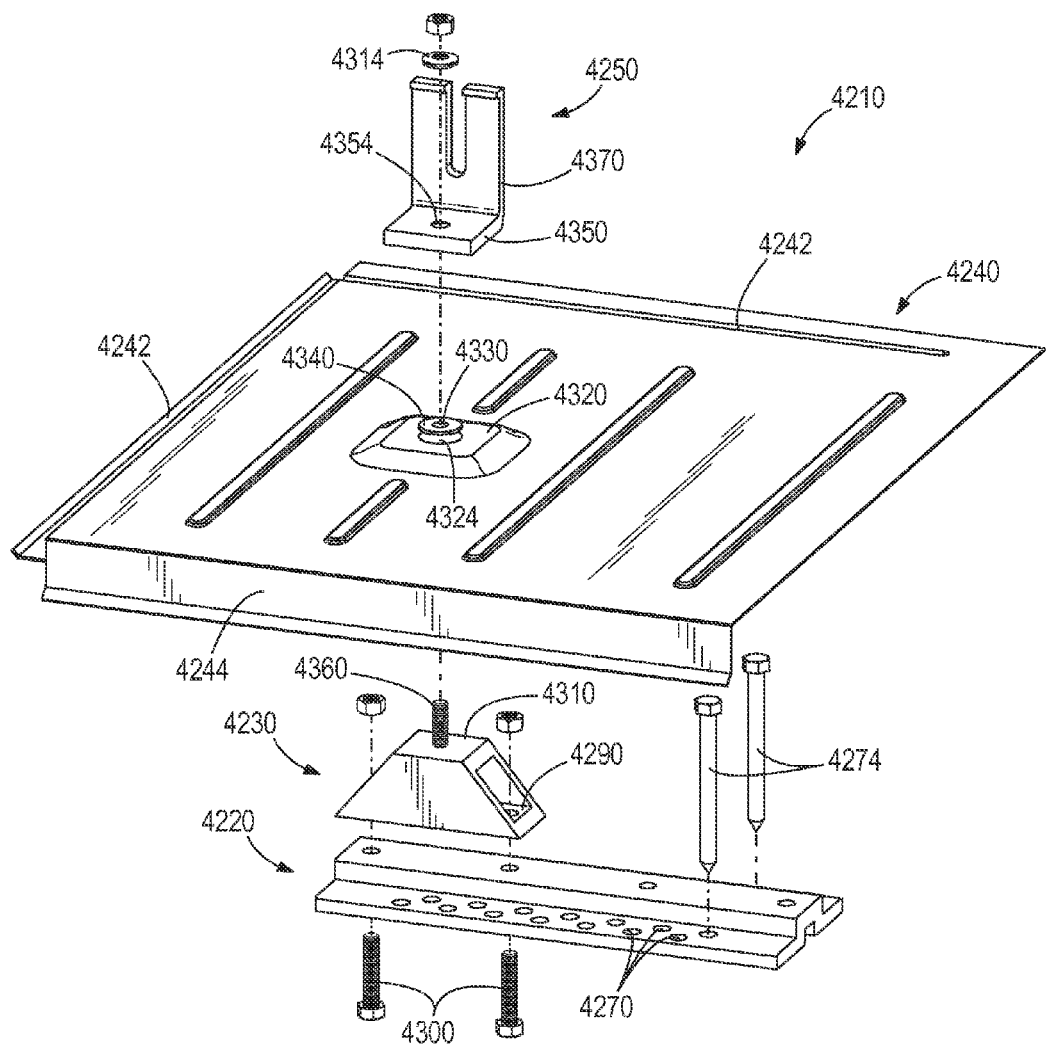
FIG. 110 is an exploded view of the tile mount assembly of FIG. 109.
Figure 111:
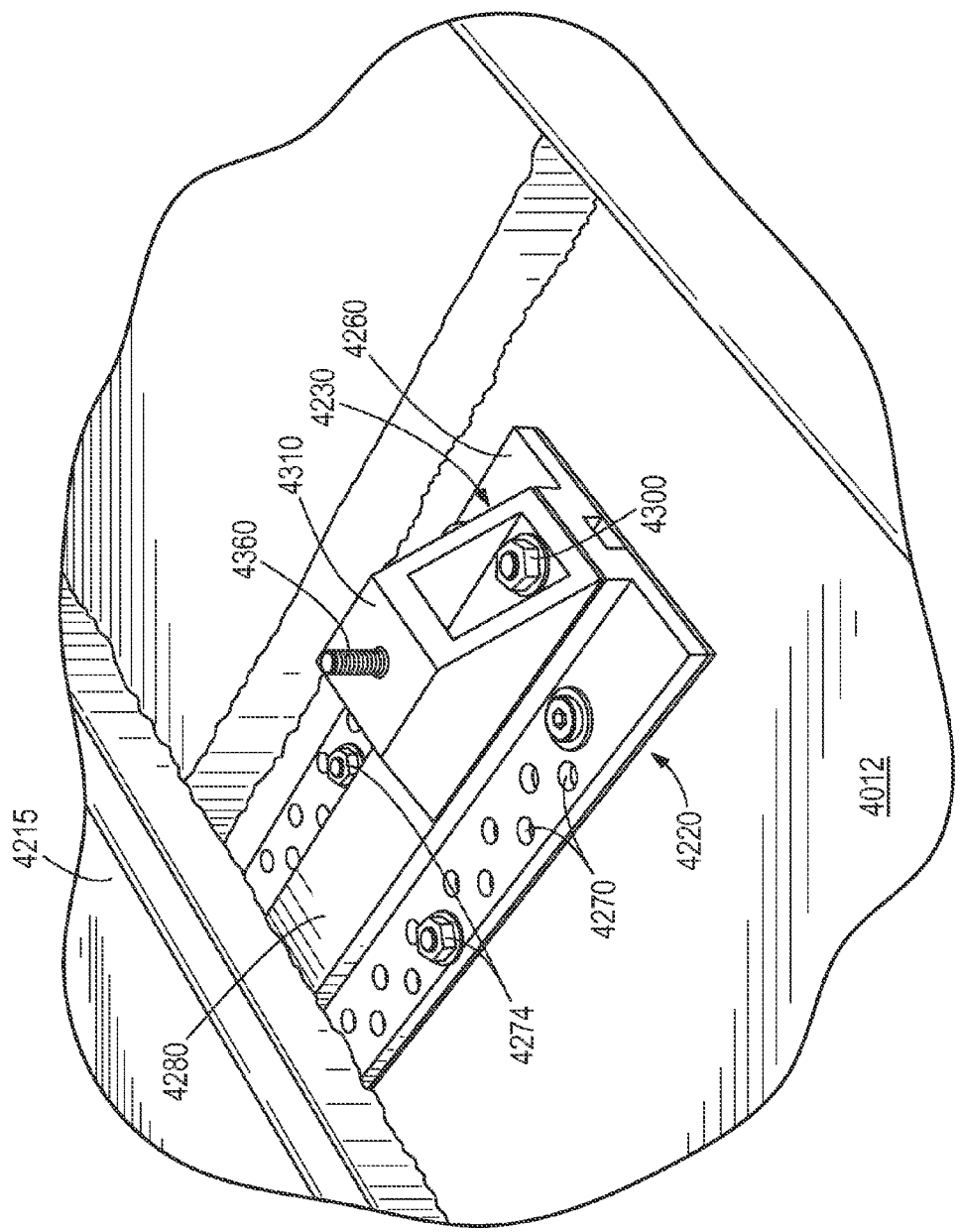
FIG. 111 is a perspective view of the tile mount assembly of FIG. 109 with a flashing removed to show a standoff and a base.
Figure 112:
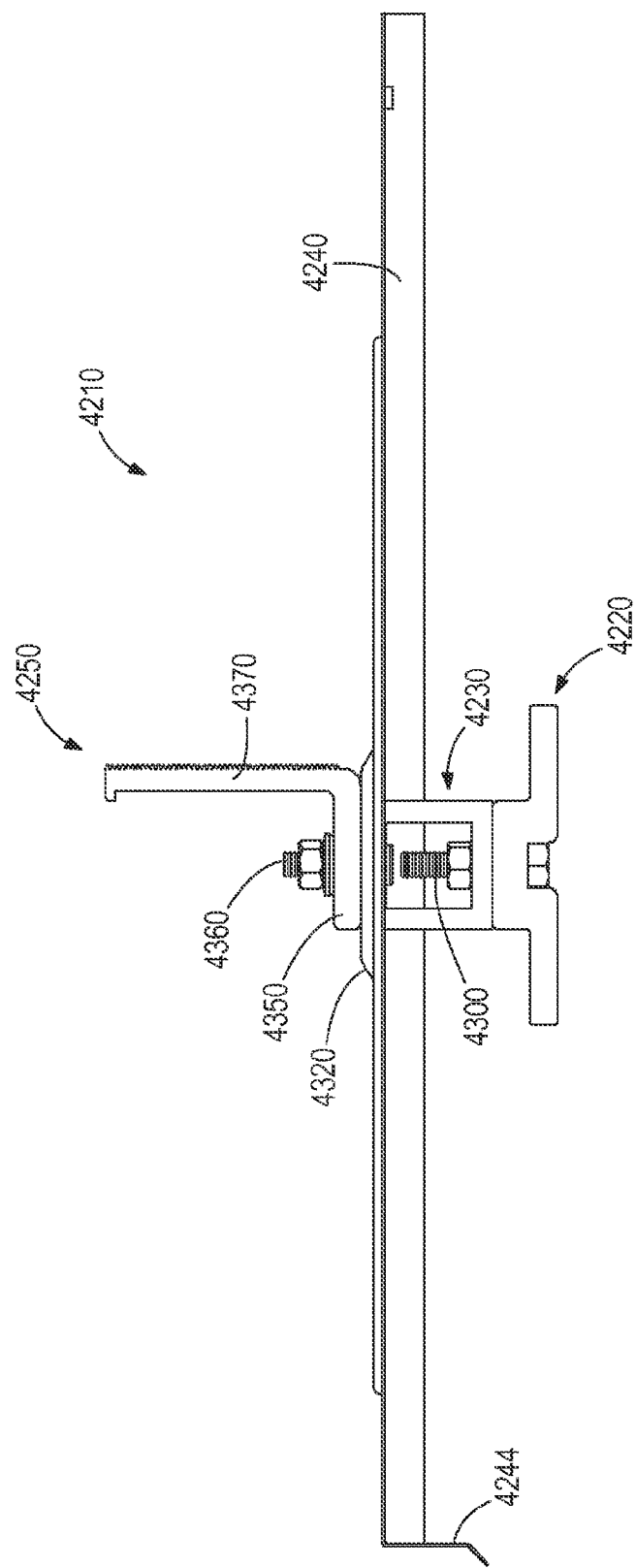
Figure 113:
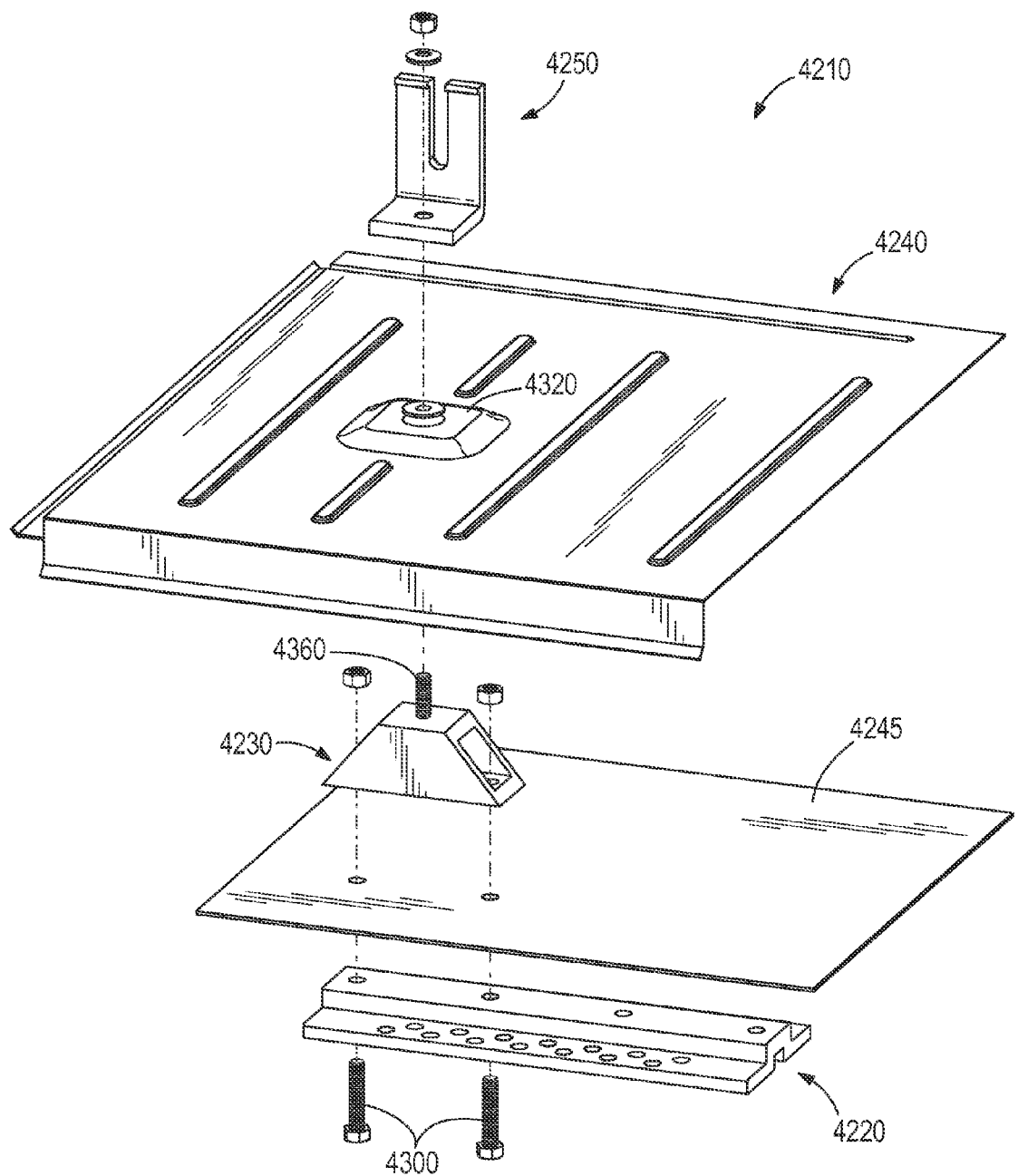
Figure 114:
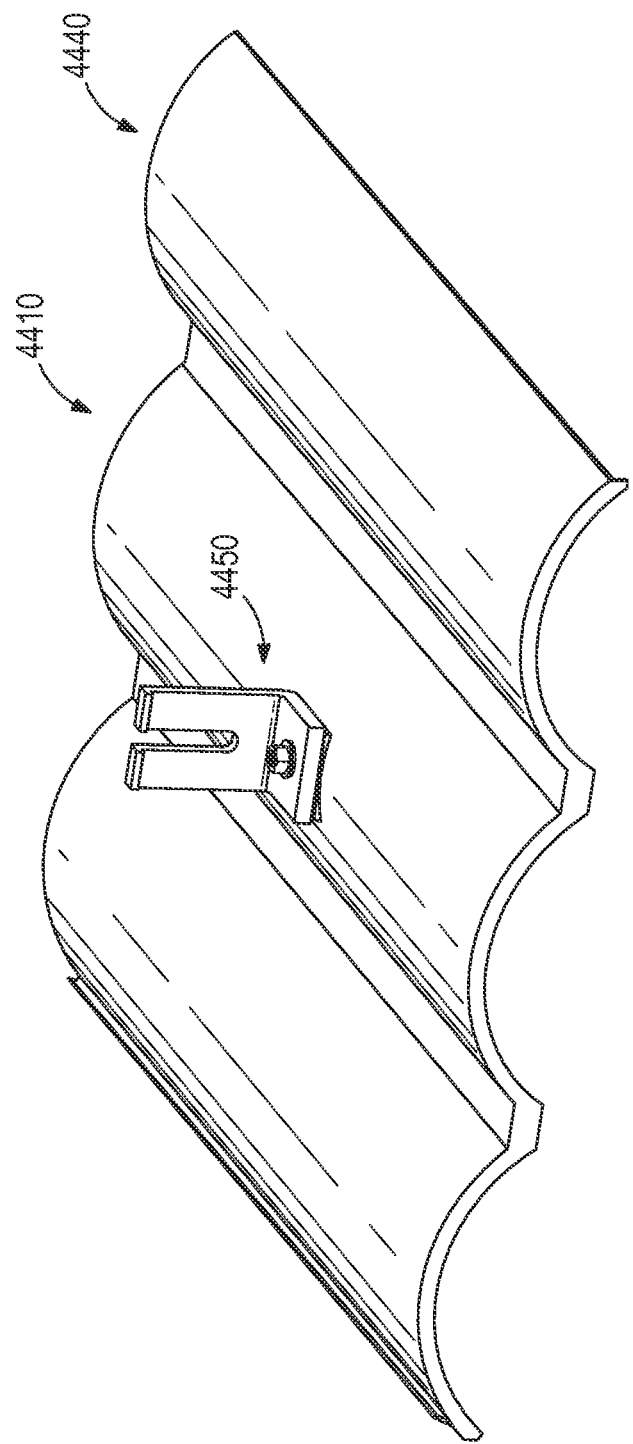
Figure 115:
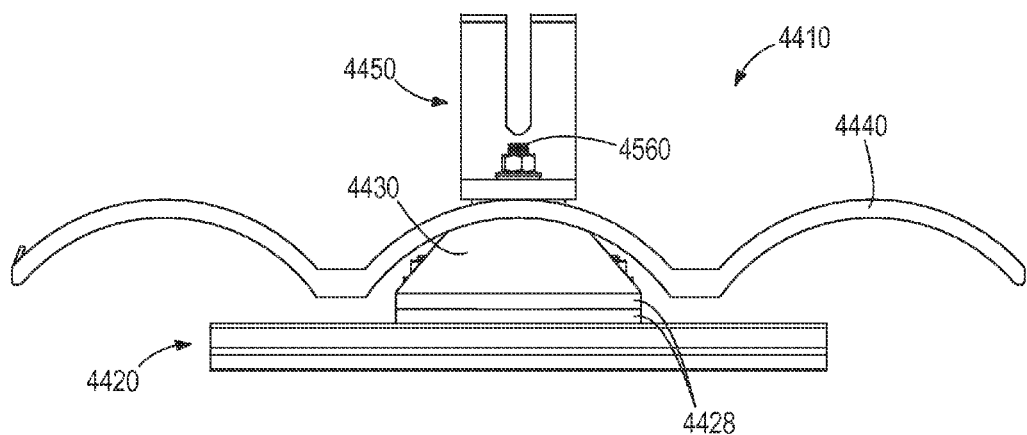
Figure 116:
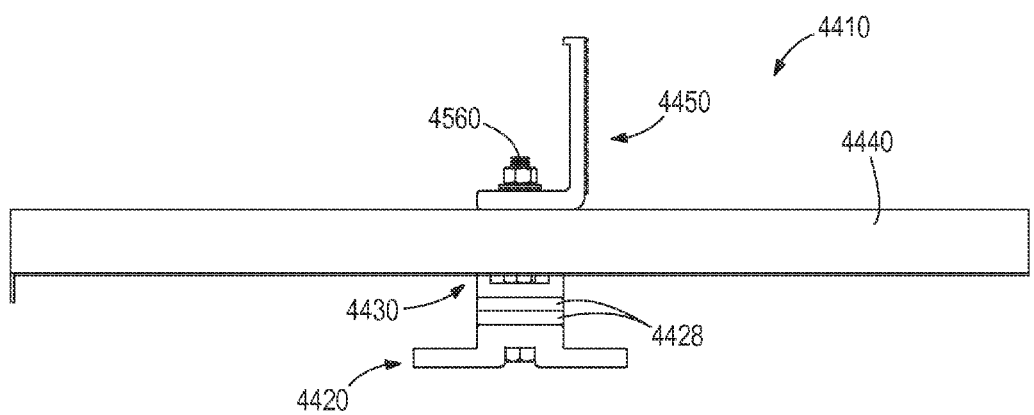

As best shown in FIG. 110, a standoff 4230 includes a top surface 4310 and an upwardly extending bolt 4360 that mates with the base portion 4350 of the bracket 4250. Referring to FIG. 111, the base 4220 is coupled to the surface of the roof 4012 beneath the flashing 4240. During installation, the base 4220 may be moved laterally along the roof surface so that the base 4220 can be coupled to a roof joist. The base 4220 includes multiple sets of holes 4270 for received fasteners 4274 to couple the base 4220 to the roof 4012 while still allowing the standoff 4260 to be positioned under the boss 4320. Also, as shown in FIG. 113, the tile mount assembly 4210 may include a secondary flashing layer 4245.

Figure 117:
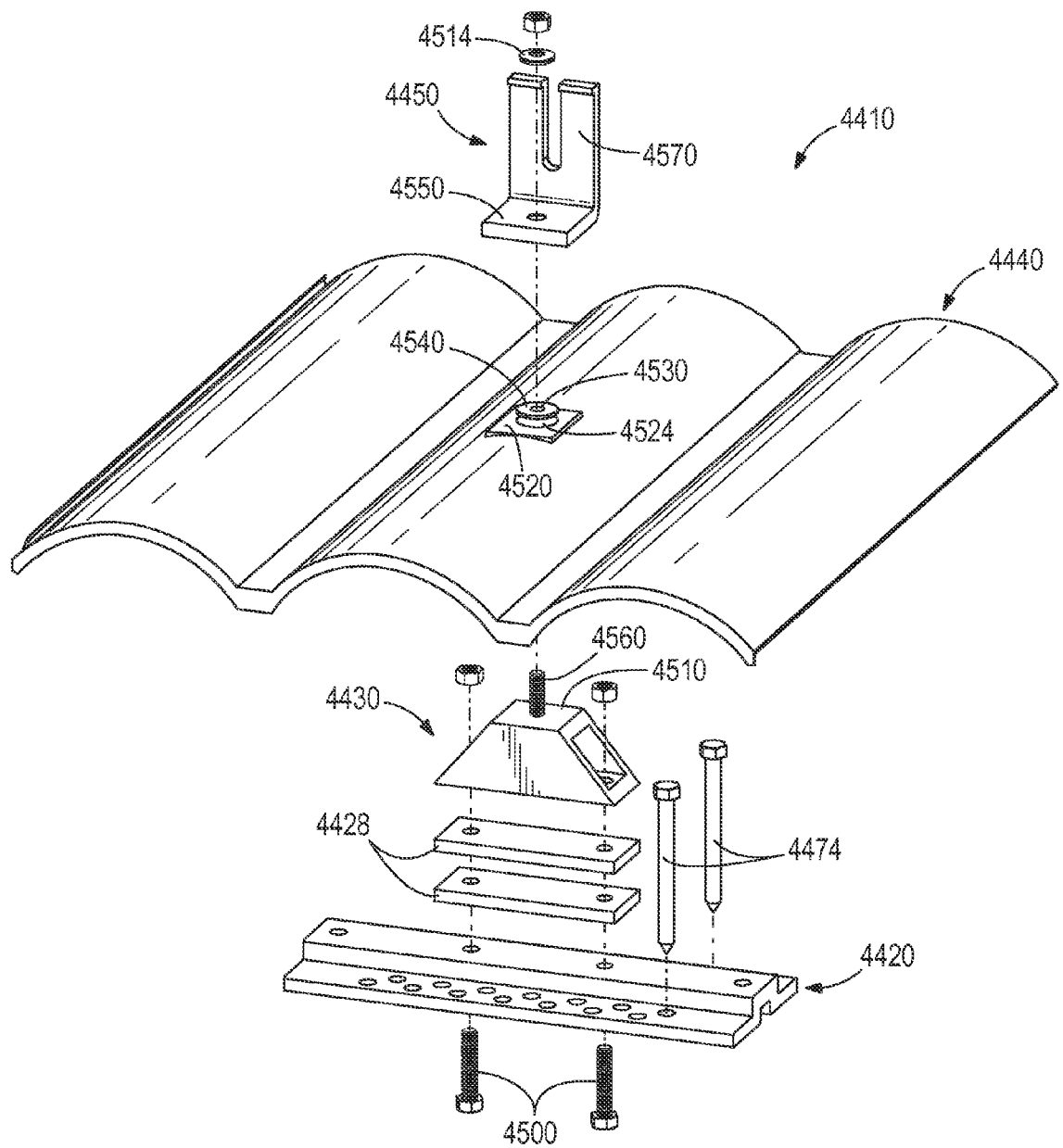

FIGS. 114-117 illustrate another embodiment of the tile mount 4410. The components of this embodiment are substantially similar to the components of the tile mount 4010, and are indicated with similar reference numbers, plus 400. The tile mount assembly 4410 includes a flashing member 4440 having a wavy cross-section. The flashing 4440 can be used with tile roofs having a similar shape (e.g., Spanish-style roof tile). As shown in FIG. 117, the boss 5520 is positioned at or near one of the peaks of the flashing 4440. Also, in the illustrated embodiment, shims 4428 are positioned between the standoff 4430 and the base 4420. The shims 4428 provide an additional height adjustment to position the flashing 4440 at the desired elevation above the roof 4012 with respect to adjacent tiles (not shown). Although only shown with respect to the embodiment of FIG. 117, the shims 4428 could also be incorporated into other embodiments described above or below. Also, the elevation of the flashing 4440 may be adjusted by substituting the standoff 4430 with a standoff having a different height. In addition, to adjusting the height of the flashing 4440 relative to the roof 4012, the tile mount assembly 4410 allows a user to adjust the height of the solar panel to make sure there is sufficient space between a solar panel coupled to the bracket 4450 and the flashing 4440 and/or roof tiles.

Figure 118:
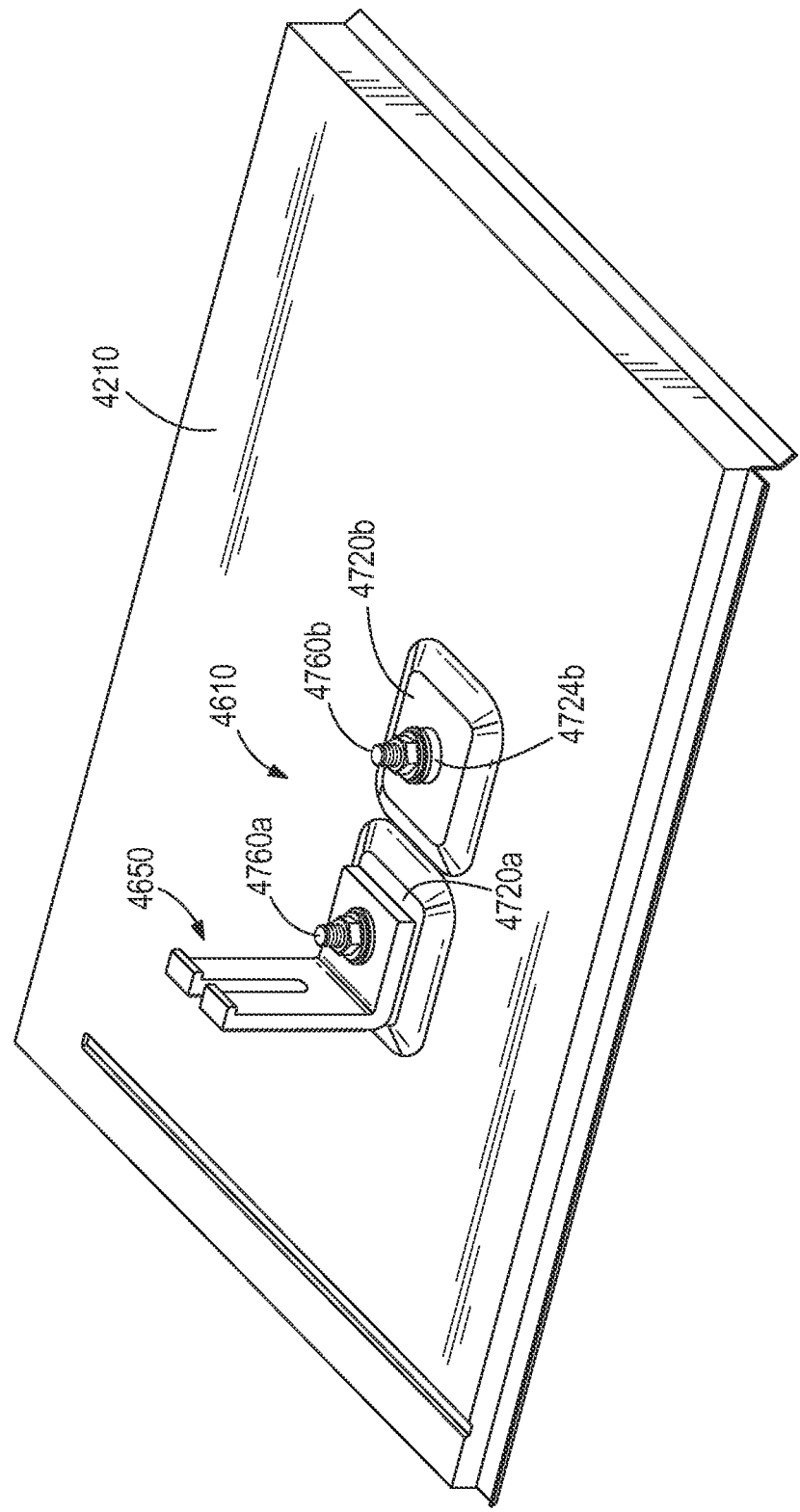
Figure 119:
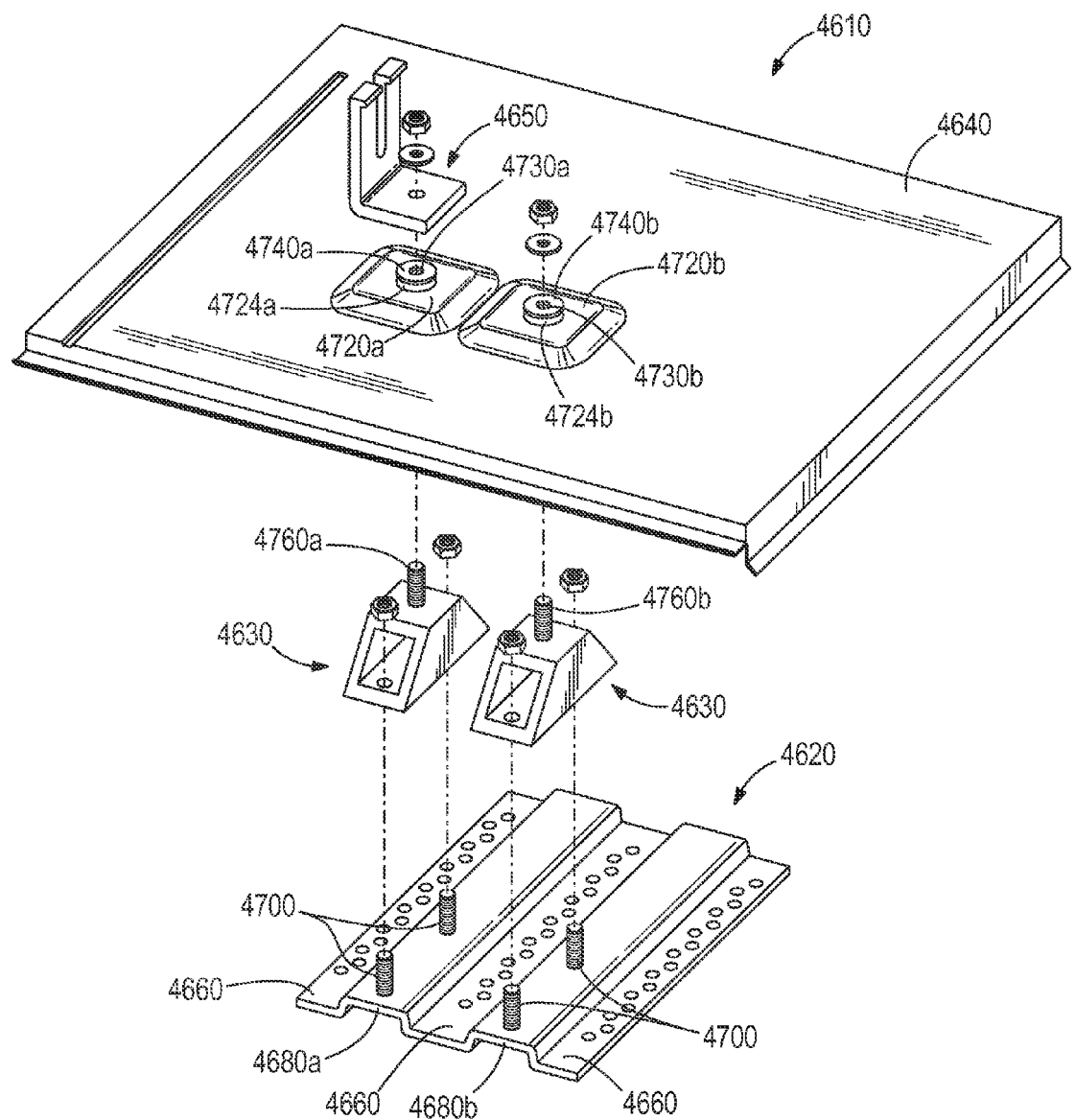

FIGS. 118 and 119 illustrate another embodiment of the tile mount 4610. The components of this embodiment are substantially similar to the components of the tile mount 4210 (FIGS. 109-113), and are indicated with similar reference numbers, plus 400. As best shown in FIG. 119, the base 4620 includes a pair of parallel central portions 4680*a*, 4680*b* with flanges 4660 extending along the outer edges of the central portions 4680*a*, 4680*b* and extending between the central portions 4680*a*, 4680*b*. A second standoff 4630*b* is coupled to the second central portion 4680*b*. In addition, the flashing 4640 includes a second boss 4720*b* adjacent the first boss 4720*a*. The second boss 4720*b* includes a second frustoconical protrusion 4724*b*, a second aperture 4730*b*, and a second seal 4740*b*. The second boss 4720*b* provides a second mounting point for a bracket 4650, allowing the position of the bracket 4650 to be adjusted to accommodate the position of the solar panel, and/or provides a mounting point for a second bracket 4650*b*.

Figure 120:
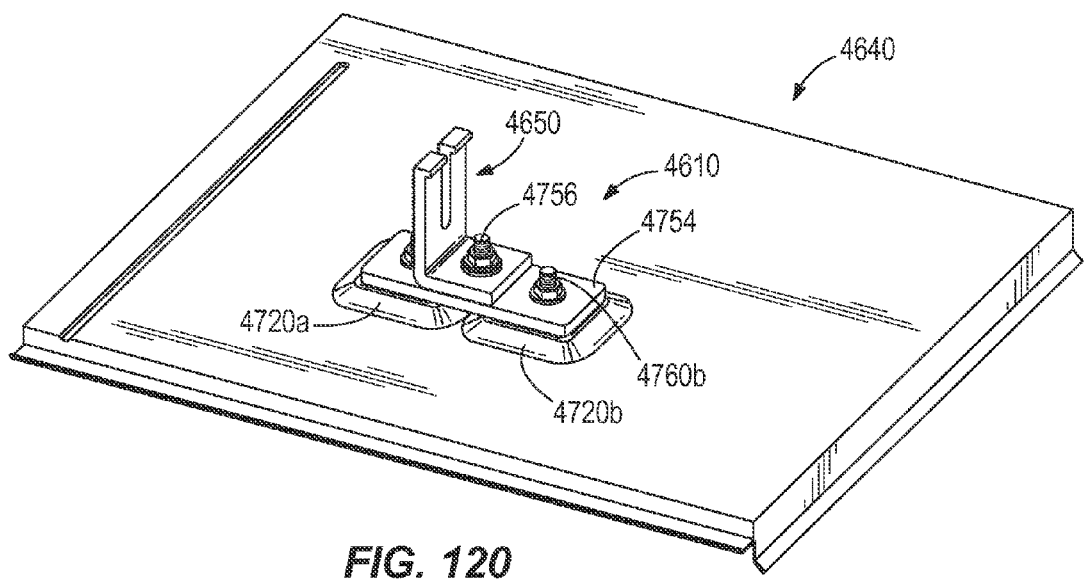
Figure 121:
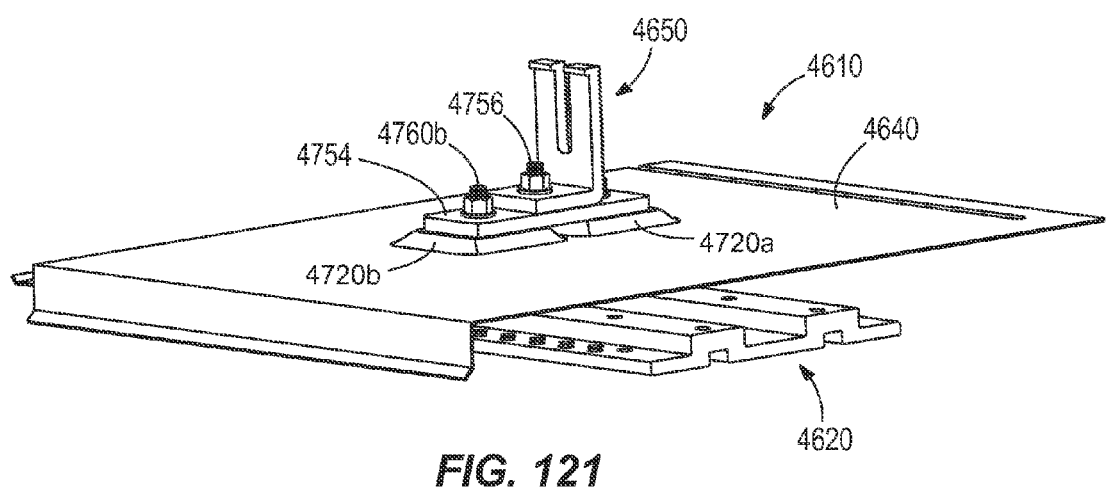
Figure 122:
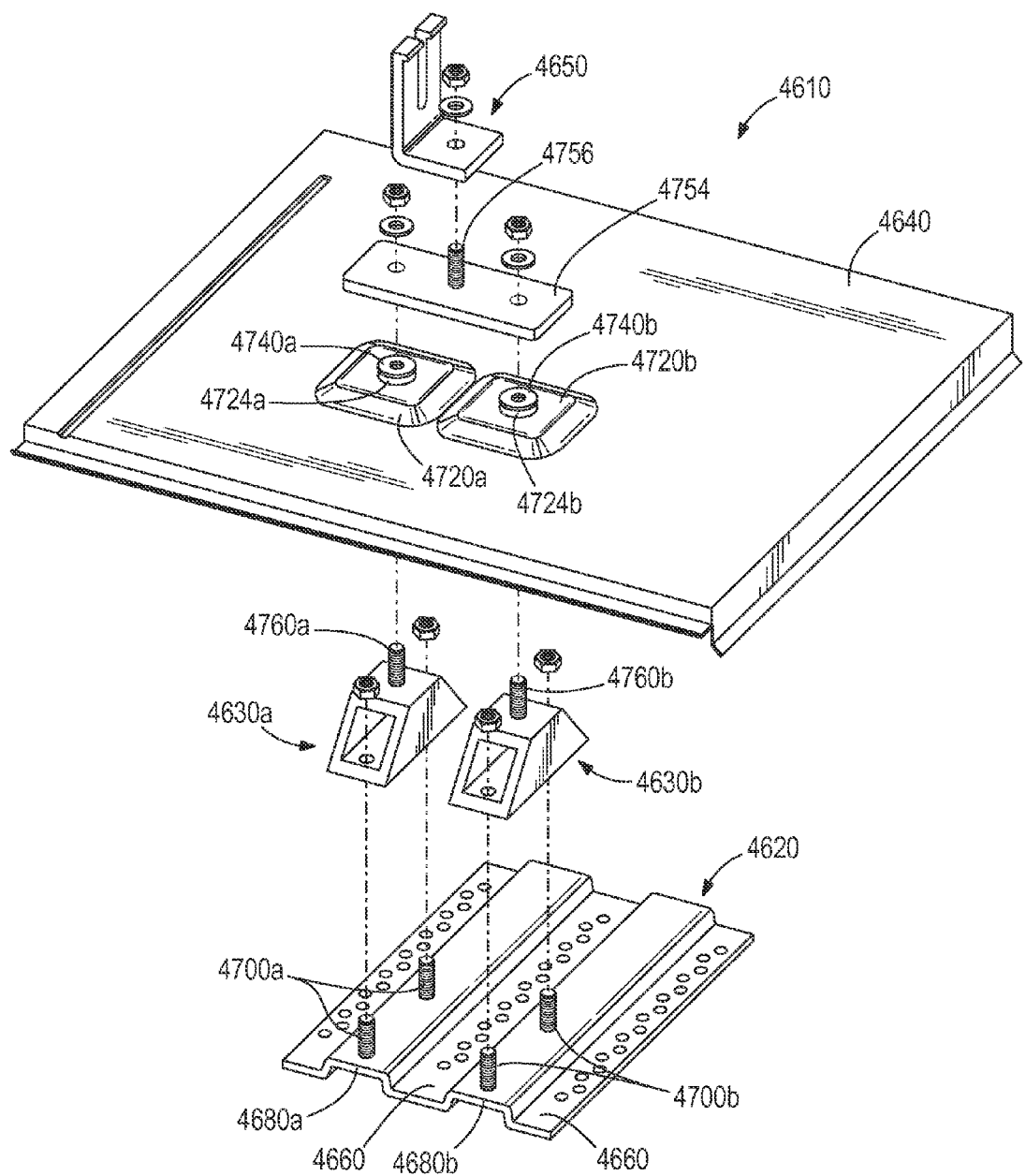

FIGS. 120-122 illustrate another embodiment in which the tile mount assembly 4610 includes a plate 4754 extending between the bosses 4720*a*, 4720*b*, and the bracket 4650 is supported on the plate 4754 by a fastener 4756.

FIGS. 123-125 illustrate another embodiment of the tile mount 4810. The components of this embodiment are substantially similar to the components of the tile mount 4610 (FIGS. 118 and 119), and are indicated with similar reference numbers, plus 200. As best shown in FIG. 124, the standoff 4830 is formed as a single block extending between and coupled to the central portions 4880*a*, 4880*b* of the base 4820. In one embodiment, the standoff 4880 is formed as a hollow rectangular block having two fasteners 4960. A secondary flashing member 4845 (FIG. 124) is positioned between the base 4820 and the standoff 4830. In addition, the flashing 4840 includes a single elongated boss 4920 extending between the mounting points. The boss 4920 includes two frustoconical protrusions 4924, each having a hole 4930 through which one of the fasteners 4960 extends. A seal 4940 extends around each hole 4930. In the illustrated embodiment, a plate 4954 is coupled to the top of the boss 4920. FIG. 125 illustrates the plate 4954, which includes multiple countersunk holes 4958 for receiving the frustoconical protrusions 4924 and the seals 4940.

In other embodiments (FIG. 126), the tile mount assembly 4810 does not include the plate 4954, and a bracket or slide member 4962 is coupled to the flashing 5040. The slide 4962 includes a slot or groove opening upwardly (i.e., away from the roof). The groove receives a fastener at any point along the length of the slide member 4962, permitting a user to adjust a position of a bracket supporting the solar panel or other attachment structure. In other embodiments (FIG. 127), the tile mount 4810 does not include the plate 4954 and a bracket 4850 (similar to the bracket described above with respect to FIGS. 118-120) is coupled directly to the boss 4920. In still other embodiments (FIG. 128), the tile mount assembly 5010 includes a single elongated boss 5120 and a pair of standoffs 5030*a*, 5030*b* similar to the standoffs described with respect to FIG. 122. Each of the standoffs 5030*a*, 5030*b* are coupled to a central portion 5080*a*, 5080*b* of the base 5020.

FIGS. 129-130 illustrate another embodiment of the tile mount assembly 5610. The tile mount assembly 5610 includes a bracket 5650 coupled to a flashing member 5640, a seal 5740, a washer 5746, and a fastener 5660, but does not include a base and standoff positioned beneath the flashing 5640. As shown in FIG. 130, the seal 5740 includes a frustoconical portion 5742 and a lip 5744 extending around an end of the seal 5740. The seal 5740 is press fit into a countersink hole on a base portion 5750 of the bracket 5650 and it retained in the hole by the lip 5742. The bracket 5650 and seal 5740 are positioned in a desired location on the flashing 5640. The washer 5746 is then positioned over the seal 5740 and the fastener 5660 (e.g., a lag bolt, a hanger bolt, or a self-drilling screw) is inserted into the hole and through the flashing 5640 to engage the roof 5612. In the illustrated embodiment, the washer 5746 is a bonded EPDM and stainless steel washer, and the EPDM side of the washer 5746 is positioned proximate the base portion 5750 of the bracket 5650. The fastener 5660 is tightened to a desired torque.

As shown in FIG. 131, the bracket 5650 includes a lip 5772 near a top of an upright portion 5770, and one side of the upright portion 5770 includes a scored or serrated or otherwise roughened surface 5776 to facilitate gripping a surface of the solar panel. In other embodiments (FIG. 132), the upright portion 5770 does not include a lip and both sides of the upright portion 5770 are roughened. In other embodiments (FIG. 133), the upright portion 5770 includes an arm 5778 extending perpendicularly from the upright portion 5770 and including a slot 5782 to engage the solar panel. In other embodiments (FIG. 134), the base portion of the bracket 5650 includes a groove positioned between two hollow channels.

FIGS. 135-138 illustrate another embodiment of a tile mount assembly 5810 including a slide 5962 that is coupled directly to the flashing boss 5920. The slide 5962 provides a mounting point for a bracket 5850 (e.g., a supplier bracket configured to mount a solar panel). In the embodiment shown in FIG. 136, the standoff 5830 is formed as a hollow, rectangular block, and the flashing 5840 has a wavy, W-shaped cross-section. In other embodiments, the flashing 5840 may be formed as a substantially flat member (FIG. 139) or a member with an S-shaped cross-section (FIG. 140), depending on the shape of the adjacent roof tile.

As best shown in the side view of FIG. 138, the slide 5962 includes a first portion or flange 5963 abutting the boss 5920 and including a countersink (not shown) that compresses the seal 5940 against the frustoconical protrusion 5924. A fastener 5960 attaches the flange 5963 to the flashing 5840, and a bonded EPDM washer 5946 seals the area around the fastener 5960. In some embodiments, the flange 5963 includes multiple countersinks to allow adjustment of the position of the slide 5962 relative to the boss 5920. The slide 5962 also includes a second portion or groove 5965 extending along the length of the groove 5965 and receiving a fastener 5969. The fastener 5965 may be positioned at any point along the length of the slide 5962. As a result, the bracket 5850 can be positioned at any point along the length of the slide 5962, permitting finer adjustment of the positioned of the bracket 5850. The bracket 5850 is coupled to the fastener 5969 by a nut 5971. In one embodiment, the nut 5971 is a serrated flange nut.

FIGS. 141-147 illustrate another embodiment of a tile mount assembly 6010 for use with a shingle roof. As shown in FIG. 141, the tile mount assembly 6010 includes a flashing 6040 that is formed as a flat sheet. Referring to FIGS. 142-143, the flashing includes a frustoconical protrusion 6124 and a seal 6140. As shown in FIGS. 145-147, a pair of notches 6179 are formed in an end of the flashing 6040 that is positioned underneath shingles 6177 (FIGS. 146-147). The notches 6179 permit the flashing 6040 to slide into engagement around nails 6183 securing the shingles 6177 against the roof. In other embodiments, the flashing 6040 may include fewer or more notches 6179. Once the flashing 6040 is positioned, a fastener 6160 is inserted through a hole 6158 first portion or flange 6163 of a slide 6162, through a hole in the flashing 6040, and into the roof 6012, and possibly a roof joist 6013. A bonded EPDM washer 6146 is positioned between the head of the fastener 6160 and the flange 6163 to prevent leaking through the shingles 6177. Once the slide 6162 is in place (FIG. 144), a bracket 6050 may be secured by a fastener 6165 positioned in a second portion or groove 6165 of the slide 6162.

While reference is made herein to the use of the present invention on tile roofs, it should be noted that aspects of the present invention can also or alternately be used on other roofing structures.

The embodiments described above and illustrated in the figures are presented by way of example only and are not intended as a limitation upon the concepts and principles of the present invention. Various features and advantages of the invention are set forth in the following claims.

The invention claimed is:

1. A mount assembly for mounting a structure to a roof, the roof including a top surface, the mount assembly comprising:
   a flashing including an aperture;
   a bracket including a first portion and a second portion, the first portion having an opening and a countersink extending around the opening, the second portion extending at an angle away from the flashing, the second portion including a slot configured to be coupled to the structure;
   a fastener extending through the aperture and through the opening of the bracket; and
   a seal extending around the aperture and positioned between the flashing and the first portion of the bracket, the seal engaging the countersink of the bracket and being compressed against the flashing.

2. The mount assembly of claim 1, further comprising a base configured to be coupled to the top surface of the roof and positioned beneath the flashing, and a block coupled to the base and having an upper surface, wherein the flashing includes an embossed portion abutting the upper surface of the block, wherein the flashing aperture is positioned on the embossed portion.

3. The mount assembly of claim 2, wherein the embossed portion of the flashing includes a frustoconical protrusion surrounding the aperture, and wherein the seal is coupled to the aperture in the flashing and the opening of the first portion of the bracket is aligned with the aperture, such that the countersink of the bracket first portion compresses the seal against the frustoconical protrusion of the embossed portion.

4. The mount assembly of claim 2, wherein the fastener extends from the upper surface of the block through the aperture.

5. The mount assembly of claim 2, wherein the base includes a plurality of holes for receiving fasteners to couple the base to the top surface of the roof.

6. The mount assembly of claim 2, further comprising a shim positioned between the block and the base.

7. The mount assembly of claim 2, wherein the flashing further includes a second embossed portion adjacent the first embossed portion and including a second aperture, the mount assembly further comprising a second block having an upper surface abutting the second embossed portion.

8. The mount assembly of claim 7, further comprising a plate extending between the first embossed portion and the second embossed portion, the plate abutting the first embossed portion and the second embossed portion, wherein the bracket is coupled to the plate.

9. The mount assembly of claim 8, wherein the plate includes at least one opening and a countersink to engage the seal.

10. The mount assembly of claim 2, further comprising a secondary flashing member positioned between the base and the block.

11. The mount assembly of claim 2, wherein the block has a trapezoidal shape.

12. The mount assembly of claim 1, wherein the flashing is configured to have a shape similar to adjacent roof tiles.

13. The mount assembly of claim 1, wherein the flashing includes at least one of a tab for engaging an adjacent tile and a groove for receiving a portion of an adjacent tile.

14. The mount assembly of claim 1, wherein the seal includes a frustoconical portion that is received within the countersink of the bracket.

15. The mount assembly of claim 1, wherein the second portion of the bracket includes a scored surface.

16. The mount assembly of claim 1, wherein the slot of the second portion of the bracket is an elongated slot that receives a fastener of a solar panel and permitting a fastener to be positioned at various distances from the flashing.

17. The mount assembly of claim 1, wherein the bracket further includes a third portion extending at an angle with respect to the second portion.

18. The mount assembly of claim 1, wherein the second portion includes a groove opening in a direction away from the roof and extending along a length of the bracket.

19. The mount assembly of claim 18, wherein the bracket is a first bracket and the groove receives a fastener for coupling a second bracket to the first bracket.

20. The mount assembly of claim 1, wherein the flashing is formed as a substantially flat member having a frustoconical protrusion, wherein at least a portion of the flashing is configured to be inserted underneath a shingle attached to the roof.

21. The mount assembly of claim 20, wherein the flashing includes at least one notch configured to extend around a fastener secured to the roof.

22. A mount assembly mounting a structure to a roof, the roof including a top surface, the mount assembly comprising:
   a base coupled to the top surface of the roof;
   a block coupled to the base and having an upper surface;
   a flashing including an embossed portion adjacent the upper surface of the block and an aperture positioned on the embossed portion;
   a bracket including a first portion and a second portion, the first portion having an opening aligned with the aperture and a countersink extending around the opening, the second portion extending away from the flashing, the second portion including a slot configured to be coupled to the structure;
a fastener extending through the aperture and through the opening of the bracket; and a seal extending around the aperture and positioned between the flashing and the first portion of the bracket, the seal engaging the countersink of the bracket and being compressed against the flashing.

23. The mount assembly of claim 22, wherein the embossed portion of the flashing includes a frustoconical protrusion extending around the aperture, and wherein the seal is coupled to the aperture in the flashing and the opening of the first portion of the bracket is aligned with the aperture, such that coupling the bracket to the embossed portion compresses the seal between the countersink and the frustoconical protrusion of the embossed portion.

24. The mount assembly of claim 22, wherein the fastener extends from the upper surface of the block through the aperture.

25. The mount assembly of claim 22, wherein the base includes a plurality of predetermined mounting points for coupling the base to the top surface of the roof.

26. The mount assembly of claim 22, further comprising a secondary flashing member positioned between the base and the block.

27. The mount assembly of claim 22, wherein the block has a trapezoidal shape.

28. The mount assembly of claim 22, wherein the flashing includes at least one of a tab for engaging an adjacent tile and a groove for receiving a portion of an adjacent tile.

29. The mount assembly of claim 22, wherein the seal includes a frustoconical portion that is received within the countersink of the bracket.

30. The mount assembly of claim 22, wherein the slot of the second portion of the bracket receives a fastener of a solar panel.

* * * * *